(12) United States Patent
Yang et al.

(10) Patent No.: US 10,356,132 B2
(45) Date of Patent: Jul. 16, 2019

(54) APPARATUS FOR TRANSMITTING BROADCAST SIGNALS, APPARATUS FOR RECEIVING BROADCAST SIGNALS, METHOD OF TRANSMITTING BROADCAST SIGNALS AND METHOD OF RECEIVING BROADCAST SIGNALS

(71) Applicant: LG ELECTRONICS INC., Seoul (KR)

(72) Inventors: Seungryul Yang, Seoul (KR); Minsung Kwak, Seoul (KR); Kyoungsoo Moon, Seoul (KR); Woosuk Ko, Seoul (KR); Sungryong Hong, Seoul (KR); Jangwon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 318 days.

(21) Appl. No.: 15/119,347

(22) PCT Filed: Feb. 29, 2016

(86) PCT No.: PCT/KR2016/002003
§ 371 (c)(1),
(2) Date: Aug. 16, 2016

(87) PCT Pub. No.: WO2016/140483
PCT Pub. Date: Sep. 9, 2016

(65) Prior Publication Data
US 2017/0013028 A1 Jan. 12, 2017

Related U.S. Application Data

(60) Provisional application No. 62/126,693, filed on Mar. 1, 2015, provisional application No. 62/126,708, filed
(Continued)

(51) Int. Cl.
*G06F 15/16* (2006.01)
*H04N 5/455* (2006.01)
(Continued)

(52) U.S. Cl.
CPC .... *H04L 65/1069* (2013.01); *H04L 29/06108* (2013.01); *H04L 65/4076* (2013.01);
(Continued)

(58) Field of Classification Search
CPC .................... H04L 29/06108–29/06115; H04L 29/08081–29/08099; H04L 69/162;
(Continued)

(56) References Cited

U.S. PATENT DOCUMENTS

2006/0291412 A1* 12/2006 Naqvi ................... H04M 7/123
370/328
2007/0206590 A1 9/2007 Baek et al.
(Continued)

FOREIGN PATENT DOCUMENTS

CN 104737549 A 6/2015
KR 10-2007-0081385 A 8/2007
(Continued)

OTHER PUBLICATIONS

Upgrading HTTP to WebSocket, dated Dec. 20, 2014, http://enterprisewebbook.com/ch8_websockets.html (Year: 2014).*
(Continued)

*Primary Examiner* — Brendan Y Higa
(74) *Attorney, Agent, or Firm* — Birch, Stewart, Kolasch & Birch, LLP

(57) ABSTRACT

The present invention proposes a method of transmitting a broadcast signal. The method of transmitting the broadcast signal according to the present invention proposes a system capable of supporting a next-generation broadcast service in an environment that supports next-generation broadcasting using a terrestrial broadcast network and an Internet protocol network. In addition, the present invention proposes an efficient signaling scheme for both the terrestrial broadcasting network and the Internet protocol network in the environment that supports next-generation broadcasting.

12 Claims, 102 Drawing Sheets

Related U.S. Application Data on Mar. 1, 2015, provisional application No. 62/144,311, filed on Apr. 7, 2015.

(51) Int. Cl.

| | |
|---|---|
| *H04L 29/06* | (2006.01) |
| *H04N 21/858* | (2011.01) |
| *H04N 21/41* | (2011.01) |
| *H04N 21/482* | (2011.01) |
| *H04N 21/2343* | (2011.01) |
| *H04N 21/235* | (2011.01) |
| *H04L 29/08* | (2006.01) |
| *H04N 21/2362* | (2011.01) |
| *H04N 21/643* | (2011.01) |
| *H04N 21/845* | (2011.01) |

(52) U.S. Cl.
CPC .............. *H04L 67/02* (2013.01); *H04L 67/18* (2013.01); *H04L 69/162* (2013.01); *H04N 21/235* (2013.01); *H04N 21/2343* (2013.01); *H04N 21/2362* (2013.01); *H04N 21/4104* (2013.01); *H04N 21/482* (2013.01); *H04N 21/64322* (2013.01); *H04N 21/8456* (2013.01); *H04N 21/8586* (2013.01)

(58) Field of Classification Search
CPC ... H04L 65/4076; H04L 67/02; H04L 67/141; H04N 21/4104; H04N 21/482–21/4828; H04N 21/8166–21/8186; H04N 21/858–21/8586
See application file for complete search history.

(56) References Cited

U.S. PATENT DOCUMENTS

| | | | |
|---|---|---|---|
| 2009/0180398 A1* | 7/2009 | Lejeune | ............. H04L 12/2809 370/254 |
| 2010/0049965 A1* | 2/2010 | Han | ................... G06F 21/6263 713/151 |
| 2013/0305305 A1 | 11/2013 | Park et al. | |
| 2014/0108618 A1 | 4/2014 | Lee et al. | |
| 2014/0115644 A1 | 4/2014 | Kim et al. | |
| 2015/0058905 A1 | 2/2015 | Kim et al. | |
| 2015/0382080 A1 | 12/2015 | Kang et al. | |
| 2016/0037199 A1 | 2/2016 | Oh et al. | |
| 2016/0249114 A1* | 8/2016 | Ryu | ................. H04N 21/43637 |
| 2017/0085955 A1* | 3/2017 | Deshpande | .......... H04N 21/436 |

FOREIGN PATENT DOCUMENTS

| | | |
|---|---|---|
| KR | 10-2014-0048020 A | 4/2014 |
| WO | WO 2012/099428 A2 | 7/2012 |
| WO | WO 2014/148813 A1 | 9/2014 |
| WO | WO 2014/207305 A1 | 12/2014 |
| WO | WO 2014/209057 A1 | 12/2014 |

OTHER PUBLICATIONS

Advanced Television System Committee, "ATSC Candidate Standard: Companion Device (A/338)," Doc. S33-161r1, Dec. 2, 2015, pp. 1-31, XP017848749.

Digital Video Broadcasting (DVB), "Companion Screens and Streams; Part 2: Content Identification and Media Synchronisation," Draft ETSI TS 102 CSS, V0.0.22, TM-CSS0130r22, May 2014 (May 29, 2014), pp. 1-179, XP017841395.

Digital Video Broadcasting (DVB), "Companion Screens and Streams; Part 3: Discovery," Draft TS 103 286-3 V0.0.9, Oct. 2014 (Oct. 24, 2014), pp. 1-17, XP017845710.

HBBTV Association, "HbbTV Version 2 Specification Draft 23 (Stable)," Oct. 9, 2014, pp. 1-203, XP017845818.

UPNP Forum, "UPnP™ Device Architecture 1.1," Oct. 15, 2008, pp. i-iv, 1-129 (136 pages total), XP002521470.

\* cited by examiner

FIG. 2

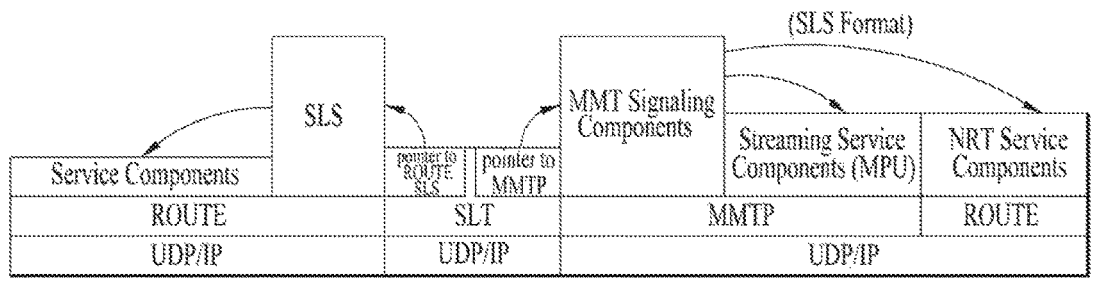

FIG. 3

| Element or Attribute Name | Use |
|---|---|
| SLT | |
| @bsid | 1 |
| @sltSectionVersion | 1 |
| @sltSectionNumber | 0..1 |
| @totalSltSectionNumbers | 0..1 |
| @language | 0..1 |
| @capabilities | 0..1 |
| InetSigLoc | 0..1 |
| Service | 1..N |
|   @serviceId | 1 |
|   @SLTserviceSeqNumber | 1 |
|   @protected | 0..1 |
|   @majorChannelNo | 1 |
|   @minorChannelNo | 1 |
|   @serviceCategory | 1 |
|   @shortServiceName | 1 |
|   @hidden | 0..1 |
|   @slsProtocolType | 1 |
|   BroadcastSignaling | 0..1 |
|   @slsPlpId | 0..1 |
|   @slsDestinationIpAddress | 0..1 |
|   @slsDestinationUdpPort | 0..1 |
|   @slsSourceIpAddress | 0..1 |
|   @slsMajorProtocolVersion | 0..1 |
|   @SlsMinorProtocolVersion | 0..1 |
|   @serviceLanguage | 0..1 |
|   @broadbandAccessRequired | 0..1 |
|   @capabilities | 0..1 |
|   InetSigLoc | 0..1 |

FIG. 5

| Element or Attribute Name | | | | Use |
|---|---|---|---|---|
| bundleDescription | | | | |
| | userServiceDescription | | | |
| | | @serviceId | | M |
| | | @atsc: serviceId | | M |
| | | @atsc: serviceStatus | | OD |
| | | @atsc: fullMPDUri | | M |
| | | @atsc: sTSIDUri | | M |
| | | name | | 0..N |
| | | | lang | CM |
| | | serviceLanguage | | 0..N |
| | | atsc: capabilityCode | | 0..1 |
| | | deliveryMethod | | 1..N |
| | | | r12: broadcastAppService | 1..N |
| | | | basePattern | 1..N |
| | | | r12: unicastAppService | 0..N |
| | | | basePattern | 1..N |

FIG. 6

| Element and Attribute Names | | | Use |
|---|---|---|---|
| S - TSID | | | |
| | @serviceId | | O |
| | RS | | 1..N |
| | | @bsid | OD |
| | | @sIpAddr | OD |
| | | @dIpAddr | OD |
| | | @dport | OD |
| | | @PLPID | OD |
| | | LS | 1..N |
| | | | @tsi | M |
| | | | @PLPID | OD |
| | | | @bw | O |
| | | | @startTime | O |
| | | | @endTime | O |
| | | | SrcFlow | 0..1 |
| | | | RprFlow | 0..1 |

FIG. 7

| Element or Attribute Name | | | | | | Use |
|---|---|---|---|---|---|---|
| bundleDescription | | | | | | |
| | userServiceDescription | | | | | |
| | | @serviceId | | | | M |
| | | @atsc: serviceId | | | | M |
| | | Name | | | | 0..N |
| | | | Lang | | | CM |
| | | serviceLanguage | | | | 0..N |
| | | atsc: capabilityCode | | | | 0..1 |
| | | atsc: Channel | | | | 1 |
| | | | @atsc: majorChannelNo | | | M |
| | | | @atsc: minorChannelNo | | | M |
| | | | @atsc: serviceLang | | | O |
| | | | @atsc: serviceGenre | | | O |
| | | | @atsc: serviceIcon | | | M |
| | | | atsc: ServiceDescription | | | 0..N |
| | | | | @atsc: serviceDescrText | | M |
| | | | | @atsc: serviceDescrLang | | O |
| | | atsc:mpuComponent | | | | 0..1 |
| | | | @atsc: mmtPackageId | | | M |
| | | | @atsc: next_MmtPackageId | | | O |
| | | atsc: routeComponent | | | | 0..1 |
| | | | @atsc: sTSIDUri | | | M |
| | | | @slsPlpId | | | OD |
| | | | @slsDestinationIpAddress | | | OD |
| | | | @slsDestinationUdpPort | | | M |
| | | | @slsSourceIpAddress | | | M |
| | | | @slsMajorProtocolVersion | | | OD |
| | | | @SlsMinorProtocolVersion | | | OD |
| | | atsc: broadbandComponent | | | | 0..1 |
| | | | @atsc: fullfMPDUri | | | M |
| | | atsc: ComponentInfo | | | | 1..N |
| | | | @atsc: component_Type | | | M |
| | | | @atsc: component_Role | | | M |
| | | | @atsc: component_ProtectedFlag | | | OD |
| | | | @atsc: component_Id | | | M |
| | | | @atsc: component_Name | | | O |

FIG. 13
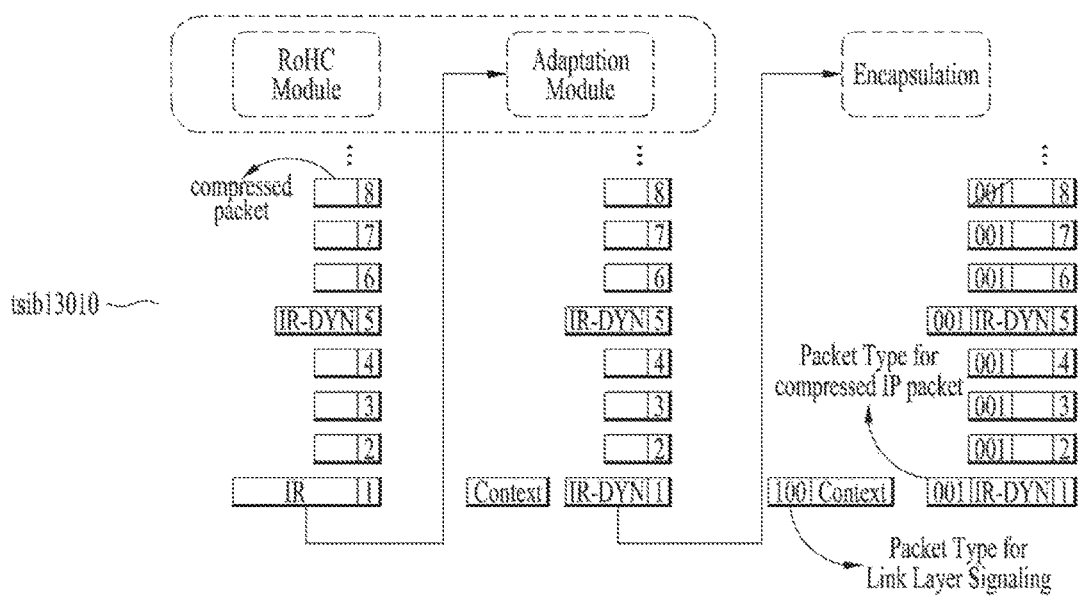
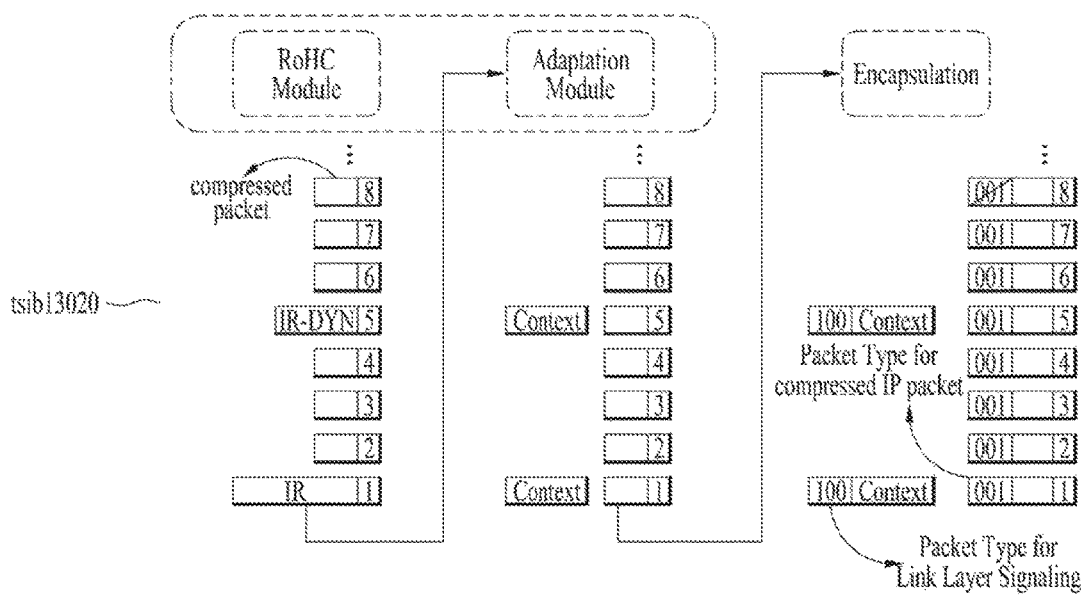

FIG. 14 tsb14010

| Syntax | Number of bits | Mnemonic |
|---|---|---|
| Link_Mapping_Table() { | | |
| signaling_type | 8 | "0x01" |
| PLP_ID | 6 | uimsbf |
| Reserved | 2 | |
| num_session | 8 | uimsbf |
| for(i = 0; i < num_session; i++) { | | |
| src_IP_add | 32 | uimsbf |
| dst_IP_add | 32 | uimsbf |
| src_UDP_port | 16 | uimsbf |
| dst_UDP_port | 16 | uimsbf |
| SID_flag | 1 | bslbf |
| compressed_flag | 1 | bslbf |
| reserved | 6 | '000000' |
| if(SID_flag == "1") { | | |
| SID | 8 | uimsbf |
| } | | |
| if(compressed_flag == "1") { | | |
| context_id | 8 | uimsbf |
| } | | |
| } | | |
| } | | | tsb14020

| Syntax | Number of bits | Mnemonic |
|---|---|---|
| ROHC-U_description_table { | | |
| signaling_type | 8 | "0x02" |
| PLP_ID | 6 | uimsbf |
| adaptation_mode | 2 | uimsbf |
| context_config | 2 | bslbf |
| reserved | 6 | bslbf |
| context_id | 8 | uimsbf |
| context_profile | 8 | uimsbf |
| if(context_config = 0x01) { | | |
| context_length | 8 | uimsbf |
| static_chain_byte () | var | uimsbf |
| } | | |
| else if (context_config = 0x02) { | | |
| context_length | 8 | uimsbf |
| dynamic_chain_byte () | var | uimsbf |
| } | | |
| else if (context_config = 0x03) { | | |
| context_length | 8 | uimsbf |
| static_chain_byte () | var | uimsbf |
| dynamic_chain_byte () | var | uimsbf |
| } | | |
| } | | |

FIG. 24

| Content | Bits |
|---|---|
| PREAMBLE_DATA<br>NUM_FRAME_FRU<br>PAYLOAD_TYPE<br>NUM_FSS<br>SYSTEM_VERSION | 20<br>2<br>3<br>2<br>8 |
| CELL_ID<br>NETWORK_ID<br>SYSTEM_ID | 16<br>16<br>16 |
| for i = 0:3<br>    FRU_PHY_PROFILE<br>    FRU_FRAME_LENGTH<br>    FRU_GI_FRACTION<br>    RESERVED<br>end | <br>3<br>2<br>3<br>4 |
| PLS2_FEC_TYPE<br>PLS2_MOD<br>PLS2_SIZE_CELL<br>PLS2_STAT_SIZE_BIT<br>PLS2_DYN_SIZE_BIT<br>PLS2_REP_FLAG<br>PLS2_REP_SIZE_CELL<br>PLS2_NEXT_FEC_TYPE<br>PLS2_NEXT_MODE<br>PLS2_NEXT_REP_FLAG<br>PLS2_NEXT_REP_SIZE_CELL<br>PLS2_NEXT_REP_STAT_SIZE_BIT<br>PLS2_NEXT_REP_DYN_SIZE_BIT<br>PLS2_AP_MODE<br>PLS2_AP_SIZE_CELL<br>PLS2_NEXT_AP_MODE<br>PLS2_NEXT_AP_SIZE_CELL | 2<br>3<br>15<br>14<br>14<br>1<br>15<br>2<br>3<br>1<br>15<br>14<br>14<br>2<br>15<br>2<br>15 |
| RESERVED<br>CRC 32 | 32<br>32 |

FIG. 25

| Content | Bits |
|---|---|
| FIC_FLAG | 1 |
| AUX_FLAG | 1 |
| NUM_DP | 6 |
| for i = 1 : NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1 : NUM_AUX | |
|         AUX_STREAM_TYPE | 4 |
|         AUX_PRIVATE_CONF | 28 |
|     end | |
| end | |

| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1:NUM_DP | |
|     DP_ID | 6 |
|     DP_START | 15 (or 13) |
|     DP_NUM_BLOCK | 10 |
| end     RESERVED | 8 |
| EAC_FLAG | 1 |
| EAS_WAKE_UP_VERSION_NUM | 8 |
| if EAC_FLAG == 1 | |
|     EAC_LENGTH_BYTE | 12 |
| else | |
|     EAC_COUNTER | 12 |
| end | |
| for i=1:NUM_AUX | |
|     AUX_PRIVATE_DYN | 48 |
| end | |
| CRC 32 | 32 |

FIG. 29
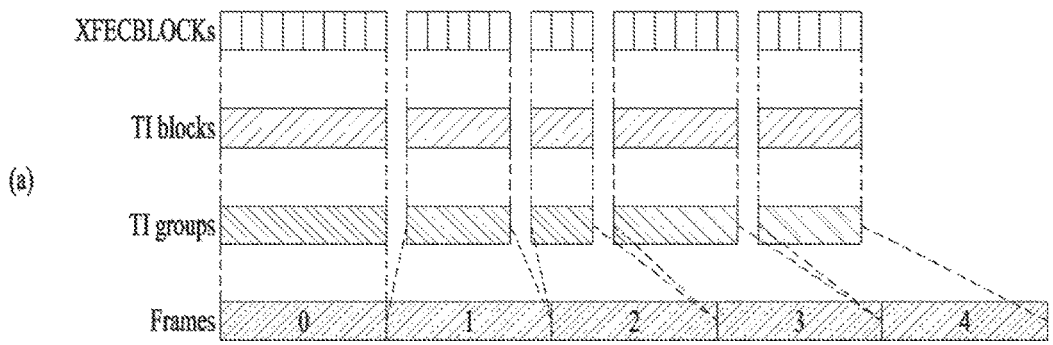
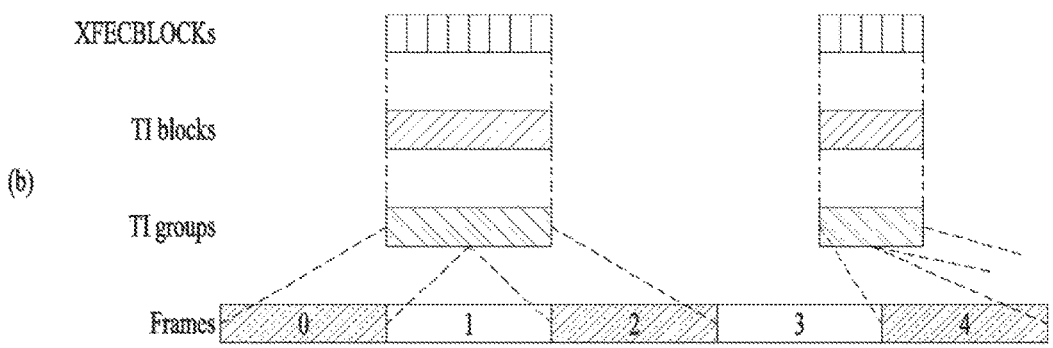
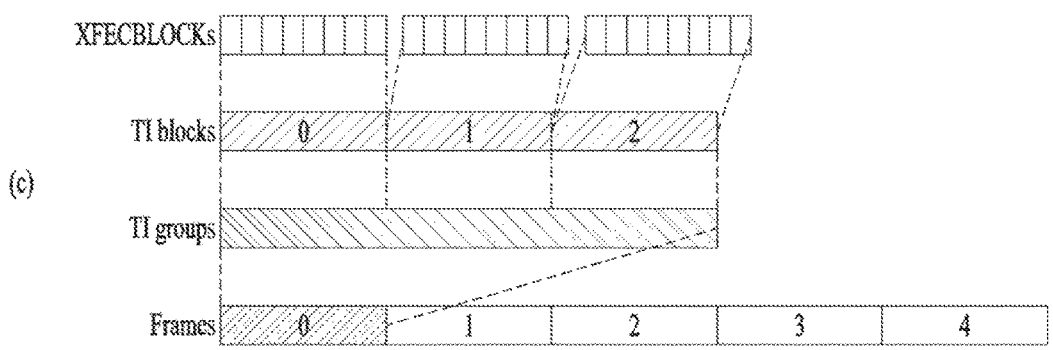

The main-PRBS generator is defined based on the $(N_a-1)$-bit binary word sequence $R_n$ with $N_a = \log_2 N_{max}$ $0 \leq n < 2$
$\quad R_n[N_a-2, N_a-3, \ldots, 1, 0] = 0, 0, \ldots, 0, 0$
$n = 2$
$\quad R_n[N_a-2, N_a-3, \ldots, 1, 0] = 0, 0, \ldots, 0, 1$
$2 < n < N_{max}$
$\quad R_n[N_a-3, N_a-4, \ldots, 1, 0] = R_n[N_a-2, N_a-3, \ldots, 2, 1]$
where
$R_n[N_a-2]$ is defined as:

in 8K FFT mode: $R_n[11] = R_{n-1}[0] \oplus R_{n-1}[1] \oplus R_{n-1}[4] \oplus R_{n-1}[6]$
in 16K FFT mode: $R_n[12] = R_{n-1}[0] \oplus R_{n-1}[1] \oplus R_{n-1}[4] \oplus R_{n-1}[5] \oplus R_{n-1}[9] \oplus R_{n-1}[11]$
in 32K FFT mode: $R_n[13] = R_{n-1}[0] \oplus R_{n-1}[1] \oplus R_{n-1}[2] \oplus R_{n-1}[12]$ (a)

| FFT mode | Nmax |
|---|---|
| 8K | 8192 |
| 16K | 16384 |
| 32K | 32768 |

The sub-PRBS generator is defined based on the $(N_b-1)$-bit binary word sequence $G_k$ with $N_b = \log_2(0.5N_{max})$ $0 \leq k < 4$
$\quad G_k[N_b-2, N_b-3,...,1,0] = 0,0,...,0,0$
$k = 4$
$\quad G_k[N_b-2, N_b-3,...,1,0] = 1,1,...,1,1$
$4 < k < N_{max}$
$\quad G_k[N_b-3, N_b-4,...,1,0] = G_k[N_b-2, N_b-3,...,2,1]$ where
$\quad G_k[N_b-2]$ is defined as:

in 8K FFT mode: $G_k[10] = G_{k-1}[0] \oplus G_{k-1}[2]$
in 16K FFT mode: $G_k[11] = G_{k-1}[0] \oplus G_{k-1}[1] \oplus G_{k-1}[4] \oplus G_{k-1}[6]$
in 32K FFT mode: $G_k[12] = G_{k-1}[0] \oplus G_{k-1}[1] \oplus G_{k-1}[4] \oplus G_{k-1}[5] \oplus G_{k-1}[9] \oplus G_{k-1}[11]$ (a)

$p = 0;$
$for\ (n = 0; n < N_{max}; n = n+1)$
$\quad \{T(n) = (n \bmod 2) \cdot 2^{N_b-1} + \sum_{i=0}^{N_b-2}(2^i\, ?R_n[i]);$
$\quad S_l(n) = (T(n) + A_{\lfloor l/2 \rfloor}) \bmod N_{max};$
$\quad if\ S_l(n) < N_{data}$
$\quad\quad \{H_l(p) = S_l(n);$
$\quad\quad p = p+1;\ \}$
$\quad\}$ $(n \bmod 2) \cdot 2^{N_b-1}$ denotes 1-bit toggling, i.e., $R_n[N_a-1] = 0,1,0,1,...$ and the cyclic-shifting value $A_{\lfloor l/2 \rfloor}$ is calculated for every OFDM symbol pair (b)

FIG. 35

FIG. 36
| PLP_NUM | 1 | >1 |
|---|---|---|
| Interleaving type | CI | CI+BI |
FIG. 37
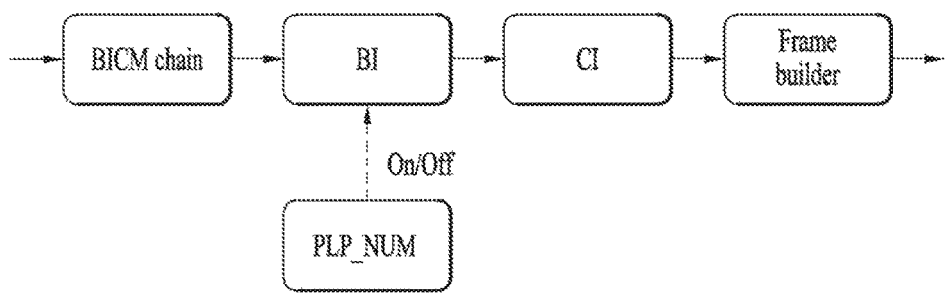
<Hybrid TI structure: example-1>
FIG. 38
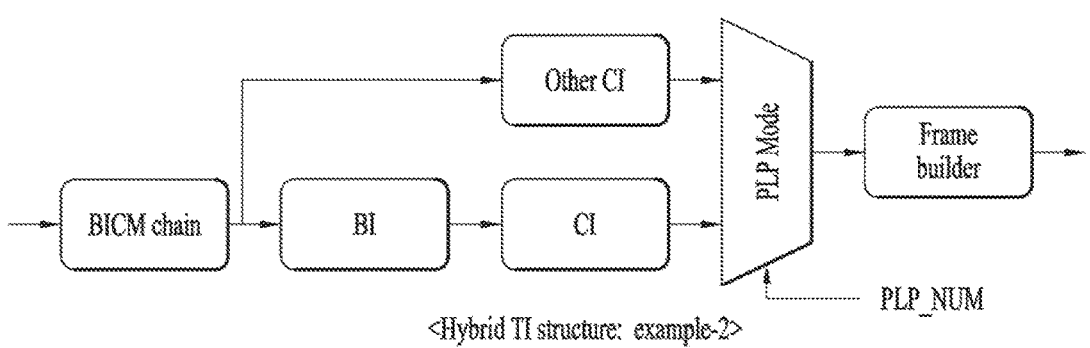
<Hybrid TI structure: example-2>

<Hybrid TI structure: example-1>

<Hybrid TI structure: example-2>

FIG. 42

| element/attribute | | | | type | cardinality |
|---|---|---|---|---|---|
| e | ApplicationList | | | | |
| | e | Application | | | 1..N |
| | | e | appName | xs:string | 0..N |
| | | | @ lang | xs:langauge | O |
| | | e | applicationDescriptor | | 1 |
| | | | e icon | | 0..N |
| | | | @ mimeType | xs:string | O |
| | | | @ width | xs:unsignedInt | O |
| | | | @ height | xs:unsignedInt | O |
| | | | @ depth | xs:unsignedInt | O |
| | | | @ url | xs:anyURI | M |
| | | | @ type | xs:unsignedInt | M |
| | | | @ controlCode | xs:unsignedInt | M |
| | | | @ visibility | xs:boolean | O |
| | | | @ serviceBound | xs:boolean | OD |
| | | | @ priority | xs:unsignedInt | M |
| | | | @ version | xs:unsignedInt | M |
| | | | @ mhpVersion | xs:unsignedInt | O |
| | | | @ storageCapabilities | xs:unsignedInt | O |
| | | | @ trickModeTolerance | | O |
| | | e | applicationSpecificDescriptor | xs:unsignedInt | 0..N |
| | | e | applicationUsageDescriptor | xs:unsignedInt | 0..N |
| | | e | applicationBoundary | xs:anyURI | 0..N |
| | | e | applicationTransport | xs:unsignedInt | 1..N |
| | | e | applicationLocation | xs:anyURI | 1 |
| | | e | atsc:Capabilities | xs:string | 1 |
| | | e | atsc:liveEventSource | | 1 |
| | | | @ URL | xs:anyURI | M |
| | | | @ shortPollingPeriod | xs:unsignedInt | O |
| | | | @ targetDevice | xs:unsignedInt | O |

FIG. 43

| | | | element/attribute | type | cardinality |
|---|---|---|---|---|---|
| e | e | e | atsc:ContentItems | | 0..N |
| | | e | location | xs:anyURI | 0..N |
| | | @ | ContentLinkage | xs:unsignedInt | M |
| | | @ | updatesAvailable | xs:boolean | M |
| | | @ | TFAvailable | xs:boolean | M |
| | | @ | contentSecurityCondition | xs:boolean | M |
| | | @ | availableInBroadcast | xs:boolean | M |
| | | @ | availableOnInet | xs:boolean | M |
| | | @ | playBackLengthInSecondes | xs:unsignedInt | O |
| | | @ | playBackDelay | xs:unsignedInt | O |
| | | @ | expiration | xs:unsignedInt | O |
| | | @ | size | xs:unsingedLong | O |
| | | @ | name | xs:string | O |
| | | e | timeSlotInfo | | |
| | | | @ time_slot_start | xs:unsingedInt | |
| | | | @ time_slot_length | xs:unsingedInt | |
| | | | @ acquisition_time | xs:unsingedInt | |
| | | | @ repeat_period | xs:unsingedInt | |
| | | | @ slot_count | xs:unsingedInt | |
| | @ | applicationIdentifier | | xs:anyURI | M |
| | @ | atsc:serviceId | | xs:unsignedInt | M |
| | @ | atsc:protocolVersion | | xs:unsignedInt | M |
| @ | ASTVersionNumber | | | xs:unsignedInt | M |
| @ | timeSpanStart | | | xs:unsignedInt | M |
| @ | timeSpanLength | | | xs:unsignedInt | M |

FIG. 44

| Element Name | | | Cardin-ality | Data Type |
|---|---|---|---|---|
| EMT | | | | |
| | @mpdId | | R | string |
| | @periodId | | R | string |
| | EventStream | | 1..N | |
| | | @schemeIdURi | R | anyURI |
| | | @value | O | string |
| | | @timescale | O | unsignedInt |
| | | Event | 0..N | string |
| | | @presentationTime | OD | unsignedLong |
| | | @duration | O | unsignedLong |
| | | @id | O | unsignedInt |

FIG. 53

(a) listener(StreamEvent event)

(b) addStreamEventListener(targetURL, eventName, listener)
    removeStreamEventListener(targetURL, eventName, listener)

FIG. 70

| Service | Service Type | Service ID |
|---|---|---|
| ESG | atsc3.0ESG:1 | urn:atsc.org:serviceId:atsc3.0ESG |

FIG. 71

```
<?xml version="1.0" encoding="UTF-8"?>
<ESGData
xmlns="urn: atsc. serviceId: atsc3 . OESG"
xsi: schemaLocacion="urn. atsc.org : serviceId: atsc3 . OESG"
    <Service id = "atsc.org/ esg/ service/1" version="1">
        <Name>Home Shopping</Name>
        <Description> Home Shopping Linear Service</Descripcion>
        <ServiceType>14</ServiceType>
        <ServiceType>15</ServiceType>
        ...
    </Service>
    <Schedule id="atsc.org/ esg/schedule/1" version="1">
        <ServiceReference idRef ="atsc.org/ esg/ service/1">
        </ServiceReference>
        ...
    </Schedule>
    <Content id="atsc.org/content/1" version="1">
        ...
        <ComponentReference idRef = "atsc.org/ esg/component/1">
        </ComponentReference>
        ...
    </Content>
    <Component id="atsc.org/esg/component/1" version="1">
        <ComponentType>1</ComponentType>
        <ComponentType>6</ComponentType>
        ...
        <ComponentData ContentType="Video">
            ...
    </Component>
    ...
    <InteractivityData>
    ...
    </InteractivityData>
</ESGData>
```

```
<ESGData
xmlns="urn: atsc. serviceId: atsc3 . OESG"
 xsi: schemaLocacion="urn. atsc.org : serviceId: atsc3 . OESG"
    <Service id = "atsc.org/ esg/ service/1" version-"1">
        <Name>Home Shopping</Name>
        <Description> Home Shopping Linear Service</Descripcion>
        <ServiceType>14</ServiceType>
        <ServiceType>15</ServiceType>
        ...
    </Service>
    <Schedule id="atsc.org/ esg/service/2" version="1">
    ...
    </Schedule>
    <Content id="atsc.org/content/1" version="1">
        <ServiceReference idRef = "atsc.org/ esg/ service/1">
        </ServiceReference>
        ...
    </Schedule>
    <Content id = "atsc.org/ esg/ service/1" version="1">
        ...
        <ServiceReference idRef = <"atsc.org/ esg/ service/1">
        </ServiceReference>
        <PrivateExt>
        <Component>
            <ComponentType>1</ComponentType>
            <ComponentType>1</ComponentType>
            <StarTime/>
            <EndTime/>
            <Language/>
            <Length/>
            <ParentalRating/>
            <DeviceCapability>4</DeviceCapability>
            <DeviceCapability>8</DeviceCapability>
        <TargetDevice>1</TargetDevice>
        </Component>
        <Component>
            <ComponentType>2</ComponentType>
            <ComponentRole>6</ComponentRole>
            <StartTime/>
            <EndTime/>
            <Language>KOR</Language>
            <Length/>
            <ParentalRating/>
            <DeviceCapability>11</DeviceCapability>
            <TargetDevice>1</TargetDevice>
        </Component>
        </PrivateExt>
        ...
    </Content>
    ...
</ESGData>
``` t55010 points to the inner Content block (from `<Content id="atsc.org/content/1"...` through `</Component>` of the first Component).

FIG. 74

```xml
<?xml version="1.0" encoding="UTF-8"?>
<LastChangedESGData
xmlns="urn: atsc . org:serviceId: atsc3 . OESG"
xsi: schemaLocacion="urn. atsc.org : serviceId: atsc3 . OESG"
    <Addition>
        <Service id="atsc.org/esg/service/3" version="1">
        ...
        </Service>
        <Service id="atsc.org/esg/service/4" version="1">
        <Name>ABC</Name>
            ...
        </Service>
    </Addtion>
    <Modification>
        <Schedule id="atsc.org/esg/service/3" version="1">
            ...
        </Schedule>
    </Modification>
    <Deletion>
        <Content id="atsc.org/content/1" version="1">
        ...
        </Content>
        <Content id="atsc.org/content/2" version="1">
        ...
        </Content>
    </Deletion>
</LastChangedESGData>
``` t57010 — Addition block
t57020 — Modification block
t57030 — Deletion block

FIG. 96

```
NOTIFY * HTTP/1.1
HOST: 239.255.255.250:1900
CACHE-CONTROL: max-age = seconds until advertisement expires
LOCATION: URL for UPnP description for root device
NT: search target (for example, urn:atsc:device:atsccompanion:3)
NTS: ssdp:alive
SERVER: OS/version UPnP/1.0 product/version
USN: advertisement UUID
```
— t413010

```
M-SEARCH * HTTP/1.1
HOST: 239.255.255.250:1900
MAN: "ssdp:discover"
MX: seconds to delay response
ST: search target (for example, urn:atsc:device:atsccompanion:3)
```
— t413020

```
HTTP/1.1 200 OK
CACHE-CONTROL: max-age = seconds until advertisement expires
DATE: when response was generated
EXT:
LOCATION: URL for UPnP description for root device
SERVER: OS/version UPnP/1.0 product/version
ST: search target (for example, urn:atsc:device:atsccompanion:3)
USN: advertisement UUID
```
— t413030

FIG. 98

```
GET path to description HTTP/1.1
HOST: host for IP address:port for description          ── t418010
ACCEPT-LANGUAGE: language preferred by control point
```

```xml
<?xml version="1.0"?>
<root xmlns="urn:schemas-upnp-org:device-1-0">
   <specVersion>
      <major>1</major>
      <minor>0</minor>
   </specVersion>
   <URLBase>base URL for all relative URLs</URLBase>
   <device>
      <deviceType>urn:atsc:device:atsccompanion:3</deviceType>
      <friendlyName>short user-friendly title</friendlyName>
      <manufacturer>manufacturer name</manufacturer>
      .....
      <serviceList>
         <service>
            <serviceType>urn:atsc:service:atsccompanion:3</serviceType>
            <serviceId> urn:atsc:serviceId:atsccompanion</serviceId>
            <SCPDURL>URL to service description</SCPDURL>
            <controlURL>URL for control</controlURL>
            <eventSubURL>URL for eventing</eventSubURL>
            .....
         </service>
      </serviceList>
   </device>
</root>
```
── t418020

FIG. 99 t419010

```xml
<?xml version="1.0"?>
<root xmlns="urn:schemas-upnp-org:device-1-0">
    .....
    <device>
        <deviceType>urn:atsc:device:atsccompanion:3</deviceType>
        <X_ATSC_ServiceIdentification>Address of Service and Content Identification
Endpoint</X_ATSC_ServiceIdentification>
        <X_ATSC_ESG>Address of ESG Information Endpoint</X_ATSC_ESG>
        <X_ATSC_Data>Address of Service, Show and Segment Data Endpoint</X_ATSC_Data>
        <X_ATSC_MediaTimeline>Address of Media Timeline Endpoint</X_ATSC_MediaTimeline>
        <X_ATSC_MediaPlaybackState>Address of Media Playback State
 Endpoint</X_ATSC_MediaPlaybackState>
        <X_ATSC_EAS>Address of Emergency Alert Messages Endpoint</X_ATSC_EAS>
        <X_ATSC_ApptoApp>Address of App-to-App Endpoint</X_ATSC_ApptoApp>
        .....
    </device>
</root>
``` t419020

```xml
<?xml version="1.0"?>
<root xmlns="urn:schemas-upnp-org:device-1-0">
    .....
    <service>
        <serviceType>urn:atsc:service:atsccompanion:3</serviceType>
        <X_ATSC_ServiceIdentification>Address of Service and Content Identification
Endpoint</X_ATSC_ServiceIdentification>
        <X_ATSC_ESG>Address of ESG Information Endpoint</X_ATSC_ESG>
        <X_ATSC_Data>Address of Service, Show and Segment Data Endpoint</X_ATSC_Data>
        <X_ATSC_MediaTimeline>Address of Media Timeline Endpoint</X_ATSC_MediaTimeline>
        <X_ATSC_MediaPlaybackState>Address of Media Playback State
 Endpoint</X_ATSC_MediaPlaybackState>
        <X_ATSC_EAS>Address of Emergency Alert Messages Endpoint</X_ATSC_EAS>
        <X_ATSC_ApptoApp>Address of App-to-App Endpoint</X_ATSC_ApptoApp>
        .....
    </service>
    .....
</root>
```

FIG. 100

```
<?xml version="1.0"?>
<root xmlns="urn:schemas-upnp-org:device-1-0">
   .....
   <device>
      <deviceType>urn:atsc:device:atsccompanion:3</deviceType>
      <X_ATSC_Companion>Address of a WebSocket Endpoint for all
      Companion functions</X_ATSC_Companion>
      .....
   </device>
</root>
```
— t420010

```
<root xmlns="urn:schemas-upnp-org:device-1-0">
   .....
   <service>
      <serviceType>urn:atsc:device:atsccompanion:3</deviceType>
      <X_ATSC_Companion>Address of a WebSocket Endpoint for all
      Companion functions</X_ATSC_Companion>
      .....
   </service>
   ...
</root>
```
— t420020

```
<?xml version="1.0"?>
<root xmlns="urn:schemas-upnp-org:device-1-0">
   .....
   <device>
      <deviceType>urn:atsc:device:atsccompanion:3</deviceType>
      <X_ATSC_ApptoApp>Address of App-to-App
      Endpoint</X_ATSC_ApptoApp>
      <X_ATSC_Companion>Address of a WebSocket Endpoint for all other
      Companion functions</X_ATSC_Companion>
      .....
   </device>
</root>
```
— t420030

```
<?xml version="1.0"?>
<root xmlns="urn:schemas-upnp-org:device-1-0">
   .....
   <service>
      <serviceType>urn:atsc:device:atsccompanion:3</deviceType>
      <X_ATSC_ApptoApp>Address of App-to-App
      Endpoint</X_ATSC_ApptoApp>
      <X_ATSC_Companion>Address of a WebSocket Endpoint for all other
      Companion functions</X_ATSC_Companion>
      .....
   </service>
   .....
</root>
```
— t420040

FIG. 102

```
GET path to description HTTP/1.1
HOST: host for description:port for description          ~ t422010
ACCEPT-LANGUAGE: language preferred by control point
```

```
HTTP/1.1 200 OK
CONTENT-LANGUAGE: language used in description
CONTENT-LENGTH: Bytes in body
CONTENT-TYPE: text/xml
ServiceIdentification-WSEndpoint-URL: Address of Service and Content Identification Endpoint
ESG-WSEndpoint-URL: Address of ESG Information Endpoint                                          ~ t422020
Data-WSEndpoint-URL: Address of Service, Show and Segment Data Endpoint
MediaTimeline-WSEndpoint-URL: Address of Media Timeline Endpoint
MediaPlaybackState-WSEndpoint-URL: Address of Media Playback State Endpoint
EAS-WSEndpoint-URL: Address of Emergency Alert Messages Endpoint
ApptoApp-WSEndpoint-URL: Address of App-to-App Endpoint
DATE: when responded
```

```
HTTP/1.1 200 OK
CONTENT-LANGUAGE: language used in description
CONTENT-LENGTH: Bytes in body                                                    ~ t422030
CONTENT-TYPE: text/xml
Companion-WSEndpoint-URL: Address of a WebSocket Endpoint for all Companion functions
DATE: when responded
```

```
HTTP/1.1 200 OK
CONTENT-LANGUAGE: language used in description
CONTENT-LENGTH: Bytes in body
CONTENT-TYPE: text/xml                                                                      ~ t422040
ApptoApp-WSEndpoint-URL: Address of App-to-App Endpoint
Companion-WSEndpoint-URL: Address of a WebSocket Endpoint for all other Companion functions
DATE: when responded
```

FIG. 104

```
GET path to description HTTP/1.1
HOST: host for description:port for description
ACCEPT-LANGUAGE: language preferred by control point
```
— t424010

```
HTTP/1.1 200 OK
CONTENT-LANGUAGE: language used in description
CONTENT-LENGTH: Bytes in body
CONTENT-TYPE: text/xml
WSEndpoint-URL: URL for WebSocket Endpoints
DATE: when responded
```
— t424020

```
GET path to WebSocket Endpoints HTTP/1.1
HOST: host for IP address:port for WebSocket Endpoints
ACCEPT-LANGUAGE: language preferred by control point
```
— t424030

```
GET /WSEndpoints HTTP/1.1
HOST: 192.168.1.10:8080
ACCEPT-LANGUAGE: language preferred by control point
```
— t424040

FIG. 105

```xml
<?xml version="1.0"?>
.....
  <additionalData>
    <X_ATSC_ServiceIdentification>Address of Service and Content Identification
    Endpoint</X_ATSC_ServiceIdentification>
    <X_ATSC_ESG>Address of ESG Information Endpoint</X_ATSC_ESG>
    <X_ATSC_Data>Address of Service, Show and Segment Data Endpoint</X_ATSC_Data>
    <X_ATSC_MediaTimeline>Address of Media Timeline Endpoint</X_ATSC_MediaTimeline>
    <X_ATSC_MediaPlaybackState>Address of Media Playback State
    Endpoint</X_ATSC_MediaPlaybackState>
    <X_ATSC_EAS>Address of Emergency Alert Messages Endpoint</X_ATSC_EAS>
    <X_ATSC_ApptoApp>Address of App-to-App Endpoint</X_ATSC_ApptoApp>
    .....
  </additionalData>
</root>
```
— t425010

```xml
<?xml version="1.0"?>
.....
  <additionalData>
    <X_ATSC_Companion>Address of a WebSocket Endpoint for all
    Companion functions</X_ATSC_Companion>    .....
  </additionalData>
</root>
```
— t425020

```xml
<?xml version="1.0"?>
.....
  <additionalData>
    <X_ATSC_ApptoApp>Address of App-to-App
    Endpoint</X_ATSC_ApptoApp>
    <X_ATSC_Companion>Address of a WebSocket Endpoint for all other
    Companion functions</X_ATSC_Companion>
    .....
  </additionalData>
</root>
```
— t425030

| Element Name | Cardinality | Data type |
|---|---|---|
| MessageBody | 1 | |
|   Service | 1..N | |
|     id | 1 | string |
|     ServiceType | 1 | interger |
|     Name | 1..N | string |
|     Description | 0..N | string |
|     TargetUserProfile | 0..N | |
|   Content | 0..N | |
|     Programid | 1 | string |
|     Name | 1..N | string |
|     Description | 0..N | string |
|     TargetUserProfile | 0..N | |
|     CARatings | 1 | string |
|     Capabilities | 1 | string |
|     Component | 1..N | |
|       @componetID | 1 | string |
|       @componentType | 1 | unsigned Byte |
|       @componentRole | 1 | string |
|       @componentName | 0..1 | string |
|       @componentLocation | 0..1 | string (URI) |
|     FileContentItem | 0..N | |
|       @FileContentItemLocation | 1 | string (URI) |
|       @FileContentItemName | 0..1 | string |
|       @FileContentItemID | 1 | string |
|       @FileContentItemType | 1 | string |
|       @FileContentItemEncoding | 1 | string |
|     TimelineInfo | | |
|       currentTime | 1 | data Time |
|     Location | | string (URI) |

APPARATUS FOR TRANSMITTING BROADCAST SIGNALS, APPARATUS FOR RECEIVING BROADCAST SIGNALS, METHOD OF TRANSMITTING BROADCAST SIGNALS AND METHOD OF RECEIVING BROADCAST SIGNALS

CROSS REFERENCE TO RELATED APPLICATIONS

This application is the National Phase of PCT International Application No. PCT/KR2016/002003, filed on Feb. 29, 2016, which claims priority under 35 U.S.C. 119(e) to U.S. Provisional Application Nos. 62/126,693, filed on Mar. 1, 2015, 62/126,708, filed on Mar. 1, 2015, and 62/144,311, filed on Apr. 7, 2015, all of which are hereby expressly incorporated by reference into the present application.

TECHNICAL FIELD

The present invention relates to an apparatus for transmitting broadcast signals, an apparatus for receiving broadcast signals, a method of transmitting broadcast signals, and a method of receiving broadcast signals.

BACKGROUND ART

As analog broadcast signal transmission comes to an end, various technologies for transmitting/receiving digital broadcast signals have been developed. A digital broadcast signal may include a larger amount of video/audio data than an analog broadcast signal and further include various types of additional data in addition to the video/audio data.

DISCLOSURE

Technical Problem

That is, a digital broadcast system can provide high definition (HD) images, multi-channel audio and various additional services. However, data transmission efficiency for transmission of large amounts of data, robustness of transmission/reception networks and network flexibility in consideration of mobile reception equipment need to be improved for digital broadcast.

Technical Solution

According to an object of the present invention, as included herein and briefly described, the present invention proposes a system for effectively supporting a next-generation broadcast service in an environment that supports next-generation hybrid broadcast using a terrestrial broadcast network and an Internet protocol (IP) network, and a related signaling scheme.

Advantageous Effects

The present invention proposes a method of efficiently providing hybrid broadcast using both a broadcast network and an IP network.

The present invention proposes a method of providing application-based enhancement based on an application for a basic broadcast service.

The present invention proposes a method of providing application-based enhancement in synchronization with a broadcast service.

The present invention proposes architecture according to various protocols between a primary device (PD) and a companion device (CD), and a communication scheme between applications.

The present invention proposes architecture and a signaling scheme for effectively delivering information about an electronic service guide (ESG), an emergency alert system (EAS), etc. from a PD side to a CD side.

DESCRIPTION OF DRAWINGS

The accompanying drawings, which are included to provide a further understanding of the invention, illustrate embodiments of the invention and together with the description serve to explain the principle of the invention.

FIG. 2 illustrates a relation between the SLT and SLS according to an embodiment of the present invention.

FIG. 3 illustrates an SLT according to an embodiment of the present invention.

FIG. 5 illustrates a USBD fragment for ROUTE/DASH according to an embodiment of the present invention.

FIG. 6 illustrates an S-TSID fragment for ROUTE/DASH according to an embodiment of the present invention.

FIG. 7 illustrates a USBD/USD fragment for MMT according to an embodiment of the present invention.

FIG. 13 illustrates an example of adaptation modes in IP header compression according to an embodiment of the present invention (transmitting side).

FIG. 14 illustrates a link mapping table (LMT) and an RoHC-U description table according to an embodiment of the present invention.

FIG. 24 is a table illustrating PLS1 data according to an embodiment of the present invention.

FIG. 25 is a table illustrating PLS2 data according to an embodiment of the present invention.

FIG. 29 is a diagram illustrating time interleaving according to an embodiment of the present invention.

FIG. 31 is a diagram illustrating an operation of a twisted row-column block interleaver according to another embodiment of the present invention.

FIG. .32 is a block diagram illustrating an interleaving address generator including a main pseudo-random binary sequence (PRBS) generator and a sub-PRBS generator according to each FFT mode according to an embodiment of the present Invention.

FIG. 33 is a diagram illustrating a main PRBS used for all FFT modes according to an embodiment of the present invention.

FIG. 34 is a diagram illustrating a sub-PRBS used for FFT modes and an interleaving address for frequency interleaving according to an embodiment of the present invention.

Figure 35:
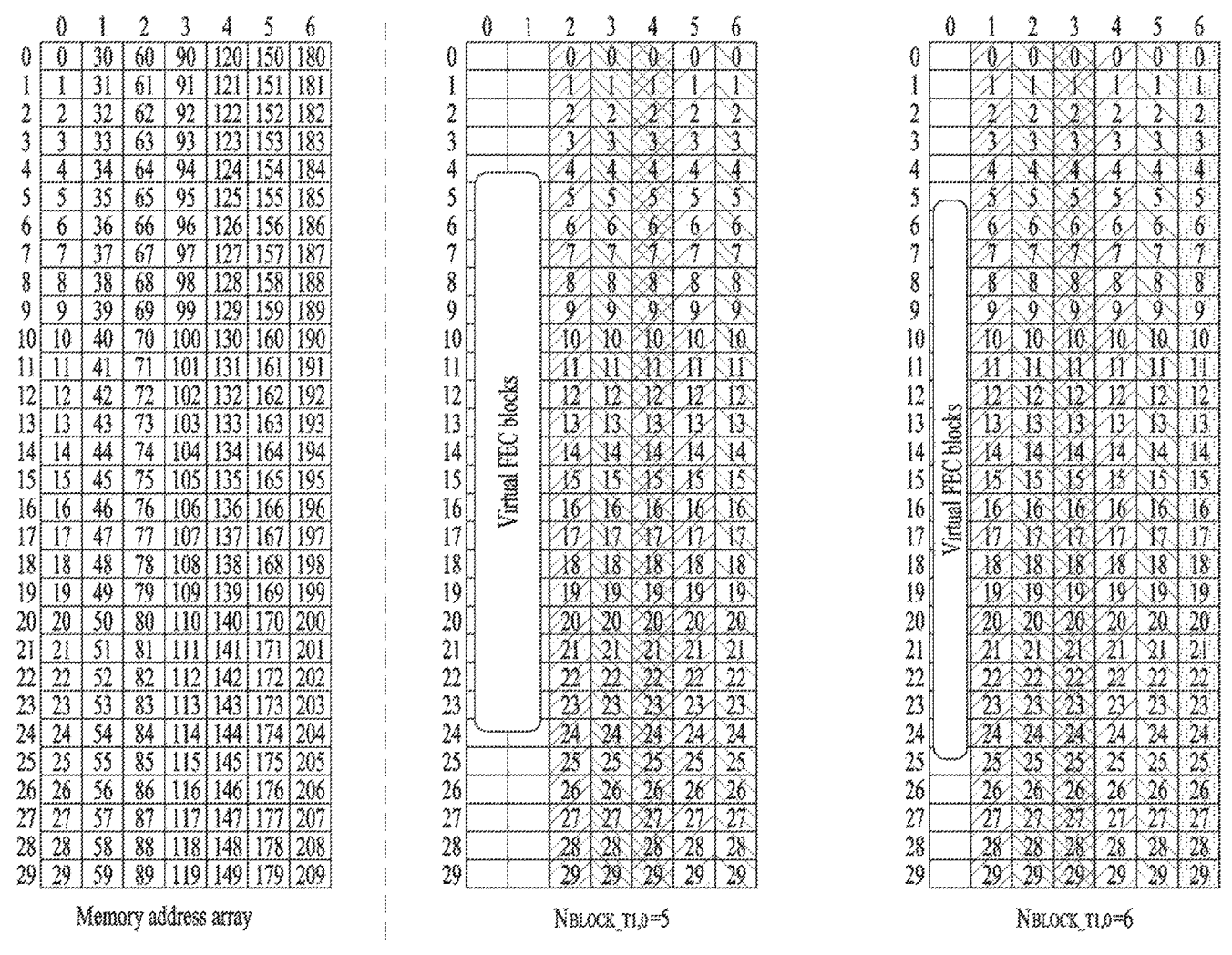

FIG. 35 is a diagram illustrating a write operation of a time interleaver according to an embodiment of the present invention.

FIG. 36 is a table illustrating an interleaving type applied according to the number of PLPs.

FIG. 37 is a block diagram including a first example of a structure of a hybrid time interleaver.

FIG. 38 is a block diagram including a second example of the structure of the hybrid time interleaver.

Figure 39:
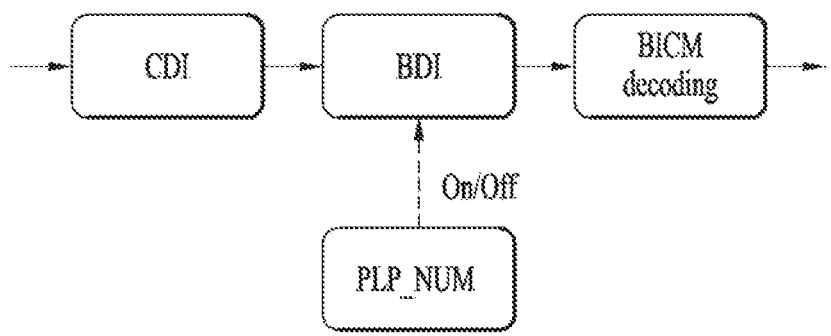

FIG. 39 is a block diagram including a first example of a structure of a hybrid time deinterleaver.

Figure 40:
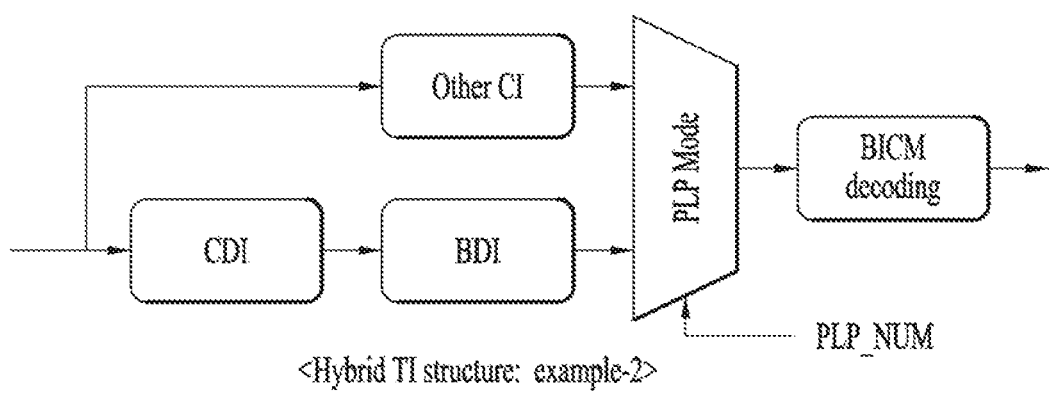

FIG. 40 is a block diagram including a second example of the structure of the hybrid time deinterleaver.

Figure 41:
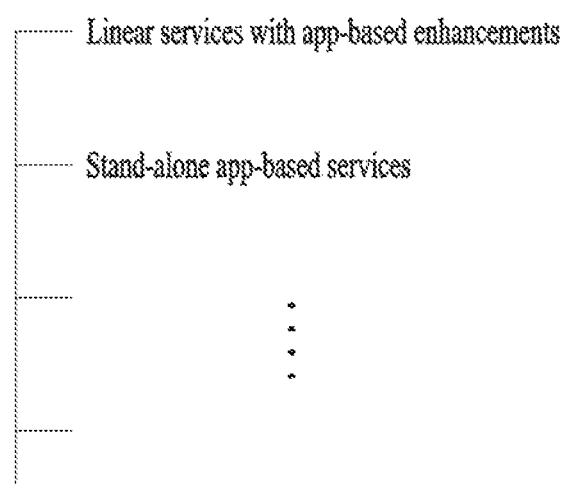

FIG. 41 illustrates an application-related broadcast service according to an embodiment of the present invention.

FIG. 42 illustrates a part of an ApplicationList element according to an embodiment of the present invention.

FIG. 43 illustrates another part of the ApplicationList element according to an embodiment of the present invention.

FIG. 44 illustrates an event message table (EMT) according to an embodiment of the present invention.

Figure 45:
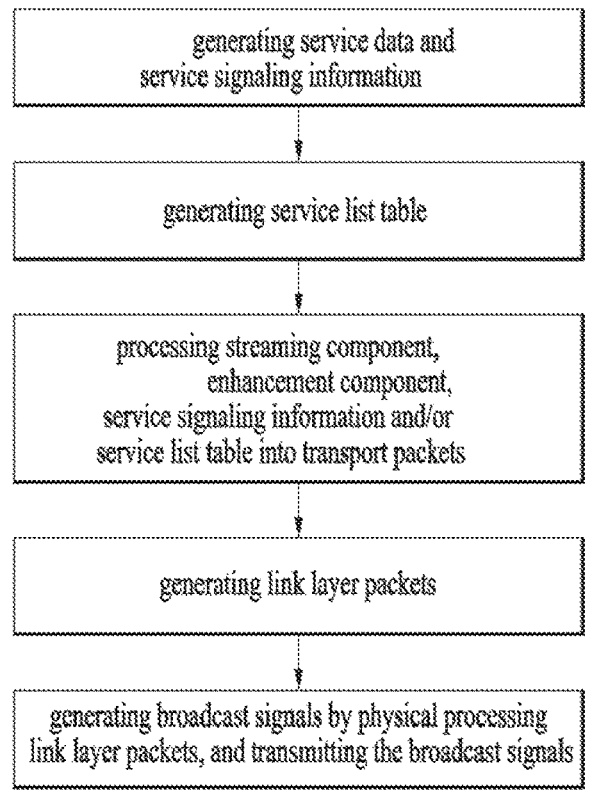

FIG. 45 illustrates a method of providing the broadcast service by a transmitting side according to an embodiment of the present invention.

Figure 46:
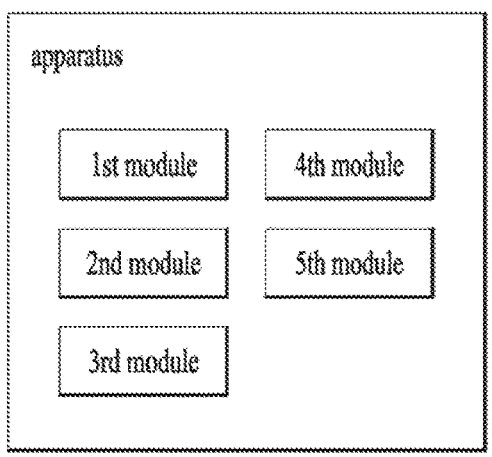

FIG. 46 illustrates an apparatus for providing the broadcast service by the transmitting side according to an embodiment of the present invention.

Figure 47:
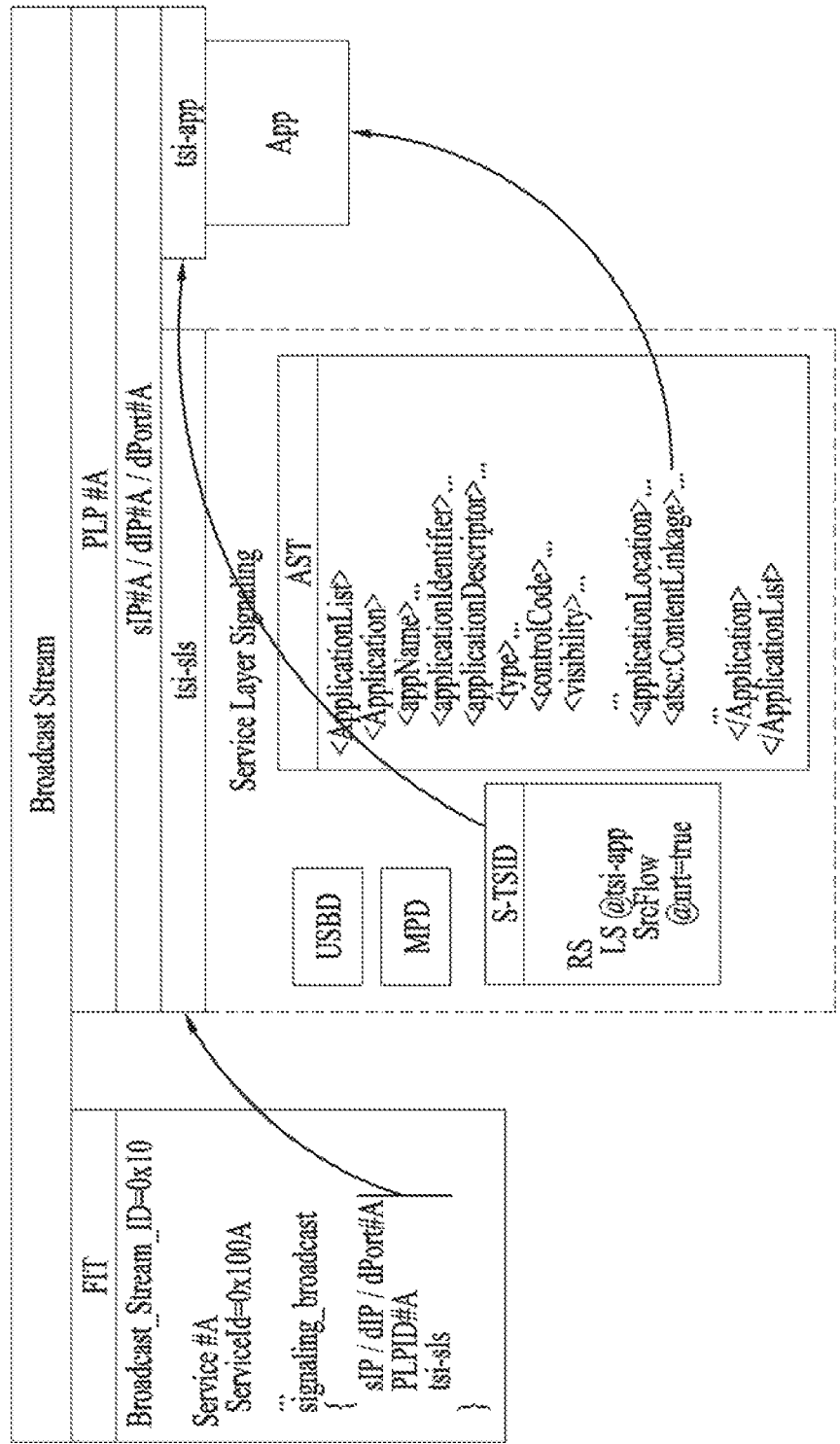

FIG. 47 illustrates an AST transmitted through a broadcast network according to an embodiment of the present invention.

Figure 48:
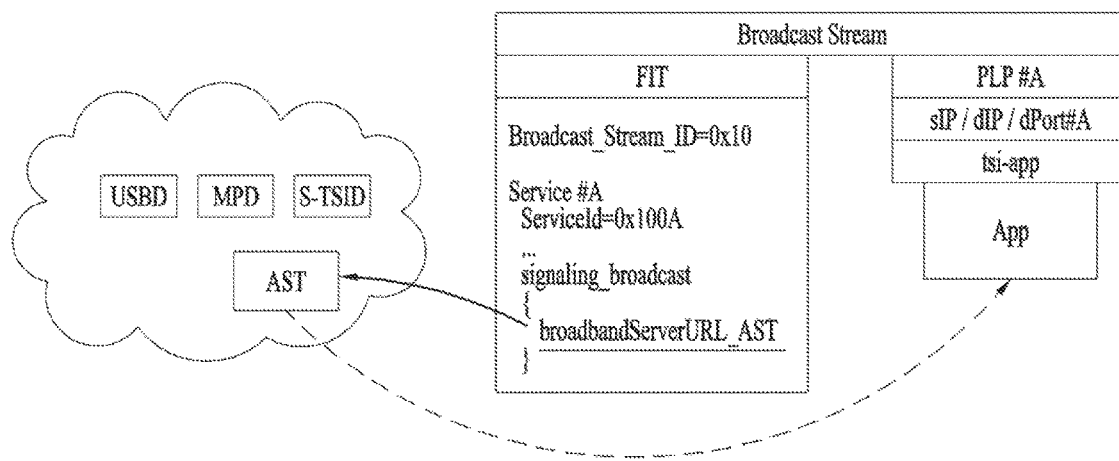

FIG. 48 illustrates an AST transmitted through a broadband network according to an embodiment of the present invention.

Figure 49:
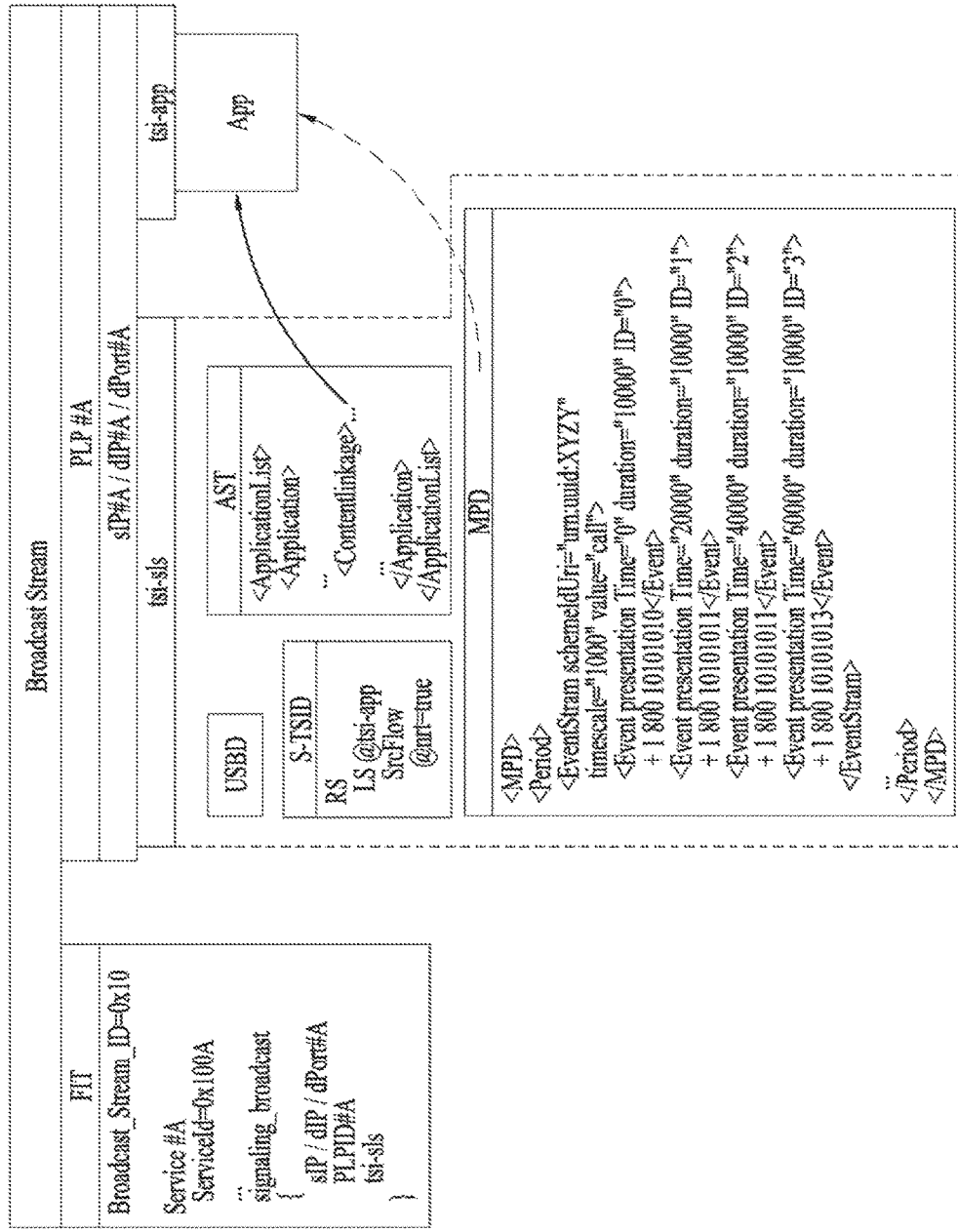

FIG. 49 illustrates an event transmitted in the form of an EventStream element through the broadcast network according to an embodiment of the present invention.

Figure 50:
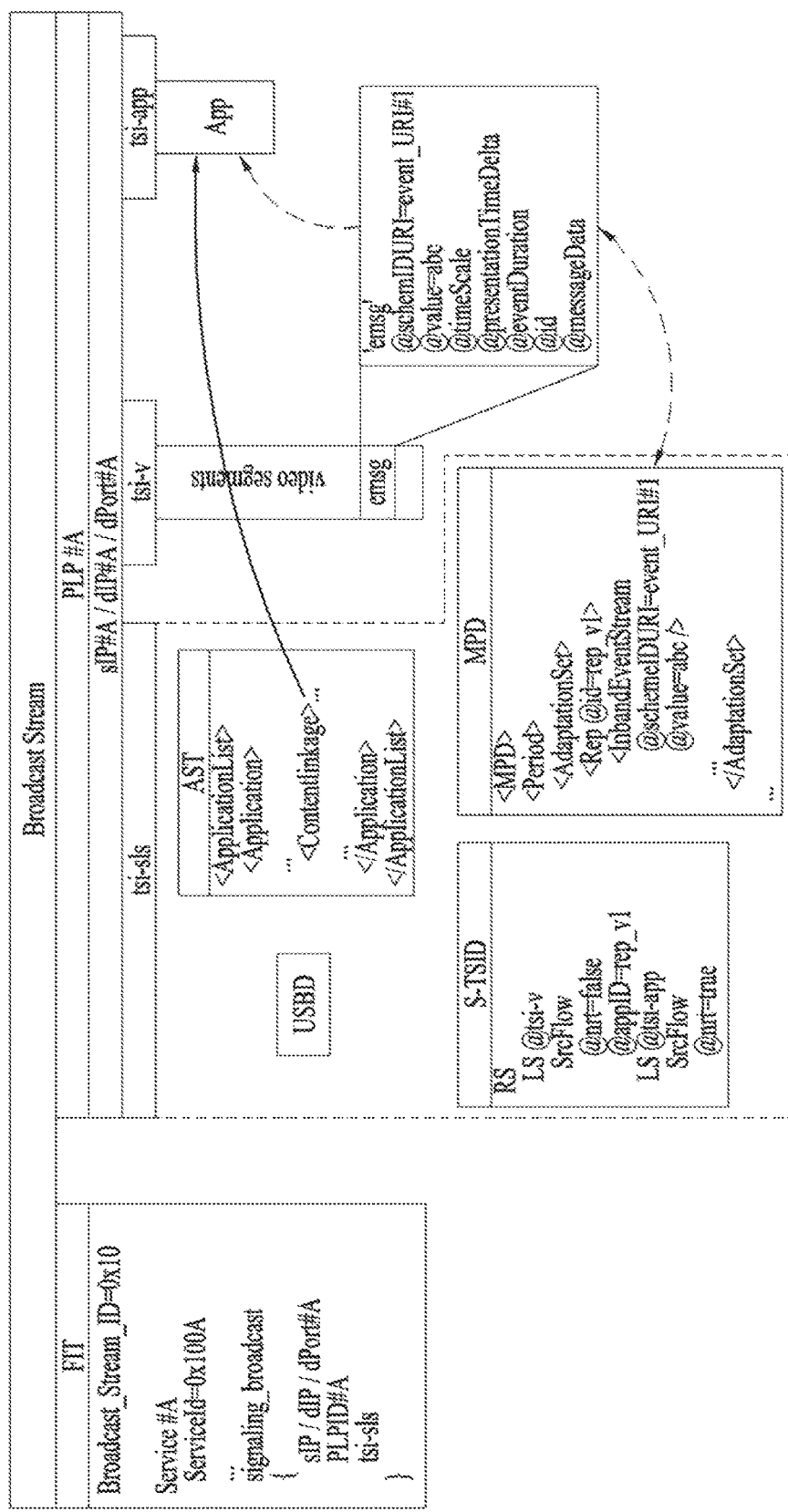

FIG. 50 illustrates an event transmitted in the form of an emsg box through the broadcast network according to an embodiment of the present invention.

Figure 51:
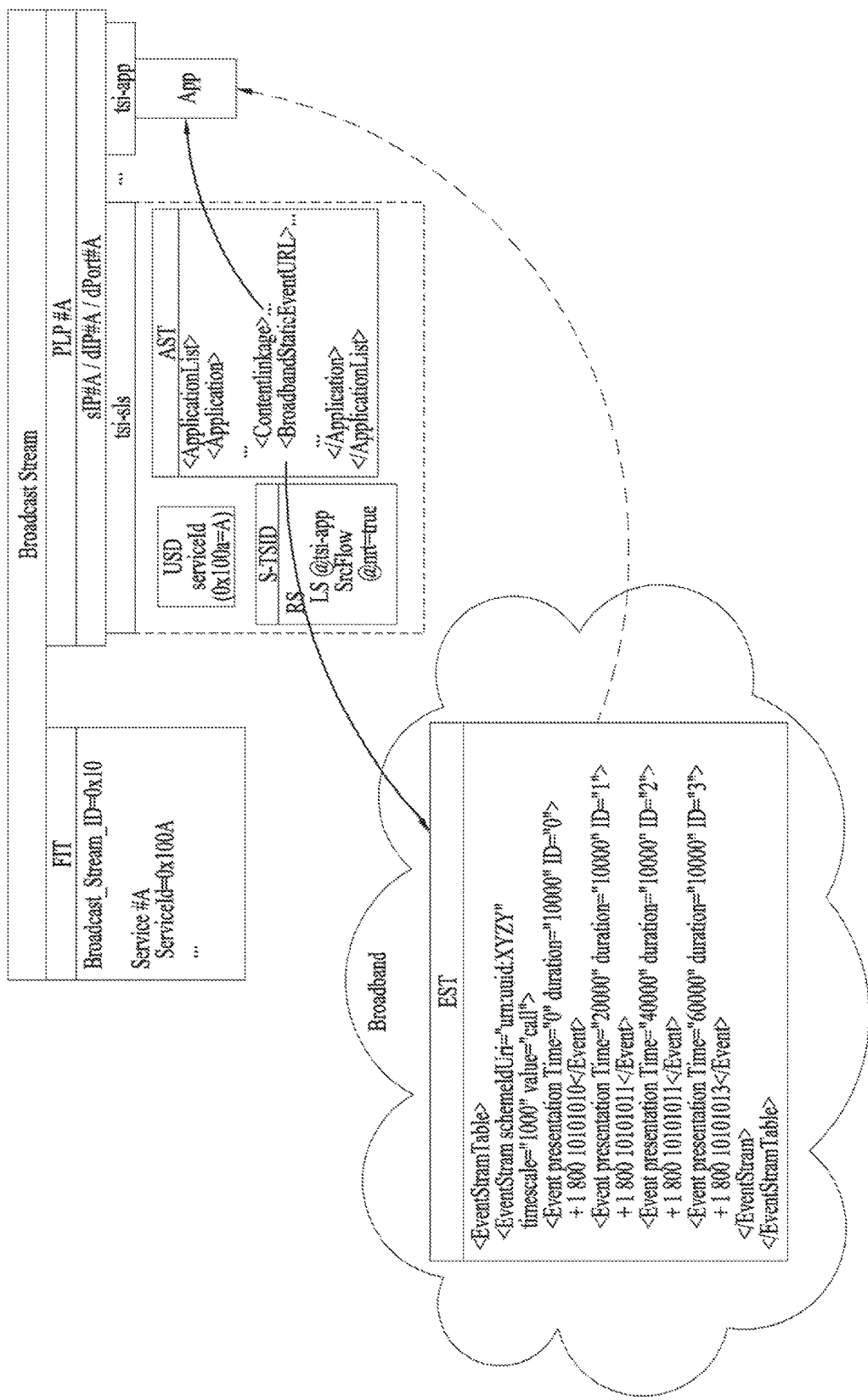

FIG. 51 illustrates an event transmitted in the form of an EventStream element through the broadband network according to an embodiment of the present invention.

Figure 52:
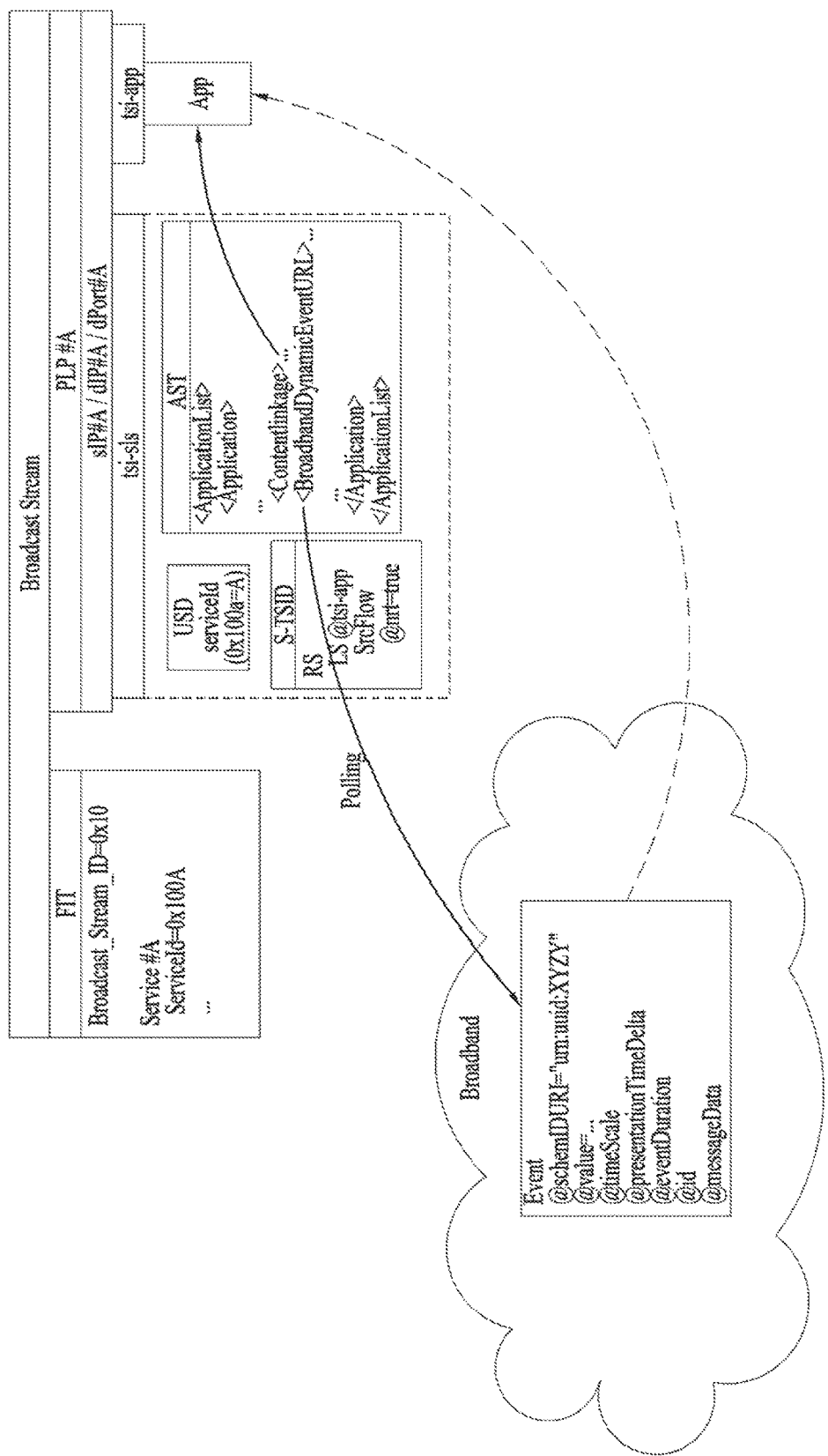

FIG. 52 illustrates an event transmitted in the form of an emsg box through the broadband network according to an embodiment of the present invention.

FIG. 53 illustrates an API and an event listener according to an embodiment of the present invention.

Figure 54:
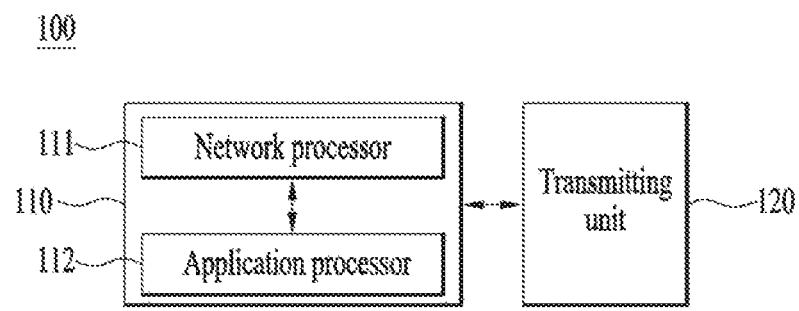

FIG. 54 is a block diagram of an electronic device according to an embodiment of the present invention.

Figure 55:
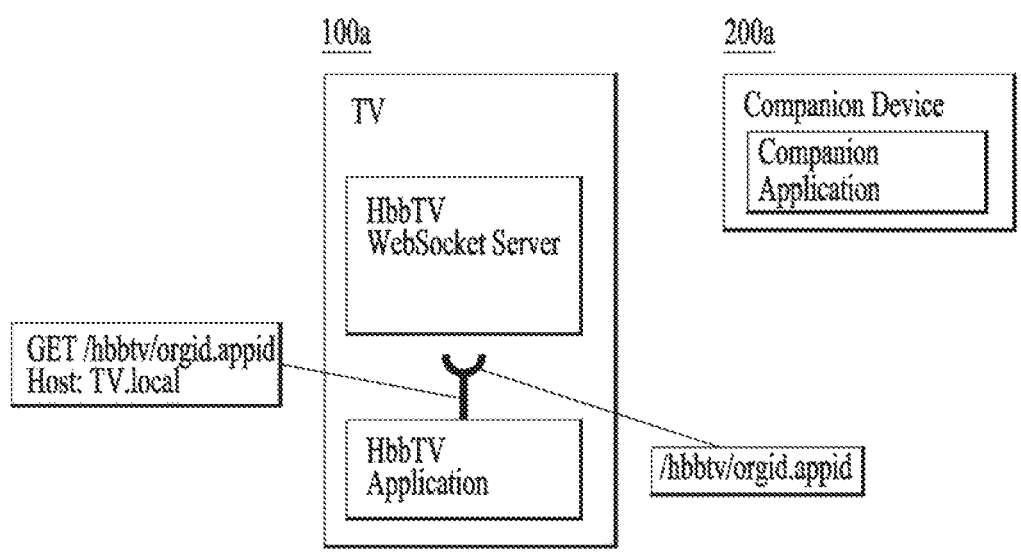

FIG. 55 is a diagram for description of connection of a first client according to an embodiment of the present invention.

Figure 56:
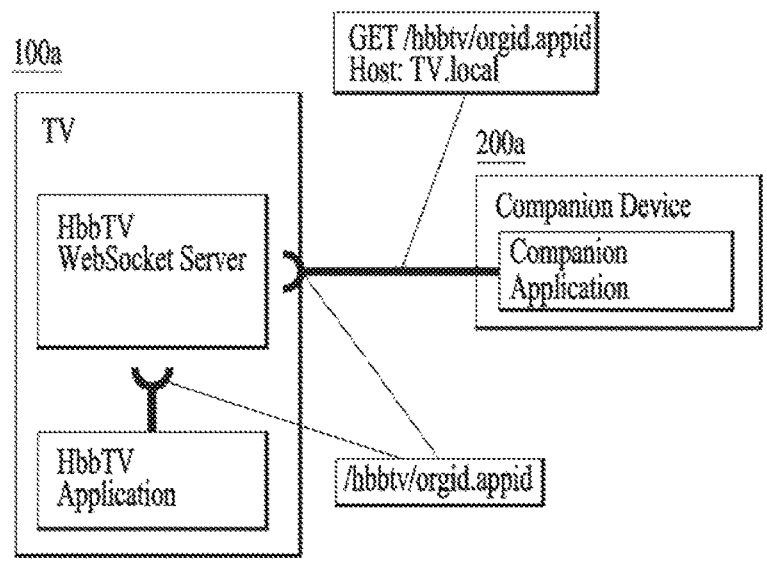

FIG. 56 is a diagram for description of connection of a second client according to an embodiment of the present invention.

Figure 57:
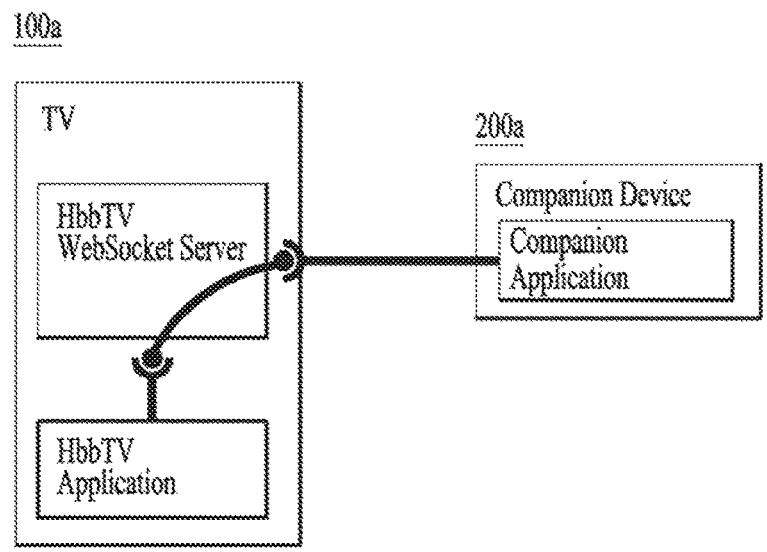

FIG. 57 is a diagram for description of connection between the first and second clients according to an embodiment of the present invention.

Figure 58:
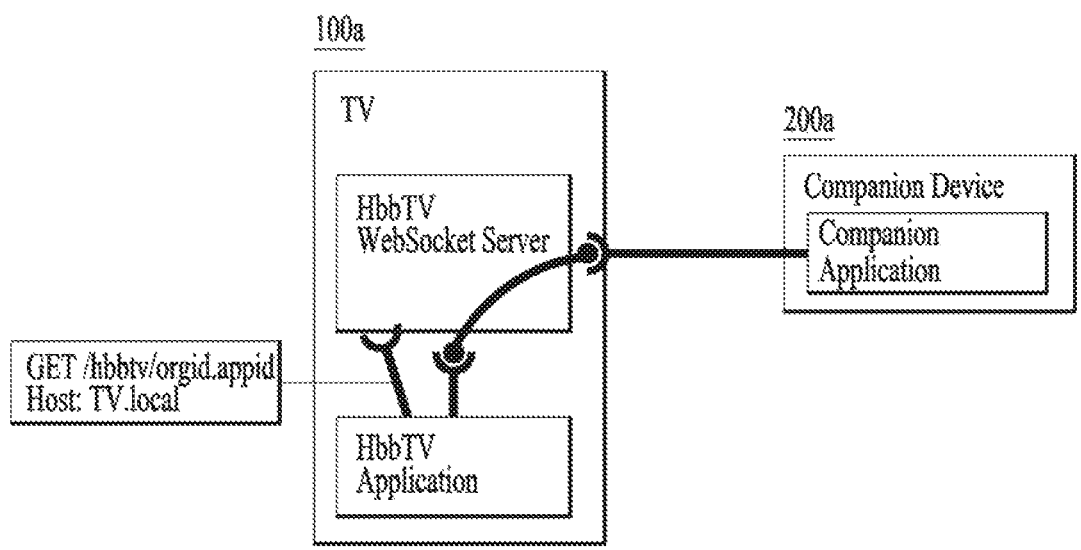

FIG. 58 is a diagram for description of an additional connection request according to an embodiment of the present invention.

Figure 59:
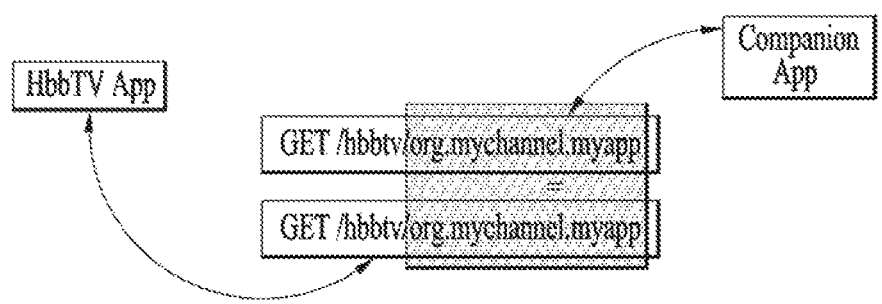

FIG. 59 is a diagram for description of connection between clients when an IP address is not present according to an embodiment of the present invention.

Figure 60:
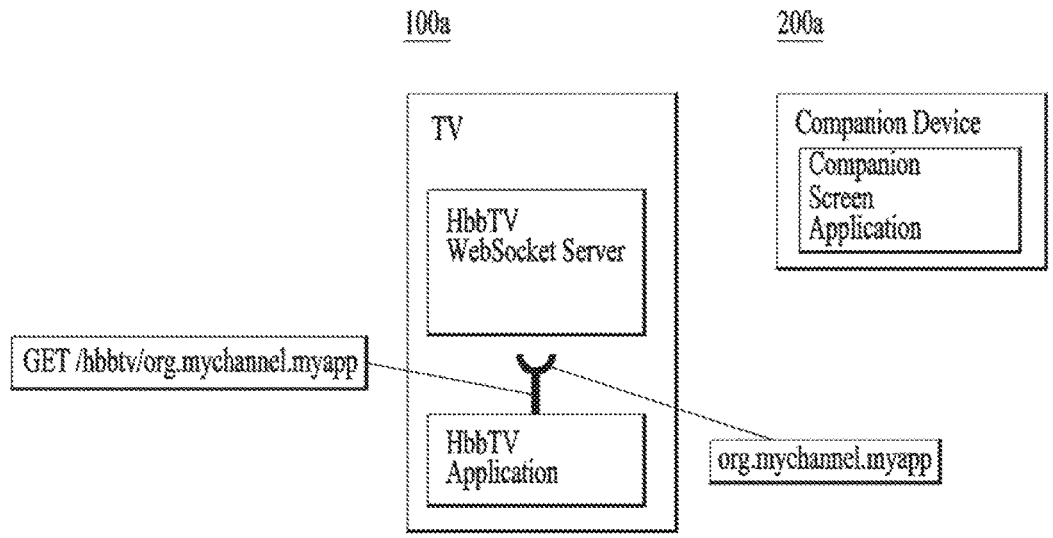

FIG. 60 is a diagram for description of standby connection for connection between applications according to an embodiment of the present invention.

Figure 61:
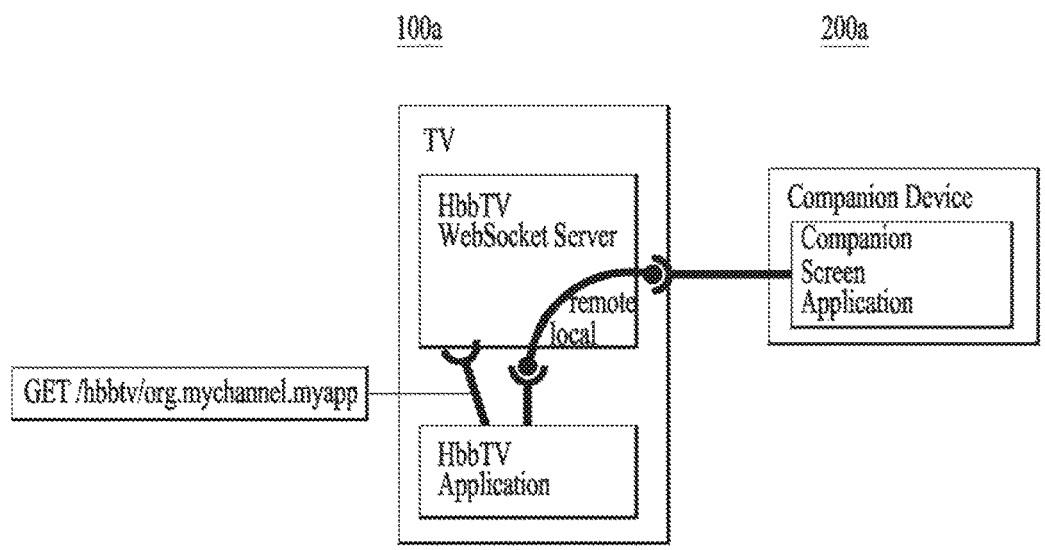

FIG. 61 is a diagram for description of a new connection request for connection with a second client according to an embodiment of the present invention.

Figure 62:
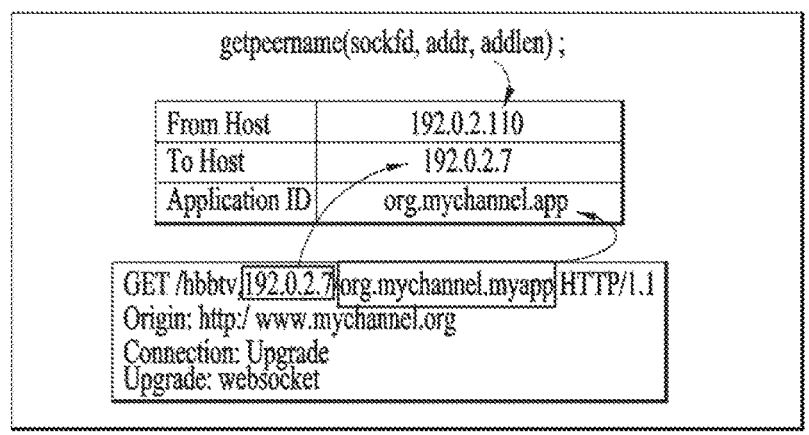

FIG. 62 is a diagram for description of setting of a first client when an IP address is included according to an embodiment of the present invention.

Figure 63:
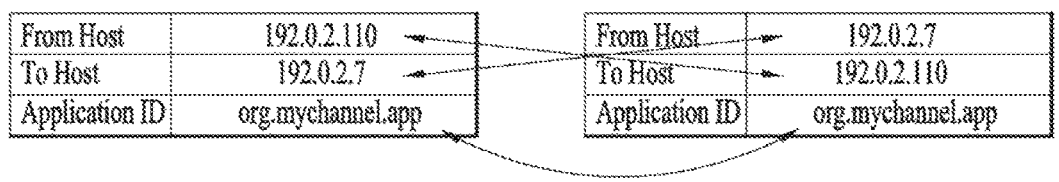

FIG. 63 is a diagram for description of setting of a first client and a second client when IP addresses are included according to an embodiment of the present invention.

Figure 64:
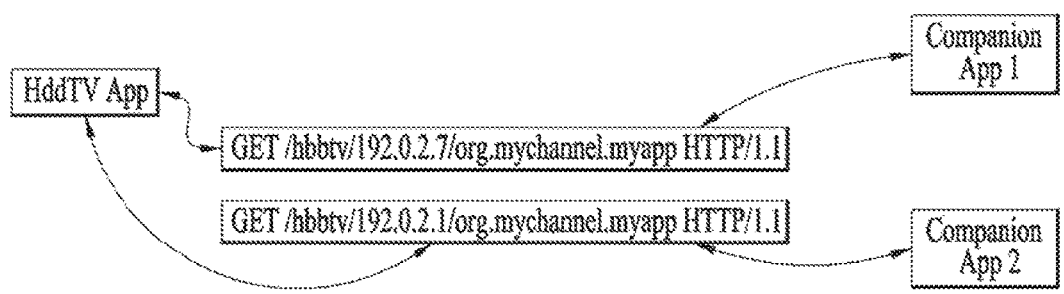

FIG. 64 is a diagram for description of an embodiment of connection to a plurality of second clients when IP addresses are included.

Figure 65:
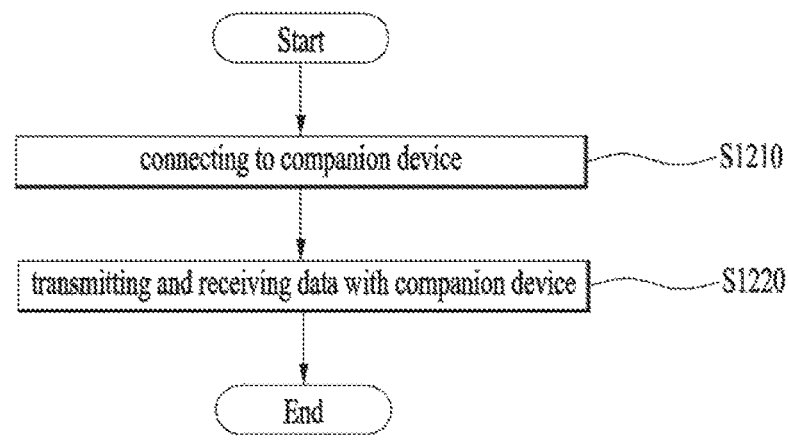

FIG. 65 is a flowchart of a method of controlling an electronic device according to an embodiment of the present invention.

Figure 66:
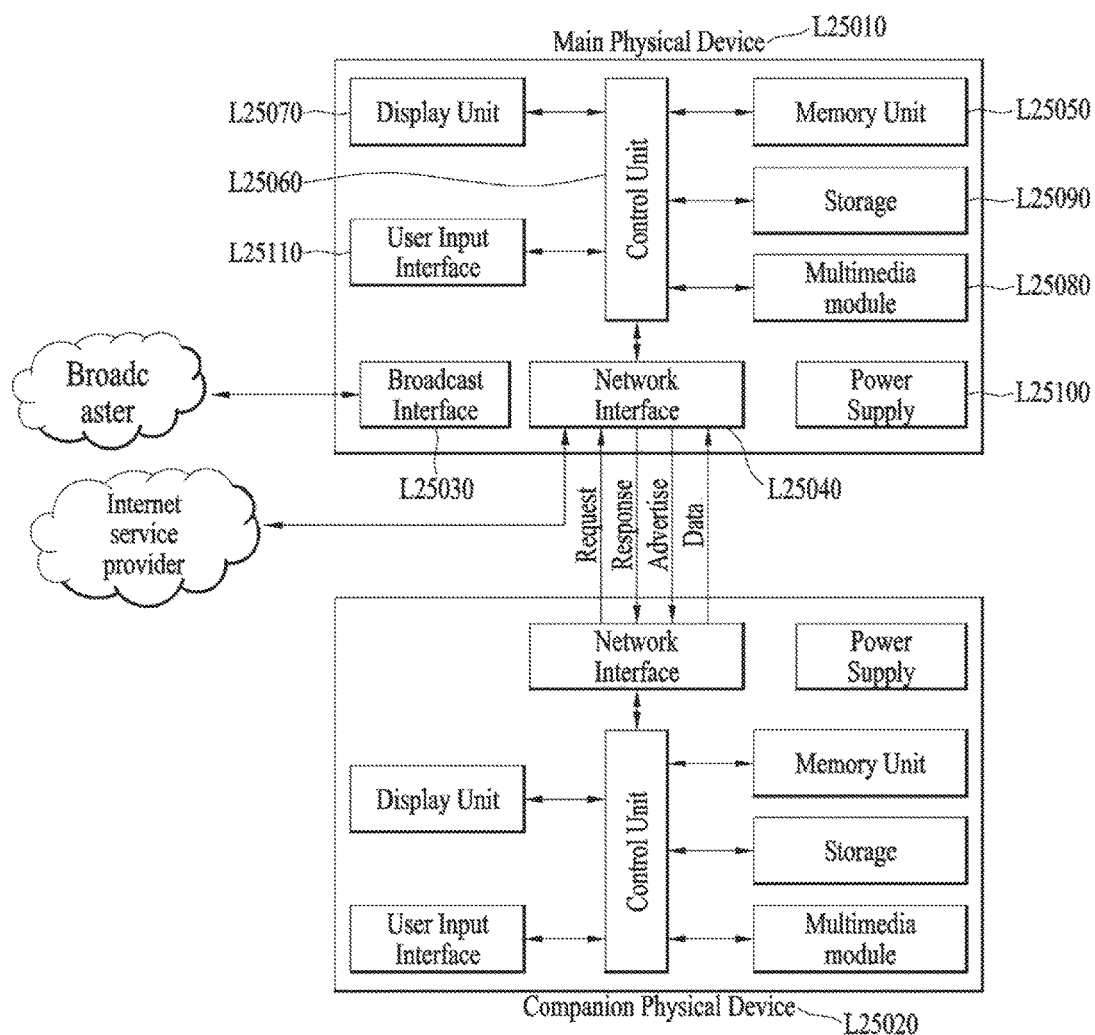

FIG. 66 is a diagram illustrating configurations of a main physical device and a companion physical device according to an embodiment of the present invention.

Figure 67:
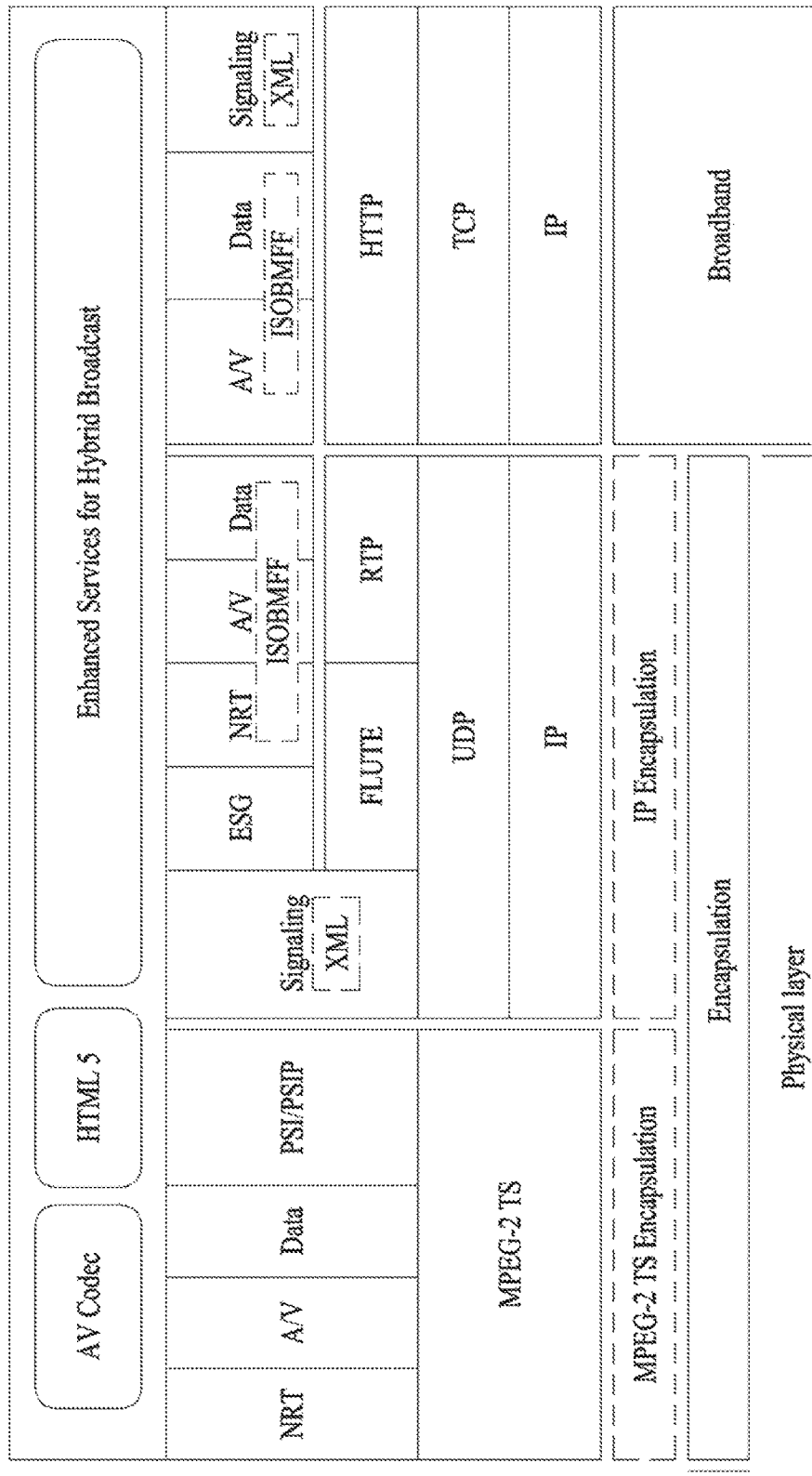

FIG. 67 is a diagram illustrating a protocol stack for supporting a hybrid broadcast service according to an embodiment of the present invention.

Figure 68:
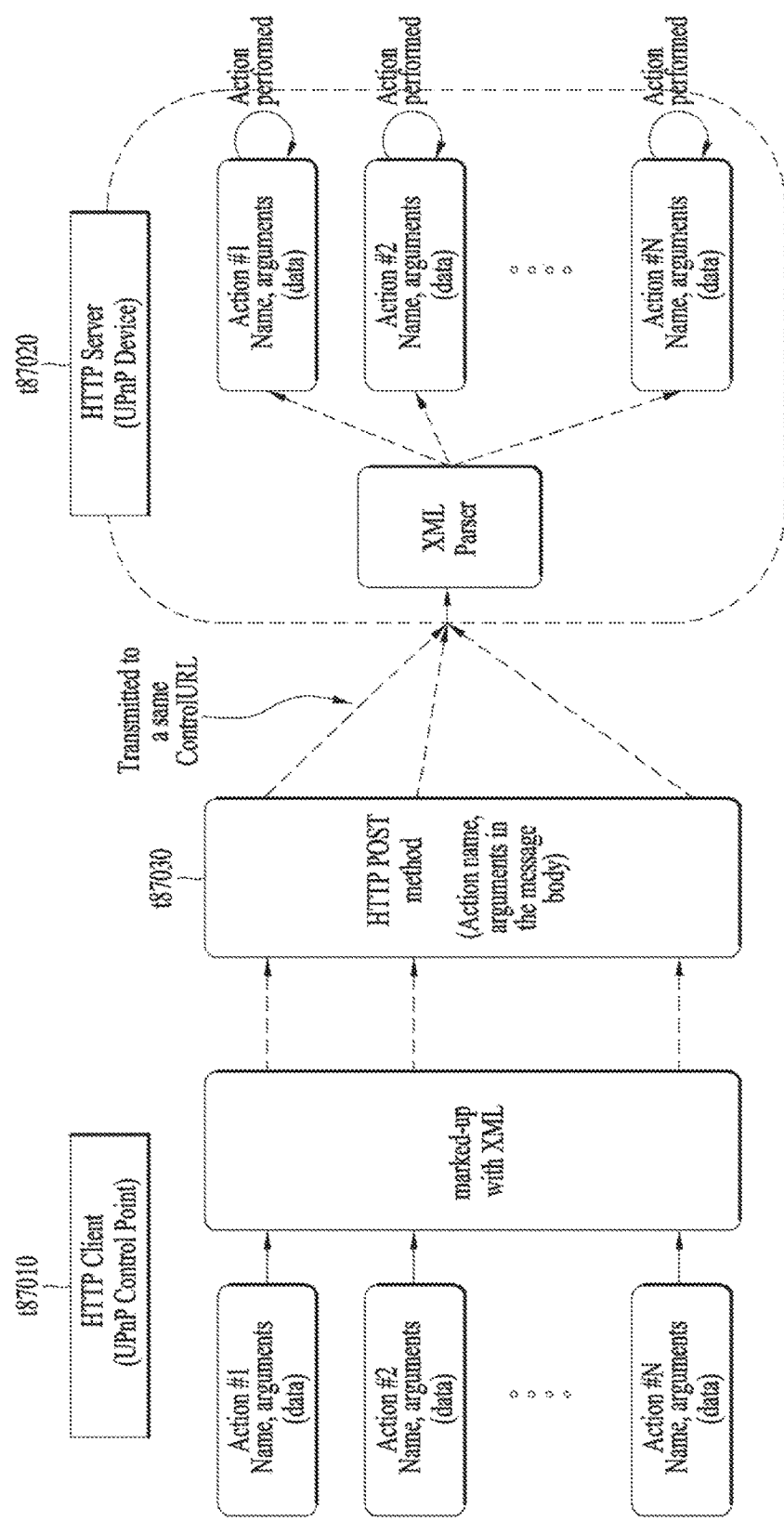

FIG. 68 is a diagram illustrating an action mechanism of a UPnP scheme according to an embodiment of the present invention.

Figure 69:
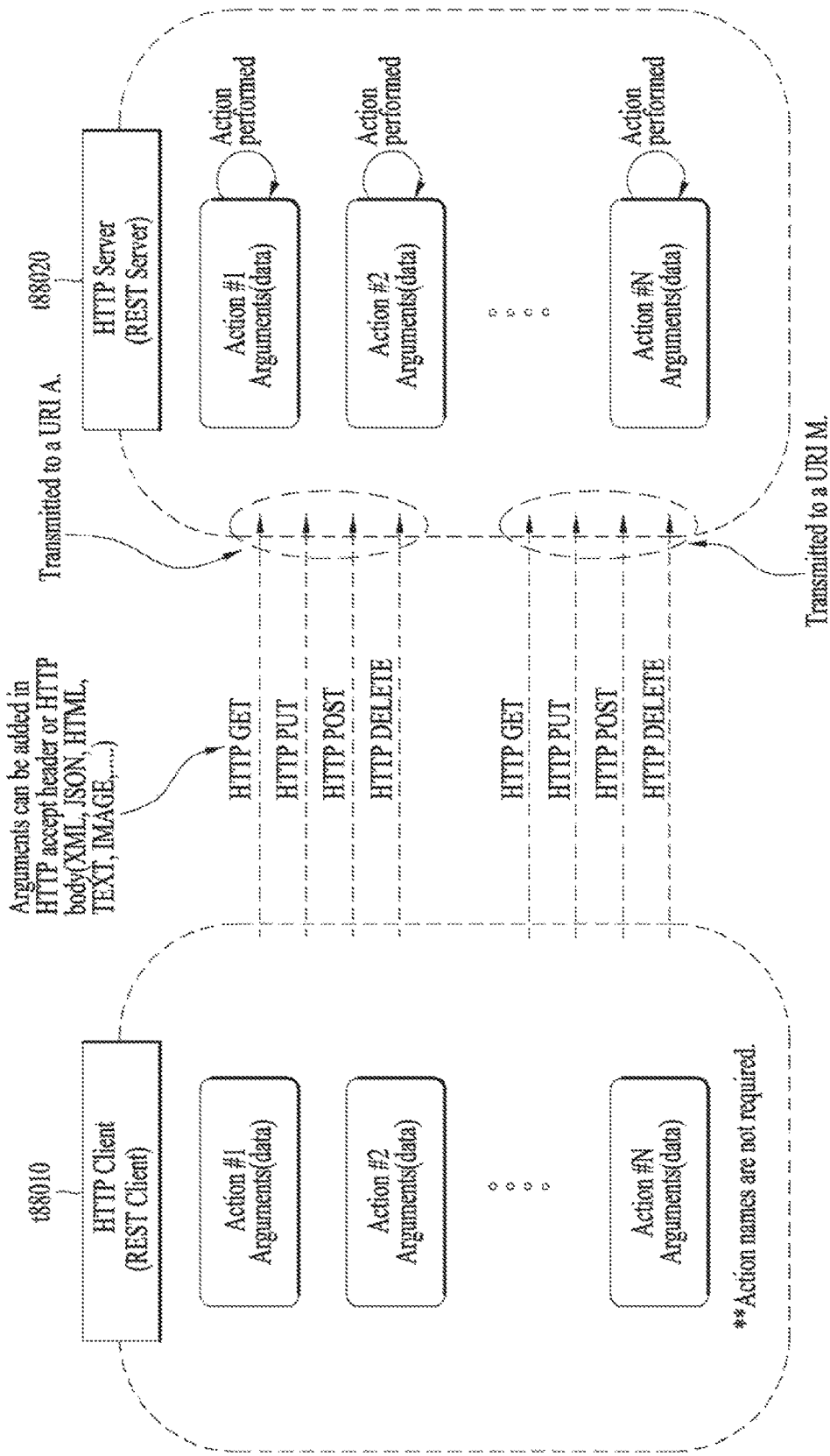

FIG. 69 is a diagram illustrating a REST mechanism according to an embodiment of the present invention.

FIG. 70 is a diagram illustrating a service that enables a broadcast receiver and companion devices to exchange an electronic service guide (ESG).

FIG. 71 is a diagram illustrating an ESGData state variable according to an embodiment of the present invention.

FIG. 72 is a diagram illustrating an ESGData state variable according to another embodiment of the present invention.

Figure 73:
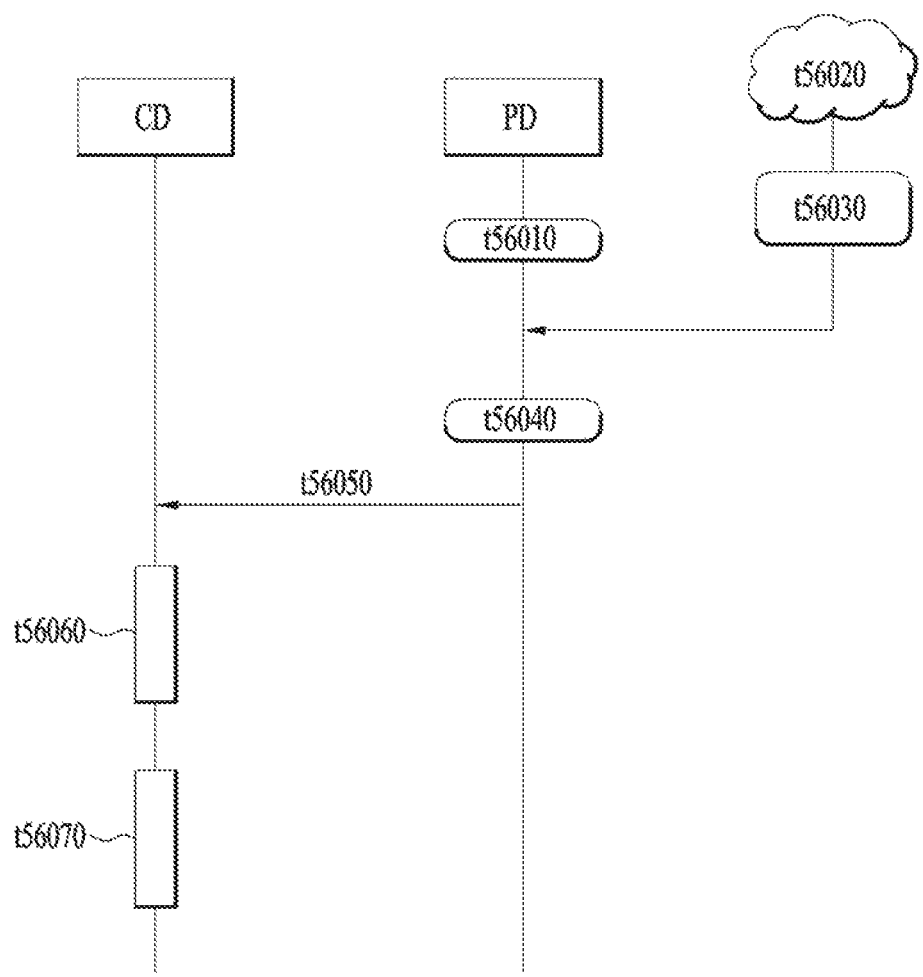

FIG. 73 is a diagram illustrating a process of delivering an ESGData state variable to a companion device using the event scheme according to an embodiment of the present invention.

FIG. 74 is a diagram illustrating a LastChangedESGData state variable according to an embodiment of the present invention.

Figure 75:
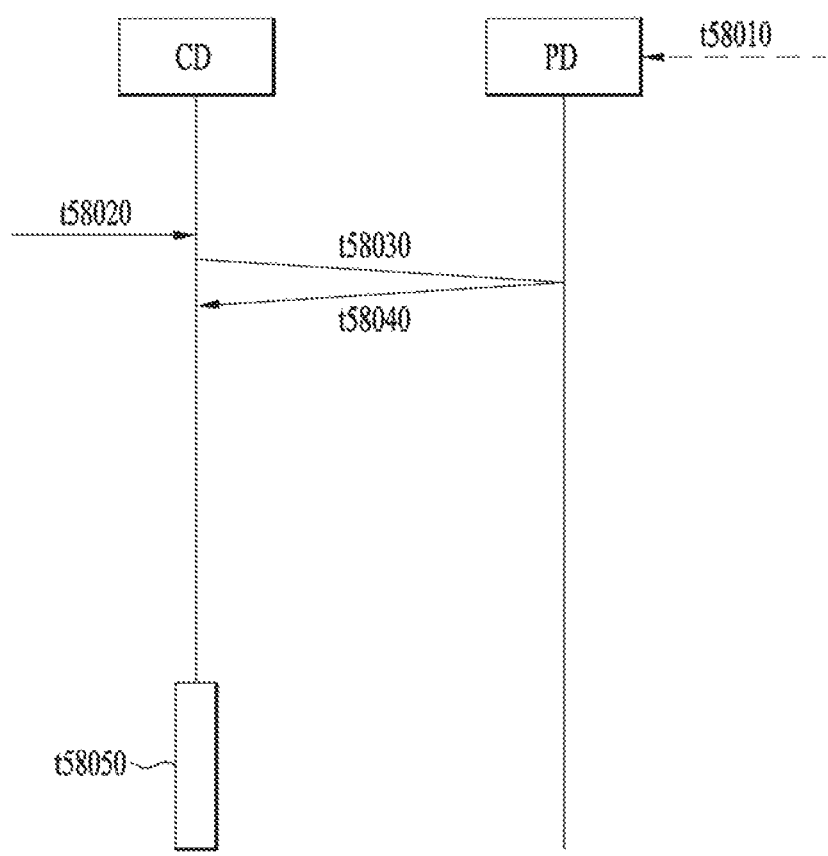

FIG. 75 is a diagram illustrating a process in which ESG data is delivered to a companion device according to a GetESGData action according to an embodiment of the present invention.

Figure 76:
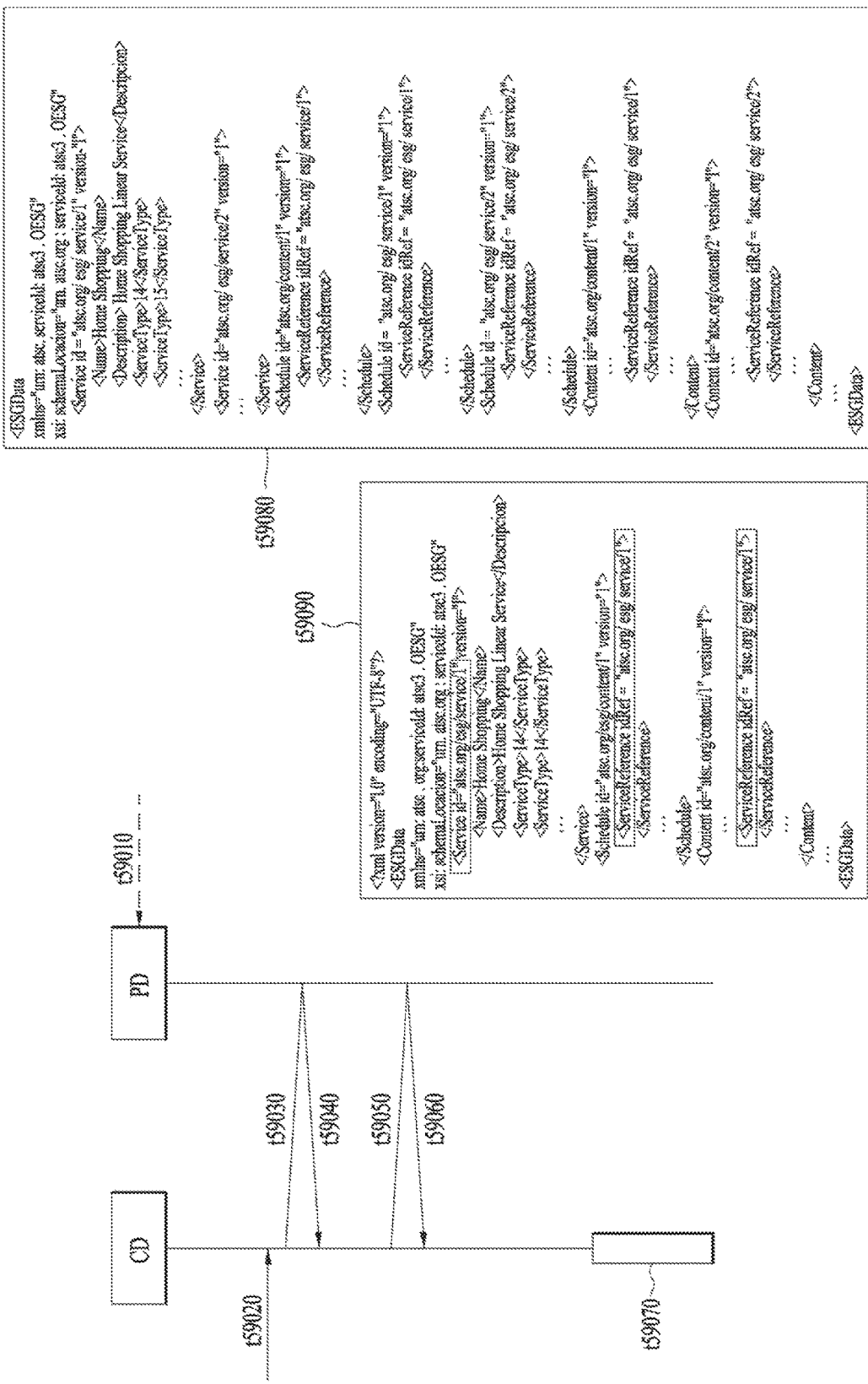

FIG. 76 is a diagram illustrating a process of delivering ESG data to a companion device according to GetServiceIds and GetESGbyServiceIds actions according to an embodiment of the present invention.

Figure 77:
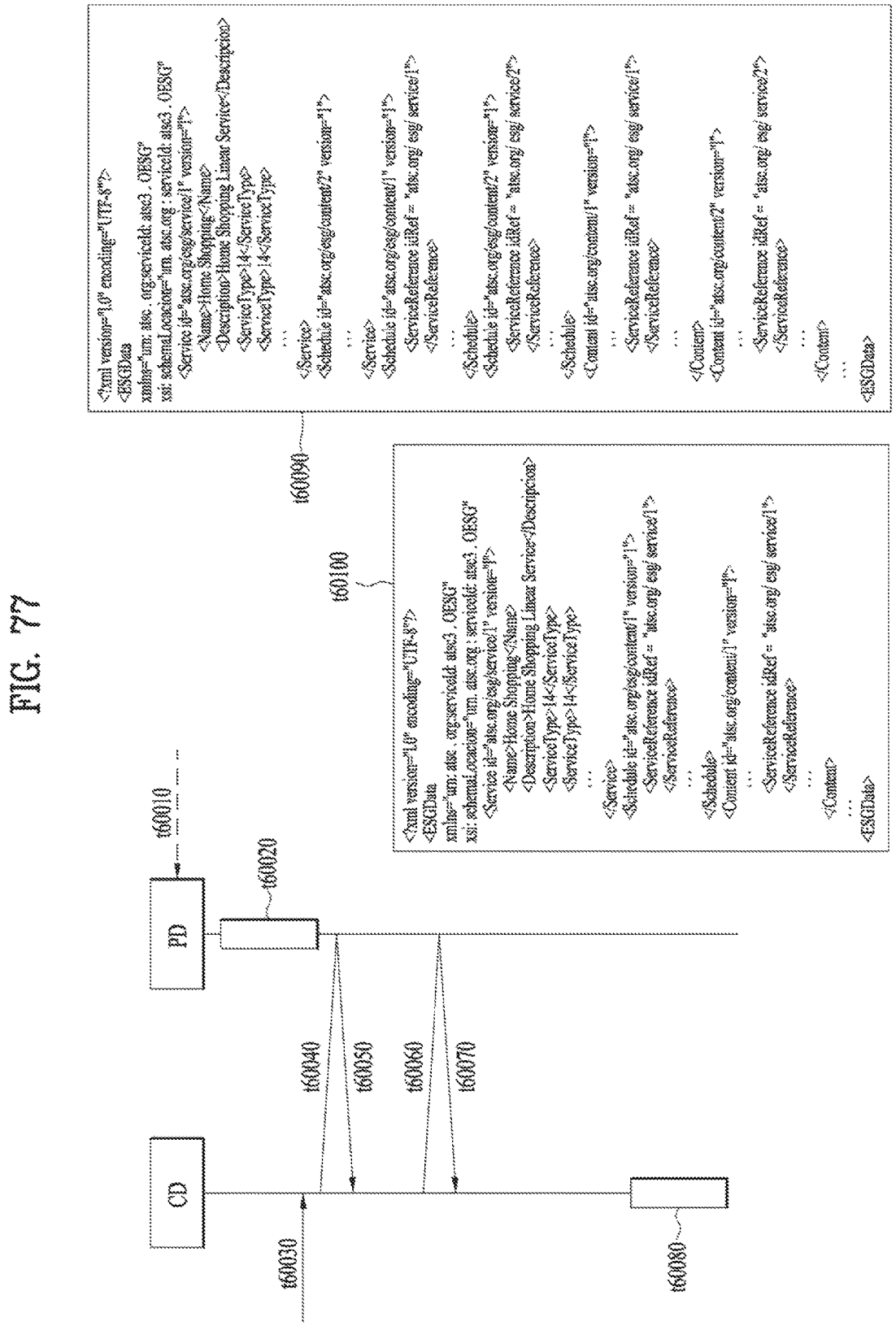

FIG. 77 is a diagram illustrating a process of delivering ESG data to a companion device according to a GetCurrentServiceId action according to an embodiment of the present invention.

Figure 78:
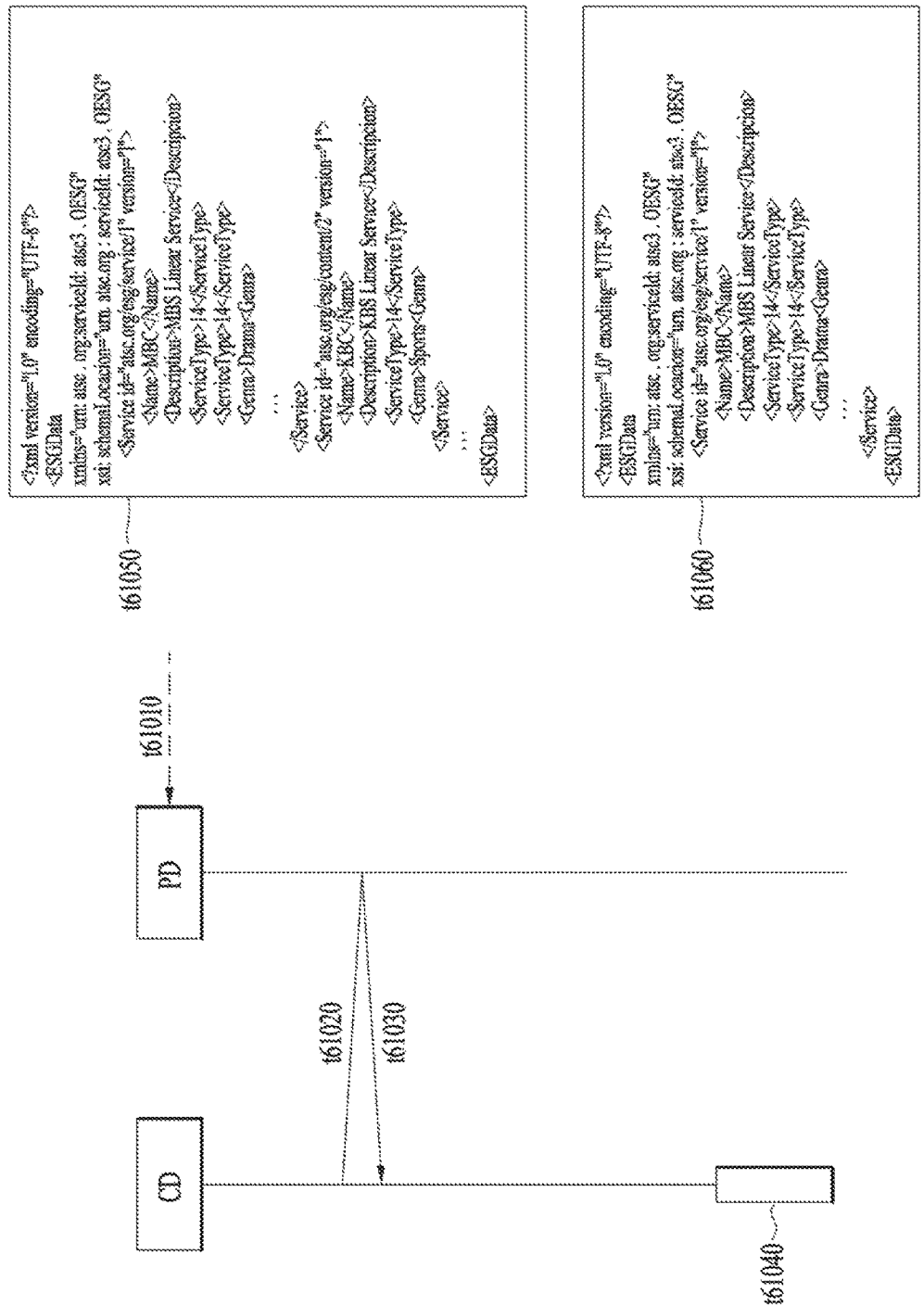

FIG. 78 is a diagram illustrating a process in which ESG data is delivered to a companion device according to a SearchESG action according to an embodiment of the present invention.

Figure 79:
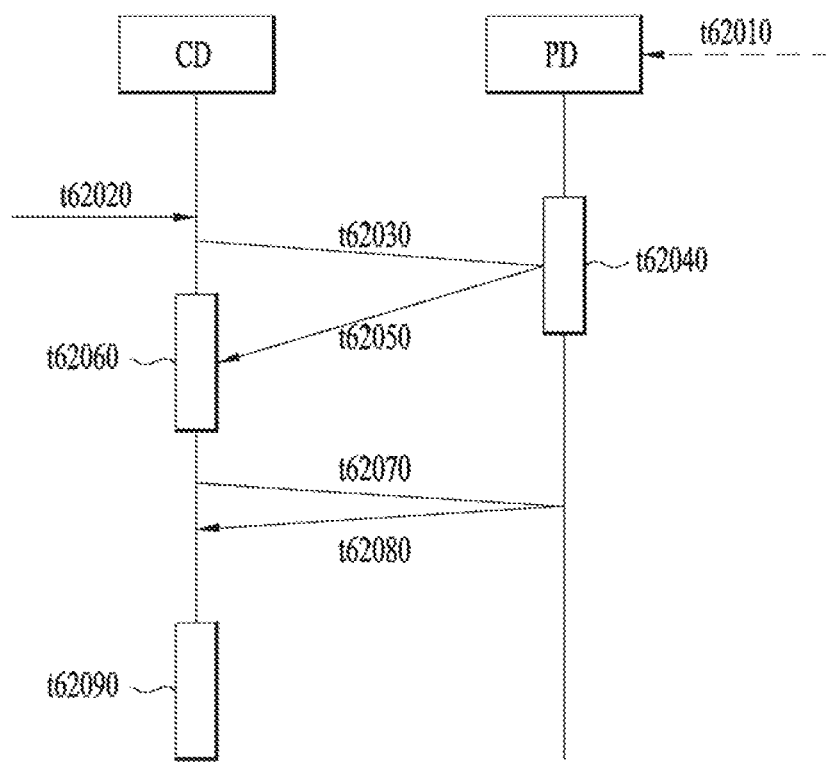

FIG. 79 is a diagram illustrating an authentication process for delivering ESG data according to a DoAuthenticationForESG action according to an embodiment of the present invention.

Figure 80:
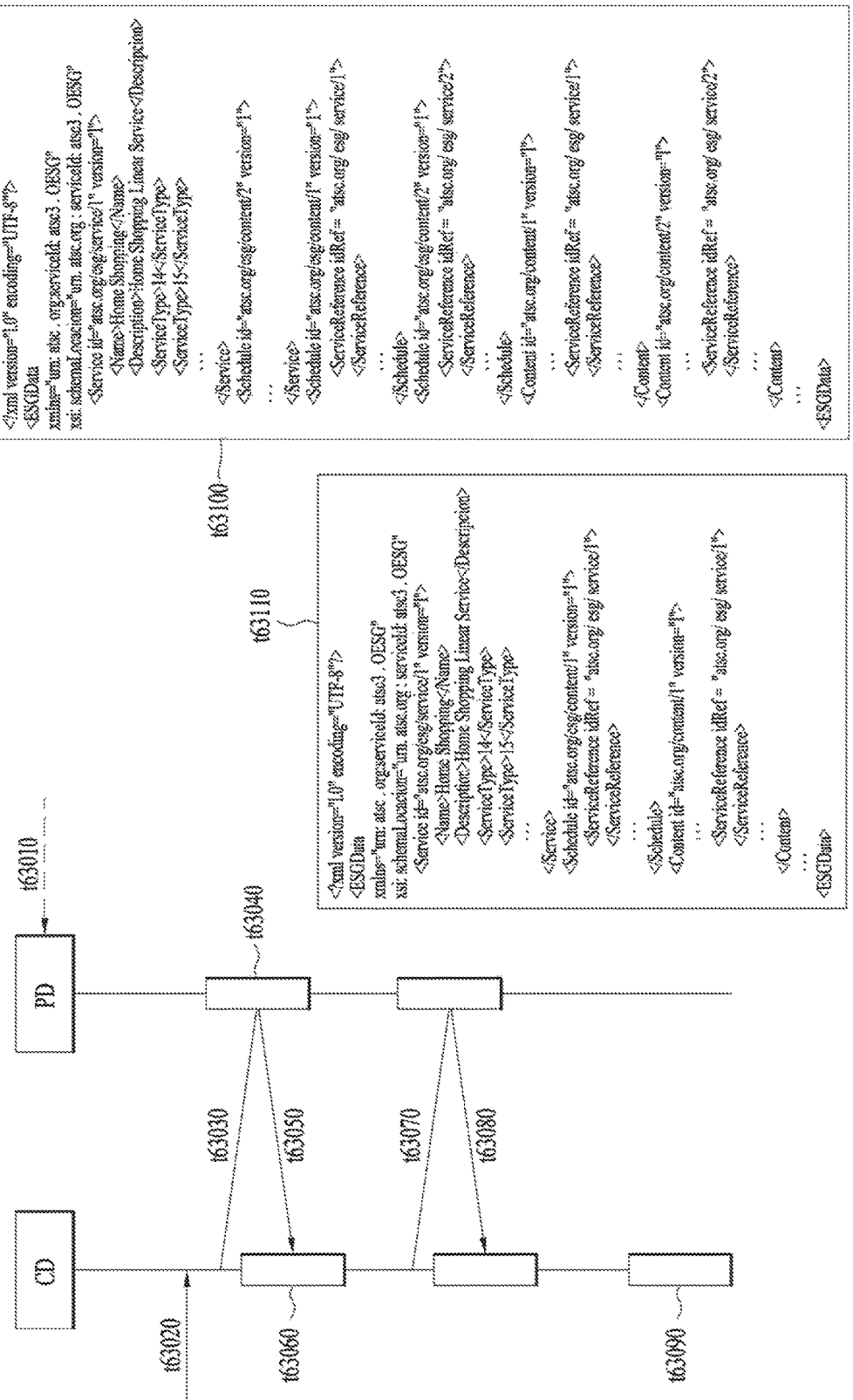

FIG. 80 is a diagram illustrating a process of delivering ESG data to a companion device simultaneously with device authentication according to GetServiceIds and GetESGbyServiceIds actions according to another embodiment of the present invention.

Figure 81:
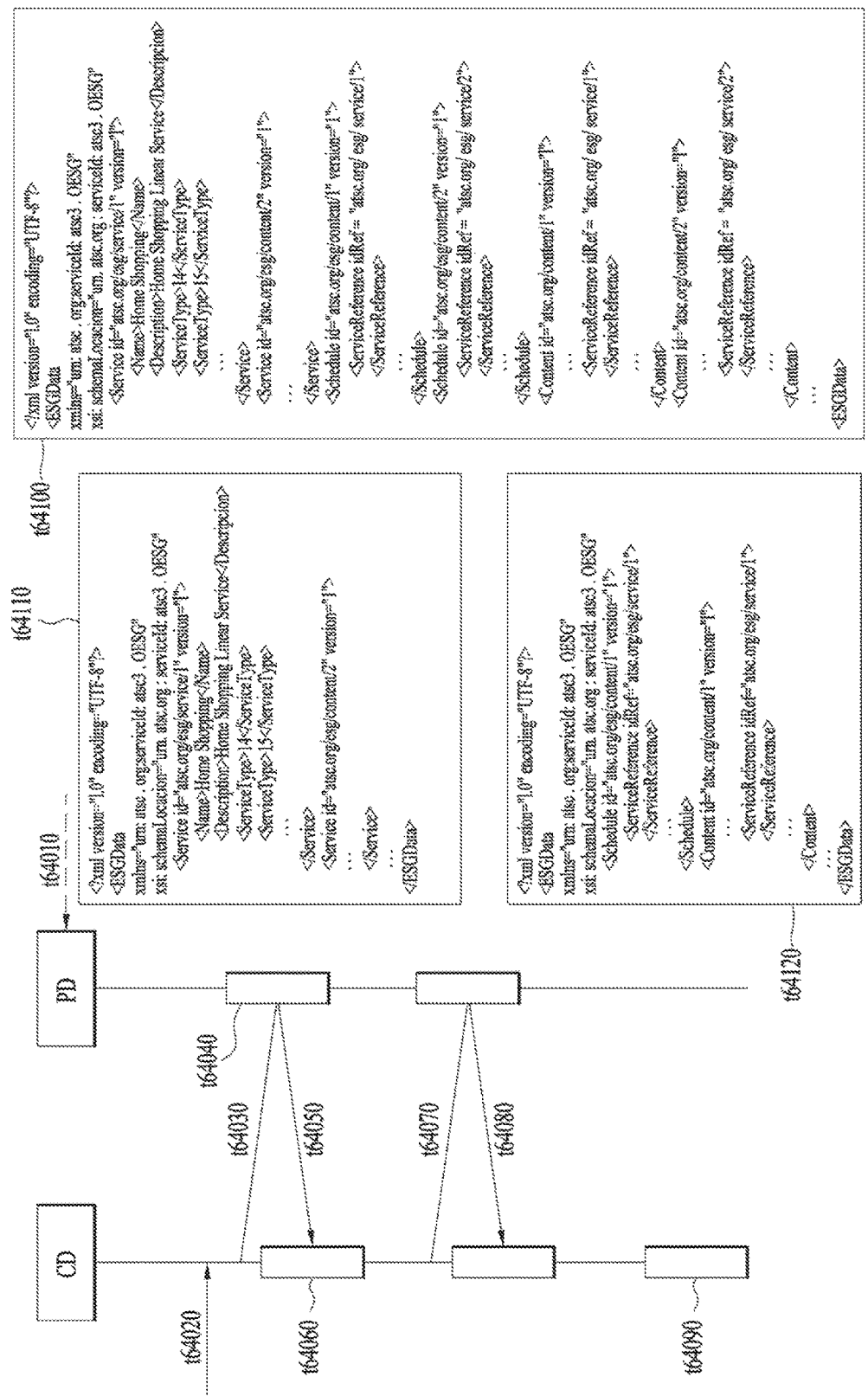

FIG. 81 is a diagram illustrating a process of delivering ESG data to a companion device according to a GetService action according to an embodiment of the present invention.

Figure 82:
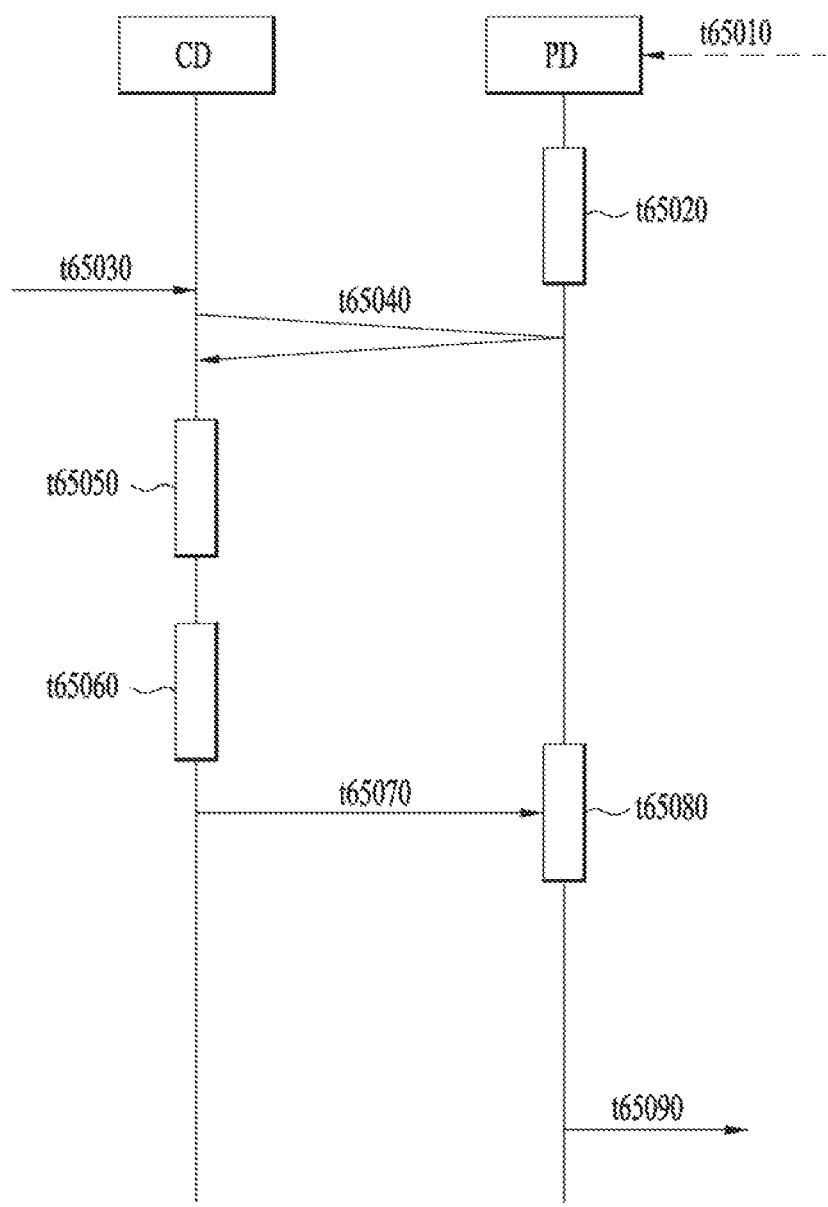

FIG. 82 is a diagram illustrating a process of changing a service of a broadcast receiver by a companion device according to a SetChangeChannel action according to an embodiment of the present invention.

Figure 83:
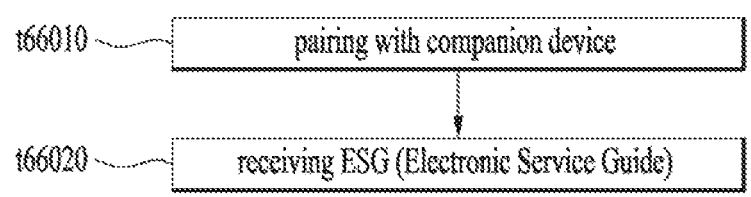

FIG. 83 is a diagram illustrating a method of providing a broadcast service according to an embodiment of the present invention.

Figure 84:
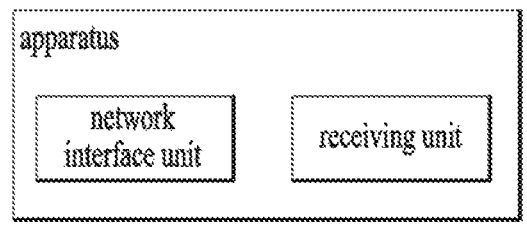

FIG. 84 is a diagram illustrating a broadcast receiver according to an embodiment of the present invention.

Figure 85:
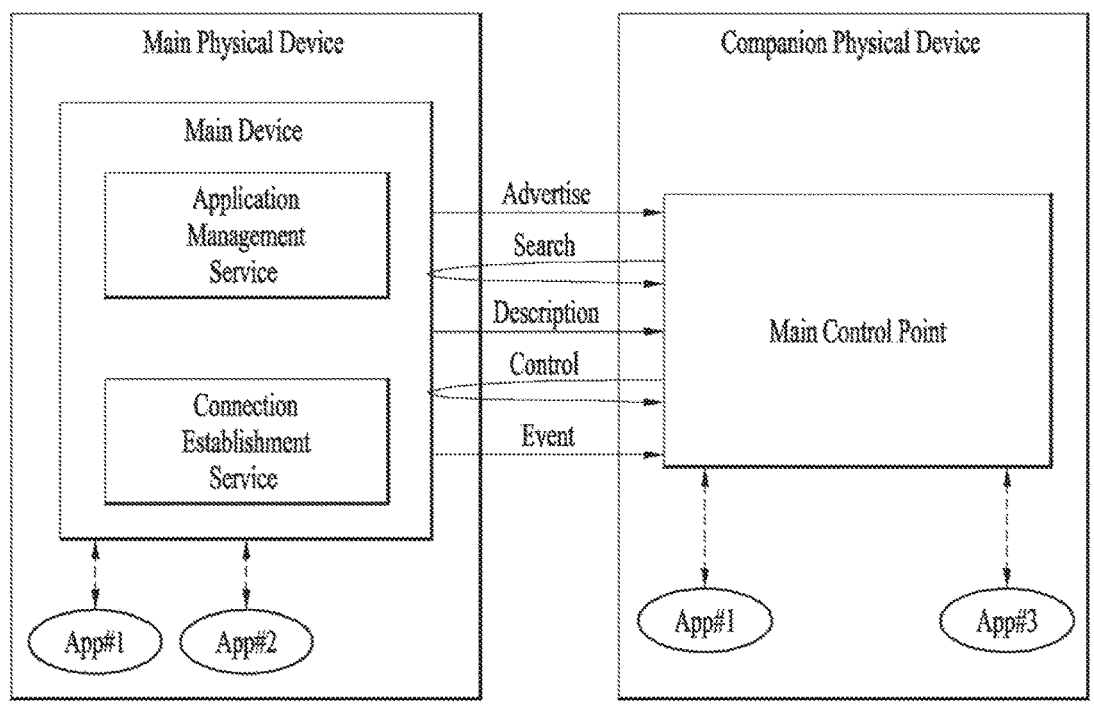

FIG. 85 is a diagram illustrating a UPnP-based PD-CD architecture according to an embodiment of the present invention.

Figure 86:
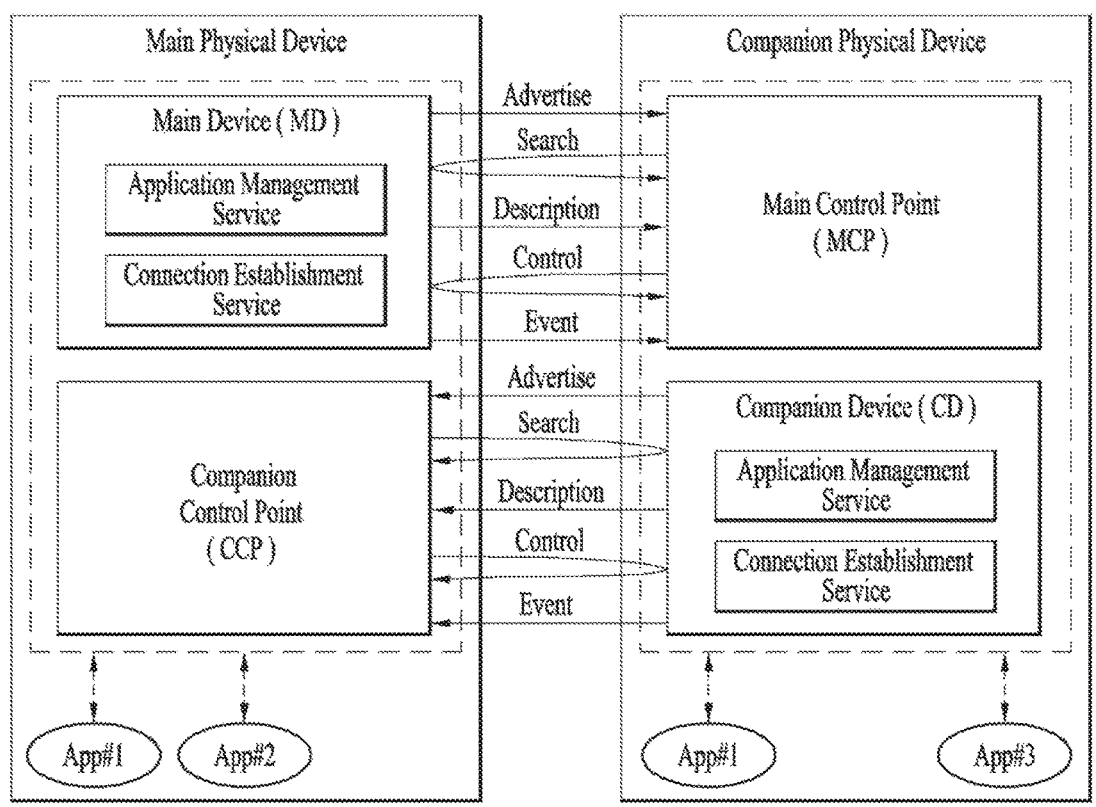

FIG. 86 is a diagram illustrating a UPnP-based PD-CD architecture according to an embodiment of the present invention.

Figure 87:
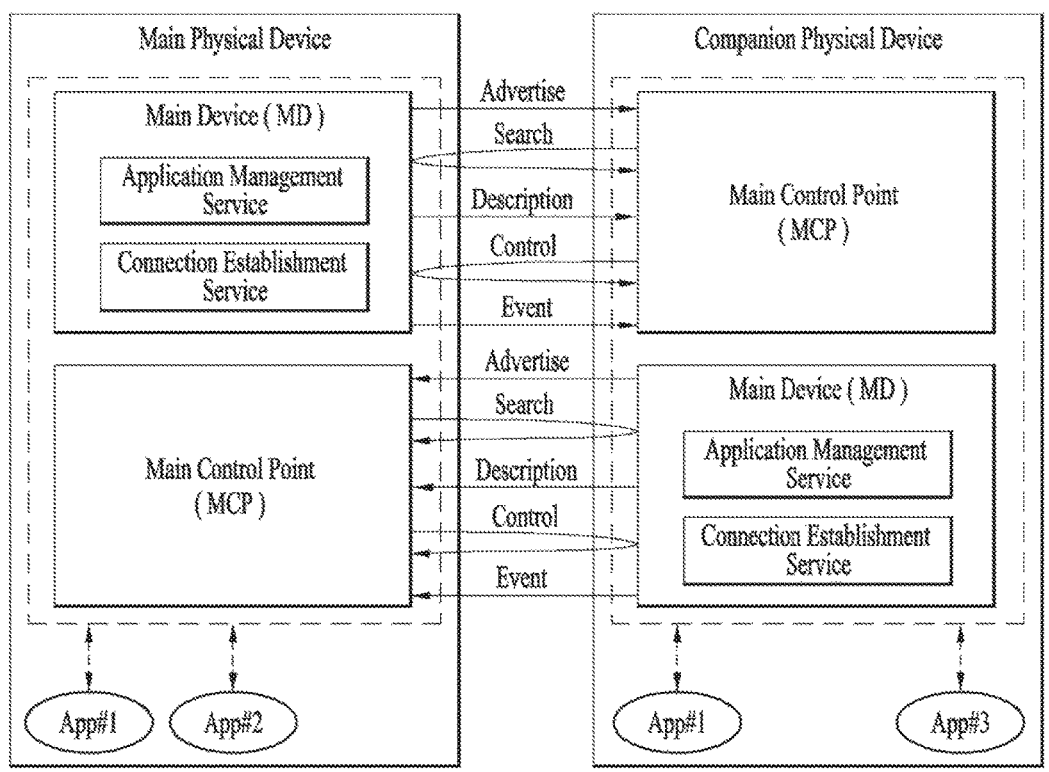

FIG. 87 is a diagram illustrating a UPnP-based PD-CD architecture according to another embodiment of the present invention.

Figure 88:
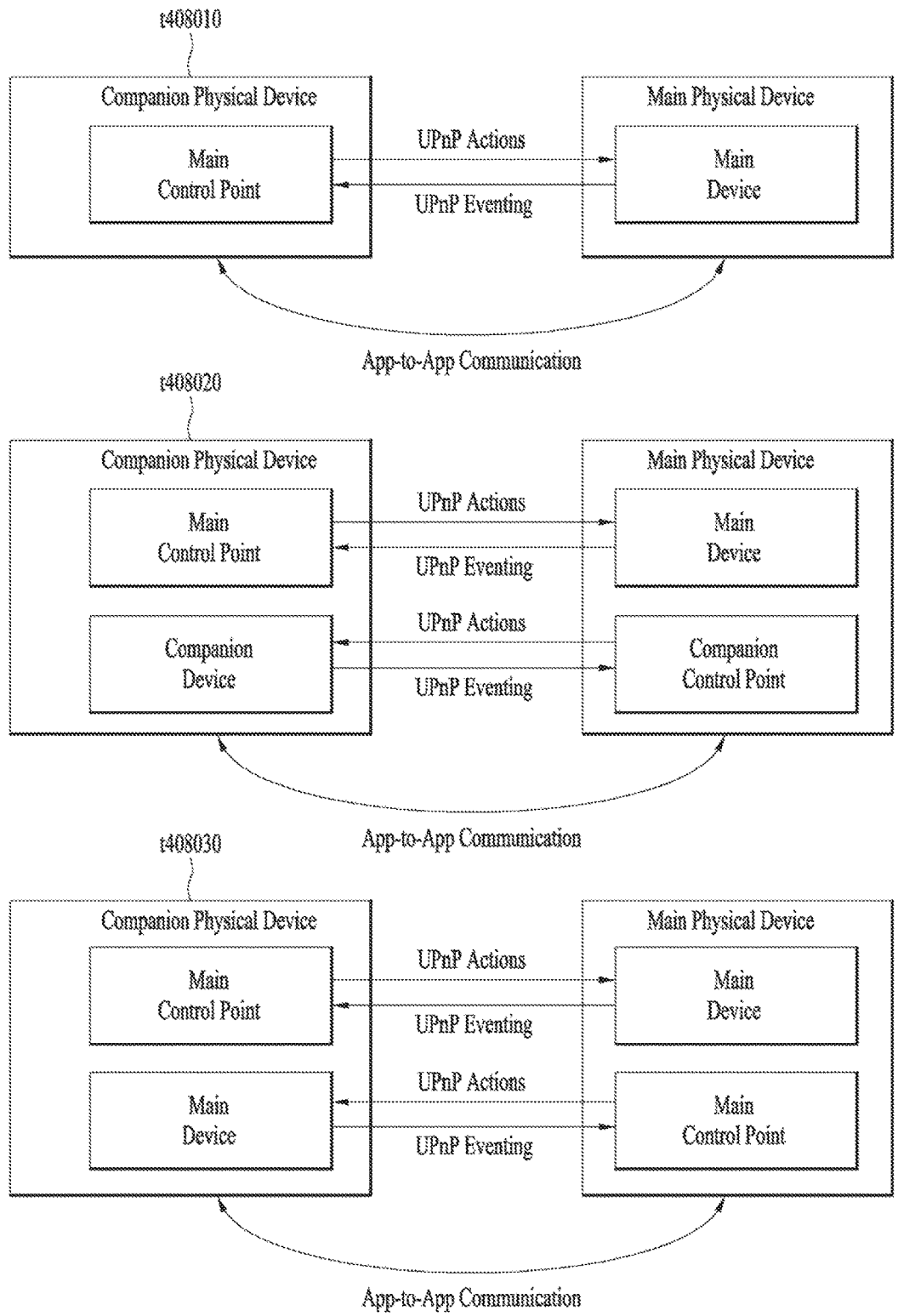

FIG. 88 illustrates interaction diagrams of a UPnP-based PD-CD architecture according to an embodiment of the present invention.

Figure 89:
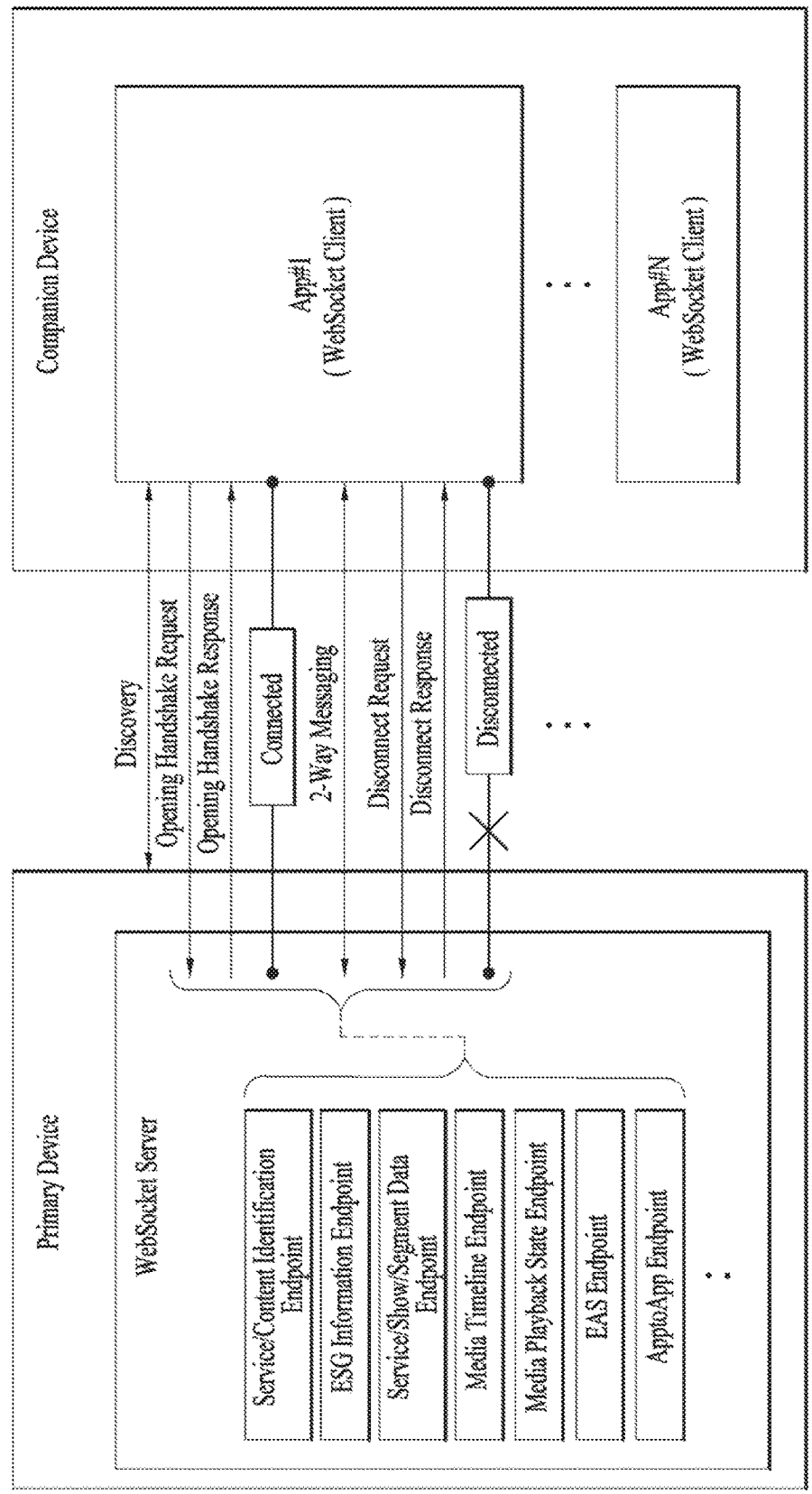

FIG. 89 is a diagram illustrating a WebSocket-based PD-CD architecture according to an embodiment of the present invention.

Figure 90:
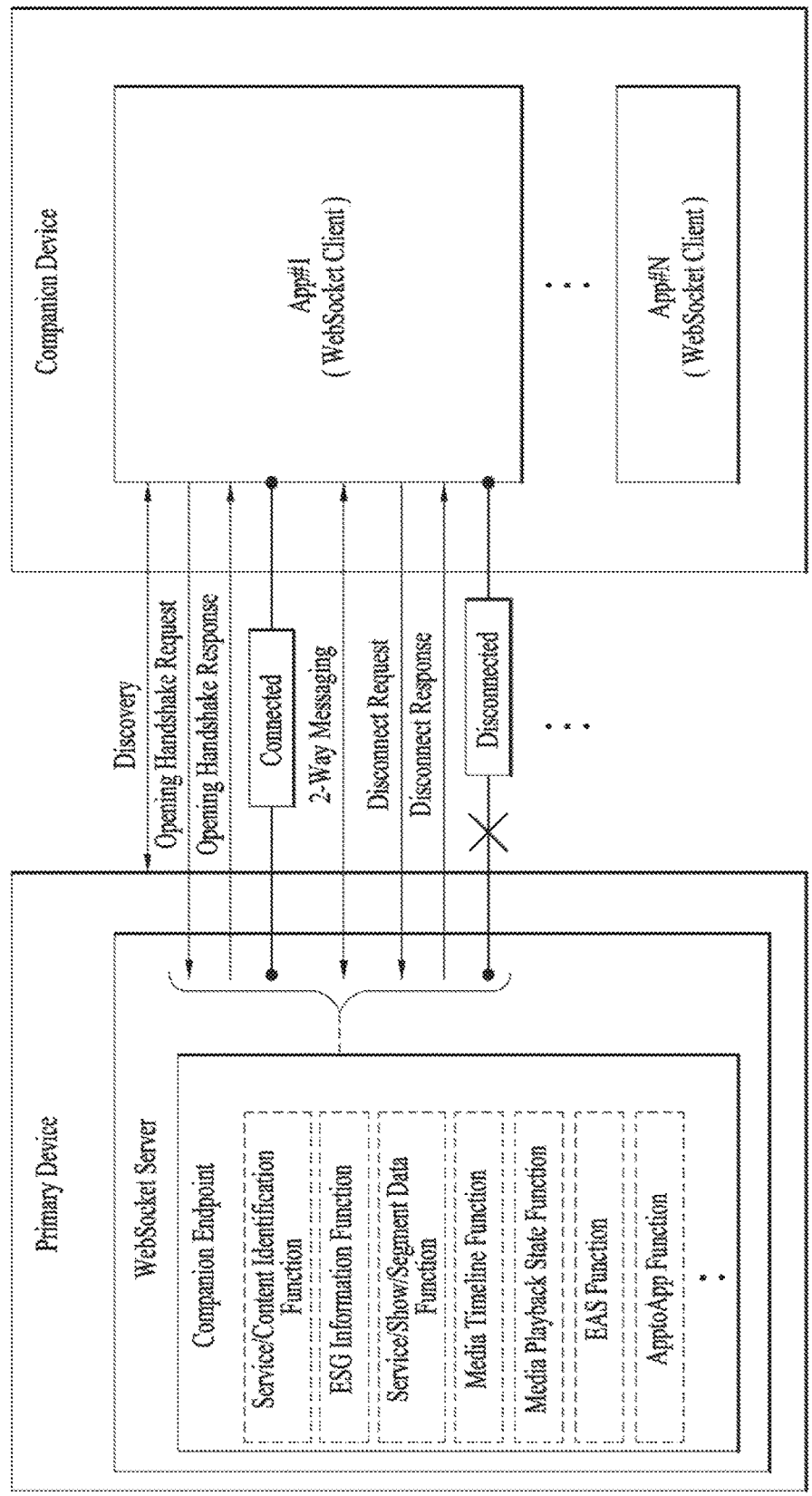

FIG. 90 is a diagram illustrating a WebSocket-based PD-CD architecture according to an embodiment of the present invention.

Figure 91:
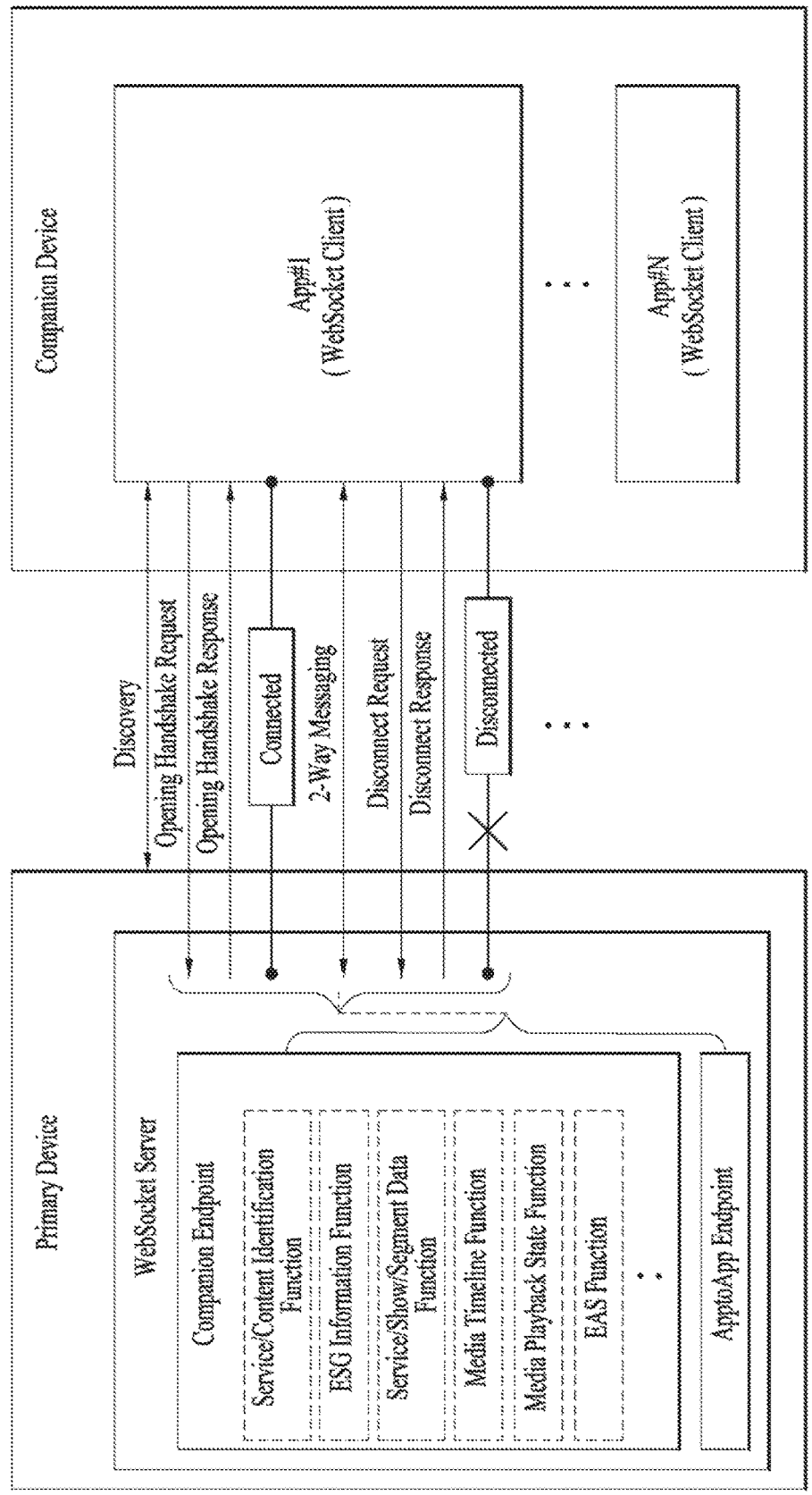

FIG. 91 is a diagram illustrating a WebSocket-based PD-CD architecture according to an embodiment of the present invention.

Figure 92:
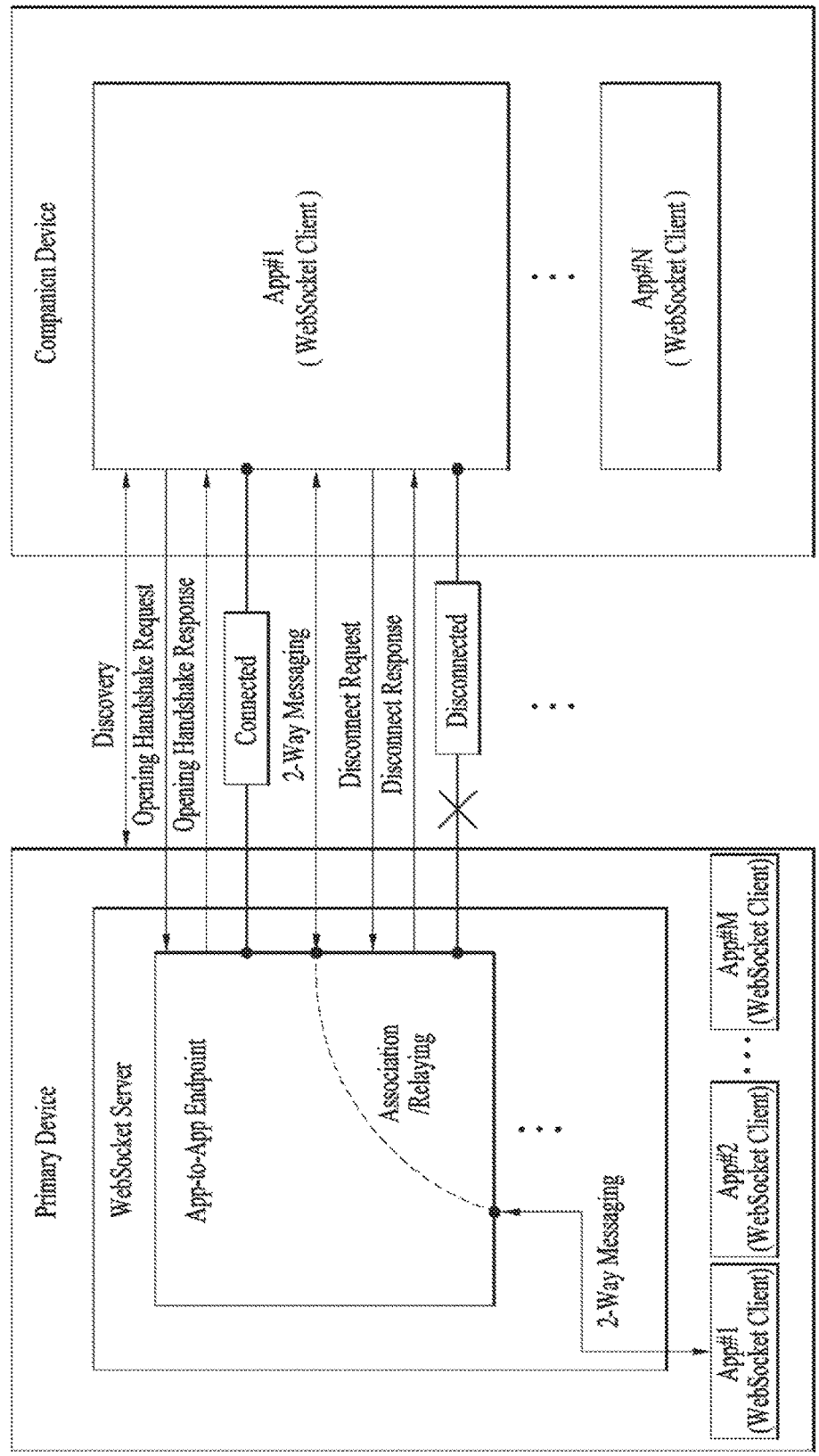

FIG. 92 is a diagram illustrating app-to-app communication in a WebSocket-based PD-CD architecture according to an embodiment of the present invention.

Figure 93:
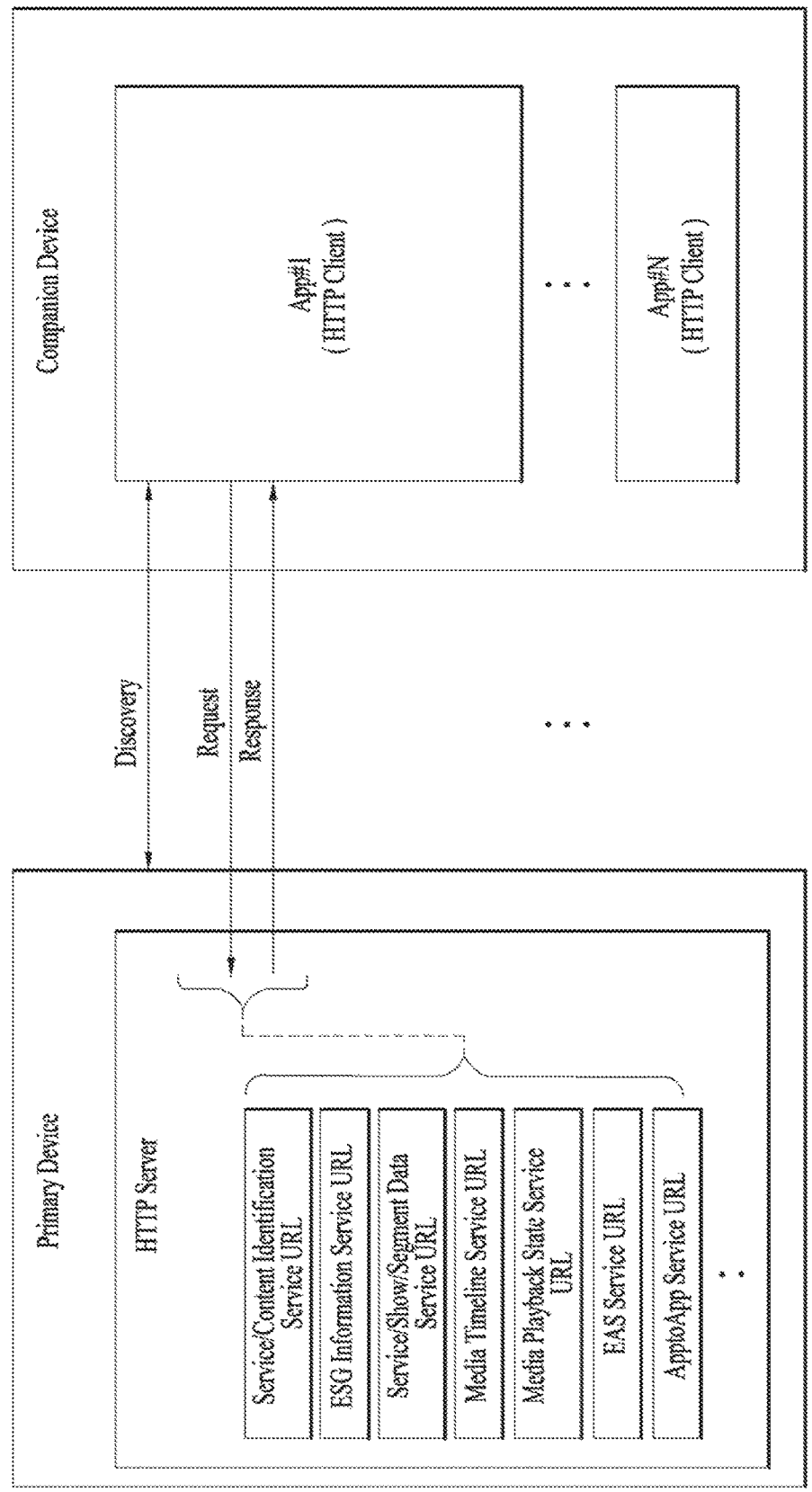

FIG. 93 is a diagram illustrating an HTTP-based PD-CD architecture according to an embodiment of the present invention.

Figure 94:
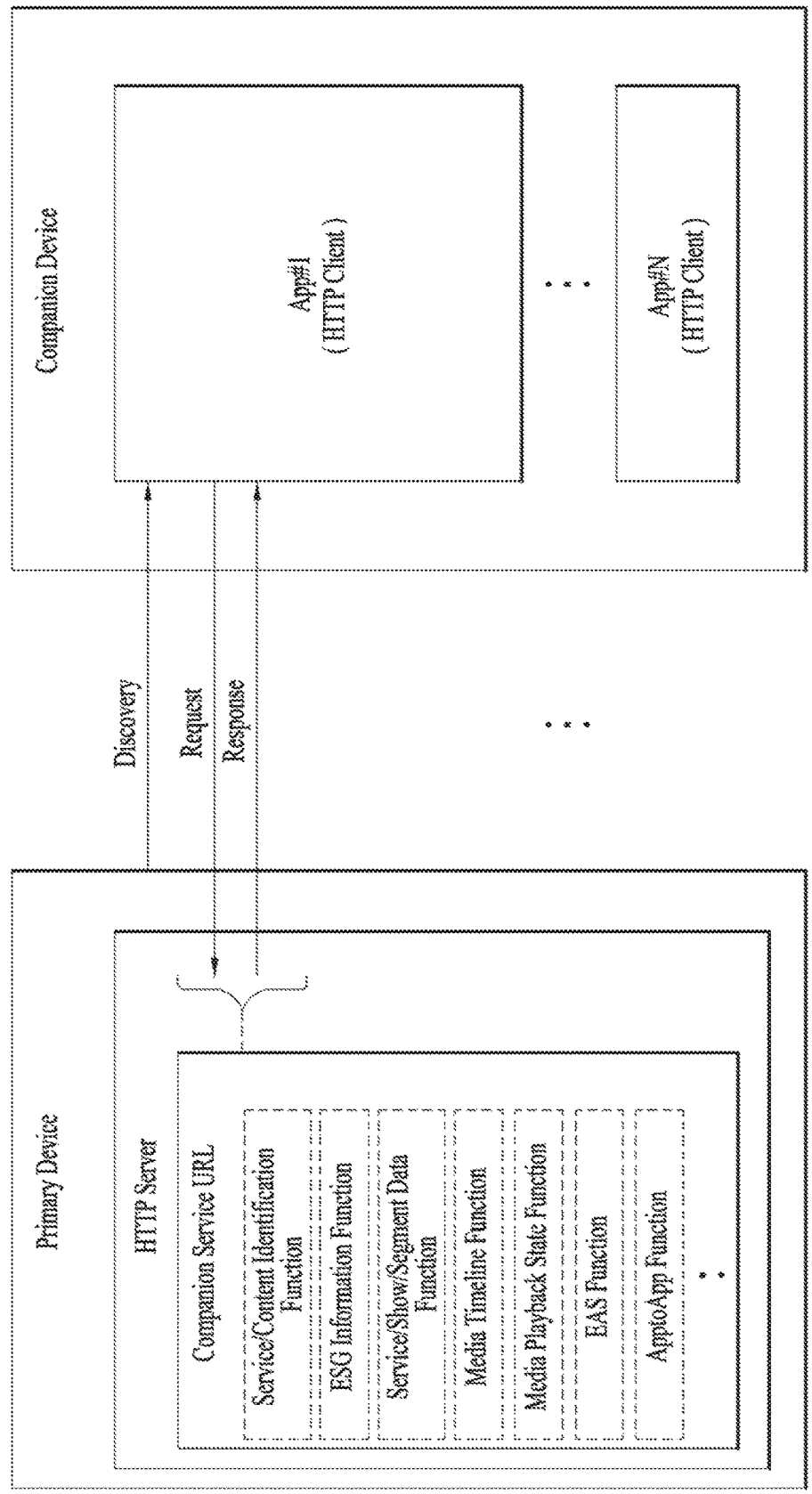

FIG. 94 is a diagram illustrating an HTTP-based PD-CD architecture according to another embodiment of present invention.

Figure 95:
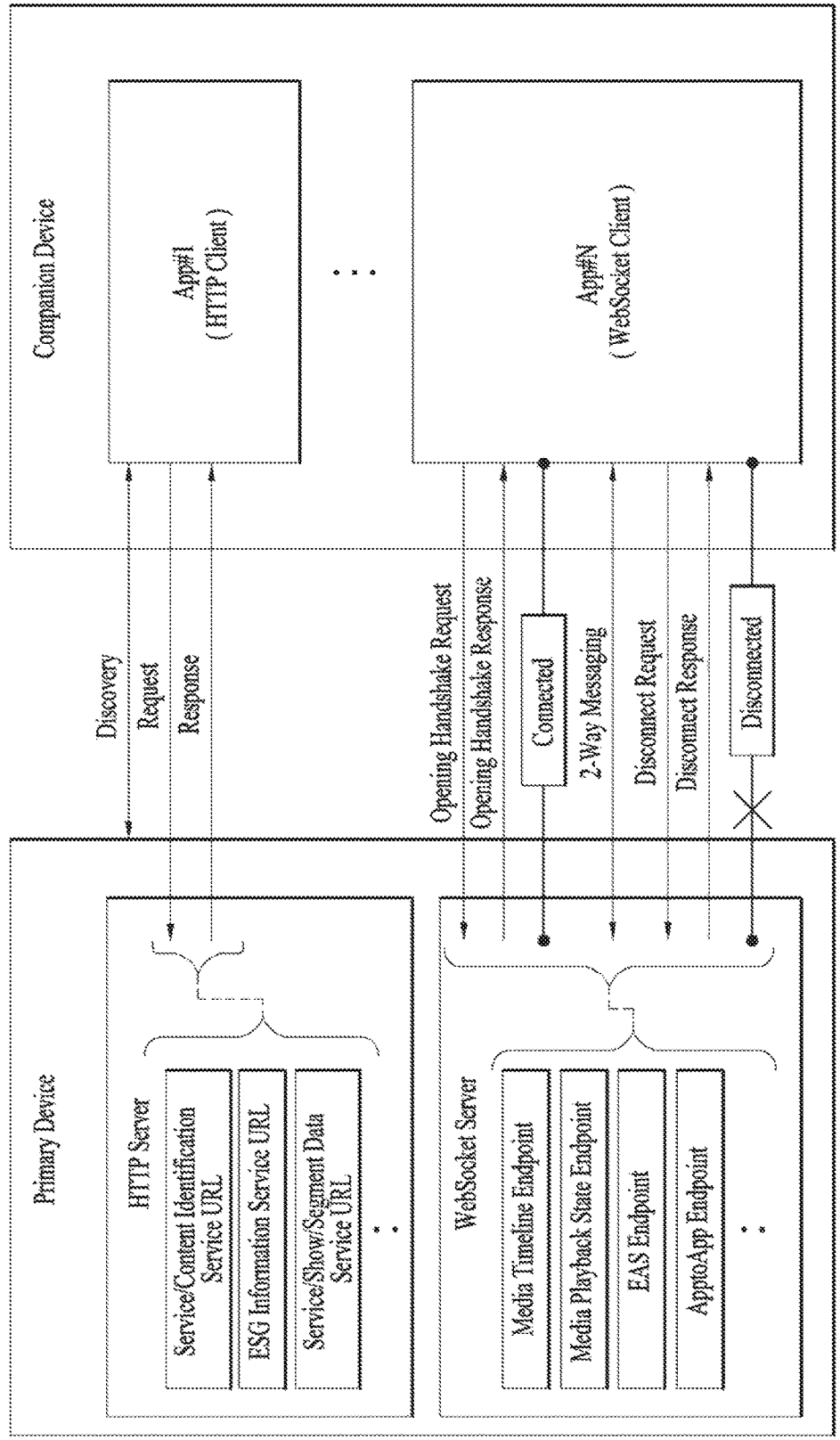

FIG. 95 is a diagram illustrating a WebSocket & HTTP-based PD-CD architecture according to an embodiment of the present invention.

FIG. 96 is a diagram illustrating formats of messages used for discovery of a Primary Device (PD).

Figure 97:
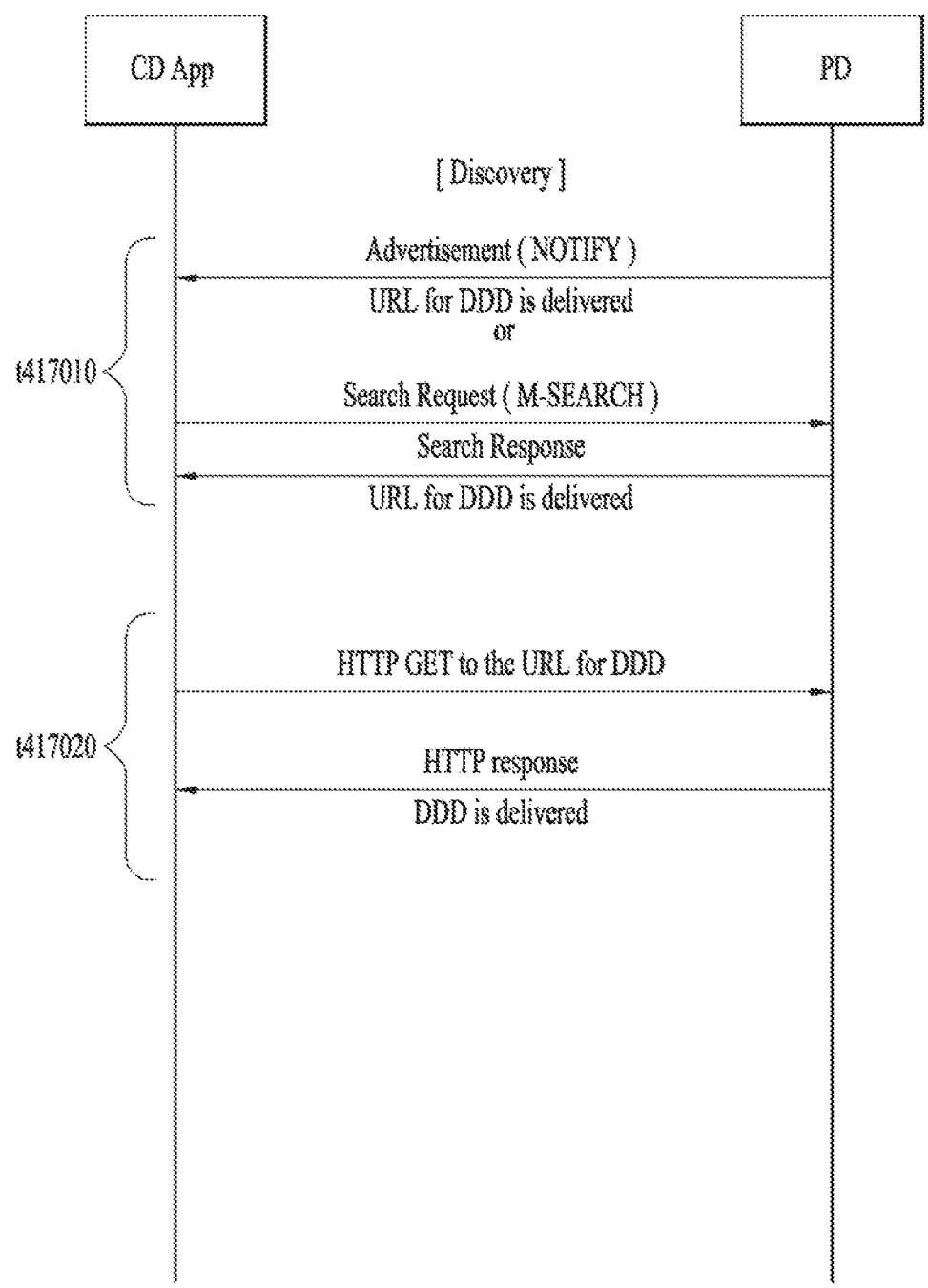

FIG. 97 is a diagram illustrating the discovery procedure of a WebSocket endpoint or an HTTP service URL using a Device Description Document (DDD).

FIG. 98 illustrates a DDD request message and a DDD format in the discovery procedure of a WebSocket endpoint or an HTTP service URL using the DDD according to an embodiment of the present invention.

FIG. 99 illustrates the format of a DDD in the discovery procedure for a WebSocket endpoint or an HTTP service URL using the DDD according to an embodiment of the present invention.

FIG. 100 illustrates the format of a DDD in the discovery procedure of a WebSocket endpoint or an HTTP service URL using the DDD according to another embodiment of the present invention.

Figure 101:
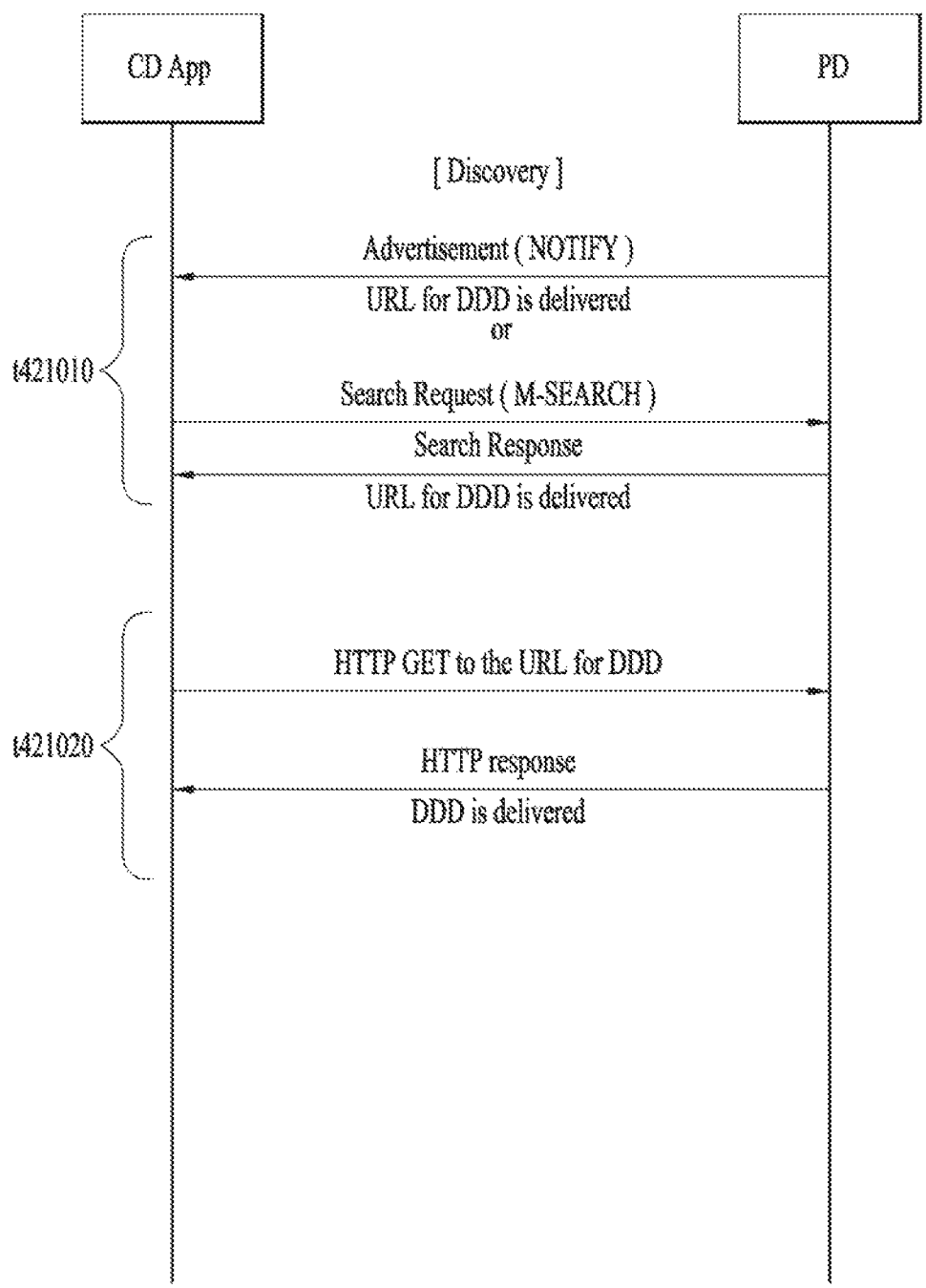

FIG. 101 illustrates a discovery procedure for a WebSocket endpoint or an HTTP service URL using a response header for a DDD request according to an embodiment of the present invention.

FIG. 102 illustrates the format of a response header in a discovery procedure of a WebSocket endpoint or an HTTP service URL using a response header for a DDD request according to another embodiment of the present invention.

Figure 103:
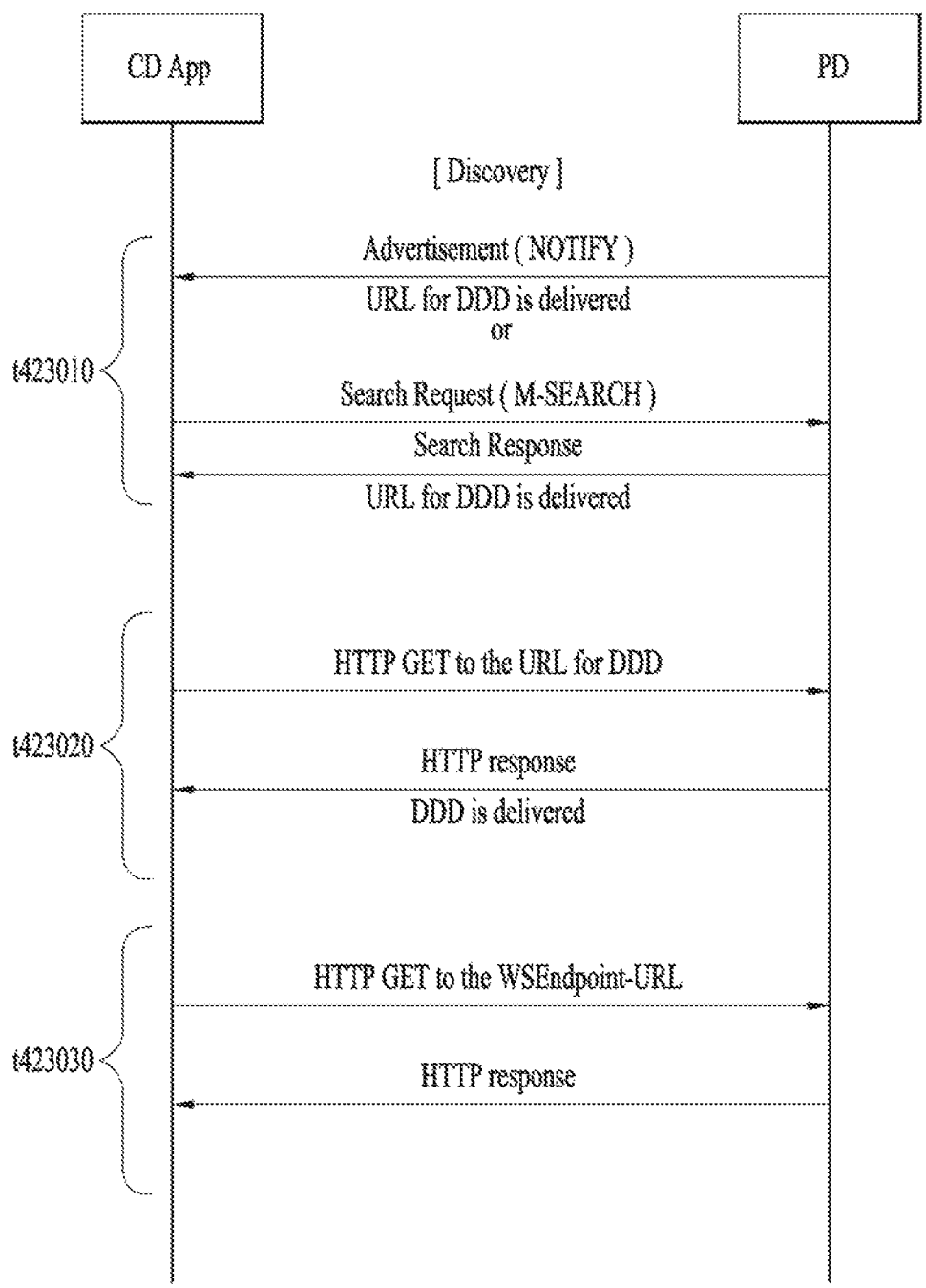

FIG. 103 illustrates a discovery procedure of a WebSocket endpoint or an HTTP service URL using a URL of a response header for a DDD request according to an embodiment of the present invention.

FIG. 104 is a diagram illustrating formats of a GET request and a response message according to the request in a discovery procedure for a WebSocket endpoint or an HTTP service URL using a URL of a response header for a DDD request according to an embodiment of the present invention.

FIG. 105 is a diagram illustrating the format of a response message for delivering address information in a discovery procedure for a WebSocket endpoint or an HTTP service URL using a URL of a response header for a DDD request according to another embodiment of the present invention.

Figure 106:
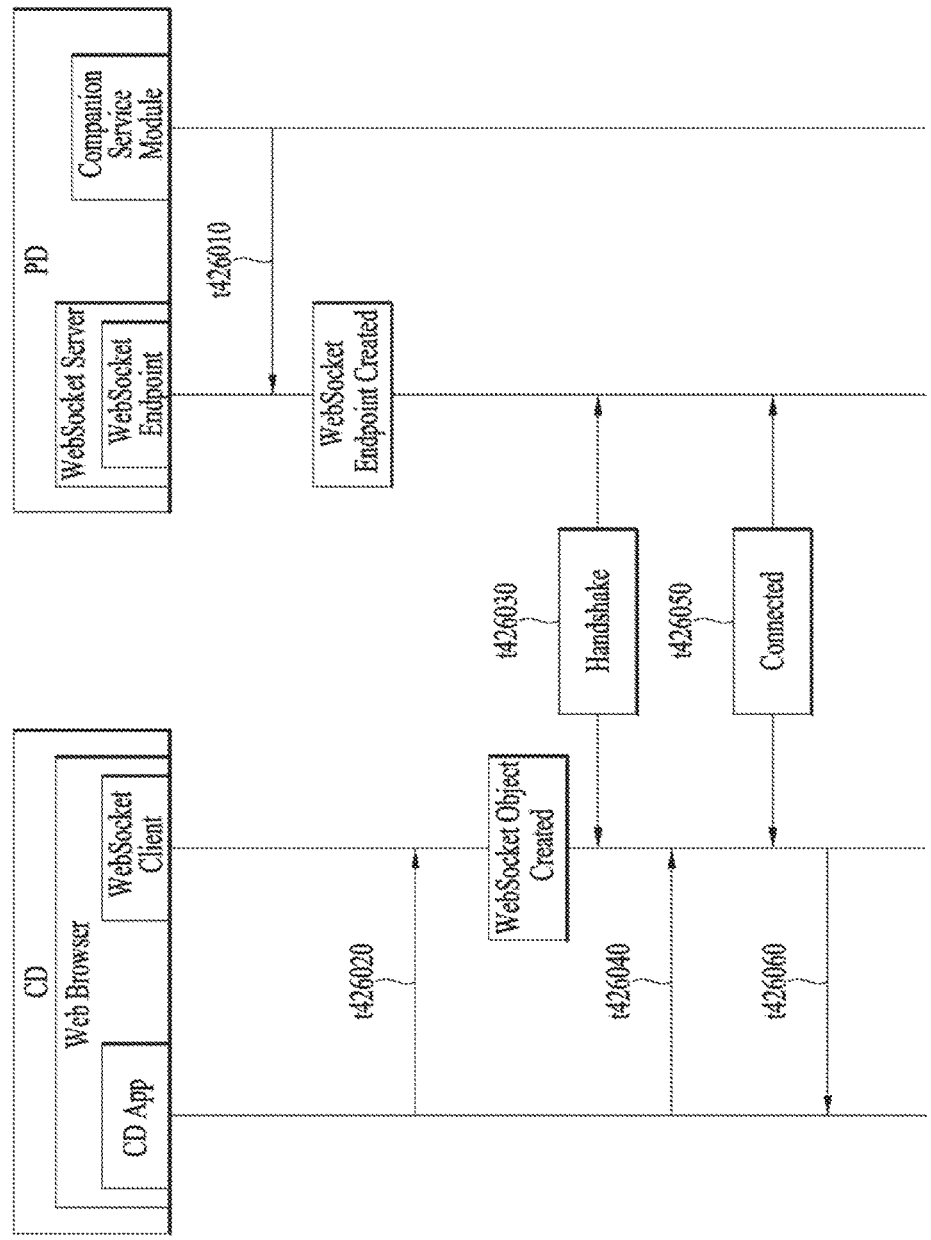

FIG. 106 is a diagram illustrating a WebSocket-based handshake & connection procedure according to an embodiment of the present invention (after discovery).

Figure 107:
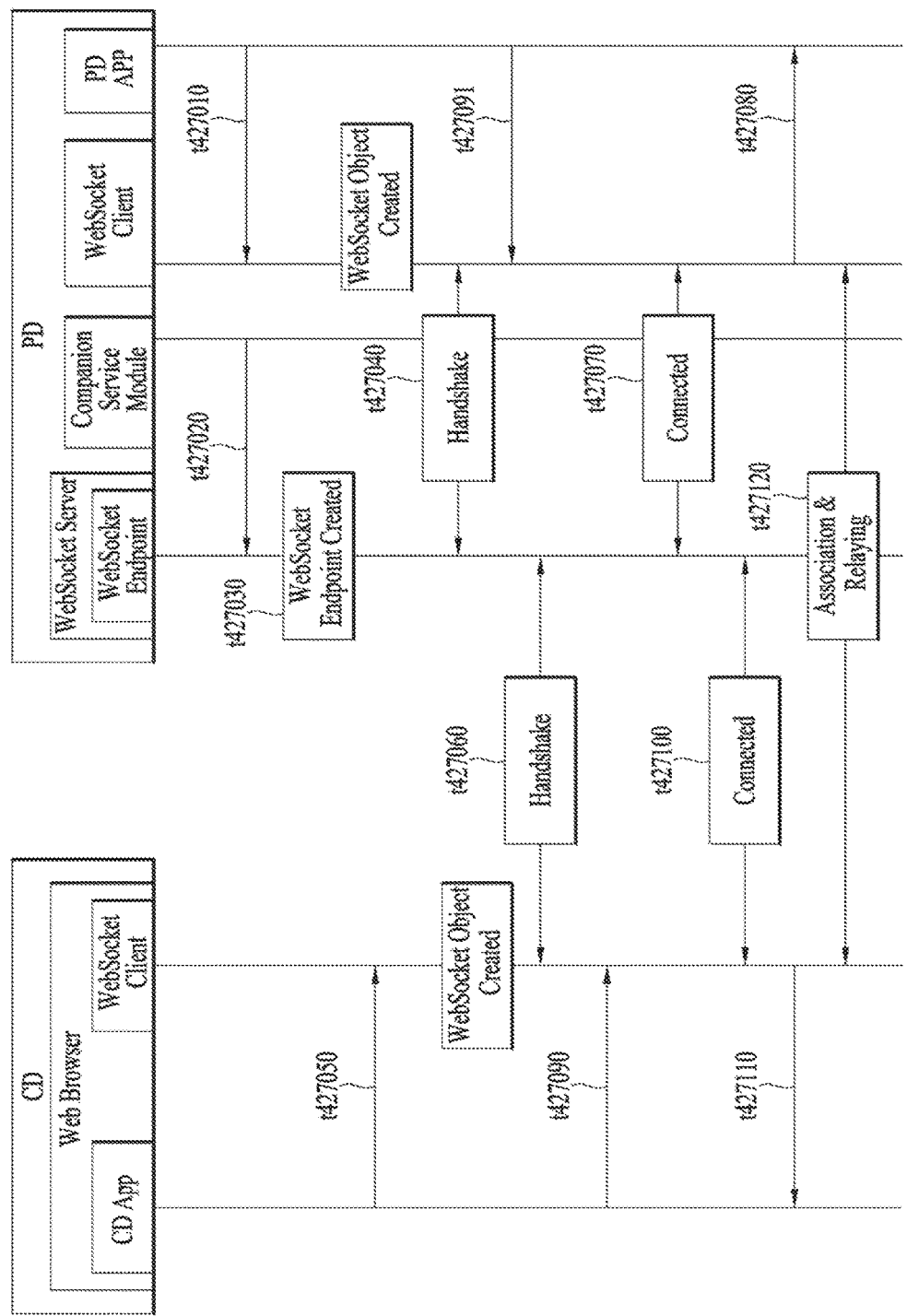

FIG. 107 is a diagram illustrating a handshake & connection procedure for WebSocket-based app-to-app communication according to an embodiment of the present invention (after discovery).

Figure 108:
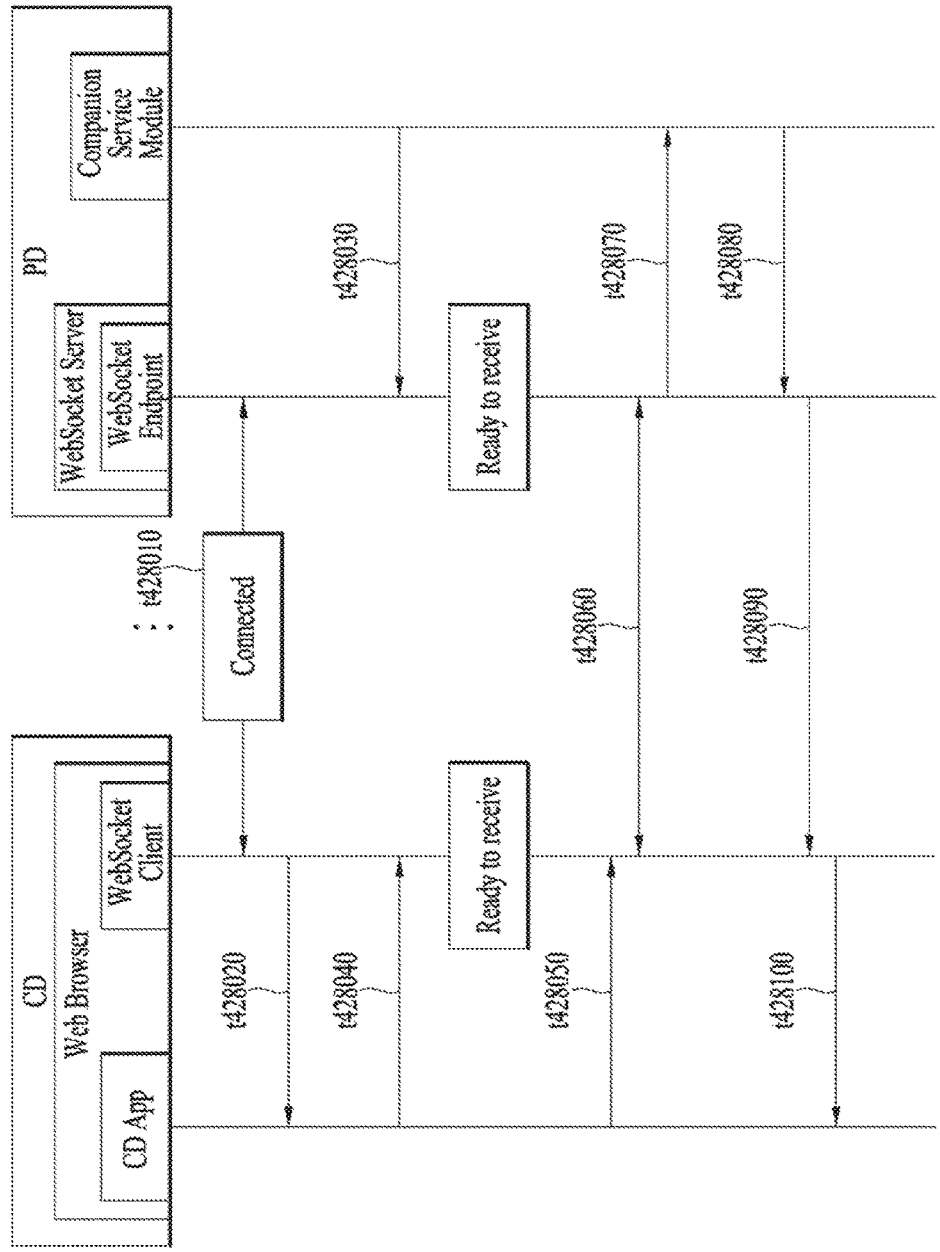

FIG. 108 is a diagram illustrating a WebSocket-based 2-way communication procedure according to an embodiment of the present invention (after connection).

Figure 109:
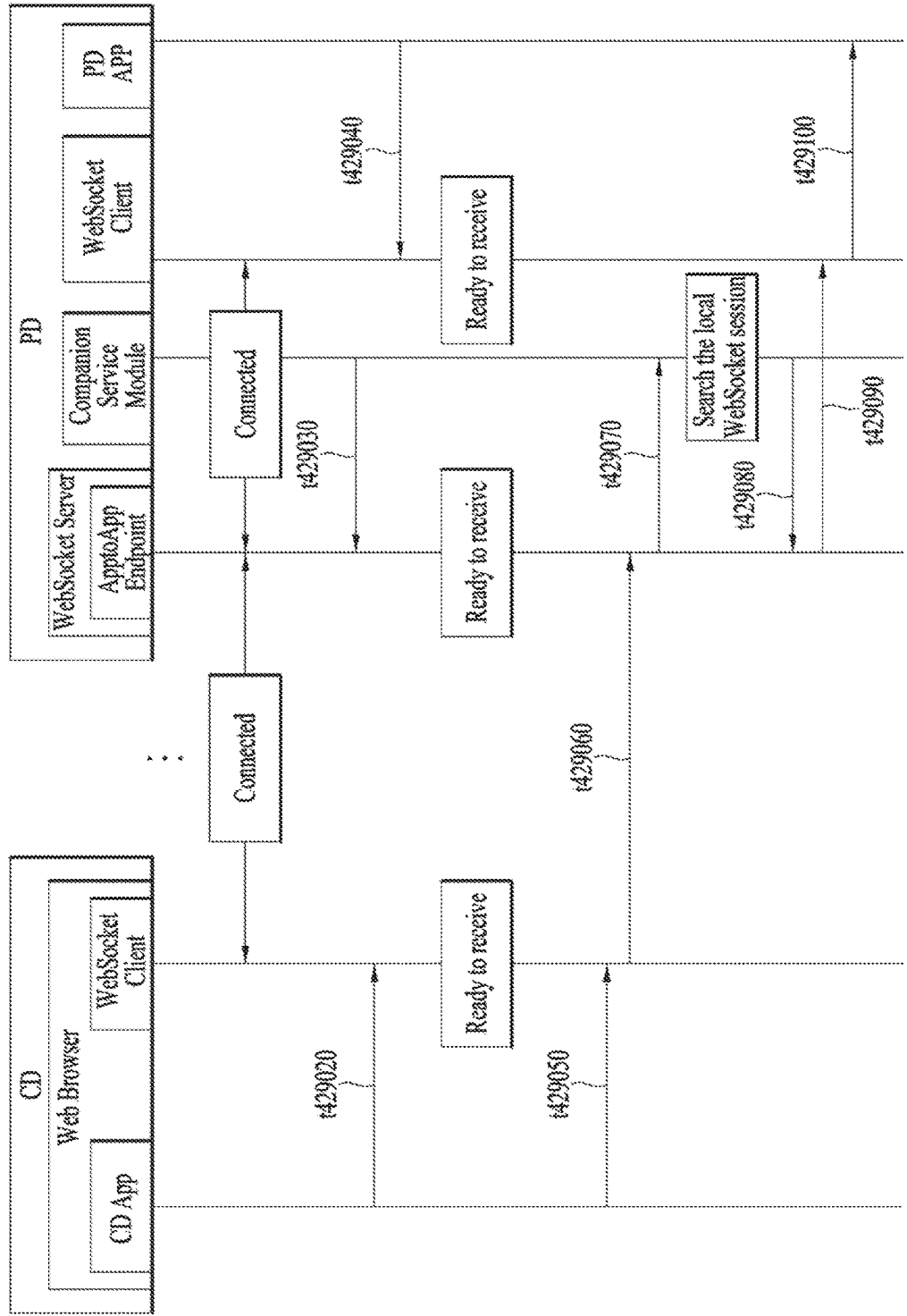

FIG. 109 is a diagram illustrating a WebSocket-based app to app 2-way communication procedure according to an embodiment of the present invention (after connection/CD to PD).

Figure 110:
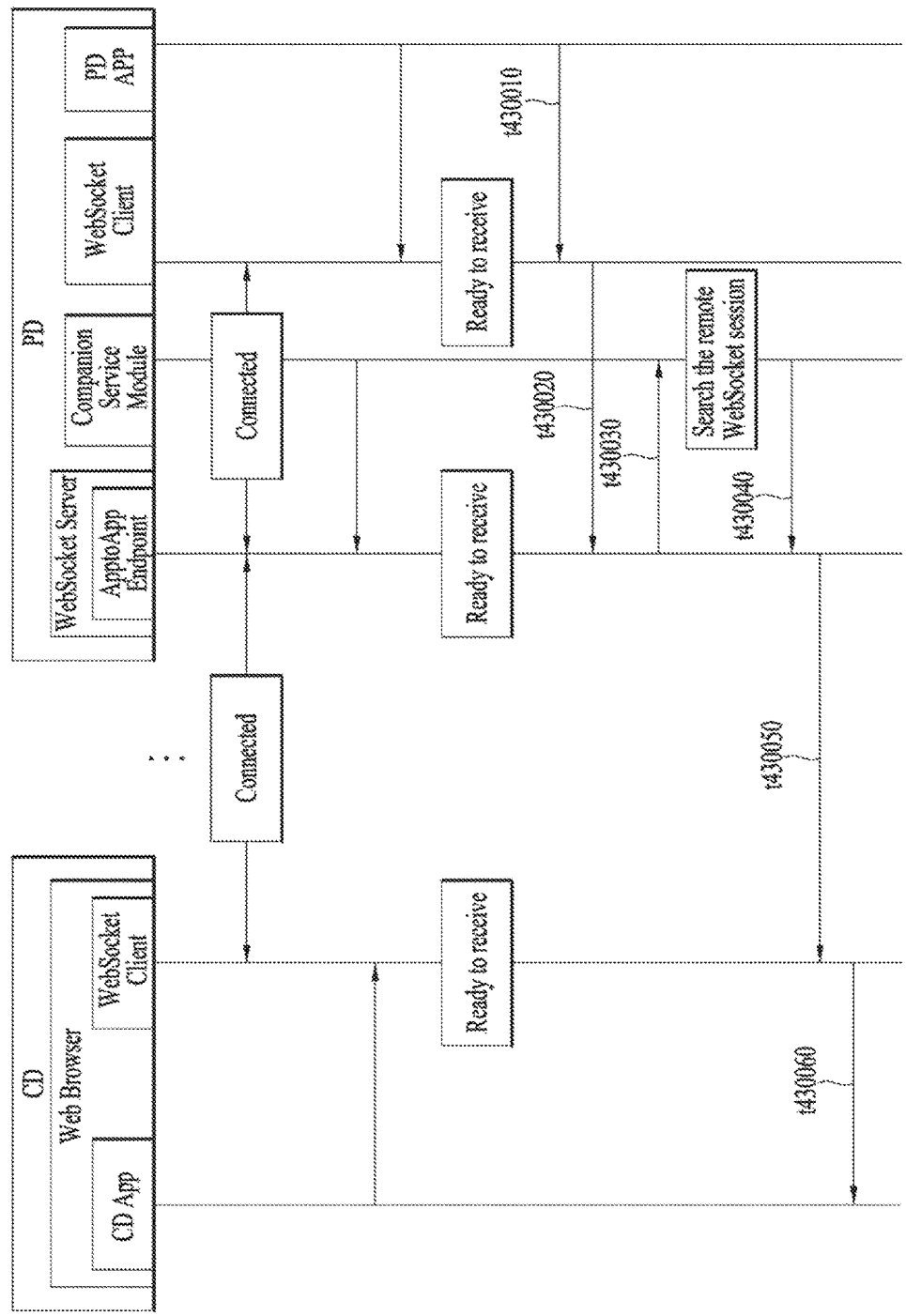

FIG. 110 is a diagram illustrating a WebSocket-based app to app 2-way communication procedure according to an embodiment of the present invention (after connection/PD to CD).

Figure 111:
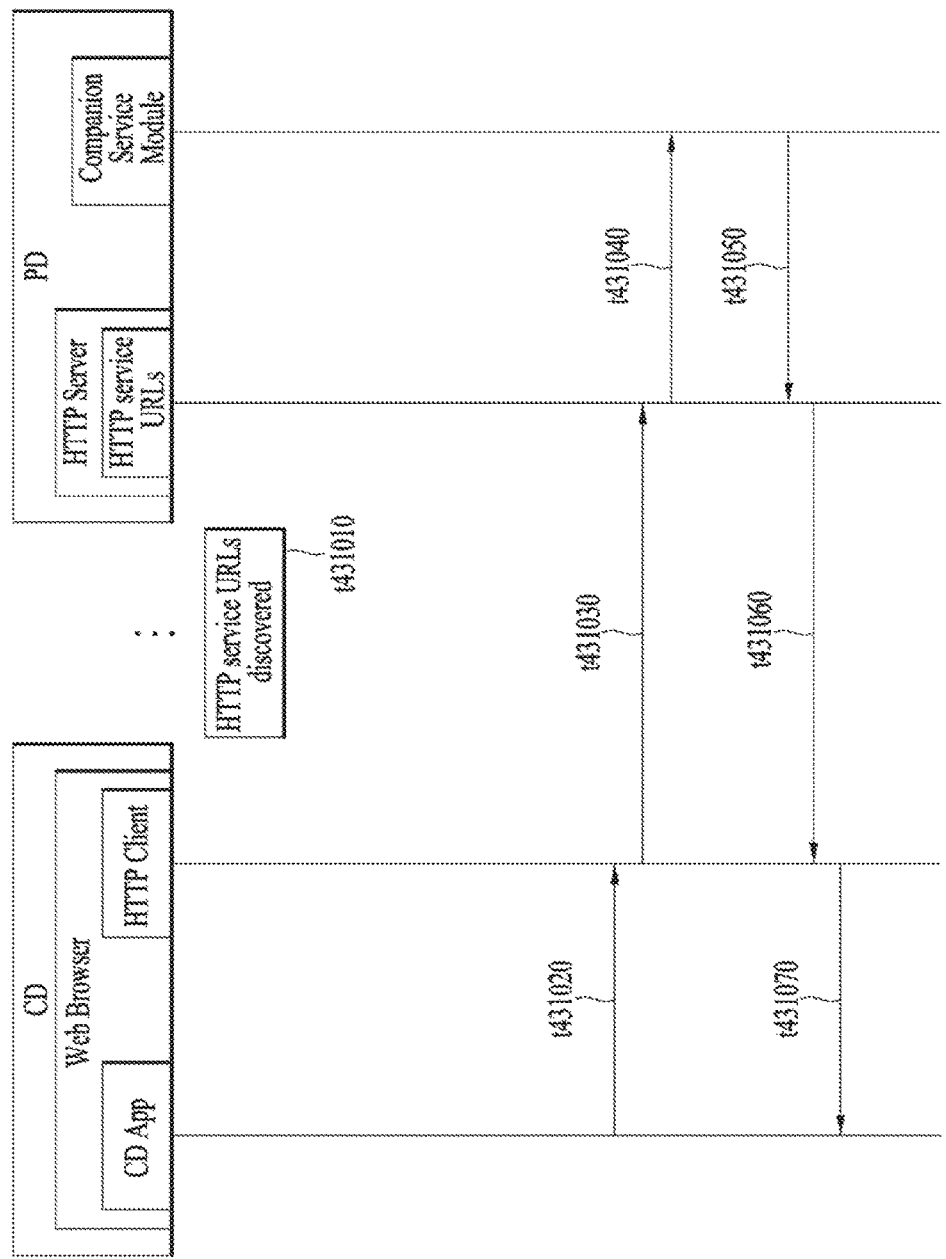

FIG. 111 is a diagram illustrating an HTTP-based Request-Response procedure according to an embodiment of the present invention (after discovery).

Figure 112:
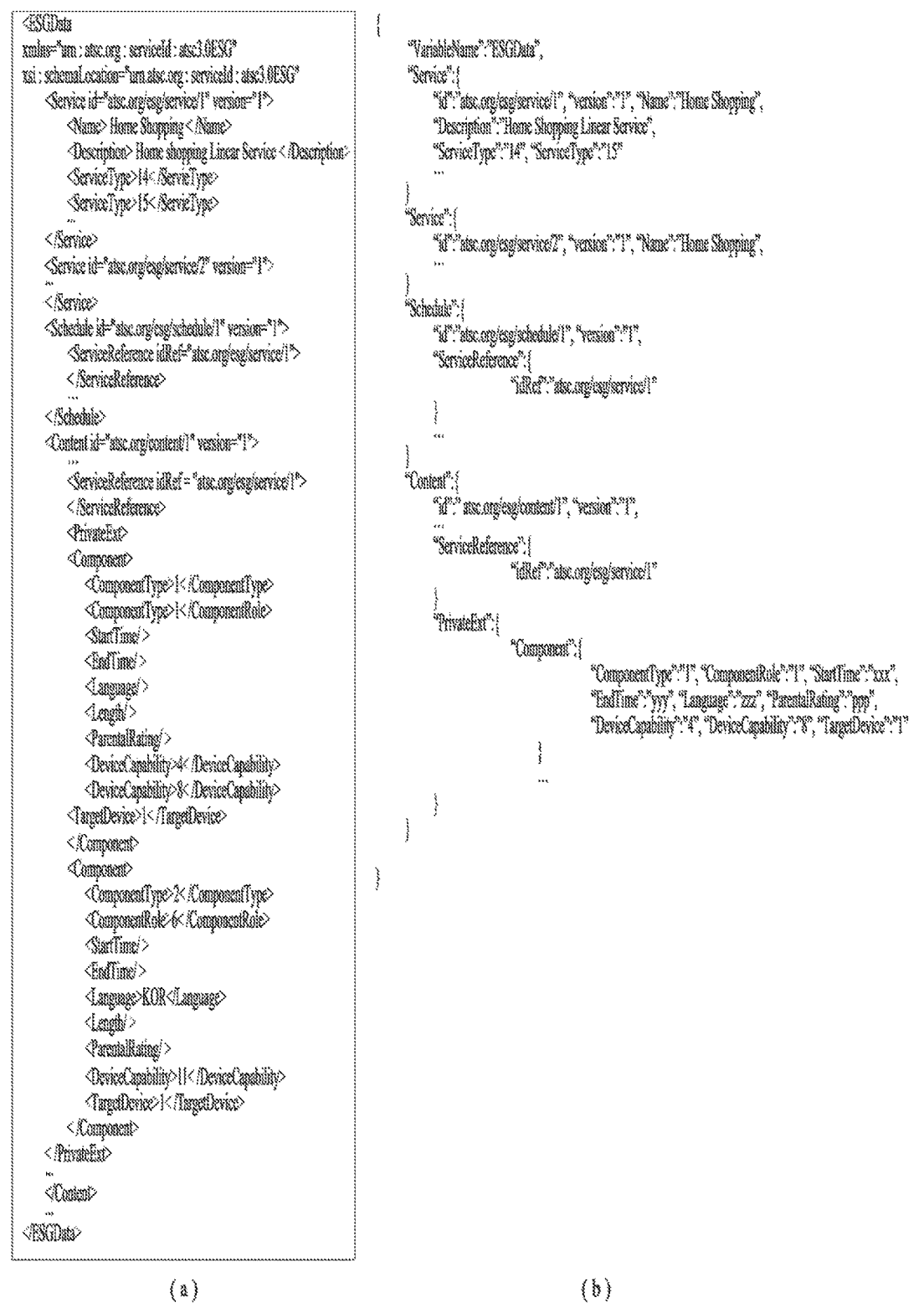

FIG. 112 illustrates conversion of an ESGData state variable in XML format into an ESGData state variable in JSON format according to another embodiment of the present invention.

Figure 113:
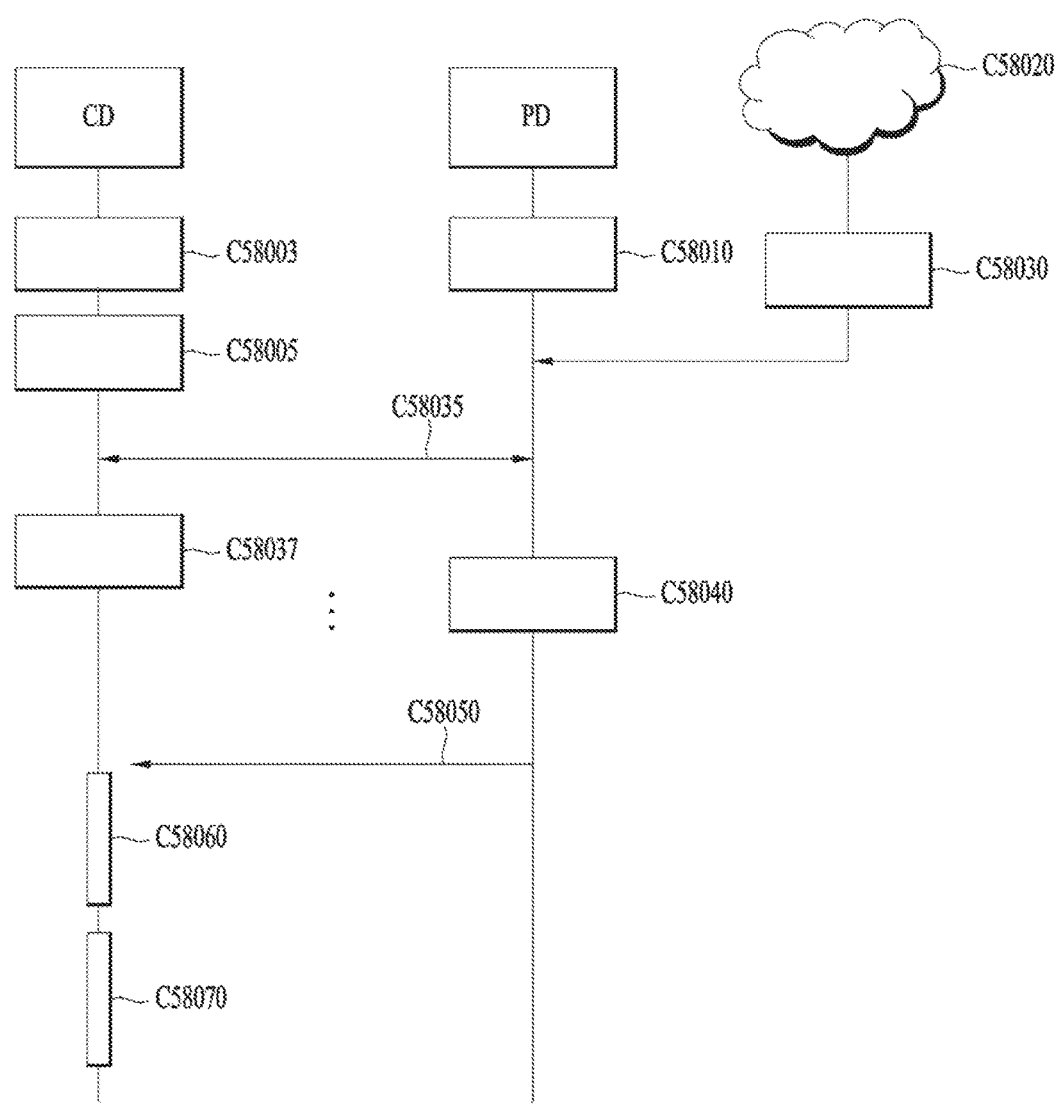

FIG. 113 is a diagram illustrating a procedure of delivering an ESGData state variable in JSON format to a companion device using the WebSocket protocol according to another embodiment of the present invention.

FIG. 114 is a diagram illustrating a format of a service/content identification message according to an embodiment of the present invention.

Figure 115:
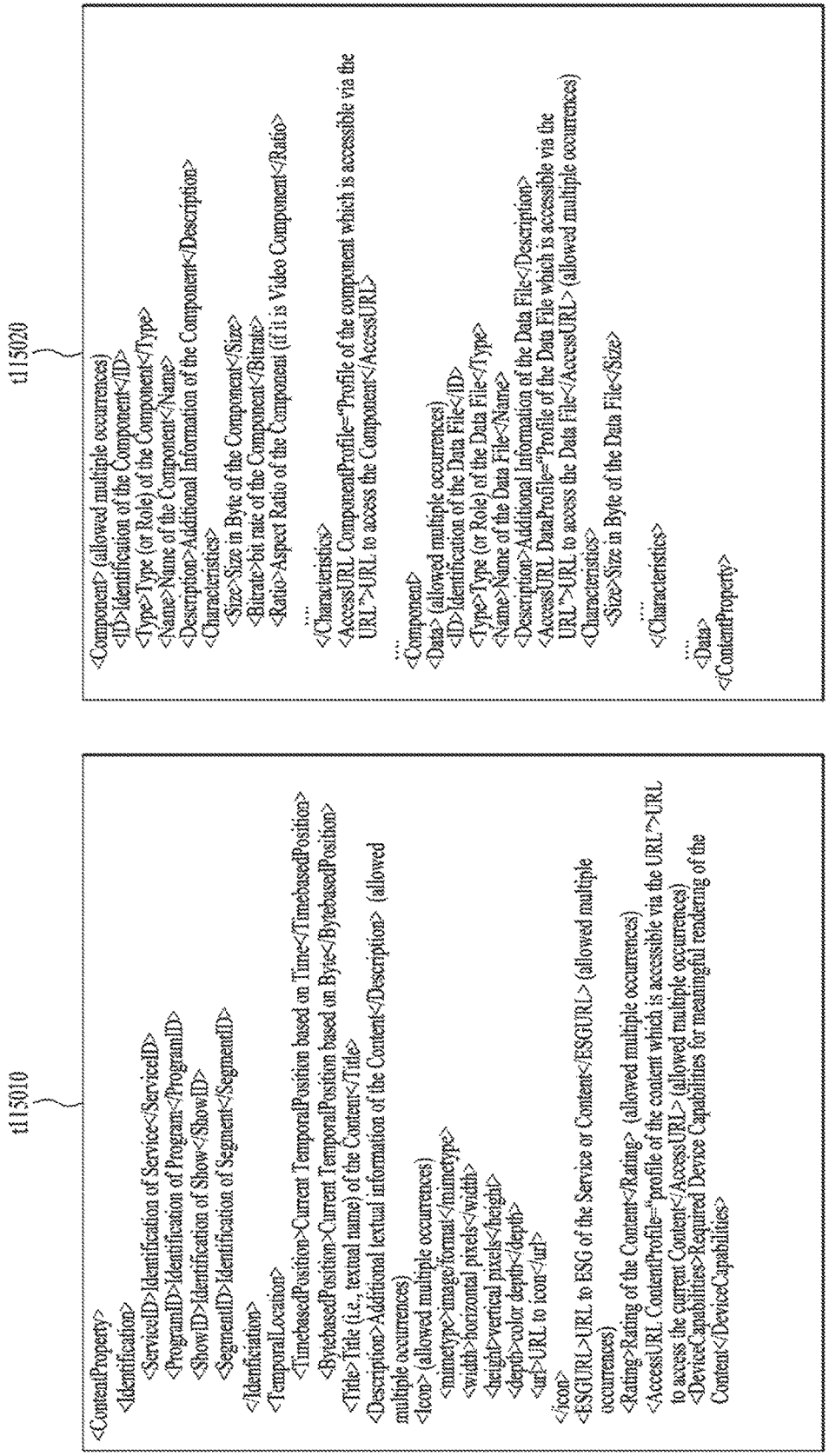

FIG. 115 is a diagram illustrating a service/content identification message of an XML format according to an embodiment of the present invention.

Figure 116:
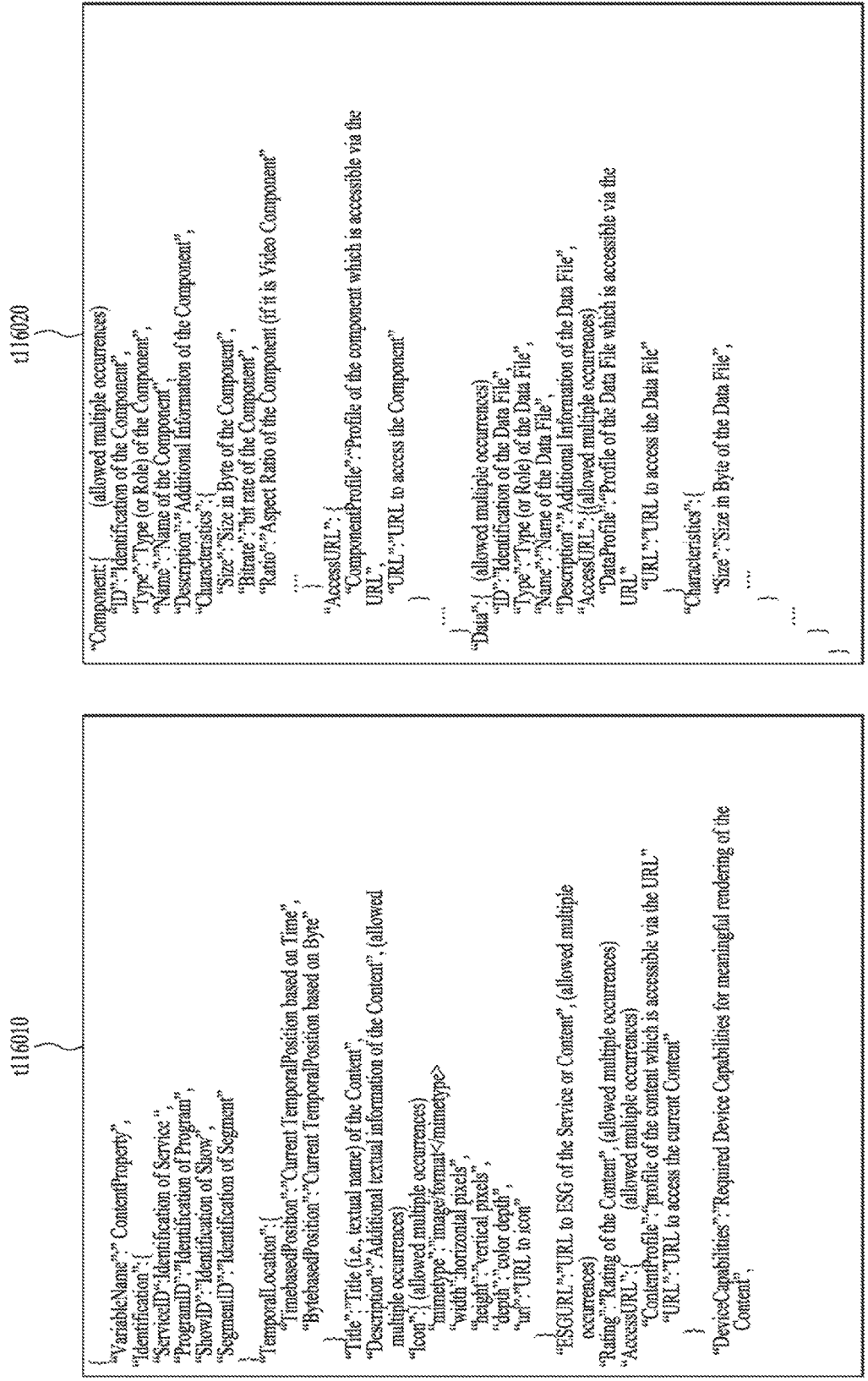

FIG. 116 is a diagram illustrating a service/content identification message of a JSON format according to an embodiment of the present invention.

Figure 117:
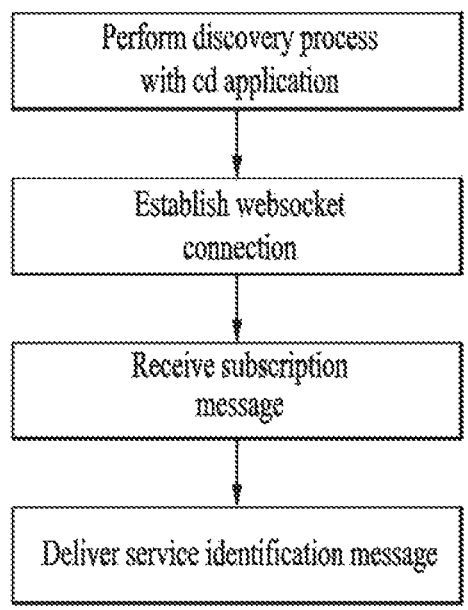

FIG. 117 is a diagram illustrating a method of providing a broadcast service in a PD according to an embodiment of the present invention.

Figure 118:
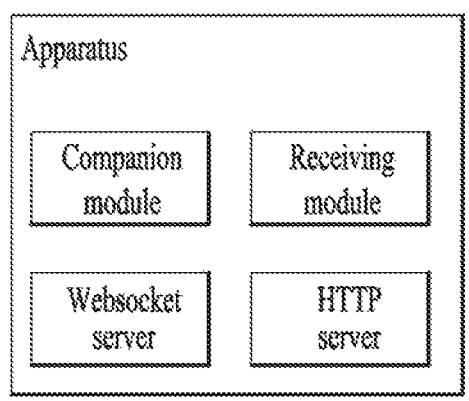

FIG. 118 is a diagram illustrating a broadcast receiver which operates as the PD according to an embodiment of the present invention.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that may be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-Multiple Input Multiple Output (MIMO) or MIMO according to one embodiment. A non-MIMO scheme according to an embodiment of the present invention may include a Multiple Input Single Output (MISO) scheme, a Single Input Single Output (SISO) scheme, etc.

Figure 1:
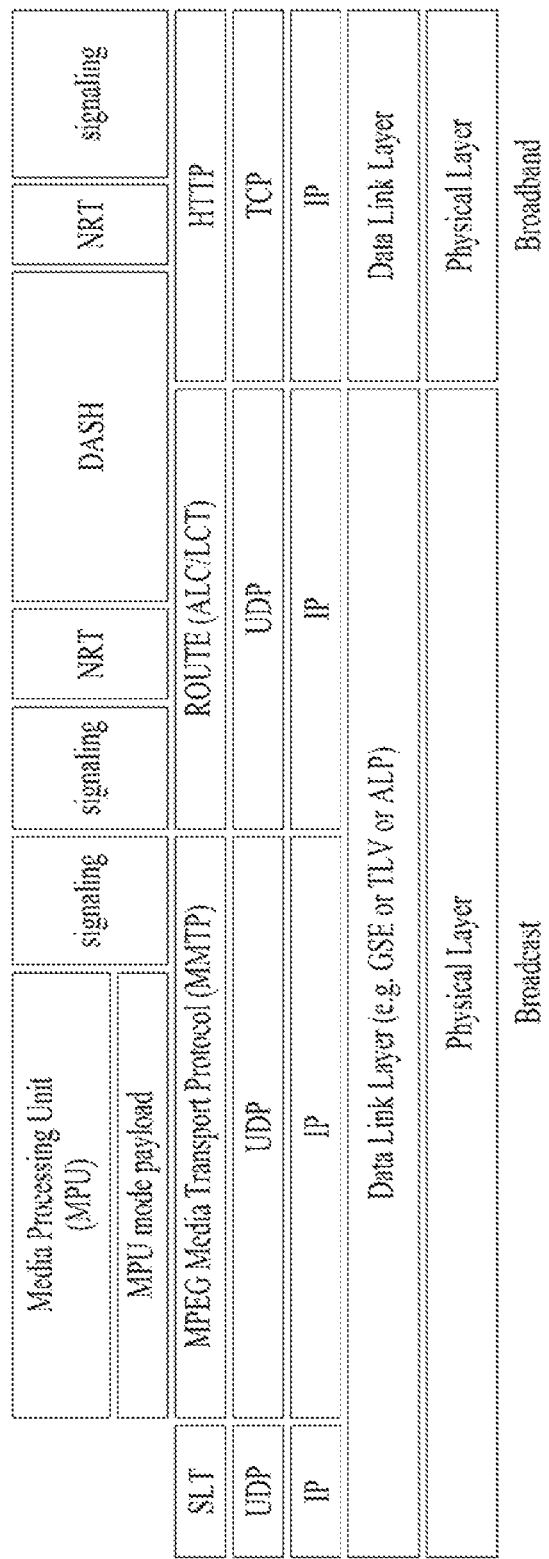
FIG. 1 illustrates a receiver protocol stack according to an embodiment of the present invention.

FIG. 1 illustrates a receiver protocol stack according to an embodiment of the present invention.

Two schemes may be used in broadcast service delivery through a broadcast network.

In a first scheme, media processing units (MPUs) are transmitted using an MMT protocol (MMTP) based on MPEG media transport (MMT). In a second scheme, dynamic adaptive streaming over HTTP (DASH) segments may be transmitted using real time object delivery over unidirectional transport (ROUTE) based on MPEG DASH.

Non-timed content including NRT media, EPG data, and other files is delivered with ROUTE. Signaling may be delivered over MMTP and/or ROUTE, while bootstrap signaling information is provided by the means of the Service List Table (SLT).

In hybrid service delivery, MPEG DASH over HTTP/TCP/IP is used on the broadband side. Media files in ISO Base Media File Format (BMFF) are used as the delivery, media encapsulation and synchronization format for both broadcast and broadband delivery. Here, hybrid service delivery may refer to a case in which one or more program elements are delivered through a broadband path.

Services are delivered using three functional layers. These are the Physical layer, the Delivery layer and the Service Management layer. The Physical layer provides the mechanism by which signaling, service announcement and IP packet streams are transported over the Broadcast Physical layer and/or Broadband Physical layer. The Delivery layer provides object and object flow transport functionality. It is enabled by the MMTP or the ROUTE protocol, operating on a UDP/IP multicast over the Broadcast Physical layer, and enabled by the HTTP protocol on a TCP/IP unicast over the Broadband Physical layer. The Service Management layer enables any type of service, such as linear TV or HTML5 application service, to be carried by the underlying Delivery and Physical layers.

In this figure, a protocol stack part on a broadcast side may be divided into a part transmitted through the SLT and the MMTP, and a part transmitted through ROUTE.

The SLT may be encapsulated through UDP and IP layers. Here, the SLT will be described below. The MMTP may transmit data formatted in an MPU format defined in MMT, and signaling information according to the MMTP. The data may be encapsulated through the UDP and IP layers. ROUTE may transmit data formatted in a DASH segment form, signaling information, and non-timed data such as NRT data, etc. The data may be encapsulated through the UDP and IP layers. According to a given embodiment, some or all processing according to the UDP and IP layers may be omitted. Here, the illustrated signaling information may be signaling information related to a service.

The part transmitted through the SLT and the MMTP and the part transmitted through ROUTE may be processed in the UDP and IP layers, and then encapsulated again in a data link layer. The link layer will be described below. Broadcast data processed in the link layer may be multicast as a broadcast signal through processes such as encoding/interleaving, etc. in the physical layer.

In this figure, a protocol stack part on a broadband side may be transmitted through HTTP as described above. Data formatted in a DASH segment form, signaling information, NRT information, etc. may be transmitted through HTTP. Here, the illustrated signaling information may be signaling information related to a service. The data may be processed through the TCP layer and the IP layer, and then encapsulated into the link layer. According to a given embodiment, some or all of the TCP, the IP, and the link layer may be omitted. Broadband data processed thereafter may be transmitted by unicast in the broadband through a process for transmission in the physical layer.

Service can be a collection of media components presented to the user in aggregate; components can be of multiple media types; a Service can be either continuous or intermittent; a Service can be Real Time or Non-Real Time; Real Time Service can consist of a sequence of TV programs.

FIG. 2 illustrates a relation between the SLT and SLS according to an embodiment of the present invention.

Service Signaling provides service discovery and description information, and comprises two functional components: Bootstrap signaling via the Service List Table (SLT) and the Service Layer Signaling (SLS). These represent the information which is necessary to discover and acquire user services. The SLT enables the receiver to build a basic service list, and bootstrap the discovery of the SLS for each service.

The SLT can enable very rapid acquisition of basic service information. The SLS enables the receiver to discover and access services and their content components. Details of the SLT and SLS will be described below.

As described in the foregoing, the SLT may be transmitted through UDP/IP. In this instance, according to a given embodiment, data corresponding to the SLT may be delivered through the most robust scheme in this transmission.

The SLT may have access information for accessing SLS delivered by the ROUTE protocol. In other words, the SLT may be bootstrapped into SLS according to the ROUTE protocol. The SLS is signaling information positioned in an upper layer of ROUTE in the above-described protocol stack, and may be delivered through ROUTE/UDP/IP. The SLS may be transmitted through one of LCT sessions included in a ROUTE session. It is possible to access a service component corresponding to a desired service using the SLS.

In addition, the SLT may have access information for accessing an MMT signaling component delivered by MMTP. In other words, the SLT may be bootstrapped into SLS according to the MMTP. The SLS may be delivered by an MMTP signaling message defined in MMT. It is possible to access a streaming service component (MPU) corresponding to a desired service using the SLS. As described in the foregoing, in the present invention, an NRT service component is delivered through the ROUTE protocol, and the SLS according to the MMTP may include information for accessing the ROUTE protocol. In broadband delivery, the SLS is carried over HTTP(S)/TCP/IP.

FIG. 3 illustrates an SLT according to an embodiment of the present invention.

First, a description will be given of a relation among respective logical entities of service management, delivery, and a physical layer.

Services may be signaled as being one of two basic types. First type is a linear audio/video or audio-only service that may have an app-based enhancement. Second type is a service whose presentation and composition is controlled by a downloaded application that is executed upon acquisition of the service. The latter can be called an "app-based" service.

The rules regarding presence of ROUTE/LCT sessions and/or MMTP sessions for carrying the content components of a service may be as follows.

For a broadcast delivery of a Linear service without app-based enhancement, the service's content components can be carried by either (but not both): (1) One or more ROUTE/LCT sessions, or (2) One or more MMTP sessions.

For broadcast delivery of a Linear service with app-based enhancement, the service's content components can be carried by: (1) One or more ROUTE/LCT sessions, and (2) Zero or more MMTP sessions.

In certain embodiments, use of both MMTP and ROUTE for streaming media components in the same service may not be allowed.

For broadcast delivery of an App-based service, the service's content components can be carried by one or more ROUTE/LCT sessions.

Each ROUTE session comprises one or more LCT sessions which carry as a whole, or in part, the content components that make up the service. In streaming services delivery, an LCT session may carry an individual component of a user service such as an audio, video or closed caption stream. Streaming media is formatted as DASH Segments.

Each MMTP session comprises one or more MMTP packet flows which carry MMT signaling messages or as a whole, or in part, the content component. An MMTP packet flow may carry MMT signaling messages or components formatted as MPUs.

For the delivery of NRT User Services or system metadata, an LCT session carries file-based content items. These content files may consist of continuous (time-based) or discrete (non-time-based) media components of an NRT service, or metadata such as Service Signaling or ESG fragments. Delivery of system metadata such as Service Signaling or ESG fragments may also be achieved through the Signaling Message mode of MMTP.

A Broadcast Stream is the abstraction for an RF Channel, which is defined in terms of a carrier frequency centered within a specified bandwidth. It is identified by the pair [geographic area, frequency]. A Physical Layer Pipe (PLP) corresponds to a portion of the RF channel. Each PLP has certain modulation and coding parameters. It is identified by a PLP identifier (PLPID), which is unique within the Broadcast Stream it belongs to. Here, PLP can be referred to as DP (Data Pipe).

Each service is identified by two forms of service identifier: a compact form that is used in the SLT and is unique only within the broadcast area, and a globally unique form that is used in the SLS and the ESG. A ROUTE Session is identified by a source IP Address, destination IP Address and destination port number. An LCT session (associated with the service component(s) it carries) is identified by a Transport Session Identifier (TSI) which is unique within the scope of the parent ROUTE session. Properties common to the LCT sessions, and certain properties unique to individual LCT sessions, are given in a ROUTE signaling structure called a Service-based Transport Session Instance Description (S-TSID), which is part of the Service Layer Signaling. Each LCT session is carried over a single Physical Layer Pipe. According to a given embodiment, one LCT session may be transmitted through a plurality of PLPs. Different LCT sessions of a ROUTE session may or may not be contained in different Physical Layer Pipes. Here, the ROUTE session may be delivered through a plurality of PLPs. The properties described in the S-TSID include the TSI value and PLPID for each LCT session, descriptors for the delivery objects/files, and Application Layer FEC parameters.

A MMTP Session is identified by destination IP Address and destination port number. An MMTP packet flow (associated with the service component(s) it carries) is identified by a packet_id which is unique within the scope of the parent MMTP session. Properties common to each MMTP packet flow, and certain properties of MMTP packet flows, are given in the SLT. Properties for each MMTP session are given by MMT signaling messages, which may be carried within the MMTP session. Different MMTP packet flows of a MMTP session may or may not be contained in different Physical Layer Pipes. Here, the MMTP session may be delivered through a plurality of PLPs. The properties described in the MMT signaling messages include the packet_id value and PLPID for each MMTP packet flow. Here, the MMT signaling messages may have a form defined in MMT, or have a deformed form according to embodiments to be described below.

Hereinafter, a description will be given of low level signaling (LLS).

Signaling information which is carried in the payload of IP packets with a well-known address/port dedicated to this function is referred to as Low Level Signaling (LLS). The IP address and the port number may be differently configured depending on embodiments. In one embodiment, LLS can be transported in IP packets with address 224.0.23.60 and destination port 4937/udp. LLS may be positioned in a portion expressed by "SLT" on the above-described protocol stack. However, according to a given embodiment, the LLS may be transmitted through a separate physical channel (dedicated channel) in a signal frame without being subjected to processing of the UDP/IP layer.

UDP/IP packets that deliver LLS data may be formatted in a form referred to as an LLS table. A first byte of each UDP/IP packet that delivers the LLS data may correspond to a start of the LLS table. The maximum length of any LLS table is limited by the largest IP packet that can be delivered from the PHY layer, 65,507 bytes.

The LLS table may include an LLS table ID field that identifies a type of the LLS table, and an LLS table version field that identifies a version of the LLS table. According to a value indicated by the LLS table ID field, the LLS table may include the above-described SLT or a rating region table (RRT). The RRT may have information about content advisory rating.

Hereinafter, the SLT will be described. LLS can be signaling information which supports rapid channel scans and bootstrapping of service acquisition by the receiver, and SLT can be a table of signaling information which is used to build a basic service listing and provide bootstrap discovery of SLS.

The function of the SLT is similar to that of the Program Association Table (PAT) in MPEG-2 Systems, and the Fast Information Channel (FIC) found in ATSC Systems. For a receiver first encountering the broadcast emission, this is the place to start. SLT supports a rapid channel scan which allows a receiver to build a list of all the services it can receive, with their channel name, channel number, etc., and SLT provides bootstrap information that allows a receiver to discover the SLS for each service. For ROUTE/DASH-delivered services, the bootstrap information includes the destination IP address and destination port of the LCT session that carries the SLS. For MMT/MPU-delivered services, the bootstrap information includes the destination IP address and destination port of the MMTP session carrying the SLS.

The SLT supports rapid channel scans and service acquisition by including the following information about each service in the broadcast stream. First, the SLT can include information necessary to allow the presentation of a service list that is meaningful to viewers and that can support initial service selection via channel number or up/down selection. Seconds, the SLT can include information necessary to locate the Service Layer Signaling for each service listed. That is, the SLT may include access information related to a location at which the SLS is delivered.

The illustrated SLT according to the present embodiment is expressed as an XML document having an SLT root element. According to a given embodiment, the SLT may be expressed in a binary format or an XML document.

The SLT root element of the SLT illustrated in the figure may include @bsid, @sltSectionVersion, @sltSectionNumber, @totalSltSectionNumbers, @language, @capabilities, InetSigLoc and/or Service. According to a given embodiment, the SLT root element may further include @providerId. According to a given embodiment, the SLT root element may not include @language.

The service element may include @serviceId, @SLTserviceSeqNumber, @protected, @majorChannelNo, @minorChannelNo, @serviceCategory, @shortServiceName, @hidden, @slsProtocolType, BroadcastSignaling, @slsPlpId, @slsDestinationIpAddress, @slsDestinationUdpPort, @slsSourceIpAddress, @slsMajorProtocolVersion, @SlsMinorProtocolVersion, @serviceLanguage, @broadbandAccessRequired, @capabilities and/or InetSigLoc.

According to a given embodiment, an attribute or an element of the SLT may be added/changed/deleted. Each element included in the SLT may additionally have a separate attribute or element, and some attribute or elements according to the present embodiment may be omitted. Here, a field which is marked with @ may correspond to an attribute, and a field which is not marked with @ may correspond to an element.

@bsid is an identifier of the whole Broadcast Stream. The value of BSID may be unique on a regional level.

@providerId can be an index of broadcaster that is using part or all of this broadcast stream. This is an optional attribute. When it's not present, it means that this broadcast stream is being used by one broadcaster. @providerId is not illustrated in the figure.

@sltSectionVersion can be a version number of the SLT section. The sltSectionVersion can be incremented by 1 when a change in the information carried within the slt occurs. When it reaches maximum value, it wraps around to 0.

@sltSectionNumber can be the number, counting from 1, of this section of the SLT. In other words, @sltSectionNumber may correspond to a section number of the SLT section. When this field is not used, @sltSectionNumber may be set to a default value of 1.

@totalSltSectionNumbers can be the total number of sections (that is, the section with the highest sltSectionNumber) of the SLT of which this section is part. sltSectionNumber and totalSltSectionNumbers together can be considered to indicate "Part M of N" of one portion of the SLT when it is sent in fragments. In other words, when the SLT is transmitted, transmission through fragmentation may be supported. When this field is not used, @totalSltSectionNumbers may be set to a default value of 1. A case in which this field is not used may correspond to a case in which the SLT is not transmitted by being fragmented.

@language can indicate primary language of the services included in this slt instance. According to a given embodiment, a value of this field may have be a three-character language code defined in the ISO. This field may be omitted.

@capabilities can indicate required capabilities for decoding and meaningfully presenting the content for all the services in this slt instance.

InetSigLoc can provide a URL telling the receiver where it can acquire any requested type of data from external server(s) via broadband. This element may include @urlType as a lower field. According to a value of the @urlType field, a type of a URL provided by InetSigLoc may be indicated. According to a given embodiment, when the @urlType field has a value of 0, InetSigLoc may provide a URL of a signaling server. When the @urlType field has a value of 1, InetSigLoc may provide a URL of an ESG server. When the @urlType field has other values, the field may be reserved for future use.

The service field is an element having information about each service, and may correspond to a service entry. Service element fields corresponding to the number of services indicated by the SLT may be present. Hereinafter, a description will be given of a lower attribute/element of the service field.

@serviceId can be an integer number that uniquely identify this Service within the scope of this Broadcast area. According to a given embodiment, a scope of @serviceId may be changed. @SLTserviceSeqNumber can be an integer number that indicates the sequence number of the SLT service information with service ID equal to the serviceId attribute above. SLTserviceSeqNumber value can start at 0 for each service and can be incremented by 1 every time any attribute in this Service element is changed. If no attribute values are changed compared to the previous Service element with a particular value of ServiceID then SLTserviceSeqNumber would not be incremented. The SLTserviceSeqNumber field wraps back to 0 after reaching the maximum value.

@protected is flag information which may indicate whether one or more components for significant reproduction of the service are in a protected state. When set to "1" (true), that one or more components necessary for meaningful presentation is protected. When set to "0" (false), this flag indicates that no components necessary for meaningful presentation of the service are protected. Default value is false.

@majorChannelNo is an integer number representing the "major" channel number of the service. An example of the field may have a range of 1 to 999.

@minorChannelNo is an integer number representing the "minor" channel number of the service. An example of the field may have a range of 1 to 999.

@serviceCategory can indicate the category of this service. This field may indicate a type that varies depending on embodiments. According to a given embodiment, when this field has values of 1, 2, and 3, the values may correspond to a linear A/V service, a linear audio only service, and an app-based service, respectively. When this field has a value of 0, the value may correspond to a service of an undefined category. When this field has other values except for 1, 2, and 3, the field may be reserved for future use. @shortServiceName can be a short string name of the Service.

@hidden can be boolean value that when present and set to "true" indicates that the service is intended for testing or proprietary use, and is not to be selected by ordinary TV receivers. The default value is "false" when not present.

@slsProtocolType can be an attribute indicating the type of protocol of Service Layer Signaling used by this service. This field may indicate a type that varies depending on embodiments. According to a given embodiment, when this field has values of 1 and 2, protocols of SLS used by respective corresponding services may be ROUTE and MMTP, respectively. When this field has other values except for 0, the field may be reserved for future use. This field may be referred to as @slsProtocol.

BroadcastSignaling and lower attributes/elements thereof may provide information related to broadcast signaling. When the BroadcastSignaling element is not present, the child element InetSigLoc of the parent Service element can be present and its attribute urlType includes URL_type 0x00 (URL to signaling server). In this case attribute url supports the query parameter svc=<service_id> where service_id corresponds to the serviceId attribute for the parent Service element.

Alternatively when the BroadcastSignaling element is not present, the element InetSigLoc can be present as a child element of the slt root element and the attribute urlType of that InetSigLoc element includes URL_type 0x00 (URL to signaling server). In this case attribute url for URL_type 0x00 supports the query parameter svc=<service_id> where service_id corresponds to the serviceId attribute for the parent Service element.

@slsPlpId can be a string representing an integer number indicating the PLP ID of the physical layer pipe carrying the SLS for this service.

@slsDestinationIpAddress can be a string containing the dotted-IPv4 destination address of the packets carrying SLS data for this service.

@slsDestinationUdpPort can be a string containing the port number of the packets carrying SLS data for this service. As described in the foregoing, SLS bootstrapping may be performed by destination IP/UDP information.

@slsSourceIpAddress can be a string containing the dotted-IPv4 source address of the packets carrying SLS data for this service.

@slsMajorProtocolVersion can be major version number of the protocol used to deliver the Service Layer Signaling for this service. Default value is 1.

@SlsMinorProtocolVersion can be minor version number of the protocol used to deliver the Service Layer Signalling for this service. Default value is 0.

@serviceLanguage can be a three-character language code indicating the primary language of the service. A value of this field may have a form that varies depending on embodiments.

@broadbandAccessRequired can be a Boolean indicating that broadband access is required for a receiver to make a meaningful presentation of the service. Default value is false. When this field has a value of True, the receiver needs to access a broadband for significant service reproduction, which may correspond to a case of hybrid service delivery.

@capabilities can represent required capabilities for decoding and meaningfully presenting the content for the service with service ID equal to the serviceId attribute above.

InetSigLoc can provide a URL for access to signaling or announcement information via broadband, if available. Its datatype can be an extension of the anyURL datatype, adding an @urlType attribute that indicates what the URL gives access to. An @urlType field of this field may indicate the same meaning as that of the @urlType field of InetSigLoc described above. When an InetSigLoc element of attribute URL_type 0x00 is present as an element of the SLT, it can be used to make HTTP requests for signaling metadata. The HTTP POST message body may include a service term. When the InetSigLoc element appears at the section level, the service term is used to indicate the service to which the requested signaling metadata objects apply. If the service term is not present, then the signaling metadata objects for all services in the section are requested. When the InetSigLoc appears at the service level, then no service term is needed to designate the desired service. When an InetSigLoc element of attribute URL_type 0x01 is provided, it can be used to retrieve ESG data via broadband. If the element appears as a child element of the service element, then the URL can be used to retrieve ESG data for that service. if the element appears as a child element of the SLT element, then the URL can be used to retrieve ESG data for all services in that section.

In another example of the SLT, @sltSectionVersion, @sltSectionNumber, @totalSltSectionNumbers and/or @language fields of the SLT may be omitted.

In addition, the above-described InetSigLoc field may be replaced by @sltInetSigUri and/or @sltInetEsgUri field. The two fields may include the URI of the signaling server and URI information of the ESG server, respectively. The InetSigLoc field corresponding to a lower field of the SLT and the InetSigLoc field corresponding to a lower field of the service field may be replaced in a similar manner.

The suggested default values may vary depending on embodiments. An illustrated "use" column relates to the respective fields. Here, "1" may indicate that a corresponding field is an essential field, and "0. . .1" may indicate that a corresponding field is an optional field.

Figure 4:
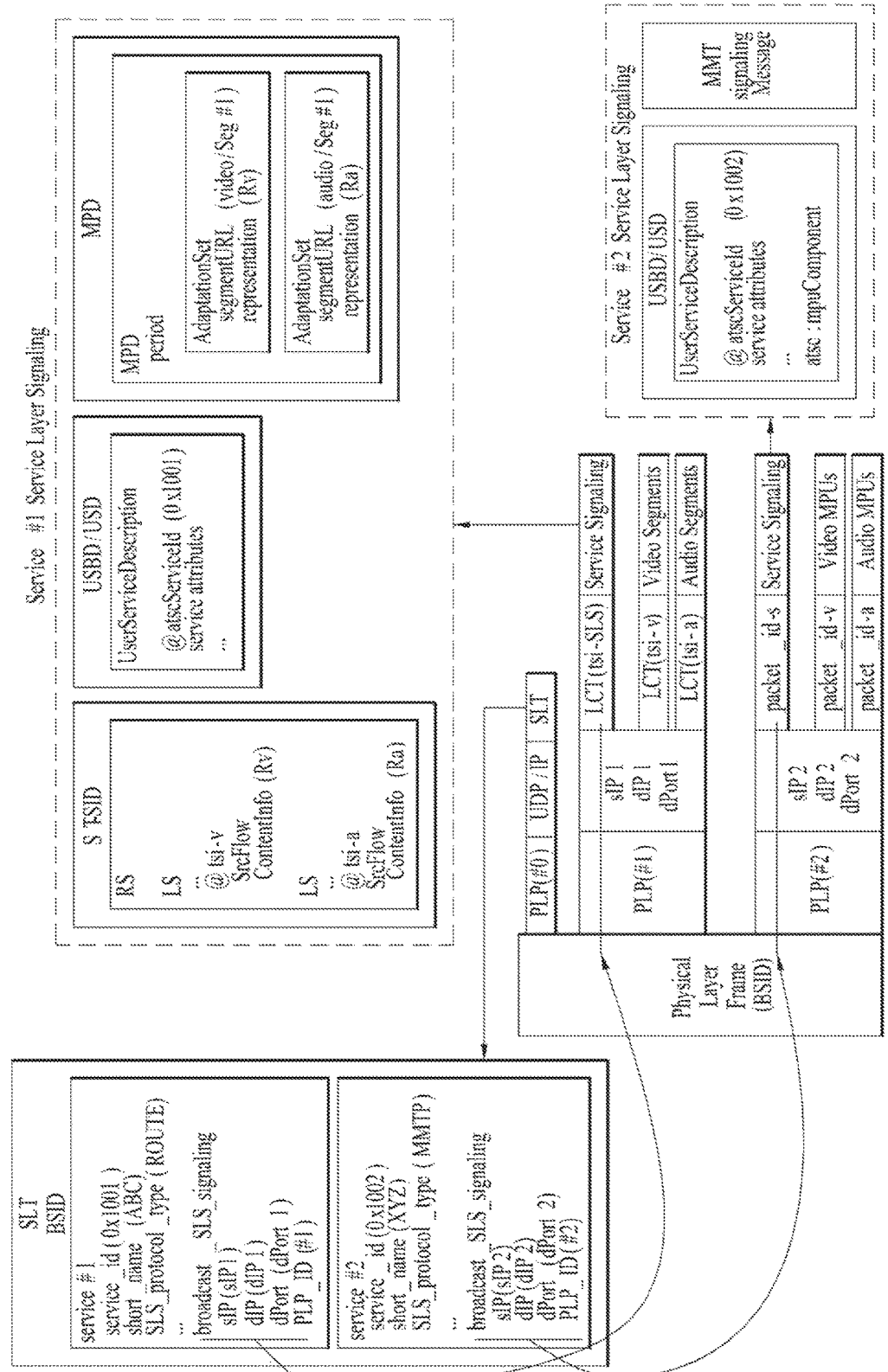
FIG. 4 illustrates SLS bootstrapping and a service discovery process according to an embodiment of the present invention.

FIG. 4 illustrates SLS bootstrapping and a service discovery process according to an embodiment of the present invention.

Hereinafter, SLS will be described.

SLS can be signaling which provides information for discovery and acquisition of services and their content components.

For ROUTE/DASH, the SLS for each service describes characteristics of the service, such as a list of its components and where to acquire them, and the receiver capabilities required to make a meaningful presentation of the service. In the ROUTE/DASH system, the SLS includes the User Service Bundle Description (USBD), the S-TSID and the DASH Media Presentation Description (MPD). Here, USBD or user service description (USD) is one of SLS XML fragments, and may function as a signaling herb that describes specific descriptive information. USBD/USD may be extended beyond 3GPP MBMS. Details of USBD/USD will be described below.

The Service Signaling focuses on basic attributes of the service itself, especially those attributes needed to acquire the service. Properties of the service and programming that are intended for viewers appear as Service Announcement, or ESG data.

Having separate Service Signaling for each service permits a receiver to acquire the appropriate SLS for a service of interest without the need to parse the entire SLS carried within a Broadcast Stream.

For optional broadband delivery of Service Signaling, the SLT can include HTTP URLs where the Service Signaling files can be obtained, as described above.

LLS is used for bootstrapping SLS acquisition, and subsequently, the SLS is used to acquire service components delivered on either ROUTE sessions or MMTP sessions.

The described figure illustrates the following signaling sequences. Receiver starts acquiring the SLT described above. Each service identified by service_id delivered over ROUTE sessions provides SLS bootstrapping information: PLPID(#1), source IP address (sIP1), destination IP address (dIP1), and destination port number (dPort1). Each service identified by service_id delivered over MMTP sessions provides SLS bootstrapping information: PLPID(#2), destination IP address (dIP2), and destination port number (dPort2).

For streaming services delivery using ROUTE, the receiver can acquire SLS fragments carried over the IP/UDP/LCT session and PLP; whereas for streaming services delivery using MMTP, the receiver can acquire SLS fragments carried over an MMTP session and PLP. For service delivery using ROUTE, these SLS fragments include USBD/USD fragments, S-TSID fragments, and MPD fragments. They are relevant to one service. USBD/USD fragments describes service layer properties and provide URI references to S-TSID fragments and URI references to MPD fragments. In other words, the USBD/USD may refer to S-TSID and MPD. For service delivery using MMTP, the USBD references the MMT Signaling's MPT Message, the MP Table of which provides identification of Package ID and location information of assets belonging to the service. Here, an asset is a multimedia data entity, and may refer to a data entity which is combined into one unique ID and is used to generate one multimedia presentation. The asset may correspond to a service component included in one service. The MPT message is a message having the MP table of MMT. Here, the MP table may be an MMT package table having information about content and an MMT asset. Details may be similar to a definition in MMT. Here, media presentation may correspond to a collection of data that establishes bounded/unbounded presentation of media content.

The S-TSID fragment provides component acquisition information associated with one service and mapping between DASH Representations found in the MPD and in the TSI corresponding to the component of the service. The S-TSID can provide component acquisition information in the form of a TSI and the associated DASH Representation identifier, and PLPID carrying DASH Segments associated with the DASH Representation. By the PLPID and TSI values, the receiver collects the audio/video components from the service and begins buffering DASH Media Segments then applies the appropriate decoding processes.

For USBD listing service components delivered on MMTP sessions, as illustrated by "Service #2" in the described figure, the receiver also acquires an MPT message with matching MMT_package_id to complete the SLS. An MPT message provides the full list of service components comprising a service and the acquisition information for each component. Component acquisition information includes MMTP session information, the PLPID carrying the session and the packet_id within that session.

According to a given embodiment, for example, in ROUTE, two or more S-TSID fragments may be used. Each fragment may provide access information related to LCT sessions delivering content of each service.

In ROUTE, S-TSID, USBD/USD, MPD, or an LCT session delivering S-TSID, USBD/USD or MPD may be referred to as a service signaling channel. In MMTP, USBD/UD, an MMT signaling message, or a packet flow delivering the MMTP or USBD/UD may be referred to as a service signaling channel.

Unlike the illustrated example, one ROUTE or MMTP session may be delivered through a plurality of PLPs. In other words, one service may be delivered through one or more PLPs. As described in the foregoing, one LCT session may be delivered through one PLP. Unlike the figure, according to a given embodiment, components included in one service may be delivered through different ROUTE sessions. In addition, according to a given embodiment, components included in one service may be delivered through different MMTP sessions. According to a given embodiment, components included in one service may be delivered separately through a ROUTE session and an MMTP session. Although not illustrated, components included in one service may be delivered via broadband (hybrid delivery).

FIG. 5 illustrates a USBD fragment for ROUTE/DASH according to an embodiment of the present invention.

Hereinafter, a description will be given of SLS in delivery based on ROUTE.

Service Layer Signaling provides detailed technical information to the receiver to enable the discovery and access of services and their content components. It can include a set of XML-encoded metadata fragments carried over a dedicated LCT session. That LCT session can be acquired using the bootstrap information contained in the SLT as described above. The SLS is defined on a per-service level, and it describes the characteristics and access information of the service, such as a list of its content components and how to acquire them, and the receiver capabilities required to make a meaningful presentation of the service. In the ROUTE/DASH system, for linear services delivery, the SLS consists of the following metadata fragments: USBD, S-TSID and the DASH MPD. The SLS fragments can be delivered on a dedicated LCT transport session with TSI=0. According to a given embodiment, a TSI of a particular LCT session (dedicated LCT session) in which an SLS fragment is delivered may have a different value. According to a given embodiment, an LCT session in which an SLS fragment is delivered may be signaled using the SLT or another scheme.

ROUTE/DASH Service Layer Signaling can include the User Service Bundle Description (USBD) and Service-based Transport Session Instance Description (S-TSID) metadata fragments. These service signaling fragments are applicable to both linear and application-based services. The USBD fragment contains service identification, device capabilities information, references to other SLS fragments required to access the service and constituent media components, and metadata to enable the receiver to determine the transport mode (broadcast and/or broadband) of service components. The S-TSID fragment, referenced by the USBD, provides transport session descriptions for the one or more ROUTE/LCT sessions in which the media content components of a service are delivered, and descriptions of the delivery objects carried in those LCT sessions. The USBD and S-TSID will be described below.

In streaming content signaling in ROUTE-based delivery, a streaming content signaling component of SLS corresponds to an MPD fragment. The MPD is typically associated with linear services for the delivery of DASH Segments as streaming content. The MPD provides the resource identifiers for individual media components of the linear/streaming service in the form of Segment URLs, and the context of the identified resources within the Media Presentation. Details of the MPD will be described below.

In app-based enhancement signaling in ROUTE-based delivery, app-based enhancement signaling pertains to the delivery of app-based enhancement components, such as an application logic file, locally-cached media files, an network content items, or a notification stream. An application can also retrieve locally-cached data over a broadband connection when available.

Hereinafter, a description will be given of details of USBD/USD illustrated in the figure.

The top level or entry point SLS fragment is the USBD fragment. An illustrated USBD fragment is an example of the present invention, basic fields of the USBD fragment not illustrated in the figure may be additionally provided according to a given embodiment. As described in the foregoing, the illustrated USBD fragment has an extended form, and may have fields added to a basic configuration.

The illustrated USBD may have a bundleDescription root element. The bundleDescription root element may have a userServiceDescription element. The userServiceDescription element may correspond to an instance for one service.

The userServiceDescription element may include @serviceId, @atsc:serviceId, @atsc:serviceStatus, @atsc:fullMPDUri, @atsc:sTSIDUri, name, serviceLanguage, atsc:capabilityCode and/or deliveryMethod.

@serviceId can be a globally unique URI that identifies a service, unique within the scope of the BSID. This parameter can be used to link to ESG data (Service@globalServiceID).

@atsc:serviceId is a reference to corresponding service entry in LLS(SLT). The value of this attribute is the same value of serviceId assigned to the entry.

@atsc:serviceStatus can specify the status of this service. The value indicates whether this service is active or inactive. When set to "1" (true), that indicates service is active. When this field is not used, @atsc:serviceStatus may be set to a default value of 1.

@atsc:fullMPDUri can reference an MPD fragment which contains descriptions for contents components of the service delivered over broadcast and optionally, also over broadband.

@atsc:sTSIDUri can reference the S-TSID fragment which provides access related parameters to the Transport sessions carrying contents of this service.

name can indicate name of the service as given by the lang attribute. name element can include lang attribute, which indicating language of the service name. The language can be specified according to XML datatypes.

serviceLanguage can represent available languages of the service. The language can be specified according to XML datatypes.

atsc:capabilityCode can specify the capabilities required in the receiver to be able to create a meaningful presentation of the content of this service. According to a given embodiment, this field may specify a predefined capability group. Here, the capability group may be a group of capability attribute values for significant presentation. This field may be omitted according to a given embodiment.

deliveryMethod can be a container of transport related information pertaining to the contents of the service over broadcast and (optionally) broadband modes of access. Referring to data included in the service, when the number of the data is N, delivery schemes for respective data may be described by this element. The deliveryMethod may include an r12:broadcastAppService element and an r12:unicastAppService element. Each lower element may include a basePattern element as a lower element.

r12:broadcastAppService can be a DASH Representation delivered over broadcast, in multiplexed or non-multiplexed form, containing the corresponding media component(s) belonging to the service, across all Periods of the affiliated Media Presentation. In other words, each of the fields may indicate DASH representation delivered through the broadcast network.

r12:unicastAppService can be a DASH Representation delivered over broadband, in multiplexed or non-multiplexed form, containing the constituent media content component(s) belonging to the service, across all Periods of the affiliated Media Presentation. In other words, each of the fields may indicate DASH representation delivered via broadband.

basePattern can be a character pattern for use by the the receiver to match against any portion of the Segment URL used by the DASH client to request Media Segments of a parent Representation under its containing Period. A match implies that the corresponding requested Media Segment is carried over broadcast transport. In a URL address for receiving DASH representation expressed by each of the r12:broadcastAppService element and the r12:unicastAppService element, a part of the URL, etc. may have a particular pattern. The pattern may be described by this field. Some data may be distinguished using this information. The proposed default values may vary depending on embodiments. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

FIG. 6 illustrates an S-TSID fragment for ROUTE/DASH according to an embodiment of the present invention.

Hereinafter, a description will be given of the S-TSID illustrated in the figure in detail.

S-TSID can be an SLS XML fragment which provides the overall session description information for transport session(s) which carry the content components of a service. The S-TSID is the SLS metadata fragment that contains the overall transport session description information for the zero or more ROUTE sessions and constituent LCT sessions in which the media content components of a service are delivered. The S-TSID also includes file metadata for the delivery object or object flow carried in the LCT sessions of the service, as well as additional information on the payload formats and content components carried in those LCT sessions.

Each instance of the S-TSID fragment is referenced in the USBD fragment by the @atsc:sTSIDUri attribute of the userServiceDescription element. The illustrated S-TSID according to the present embodiment is expressed as an XML document. According to a given embodiment, the S-TSID may be expressed in a binary format or as an XML document.

The illustrated S-TSID may have an S-TSID root element. The S-TSID root element may include @serviceId and/or RS.

@serviceID can be a reference corresponding service element in the USD. The value of this attribute can reference a service with a corresponding value of service_id.

The RS element may have information about a ROUTE session for delivering the service data. Service data or service components may be delivered through a plurality of ROUTE sessions, and thus the number of RS elements may be 1 to N.

The RS element may include @bsid, @sIpAddr, @dIpAddr, @dport, @PLPID and/or LS.

@bsid can be an identifier of the Broadcast Stream within which the content component(s) of the broadcastAppService are carried. When this attribute is absent, the default Broadcast Stream is the one whose PLPs carry SLS fragments for this service. Its value can be identical to that of the broadcast_stream_id in the SLT.

@sIpAddr can indicate source IP address. Here, the source IP address may be a source IP address of a ROUTE session for delivering a service component included in the service. As described in the foregoing, service components of one service may be delivered through a plurality of ROUTE sessions. Thus, the service components may be transmitted using another ROUTE session other than the ROUTE session for delivering the S-TSID. Therefore, this field may be used to indicate the source IP address of the ROUTE session. A default value of this field may be a source IP address of a current ROUTE session. When a service component is delivered through another ROUTE session, and thus the ROUTE session needs to be indicated, a value of this field may be a value of a source IP address of the ROUTE session. In this case, this field may correspond to M, that is, an essential field.

@dIpAddr can indicate destination IP address. Here, a destination IP address may be a destination IP address of a ROUTE session that delivers a service component included in a service. For a similar case to the above description of @sIpAddr, this field may indicate a destination IP address of a ROUTE session that delivers a service component. A default value of this field may be a destination IP address of a current ROUTE session. When a service component is delivered through another ROUTE session, and thus the ROUTE session needs to be indicated, a value of this field may be a value of a destination IP address of the ROUTE session. In this case, this field may correspond to M, that is, an essential field.

@dport can indicate destination port. Here, a destination port may be a destination port of a ROUTE session that delivers a service component included in a service. For a similar case to the above description of @sIpAddr, this field may indicate a destination port of a ROUTE session that delivers a service component. A default value of this field may be a destination port number of a current ROUTE session. When a service component is delivered through another ROUTE session, and thus the ROUTE session needs to be indicated, a value of this field may be a destination port number value of the ROUTE session. In this case, this field may correspond to M, that is, an essential field.

@PLPID may be an ID of a PLP for a ROUTE session expressed by an RS. A default value may be an ID of a PLP of an LCT session including a current S-TSID. According to a given embodiment, this field may have an ID value of a PLP for an LCT session for delivering an S-TSID in the ROUTE session, and may have ID values of all PLPs for the ROUTE session.

An LS element may have information about an LCT session for delivering a service data. Service data or service components may be delivered through a plurality of LCT sessions, and thus the number of LS elements may be 1 to N.

The LS element may include @tsi, @PLPID, @bw, @startTime, @endTime, SrcFlow and/or RprFlow.

@tsi may indicate a TSI value of an LCT session for delivering a service component of a service.

@PLPID may have ID information of a PLP for the LCT session. This value may be overwritten on a basic ROUTE session value.

@bw may indicate a maximum bandwidth value. @startTime may indicate a start time of the LCT session. @endTime may indicate an end time of the LCT session. A SrcFlow element may describe a source flow of ROUTE. A RprFlow element may describe a repair flow of ROUTE.

The proposed default values may be varied according to an embodiment. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

Hereinafter, a description will be given of MPD for ROUTE/DASH.

The MPD is an SLS metadata fragment which contains a formalized description of a DASH Media Presentation, corresponding to a linear service of a given duration defined by the broadcaster (for example a single TV program, or the set of contiguous linear TV programs over a period of time). The contents of the MPD provide the resource identifiers for Segments and the context for the identified resources within the Media Presentation. The data structure and semantics of the MPD fragment can be according to the MPD defined by MPEG DASH.

One or more of the DASH Representations conveyed in the MPD can be carried over broadcast. The MPD may describe additional Representations delivered over broadband, e.g. in the case of a hybrid service, or to support service continuity in handoff from broadcast to broadcast due to broadcast signal degradation (e.g. driving through a tunnel).

FIG. 7 illustrates a USBD/USD fragment for MMT according to an embodiment of the present invention.

MMT Service Layer Signaling for linear services comprises the USBD fragment and the MMT Package (MP) table. The MP table is as described above. The USBD fragment contains service identification, device capabilities information, references to other SLS information required to access the service and constituent media components, and the metadata to enable the receiver to determine the transport mode (broadcast and/or broadband) of the service components. The MP table for MPU components, referenced by the USBD, provides transport session descriptions for the MMTP sessions in which the media content components of a service are delivered and the descriptions of the Assets carried in those MMTP sessions.

The streaming content signaling component of the SLS for MPU components corresponds to the MP table defined in MMT. The MP table provides a list of MMT Assets where each Asset corresponds to a single service component and the description of the location information for this component.

USBD fragments may also contain references to the S-TSID and the MPD as described above, for service components delivered by the ROUTE protocol and the broadband, respectively. According to a given embodiment, in delivery through MMT, a service component delivered through the ROUTE protocol is NRT data, etc. Thus, in this case, MPD may be unnecessary. In addition, in delivery through MMT, information about an LCT session for delivering a service component, which is delivered via broadband, is unnecessary, and thus an S-TSID may be unnecessary. Here, an MMT package may be a logical collection of media data delivered using MMT. Here, an MMTP packet may refer to a formatted unit of media data delivered using MMT. An MPU may refer to a generic container of independently decodable timed/non-timed data. Here, data in the MPU is media codec agnostic.

Hereinafter, a description will be given of details of the USBD/USD illustrated in the figure.

The illustrated USBD fragment is an example of the present invention, and basic fields of the USBD fragment may be additionally provided according to an embodiment. As described in the foregoing, the illustrated USBD fragment has an extended form, and may have fields added to a basic structure.

The illustrated USBD according to an embodiment of the present invention is expressed as an XML, document. According to a given embodiment, the USBD may be expressed in a binary format or as an XML document.

The illustrated USBD may have a bundleDescription root element. The bundleDescription root element may have a userServiceDescription element. The userServiceDescription element may be an instance for one service.

The userServiceDescription element may include @serviceId, @atsc:serviceId, name, serviceLanguage, atsc:capabilityCode, atsc:Channel, atsc:mpuComponent, atsc:routeComponent, atsc:broadbandComponent and/or atsc:ComponentInfo.

Here, @serviceId, @atsc:serviceId, name, serviceLanguage, and atsc:capabilityCode may be as described above. The lang field below the name field may be as described above. atsc:capabilityCode may be omitted according to a given embodiment.

The userServiceDescription element may further include an atsc:contentAdvisoryRating element according to an embodiment. This element may be an optional element. atsc:contentAdvisoryRating can specify the content advisory rating. This field is not illustrated in the figure.

atsc:Channel may have information about a channel of a service. The atsc:Channel element may include @atsc:majorChannelNo, @atsc:minorChannelNo, @atsc:serviceLang, @atsc:serviceGenre, @atsc:serviceIcon and/or atsc:ServiceDescription. @atsc:majorChannelNo, @atsc:minorChannelNo, and @atsc:serviceLang may be omitted according to a given embodiment.

@atsc:majorChannelNo is an attribute that indicates the major channel number of the service.

@atsc:minorChannelNo is an attribute that indicates the minor channel number of the service.

@atsc:serviceLang is an attribute that indicates the primary language used in the service.

@atsc:serviceGenre is an attribute that indicates primary genre of the service.

@atsc:serviceIcon is an attribute that indicates the Uniform Resource Locator (URL) for the icon used to represent this service.

atsc:ServiceDescription includes service description, possibly in multiple languages. atsc:ServiceDescription includes can include @atsc:serviceDescrText and/or @atsc:serviceDescrLang.

@atsc:serviceDescrText is an attribute that indicates description of the service.

@atsc:serviceDescrLang is an attribute that indicates the language of the serviceDescrText attribute above.

atsc:mpuComponent may have information about a content component of a service delivered in a form of an MPU. atsc:mpuComponent may include @atsc:mmtPackageId and/or @atsc:nextMmtPackageId.

@atsc:mmtPackageId can reference a MMT Package for content components of the service delivered as MPUs.

@atsc:nextMmtPackageId can reference a MMT Package to be used after the one referenced by @atsc:mmtPackageId in time for content components of the service delivered as MPUs.

atsc:routeComponent may have information about a content component of a service delivered through ROUTE. atsc:routeComponent may include @atsc:sTSIDUri, @sTSIDPlpId, @sTSIDDestinationIpAddress, @sTSIDDestinationUdpPort, @sTSIDSourceIpAddress, @sTSIDMajorProtocol Version and/or @sTSIDMinorProtocolVersion.

@atsc:sTSIDUri can be a reference to the S-TSID fragment which provides access related parameters to the Transport sessions carrying contents of this service. This field may be the same as a URI for referring to an S-TSID in USBD for ROUTE described above. As described in the foregoing, in service delivery by the MMTP, service components, which are delivered through NRT, etc., may be delivered by ROUTE. This field may be used to refer to the S-TSID therefor.

@sTSIDPlpId can be a string representing an integer number indicating the PLP ID of the physical layer pipe carrying the S-TSID for this service. (default: current physical layer pipe)

@sTSIDDestinationIpAddress can be a string containing the dotted-IPv4 destination address of the packets carrying S-TSID for this service. (default: current MMTP session's source IP address)

@sTSIDDestinationUdpPort can be a string containing the port number of the packets carrying S-TSID for this service.

@sTSIDSourceIpAddress can be a string containing the dotted-IPv4 source address of the packets carrying S-T SID for this service.

@sTSIDMajorProtocolVersion can indicate major version number of the protocol used to deliver the S-TSID for this service. Default value is 1.

@sTSIDMinorProtocolVersion can indicate minor version number of the protocol used to deliver the S-TSID for this service. Default value is 0.

atsc:broadbandComponent may have information about a content component of a service delivered via broadband. In other words, atsc:broadbandComponent may be a field on the assumption of hybrid delivery. atsc:broadbandComponent may further include @atsc:fullfMPDUri.

@atsc:fullfMPDUri can be a reference to an MPD fragment which contains descriptions for contents components of the service delivered over broadband.

An atsc:ComponentInfo field may have information about an available component of a service. The atsc:ComponentInfo field may have information about a type, a role, a name, etc. of each component. The number of atsc:ComponentInfo fields may correspond to the number (N) of respective components. The atsc:ComponentInfo field may include @atsc:componentType, @atsc:componentRole, @atsc:componentProtectedFlag, @atsc:componentId and/or @atsc:componentName.

@atsc:componentType is an attribute that indicates the type of this component. Value of 0 indicates an audio component. Value of 1 indicates a video component. Value of 2 indicated a closed caption component. Value of 3 indicates an application component. Values 4 to 7 are reserved. A meaning of a value of this field may be differently set depending on embodiments.

@atsc:componentRole is an attribute that indicates the role or kind of this component.

For audio (when componentType attribute above is equal to 0): values of componentRole attribute are as follows: 0=Complete main, 1=Music and Effects, 2=Dialog, 3=Commentary, 4=Visually Impaired, 5=Hearing Impaired, 6=Voice-Over, 7-254=reserved, 255=unknown.

For Video (when componentType attribute above is equal to 1) values of componentRole attribute are as follows: 0=Primary video, 1=Alternative camera view, 2=Other alternative video component, 3=Sign language inset, 4=Follow subject video, 5=3D video left view, 6=3D video right view, 7=3D video depth information, 8=Part of video array <x,y> of <n,m>, 9=Follow-Subject metadata, 10-254=reserved, 255=unknown.

For Closed Caption component (when componentType attribute above is equal to 2) values of componentRole attribute are as follows: 0=Normal, 1=Easy reader, 2-254=reserved, 255=unknown.

When componentType attribute above is between 3 to 7, inclusive, the componentRole can be equal to 255. A meaning of a value of this field may be differently set depending on embodiments.

@atsc:componentProtectedFlag is an attribute that indicates if this component is protected (e.g. encrypted). When this flag is set to a value of 1 this component is protected (e.g. encrypted). When this flag is set to a value of 0 this component is not protected (e.g. encrypted). When not present the value of componentProtectedFlag attribute is inferred to be equal to 0. A meaning of a value of this field may be differently set depending on embodiments.

@atsc:componentId is an attribute that indicates the identifier of this component. The value of this attribute can be the same as the asset id in the MP table corresponding to this component @atsc:componentName is an attribute that indicates the human readable name of this component.

The proposed default values may vary depending on embodiments. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

Hereinafter, a description will be given of MPD for MMT.

The Media Presentation Description is an SLS metadata fragment corresponding to a linear service of a given duration defined by the broadcaster (for example a single TV program, or the set of contiguous linear TV programs over a period of time). The contents of the MPD provide the resource identifiers for Segments and the context for the identified resources within the Media Presentation. The data structure and semantics of the MPD can be according to the MPD defined by MPEG DASH.

In the present embodiment, an MPD delivered by an MMTP session describes Representations delivered over broadband, e.g. in the case of a hybrid service, or to support service continuity in handoff from broadcast to broadband due to broadcast signal degradation (e.g. driving under a mountain or through a tunnel).

Hereinafter, a description will be given of an MMT signaling message for MMT.

When MMTP sessions are used to carry a streaming service, MMT signaling messages defined by MMT are delivered by MMTP packets according to Signaling Message Mode defined by MMT. The value of the packet_id field of MMTP packets carrying Service Layer Signaling is set to '00' except for MMTP packets carrying MMT signaling messages specific to an Asset, which can be set to the same packet_id value as the MMTP packets carrying the Asset. Identifiers referencing the appropriate Package for each service are signaled by the USBD fragment as described above. MMT Package Table (MPT) messages with matching MMT_package_id can be delivered on the MMTP session signaled in the SLT. Each MMTP session carries MMT signaling messages specific to its session or each asset delivered by the MMTP session.

In other words, it is possible to access USBD of the MMTP session by specifying an IP destination address/port number, etc. of a packet having the SLS for a particular service in the SLT. As described in the foregoing, a packet ID of an MMTP packet carrying the SLS may be designated as a particular value such as 00, etc. It is possible to access an MPT message having a matched packet ID using the above-described package IP information of USBD. As described below, the MPT message may be used to access each service component/asset.

The following MMTP messages can be delivered by the MMTP session signaled in the SLT.

MMT Package Table (MPT) message: This message carries an MP (MMT Package) table which contains the list of all Assets and their location information as defined by MMT. If an Asset is delivered by a PLP different from the current PLP delivering the MP table, the identifier of the PLP carrying the Asset can be provided in the MP table using Physical Layer Pipe Identifier Descriptor. The physical layer pipe identifier descriptor will be described below.

MMT ATSC3 (MA3) message mmt_atsc3_message( ): This message carries system metadata specific for services including Service Layer Signaling as described above. mmt_atsc3_message( ) will be described below.

The following MMTP messages can be delivered by the MMTP session signaled in the SLT, if required.

Media Presentation Information (MPI) message: This message carries an MPI table which contains the whole document or a subset of a document of presentation information. An MP table associated with the MPI table also can be delivered by this message.

Clock Relation Information (CRI) message: This message carries a CRI table which contains clock related information for the mapping between the NTP timestamp and the MPEG-2 STC. According to a given embodiment, the CRI message may not be delivered through the MMTP session.

The following MMTP messages can be delivered by each MMTP session carrying streaming content.

Hypothetical Receiver Buffer Model message: This message carries information required by the receiver to manage its buffer.

Hypothetical Receiver Buffer Model Removal message: This message carries information required by the receiver to manage its MMT de-capsulation buffer.

Hereinafter, a description will be given of mmt_atsc3_message( ) corresponding to one of MMT signaling messages. An MMT Signaling message mmt_atsc3_message( ) is defined to deliver information specific to services according to the present invention described above. The signaling message may include message ID, version, and/or length fields corresponding to basic fields of the MMT signaling message. A payload of the signaling message may include service ID information, content type information, content version information, content compression information and/or URI information. The content type information may indicate a type of data included in the payload of the signaling message. The content version information may indicate a version of data included in the payload, and the content compression information may indicate a type of compression applied to the data. The URI information may have URI information related to content delivered by the message.

Hereinafter, a description will be given of the physical layer pipe identifier descriptor.

The physical layer pipe identifier descriptor is a descriptor that can be used as one of descriptors of the MP table described above. The Physical Layer Pipe Identifier Descriptor provides information about the PLP carrying an Asset. If an Asset is delivered by a PLP different from the current PLP delivering the MP table, the Physical Layer Pipe Identifier Descriptor can be used as an asset descriptor in the associated MP table to identify the PLP carrying the Asset. The physical layer pipe identifier descriptor may further include BSID information in addition to PLP ID information. The BSID may be an ID of a broadcast stream that delivers an MMTP packet for an asset described by the descriptor.

Figure 8:
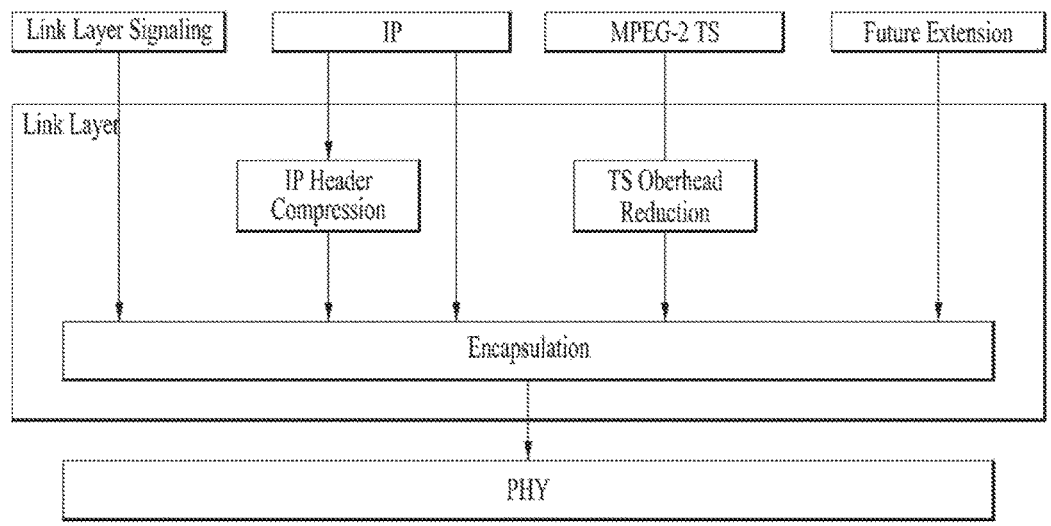
FIG. 8 illustrates a link layer protocol architecture according to an embodiment of the present invention.

FIG. 8 illustrates a link layer protocol architecture according to an embodiment of the present invention.

Hereinafter, a link layer will be described.

The link layer is the layer between the physical layer and the network layer, and transports the data from the network layer to the physical layer at the sending side and transports the data from the physical layer to the network layer at the receiving side. The purpose of the link layer includes abstracting all input packet types into a single format for processing by the physical layer, ensuring flexibility and future extensibility for as yet undefined input types. In addition, processing within the link layer ensures that the input data can be transmitted in an efficient manner, for example by providing options to compress redundant information in the headers of input packets. The operations of encapsulation, compression and so on are referred to as the link layer protocol and packets created using this protocol are called link layer packets. The link layer may perform functions such as packet encapsulation, overhead reduction and/or signaling transmission, etc.

Hereinafter, packet encapsulation will be described. Link Layer protocol allows encapsulation of any type of packet, including ones such as IP packets and MPEG-2 TS. Using Link Layer protocol, the physical layer need only process one single packet format, independent of the network layer protocol type (here we consider MPEG-2 TS packet as a kind of network layer packet.) Each network layer packet or input packet is transformed into the payload of a generic link layer packet. Additionally, concatenation and segmentation can be performed in order to use the physical layer resources efficiently when the input packet sizes are particularly small or large.

As described in the foregoing, segmentation may be used in packet encapsulation. When the network layer packet is too large to process easily in the physical layer, the network layer packet is divided into two or more segments. The link layer packet header includes protocol fields to perform segmentation on the sending side and reassembly on the receiving side. When the network layer packet is segmented, each segment can be encapsulated to link layer packet in the same order as original position in the network layer packet. Also each link layer packet which includes a segment of network layer packet can be transported to PHY layer consequently.

As described in the foregoing, concatenation may be used in packet encapsulation. When the network layer packet is small enough for the payload of a link layer packet to include several network layer packets, the link layer packet header includes protocol fields to perform concatenation. The concatenation is combining of multiple small sized network layer packets into one payload. When the network layer packets are concatenated, each network layer packet can be concatenated to payload of link layer packet in the same order as original input order. Also each packet which constructs a payload of link layer packet can be whole packet, not a segment of packet.

Hereinafter, overhead reduction will be described. Use of the link layer protocol can result in significant reduction in overhead for transport of data on the physical layer. The link layer protocol according to the present invention may provide IP overhead reduction and/or MPEG-2 TS overhead reduction. In IP overhead reduction, IP packets have a fixed header format, however some of the information which is needed in a communication environment may be redundant in a broadcast environment. Link Layer protocol provides mechanisms to reduce the broadcast overhead by compressing headers of IP packets. In MPEG-2 TS overhead reduction, Link Layer protocol provides sync byte removal, null packet deletion and/or common header removal (compression). First, sync byte removal provides an overhead reduction of one byte per TS packet, secondly a null packet deletion mechanism removes the 188 byte null TS packets in a manner that they can be re-inserted at the receiver and finally a common header removal mechanism.

For signaling transmission, in the link layer protocol, a particular format for the signaling packet may be provided for link layer signaling, which will be described below.

In the illustrated link layer protocol architecture according to an embodiment of the present invention, Link Layer protocol takes as input network layer packets such as IPv4, MPEG-2 TS and so on as input packets. Future extension indicates other packet types and protocol which is also possible to be input in link layer. Link layer protocol also specifies the format and signaling for any link layer signaling, including information about mapping to specific channel to the physical layer. Figure also shows how ALP incorporates mechanisms to improve the efficiency of transmission, via various header compression and deletion algorithms. In addition, the link layer protocol may basically encapsulate input packets.

Figure 9:
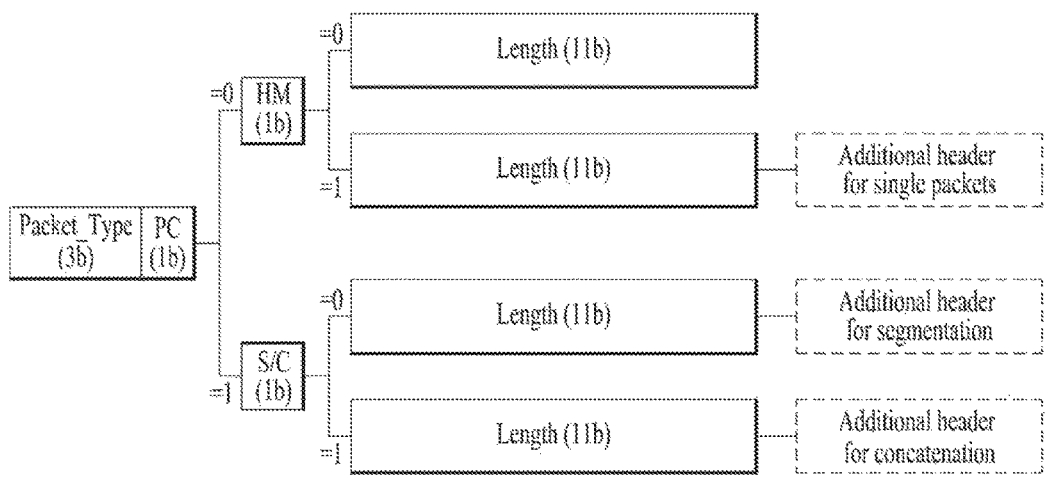
FIG. 9 illustrates a structure of a base header of a link layer packet according to an embodiment of the present invention. Hereinafter, the structure of the header will be described.

FIG. 9 illustrates a structure of a base header of a link layer packet according to an embodiment of the present invention. Hereinafter, the structure of the header will be described.

A link layer packet can include a header followed by the data payload. The header of a link layer packet can include a base header, and may include an additional header depending on the control fields of the base header. The presence of an optional header is indicated from flag fields of the additional header. According to a given embodiment, a field indicating the presence of an additional header and an optional header may be positioned in the base header.

Hereinafter, the structure of the base header will be described. The base header for link layer packet encapsulation has a hierarchical structure. The base header can be two bytes in length and is the minimum length of the link layer packet header.

The illustrated base header according to the present embodiment may include a Packet_Type field, a PC field and/or a length field. According to a given embodiment, the base header may further include an HM field or an S/C field.

Packet_Type field can be a 3-bit field that indicates the original protocol or packet type of the input data before encapsulation into a link layer packet. An IPv4 packet, a compressed IP packet, a link layer signaling packet, and other types of packets may have the base header structure and may be encapsulated. However, according to a given embodiment, the MPEG-2 TS packet may have a different particular structure, and may be encapsulated. When the value of Packet_Type is "000", "001" "100" or "111", that is the original data type of an ALP packet is one of an IPv4 packet, a compressed IP packet, link layer signaling or extension packet. When the MPEG-2 TS packet is encapsulated, the value of Packet_Type can be "010". Other values of the Packet_Type field may be reserved for future use.

Payload_Configuration (PC) field can be a 1-bit field that indicates the configuration of the payload. A value of 0 can indicate that the link layer packet carries a single, whole input packet and the following field is the Header_Mode field. A value of 1 can indicate that the link layer packet carries more than one input packet (concatenation) or a part of a large input packet (segmentation) and the following field is the Segmentation_Concatenation field.

Header_Mode (HM) field can be a 1-bit field, when set to 0, that can indicate there is no additional header, and that the length of the payload of the link layer packet is less than 2048 bytes. This value may be varied depending on embodiments. A value of 1 can indicate that an additional header for single packet defined below is present following the Length field. In this case, the length of the payload is larger than 2047 bytes and/or optional features can be used (sub-stream identification, header extension, etc.). This value may be varied depending on embodiments. This field can be present only when Payload_Configuration field of the link layer packet has a value of 0.

Segmentation_Concatenation (S/C) field can be a 1-bit field, when set to 0, that can indicate that the payload carries a segment of an input packet and an Additional header for segmentation defined below is present following the Length field. A value of 1 can indicate that the payload carries more than one complete input packet and an Additional header for concatenation defined below is present following the Length field. This field can be present only when the value of Payload_Configuration field of the ALP packet is 1.

Length field can be a 11-bit field that indicates the 11 least significant bits (LSBs) of the length in bytes of payload carried by the link layer packet. When there is a Length_MSB field in the following additional header, the Length field is concatenated with the Length_MSB field, and is the LSB to provide the actual total length of the payload. The number of bits of the length field may be changed to another value rather than 11 bits.

Following types of packet configuration are thus possible: a single packet without any additional header, a single packet with an additional header, a segmented packet and a concatenated packet. According to a given embodiment, more packet configurations may be made through a combination of each additional header, an optional header, an additional header for signaling information to be described below, and an additional header for time extension.

Figure 10:
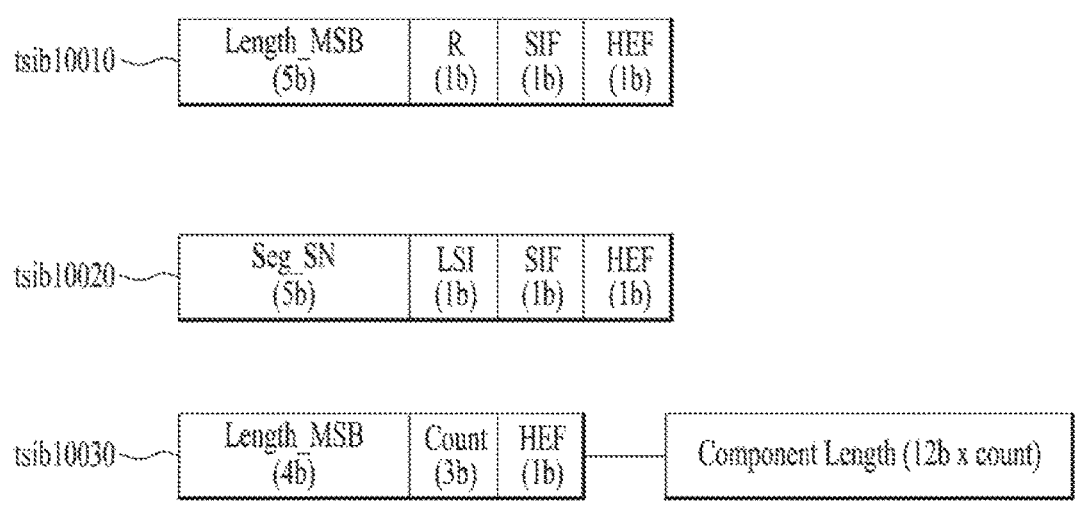
FIG. 10 illustrates a structure of an additional header of a link layer packet according to an embodiment of the present invention.

FIG. 10 illustrates a structure of an additional header of a link layer packet according to an embodiment of the present invention.

Various types of additional headers may be present. Hereinafter, a description will be given of an additional header for a single packet.

This additional header for single packet can be present when Header_Mode (HM)="1". The Header_Mode (HM) can be set to 1 when the length of the payload of the link layer packet is larger than 2047 bytes or when the optional fields are used. The additional header for single packet is shown in Figure (tsib10010).

Length_MSB field can be a 5-bit field that can indicate the most significant bits (MSBs) of the total payload length in bytes in the current link layer packet, and is concatenated with the Length field containing the 11 least significant bits (LSBs) to obtain the total payload length. The maximum length of the payload that can be signaled is therefore 65535 bytes. The number of bits of the length field may be changed to another value rather than 11 bits. In addition, the number of bits of the Length_MSB field may be changed, and thus a maximum expressible payload length may be changed. According to a given embodiment, each length field may indicate a length of a whole link layer packet rather than a payload.

SIF (Sub-stream Identifier Flag) field can be a 1-bit field that can indicate whether the sub-stream ID (SID) is present after the HEF field or not. When there is no SID in this link layer packet, SIF field can be set to 0. When there is a SID after HEF field in the link layer packet, SIF can be set to 1. The detail of SID is described below.

HEF (Header Extension Flag) field can be a 1-bit field that can indicate, when set to 1 additional header is present for future extension. A value of 0 can indicate that this extension header is not present.

Hereinafter, a description will be given of an additional header when segmentation is used.

This additional header (tsib10020) can be present when Segmentation_Concatenation (S/C)="0". Segment Sequence Number can be a 5-bit unsigned integer that can indicate the order of the corresponding segment carried by the link layer packet. For the link layer packet which carries the first segment of an input packet, the value of this field can be set to 0x0. This field can be incremented by one with each additional segment belonging to the segmented input packet.

Last_Segment_Indicator (LSI) can be a 1-bit field that can indicate, when set to 1, that the segment in this payload is the last one of input packet. A value of 0, can indicate that it is not last segment.

SIF (Sub-stream Identifier Flag) can be a 1-bit field that can indicate whether the SID is present after the HEF field or not. When there is no SID in the link layer packet, SIF field can be set to 0. When there is a SID after the HEF field in the link layer packet, SIF can be set to 1.

HEF (Header Extension Flag) can be a This 1-bit field that can indicate, when set to 1, that the optional header extension is present after the additional header for future extensions of the link layer header. A value of 0 can indicate that optional header extension is not present.

According to a given embodiment, a packet ID field may be additionally provided to indicate that each segment is generated from the same input packet. This field may be unnecessary and thus be omitted when segments are transmitted in order.

Hereinafter, a description will be given of an additional header when concatenation is used.

This additional header (tsib10030) can be present when Segmentation_Concatenation (S/C)="1".

Length_MSB can be a 4-bit field that can indicate MSB bits of the payload length in bytes in this link layer packet. The maximum length of the payload is 32767 bytes for concatenation. As described in the foregoing, a specific numeric value may be changed.

Count can be a field that can indicate the number of the packets included in the link layer packet. The number of the packets included in the link layer packet, 2 can be set to this field. So, its maximum value of concatenated packets in a link layer packet is 9. A scheme in which the count field indicates the number may be varied depending on embodiments. That is, the numbers from 1 to 8 may be indicated.

HEF (Header Extension Flag) can be a 1-bit field that can indicate, when set to 1 the optional header extension is present after the additional header for future extensions of the link layer header. A value of 0, can indicate extension header is not present.

Component_Length can be a is 12-bit length field that can indicate the length in byte of each packet. Component_Length fields are included in the same order as the packets present in the payload except last component packet. The number of length field can be indicated by (Count+1). According to a given embodiment, length fields, the number of which is the same as a value of the count field, may be present. When a link layer header consists of an odd number of Component_Length, four stuffing bits can follow after the last Component_Length field. These bits can be set to 0. According to a given embodiment, a Component length field indicating a length of a last concatenated input packet may not be present. In this case, the length of the last concatenated input packet may correspond to a length obtained by subtracting a sum of values indicated by respective Component_length fields from a whole payload length.

Hereinafter, the optional header will be described.

As described in the foregoing, the optional header may be added to a rear of the additional header. The optional header field can contain SID and/or header extension. The SID is used to filter out specific packet stream in the link layer level. One example of SID is the role of service identifier in a link layer stream carrying multiple services. The mapping information between a service and the SID value corresponding to the service can be provided in the SLT, if applicable. The header extension contains extended field for future use. Receivers can ignore any header extensions which they do not understand.

SID (Sub-stream Identifier) can be a 8-bit field that can indicate the sub stream identifier for the link layer packet. If there is optional header extension, SID present between additional header and optional header extension.

Header_Extension ( ) can include the fields defined below.

Extension_Type can be a 8-bit field that can indicate the type of the Header_Extension ( ).

Extension Length can be a 8-bit field that can indicate the length of the Header Extension ( ) in bytes counting from the next byte to the last byte of the Header_Extension ( ).

Extension_Byte can be a byte representing the value of the Header_Extension ( ).

Figure 11:
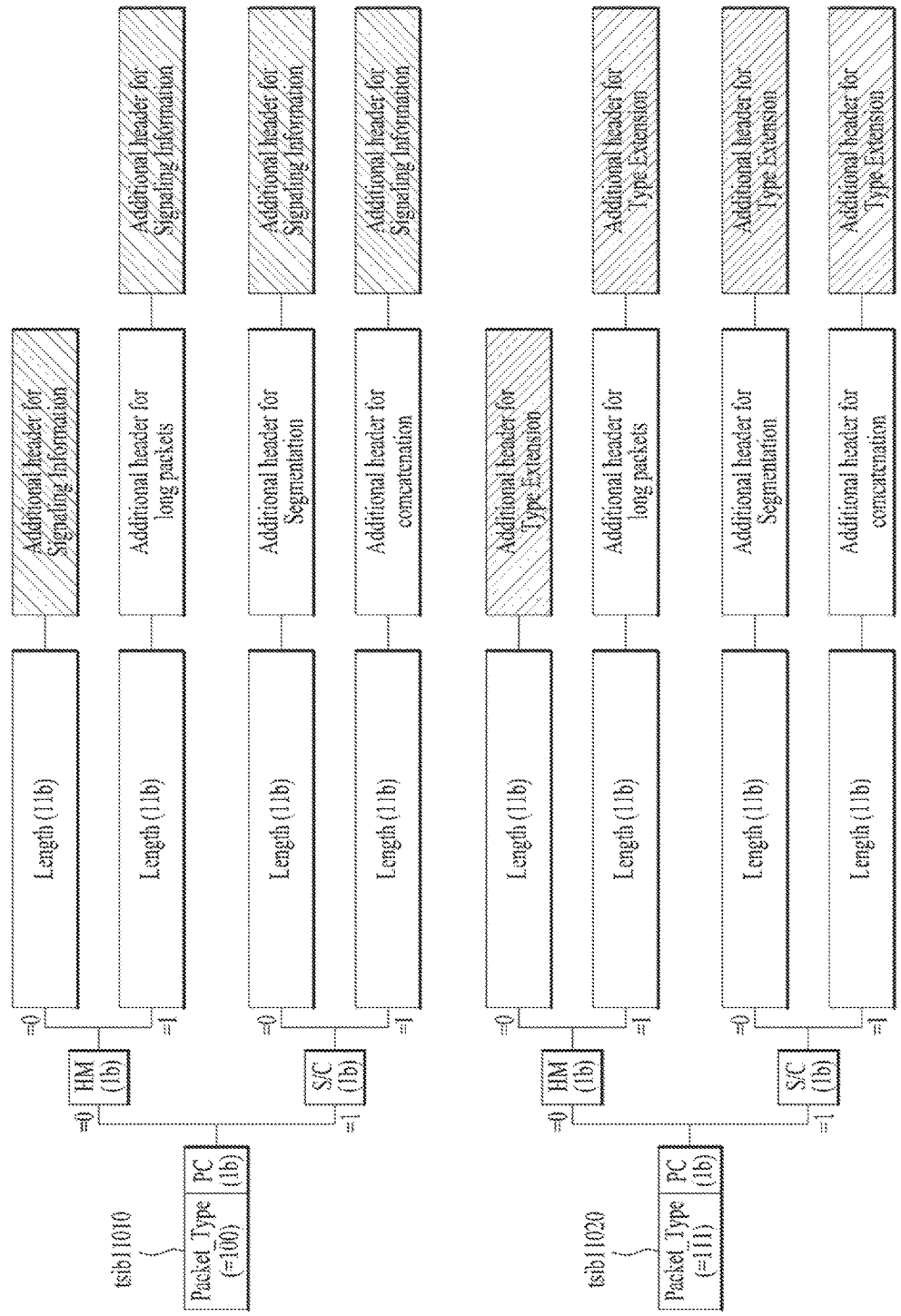
FIG. 11 illustrates a structure of an additional header of a link layer packet according to another embodiment of the present invention.

FIG. 11 illustrates a structure of an additional header of a link layer packet according to another embodiment of the present invention.

Hereinafter, a description will be given of an additional header for signaling information.

How link layer signaling is incorporated into link layer packets are as follows. Signaling packets are identified by when the Packet_Type field of the base header is equal to 100.

Figure (tsib11010) shows the structure of the link layer packets containing additional header for signaling information. In addition to the link layer header, the link layer packet can consist of two additional parts, additional header for signaling information and the actual signaling data itself. The total length of the link layer signaling packet is shown in the link layer packet header.

The additional header for signaling information can include following fields. According to a given embodiment, some fields may be omitted.

Signaling_Type can be a 8-bit field that can indicate the type of signaling.

Signaling_Type_Extension can be a 16-bit filed that can indicate the attribute of the signaling. Detail of this field can be defined in signaling specification.

Signaling_Version can be a 8-bit field that can indicate the version of signaling.

Signaling_Format can be a 2-bit field that can indicate the data format of the signaling data. Here, a signaling format may refer to a data format such as a binary format, an XML, format, etc.

Signaling_Encoding can be a 2-bit field that can specify the encoding/compression format. This field may indicate whether compression is not performed and which type of compression is performed.

Hereinafter, a description will be given of an additional header for packet type extension.

In order to provide a mechanism to allow an almost unlimited number of additional protocol and packet types to be carried by link layer in the future, the additional header is defined. Packet type extension can be used when Packet type is 111 in the base header as described above. Figure (tsib11020) shows the structure of the link layer packets containing additional header for type extension.

The additional header for type extension can include following fields. According to a given embodiment, some fields may be omitted.

extended_type can be a 16-bit field that can indicate the protocol or packet type of the input encapsulated in the link layer packet as payload. This field can not be used for any protocol or packet type already defined by Packet_Type field.

Figure 12:
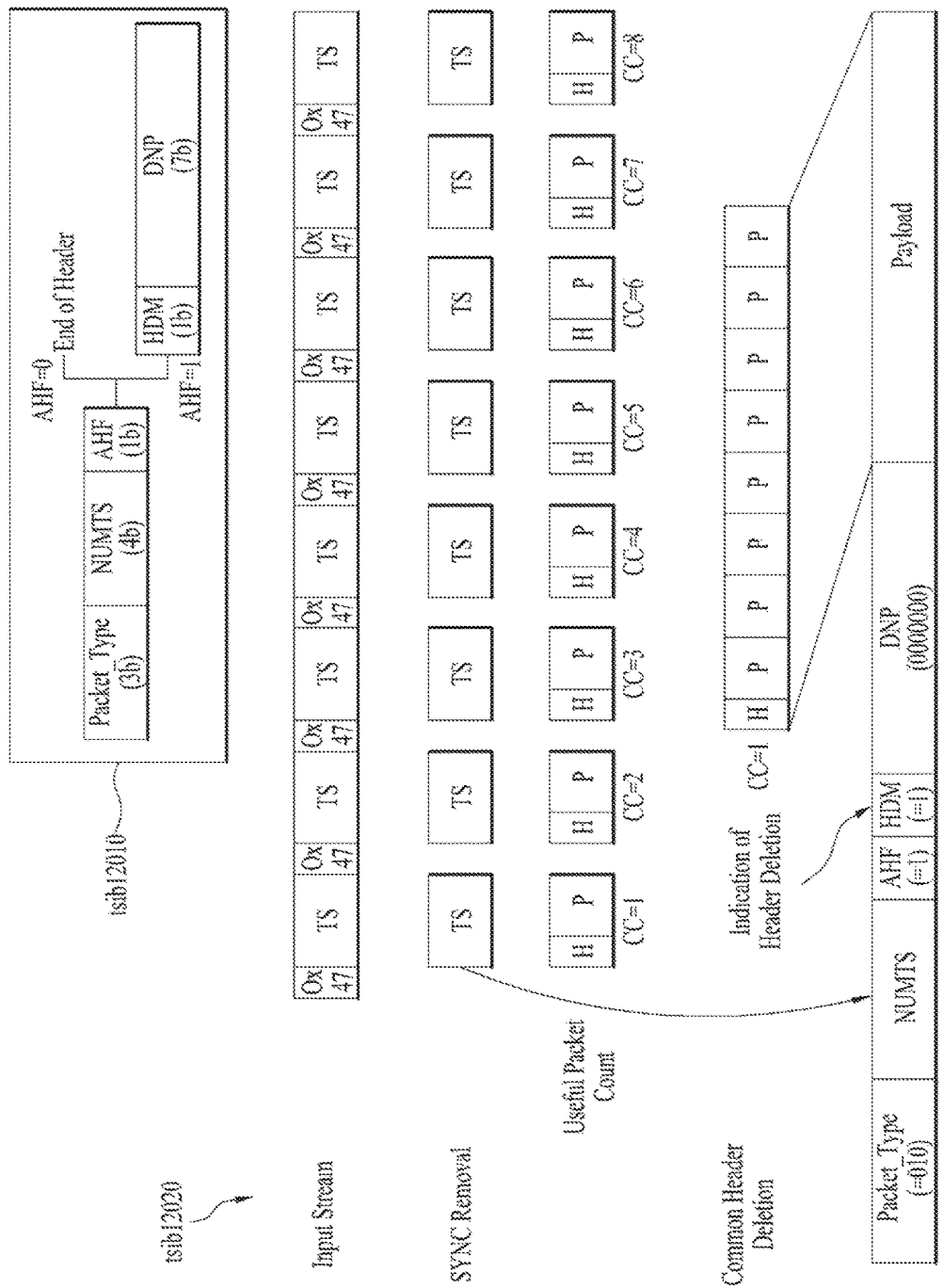
FIG. 12 illustrates a header structure of a link layer packet for an MPEG-2 TS packet and an encapsulation process thereof according to an embodiment of the present invention.

FIG. 12 illustrates a header structure of a link layer packet for an MPEG-2 TS packet and an encapsulation process thereof according to an embodiment of the present invention.

Hereinafter, a description will be given of a format of the link layer packet when the MPEG-2 TS packet is input as an input packet.

In this case, the Packet_Type field of the base header is equal to 010. Multiple TS packets can be encapsulated within each link layer packet. The number of TS packets is signaled via the NUMTS field. In this case, as described in the foregoing, a particular link layer packet header format may be used.

Link layer provides overhead reduction mechanisms for MPEG-2 TS to enhance the transmission efficiency. The sync byte (0x47) of each TS packet can be deleted. The option to delete NULL packets and similar TS headers is also provided.

In order to avoid unnecessary transmission overhead, TS null packets (PID=0x1FFF) may be removed. Deleted null packets can be recovered in receiver side using DNP field. The DNP field indicates the count of deleted null packets. Null packet deletion mechanism using DNP field is described below.

In order to achieve more transmission efficiency, similar header of MPEG-2 TS packets can be removed. When two or more successive TS packets have sequentially increased continuity counter fields and other header fields are the same, the header is sent once at the first packet and the other headers are deleted. HDM field can indicate whether the header deletion is performed or not. Detailed procedure of common TS header deletion is described below.

When all three overhead reduction mechanisms are performed, overhead reduction can be performed in sequence of sync removal, null packet deletion, and common header deletion. According to a given embodiment, a performance order of respective mechanisms may be changed. In addition, some mechanisms may be omitted according to a given embodiment.

The overall structure of the link layer packet header when using MPEG-2 TS packet encapsulation is depicted in Figure (tsib12010).

Hereinafter, a description will be given of each illustrated field. Packet_Type can be a 3-bit field that can indicate the protocol type of input packet as describe above. For MPEG-2 TS packet encapsulation, this field can always be set to 010.

NUMTS (Number of TS packets) can be a 4-bit field that can indicate the number of TS packets in the payload of this link layer packet. A maximum of 16 TS packets can be supported in one link layer packet. The value of NUMTS=0 can indicate that 16 TS packets are carried by the payload of the link layer packet. For all other values of NUMTS, the same number of TS packets are recognized, e.g. NUMTS=0001 means one TS packet is carried.

AHF (Additional Header Flag) can be a field that can indicate whether the additional header is present of not. A value of 0 indicates that there is no additional header. A value of 1 indicates that an additional header of length 1-byte is present following the base header. If null TS packets are deleted or TS header compression is applied this field can be set to 1. The additional header for TS packet encapsulation consists of the following two fields and is present only when the value of AHF in this link layer packet is set to 1.

HDM (Header Deletion Mode) can be a 1-bit field that indicates whether TS header deletion can be applied to this link layer packet. A value of 1 indicates that TS header deletion can be applied. A value of "0" indicates that the TS header deletion method is not applied to this link layer packet.

DNP (Deleted Null Packets) can be a 7-bit field that indicates the number of deleted null TS packets prior to this link layer packet. A maximum of 128 null TS packets can be deleted. When HDM=0 the value of DNP=0 can indicate that 128 null packets are deleted. When HDM=1 the value of DNP=0 can indicate that no null packets are deleted. For all other values of DNP, the same number of null packets are recognized, e.g. DNP=5 means 5 null packets are deleted.

The number of bits of each field described above may be changed. According to the changed number of bits, a minimum/maximum value of a value indicated by the field may be changed. These numbers may be changed by a designer.

Hereinafter, SYNC byte removal will be described.

When encapsulating TS packets into the payload of a link layer packet, the SYNC byte (0x47) from the start of each TS packet can be deleted. Hence the length of the MPEG2-TS packet encapsulated in the payload of the link layer packet is always of length 187 bytes (instead of 188 bytes originally).

Hereinafter, null packet deletion will be described.

Transport Stream rules require that bit rates at the output of a transmitter's multiplexer and at the input of the receiver's de-multiplexer are constant in time and the end-to-end delay is also constant. For some Transport Stream input signals, null packets may be present in order to accommodate variable bitrate services in a constant bitrate stream. In this case, in order to avoid unnecessary transmission overhead, TS null packets (that is TS packets with PID=0x1FFF) may be removed. The process is carried-out in a way that the removed null packets can be re-inserted in the receiver in the exact place where they were originally, thus guaranteeing constant bitrate and avoiding the need for PCR time stamp updating.

Before generation of a link layer packet, a counter called DNP (Deleted Null-Packets) can first be reset to zero and then incremented for each deleted null packet preceding the first non-null TS packet to be encapsulated into the payload of the current link layer packet. Then a group of consecutive useful TS packets is encapsulated into the payload of the current link layer packet and the value of each field in its header can be determined. After the generated link layer packet is injected to the physical layer, the DNP is reset to zero. When DNP reaches its maximum allowed value, if the next packet is also a null packet, this null packet is kept as a useful packet and encapsulated into the payload of the next link layer packet. Each link layer packet can contain at least one useful TS packet in its payload.

Hereinafter, TS packet header deletion will be described. TS packet header deletion may be referred to as TS packet header compression.

When two or more successive TS packets have sequentially increased continuity counter fields and other header fields are the same, the header is sent once at the first packet and the other headers are deleted. When the duplicated MPEG-2 TS packets are included in two or more successive TS packets, header deletion can not be applied in transmitter side. HDM field can indicate whether the header deletion is performed or not. When TS header deletion is performed, HDM can be set to 1. In the receiver side, using the first packet header, the deleted packet headers are recovered, and the continuity counter is restored by increasing it in order from that of the first header.

An example tsib12020 illustrated in the figure is an example of a process in which an input stream of a TS packet is encapsulated into a link layer packet. First, a TS stream including TS packets having SYNC byte (0x47) may be input. First, sync bytes may be deleted through a sync byte deletion process. In this example, it is presumed that null packet deletion is not performed.

Here, it is presumed that packet headers of eight TS packets have the same field values except for CC, that is, a continuity counter field value. In this case, TS packet deletion/compression may be performed. Seven remaining TS packet headers are deleted except for a first TS packet header corresponding to CC=1. The processed TS packets may be encapsulated into a payload of the link layer packet.

In a completed link layer packet, a Packet_Type field corresponds to a case in which TS packets are input, and thus may have a value of 010. A NUMTS field may indicate the number of encapsulated TS packets. An AHF field may be set to 1 to indicate the presence of an additional header since packet header deletion is performed. An HDM field may be set to 1 since header deletion is performed. DNP may be set to 0 since null packet deletion is not performed.

FIG. 13 illustrates an example of adaptation modes in IP header compression according to an embodiment of the present invention (transmitting side).

Hereinafter, IP header compression will be described.

In the link layer, IP header compression/decompression scheme can be provided. IP header compression can include two parts: header compressor/decompressor and adaptation module. The header compression scheme can be based on the Robust Header Compression (ROHC). In addition, for broadcasting usage, adaptation function is added.

In the transmitter side, ROHC Compressor reduces the size of header for each packet. Then, Adaptation module extracts context information and builds signaling information from each packet stream. In the receiver side, adaptation module parses the signaling information associated with the received packet stream and attaches context information to the received packet stream. ROHC decompressor reconstructs the original IP packet by recovering the packet header.

The header compression scheme can be based on the RoHC as described above, In particular, in the present system, an RoHC framework can operate in a unidirectional mode (U mode) of the RoHC. In addition, in the present system, it is possible to use an RoHC UDP header compression profile which is identified by a profile identifier of 0x0002.

Hereinafter, adaptation will be described.

In case of transmission through the unidirectional link, if a receiver has no information of context, decompressor cannot recover the received packet header until receiving full context. This may cause channel change delay and turn on delay. For this reason, context information and configuration parameters between compressor and decompressor can be always sent with packet flow.

The Adaptation function provides out-of-band transmission of the configuration parameters and context information. Out-of-band transmission can be done through the link layer signaling. Therefore, the Adaptation function is used to reduce the channel change delay and decompression error due to loss of context information.

Hereinafter, extraction of context information will be described.

Context information may be extracted using various schemes according to adaptation mode. In the present invention, three examples will be described below. The scope of the present invention is not restricted to the examples of the adaptation mode to be described below. Here, the adaptation mode may be referred to as a context extraction mode.

Adaptation Mode 1 (not illustrated) may be a mode in which no additional operation is applied to a basic RoHC packet stream. In other words, the adaptation module may operate as a buffer in this mode. Therefore, in this mode, context information may not be included in link layer signaling.

In Adaptation Mode 2 (tsib13010), the adaptation module can detect the IR packet from ROHC packet flow and extract the context information (static chain). After extracting the context information, each IR packet can be converted to an IR-DYN packet. The converted IR-DYN packet can be included and transmitted inside the ROHC packet flow in the same order as IR packet, replacing the original packet.

In Adaptation Mode 3 (tsib13020), the adaptation module can detect the IR and IR-DYN packet from ROHC packet flow and extract the context information. The static chain and dynamic chain can be extracted from IR packet and dynamic chain can be extracted from IR-DYN packet. After extracting the context information, each IR and IR-DYN packet can be converted to a compressed packet. The compressed packet format can be the same with the next packet of IR or IR-DYN packet. The converted compressed packet can be included and transmitted inside the ROHC packet flow in the same order as IR or IR-DYN packet, replacing the original packet.

Signaling (Context) information can be encapsulated based on transmission structure. For example, context information can be encapsulated to the link layer signaling. In this case, the packet type value can be set to '100'.

In the above-described Adaptation Modes 2 and 3, a link layer packet for context information may have a packet type field value of 100. In addition, a link layer packet for compressed IP packets may have a packet type field value of 001. The values indicate that each of the signaling information and the compressed IP packets are included in the link layer packet as described above.

Hereinafter, a description will be given of a method of transmitting the extracted context information.

The extracted context information can be transmitted separately from ROHC packet flow, with signaling data through specific physical data path. The transmission of context depends on the configuration of the physical layer path. The context information can be sent with other link layer signaling through the signaling data pipe.

In other words, the link layer packet having the context information may be transmitted through a signaling PLP together with link layer packets having other link layer signaling information (Packet_Type=100). Compressed IP packets from which context information is extracted may be transmitted through a general PLP (Packet_Type=001). Here, depending on embodiments, the signaling PLP may refer to an L1 signaling path. In addition, depending on embodiments, the signaling PLP may not be separated from the general PLP, and may refer to a particular and general PLP through which the signaling information is transmitted.

At a receiving side, prior to reception of a packet stream, a receiver may need to acquire signaling information. When receiver decodes initial PLP to acquire the signaling information, the context signaling can be also received. After the signaling acquisition is done, the PLP to receive packet stream can be selected. In other words, the receiver may acquire the signaling information including the context information by selecting the initial PLP. Here, the initial PLP may be the above-described signaling PLP. Thereafter, the receiver may select a PLP for acquiring a packet stream. In this way, the context information may be acquired prior to reception of the packet stream.

After the PLP for acquiring the packet stream is selected, the adaptation module can detect IR-DYN packet form received packet flow. Then, the adaptation module parses the static chain from the context information in the signaling data. This is similar to receiving the IR packet. For the same context identifier, IR-DYN packet can be recovered to IR packet. Recovered ROHC packet flow can be sent to ROHC decompressor. Thereafter, decompression may be started.

FIG. 14 illustrates a link mapping table (LMT) and an RoHC-U description table according to an embodiment of the present invention.

Hereinafter, link layer signaling will be described.

Generally, link layer signaling is operates under IP level. In the receiver side, link layer signaling can be obtained earlier than IP level signaling such as Service List Table (SLT) and Service Layer Signaling (SLS). Therefore, link layer signaling can be obtained before session establishment.

For link layer signaling, there can be two kinds of signaling according input path: internal link layer signaling and external link layer signaling. The internal link layer signaling is generated in link layer at transmitter side. And the link layer takes the signaling from external module or protocol. This kind of signaling information is considered as external link layer signaling. If some signaling need to be obtained prior to IP level signaling, external signaling is transmitted in format of link layer packet.

The link layer signaling can be encapsulated into link layer packet as described above. The link layer packets can carry any format of link layer signaling, including binary and XML. The same signaling information may not be transmitted in different formats for the link layer signaling.

Internal link layer signaling may include signaling information for link mapping. The Link Mapping Table (LMT) provides a list of upper layer sessions carried in a PLP. The LMT also provides addition information for processing the link layer packets carrying the upper layer sessions in the link layer.

An example of the LMT (tsib14010) according to the present invention is illustrated.

signaling_type can be an 8-bit unsigned integer field that indicates the type of signaling carried by this table. The value of signaling_type field for Link Mapping Table (LMT) can be set to 0x01.

PLP_ID can be an 8-bit field that indicates the PLP corresponding to this table.

num_session can be an 8-bit unsigned integer field that provides the number of upper layer sessions carried in the PLP identified by the above PLP_ID field. When the value of signaling_type field is 0x01, this field can indicate the number of UDP/IP sessions in the PLP.

src_IP_add can be a 32-bit unsigned integer field that contains the source IP address of an upper layer session carried in the PLP identified by the PLP_ID field.

dst_IP_add can be a 32-bit unsigned integer field that contains the destination IP address of an upper layer session carried in the PLP identified by the PLP_ID field.

UDP_port can be a 16-bit unsigned integer field that represents the source UDP port number of an upper layer session carried in the PLP identified by the PLP_ID field.

dst_UDP_port can be a 16-bit unsigned integer field that represents the destination UDP port number of an upper layer session carried in the PLP identified by the PLP_ID field.

SID_ flag can be a 1-bit Boolean field that indicates whether the link layer packet carrying the upper layer session identified by above 4 fields, Src_IP_add, Dst_IP_add, Src_UDP_Port and Dst_UDP_Port, has an SID field in its optional header. When the value of this field is set to 0, the link layer packet carrying the upper layer session may not have an SID field in its optional header. When the value of this field is set to 1, the link layer packet carrying the upper layer session can have an SID field in its optional header and the value the SID field can be same as the following SID field in this table.

compressed_flag can be a 1-bit Boolean field that indicates whether the header compression is applied the link layer packets carrying the upper layer session identified by above 4 fields, Src_IP_add, Dst_IP_add, Src_UDP_Port and Dst_UDP_Port. When the value of this field is set to 0, the link layer packet carrying the upper layer session may have a value of 0x00 of Packet_Type field in its base header. When the value of this field is set to 1, the link layer packet carrying the upper layer session may have a value of 0x01 of Packet_Type field in its base header and the Context_ID field can be present.

SID can be an 8-bit unsigned integer field that indicates sub-stream identifier for the link layer packets carrying the upper layer session identified by above 4 fields, Src_IP_add, Dst_IP_add, Src_UDP_Port and Dst_UDP_Port. This field can be present when the value of SID_flag is equal to 1.

context_id can be an 8-bit field that provides a reference for the context id (CID) provided in the ROHC-U description table. This field can be present when the value of compressed_flag is equal to 1.

An example of the RoHC-U description table (tsib14020) according to the present invention is illustrated. As described in the foregoing, the RoHC-U adaptation module may generate information related to header compression.

signaling_type can be an 8-bit field that indicates the type of signaling carried by this table. The value of signaling_type field for ROHC-U description table (RDT) can be set to "0x02".

PLP_ID can be an 8-bit field that indicates the PLP corresponding to this table.

context_id can be an 8-bit field that indicates the context id (CID) of the compressed IP stream. In this system, 8-bit CID can be used for large CID.

context_profile can be an 8-bit field that indicates the range of protocols used to compress the stream. This field can be omitted.

adaptation_mode can be a 2-bit field that indicates the mode of adaptation module in this PLP. Adaptation modes have been described above.

context_config can be a 2-bit field that indicates the combination of the context information. If there is no context information in this table, this field may be set to '0x0'. If the static chain( ) or dynamic chain( ) byte is included in this table, this field may be set to '0x01' or '0x02' respectively. If both of the static chain( ) and dynamic chain( ) byte are included in this table, this field may be set to '0x03'.

context_length can be an 8-bit field that indicates the length of the static chain byte sequence. This field can be omitted.

static_chain_byte ( ) can be a field that conveys the static information used to initialize the ROHC-U decompressor. The size and structure of this field depend on the context profile.

dynamic_chain_byte ( ) can be a field that conveys the dynamic information used to initialize the ROHC-U decompressor. The size and structure of this field depend on the context profile.

The static_chain_byte can be defined as sub-header information of IR packet. The dynamic_chain_byte can be defined as sub-header information of IR packet and IR-DYN packet.

Figure 15:
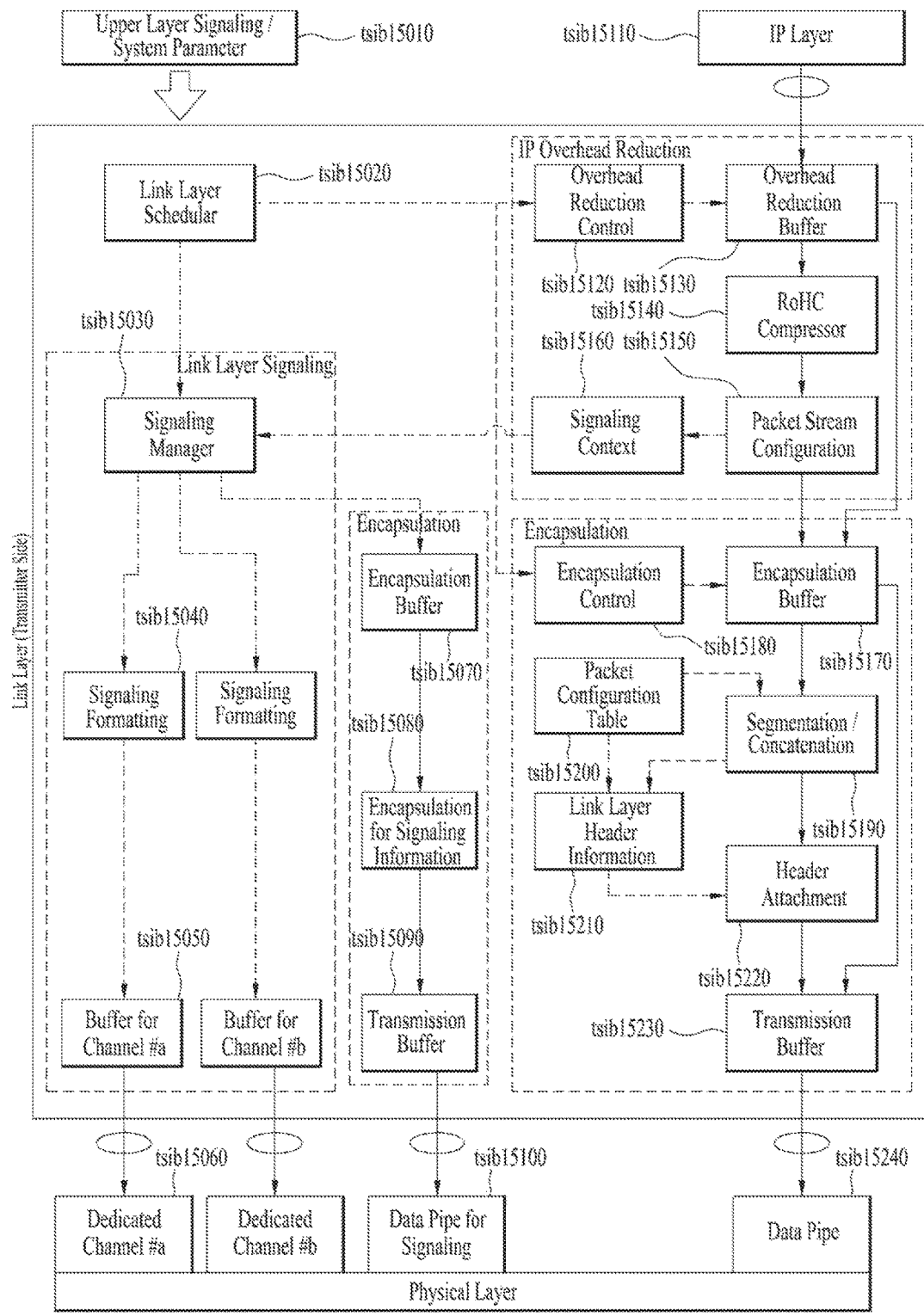
FIG. 15 illustrates a structure of a link layer on a transmitter side according to an embodiment of the present invention.

FIG. 15 illustrates a structure of a link layer on a transmitter side according to an embodiment of the present invention.

The present embodiment presumes that an IP packet is processed. From a functional point of view, the link layer on the transmitter side may broadly include a link layer signaling part in which signaling information is processed, an overhead reduction part, and/or an encapsulation part. In addition, the link layer on the transmitter side may include a scheduler for controlling and scheduling an overall operation of the link layer and/or input and output parts of the link layer.

First, signaling information of an upper layer and/or a system parameter tsib15010 may be delivered to the link layer. In addition, an IP stream including IP packets may be delivered to the link layer from an IP layer tsib15110.

As described above, the scheduler tsib15020 may determine and control operations of several modules included in the link layer. The delivered signaling information and/or system parameter tsib15010 may be filterer or used by the scheduler tsib15020. Information, which corresponds to a part of the delivered signaling information and/or system parameter tsib15010, necessary for a receiver may be delivered to the link layer signaling part. In addition, information, which corresponds to a part of the signaling information, necessary for an operation of the link layer may be delivered to an overhead reduction controller tsib15120 or an encapsulation controller tsib15180.

The link layer signaling part may collect information to be transmitted as a signal in a physical layer, and convert/configure the information in a form suitable for transmission. The link layer signaling part may include a signaling manager tsib15030, a signaling formatter tsib15040, and/or a buffer for channels tsib15050.

The signaling manager tsib15030 may receive signaling information delivered from the scheduler tsib15020 and/or signaling (and/or context) information delivered from the overhead reduction part. The signaling manager tsib15030 may determine a path for transmission of the signaling information for delivered data. The signaling information may be delivered through the path determined by the signaling manager tsib15030. As described in the foregoing, signaling information to be transmitted through a divided channel such as the FIC, the EAS, etc. may be delivered to the signaling formatter tsib15040, and other signaling information may be delivered to an encapsulation buffer tsib15070.

The signaling formatter tsib15040 may format related signaling information in a form suitable for each divided channel such that signaling information may be transmitted through a separately divided channel. As described in the foregoing, the physical layer may include separate physically/logically divided channels. The divided channels may be used to transmit FIC signaling information or EAS-related information. The FIC or EAS-related information may be sorted by the signaling manager tsib15030, and input to the signaling formatter tsib15040. The signaling formatter tsib15040 may format the information based on each separate channel. When the physical layer is designed to transmit particular signaling information through a separately divided channel other than the FIC and the EAS, a signaling formatter for the particular signaling information may be additionally provided. Through this scheme, the link layer may be compatible with various physical layers.

The buffer for channels tsib15050 may deliver the signaling information received from the signaling formatter tsib15040 to separate dedicated channels tsib15060. The number and content of the separate channels may vary depending on embodiments.

As described in the foregoing, the signaling manager tsib15030 may deliver signaling information, which is not delivered to a particular channel, to the encapsulation buffer tsib15070. The encapsulation buffer tsib15070 may function as a buffer that receives the signaling information which is not delivered to the particular channel.

An encapsulation block for signaling information tsib15080 may encapsulate the signaling information which is not delivered to the particular channel. A transmission buffer tsib15090 may function as a buffer that delivers the encapsulated signaling information to a DP for signaling information tsib15100. Here, the DP for signaling information tsib15100 may refer to the above-described PLS region.

The overhead reduction part may allow efficient transmission by removing overhead of packets delivered to the link layer. It is possible to configure overhead reduction parts corresponding to the number of IP streams input to the link layer.

An overhead reduction buffer tsib15130 may receive an IP packet delivered from an upper layer. The received IP packet may be input to the overhead reduction part through the overhead reduction buffer tsib15130.

An overhead reduction controller tsib15120 may determine whether to perform overhead reduction on a packet stream input to the overhead reduction buffer tsib15130. The overhead reduction controller tsib15120 may determine whether to perform overhead reduction for each packet stream. When overhead reduction is performed on a packet stream, packets may be delivered to a robust header compression (RoHC) compressor tsib15140 to perform overhead reduction. When overhead reduction is not performed on a packet stream, packets may be delivered to the encapsulation part to perform encapsulation without overhead reduction. Whether to perform overhead reduction of packets may be determined based on the signaling information tsib15010 delivered to the link layer. The signaling information may be delivered to the encapsulation controller tsib15180 by the scheduler tsib15020.

The RoHC compressor tsib15140 may perform overhead reduction on a packet stream. The RoHC compressor tsib15140 may perform an operation of compressing a header of a packet. Various schemes may be used for overhead reduction. Overhead reduction may be performed using a scheme proposed by the present invention. The present invention presumes an IP stream, and thus an expression "RoHC compressor" is used. However, the name may be changed depending on embodiments. The operation is not restricted to compression of the IP stream, and overhead reduction of all types of packets may be performed by the RoHC compressor tsib15140.

A packet stream configuration block tsib15150 may separate information to be transmitted to a signaling region and information to be transmitted to a packet stream from IP packets having compressed headers. The information to be transmitted to the packet stream may refer to information to be transmitted to a DP region. The information to be transmitted to the signaling region may be delivered to a signaling and/or context controller tsib15160. The information to be transmitted to the packet stream may be transmitted to the encapsulation part.

The signaling and/or context controller tsib15160 may collect signaling and/or context information and deliver the signaling and/or context information to the signaling manager in order to transmit the signaling and/or context information to the signaling region.

The encapsulation part may perform an operation of encapsulating packets in a form suitable for a delivery to the physical layer. It is possible to configure encapsulation parts corresponding to the number of IP streams.

An encapsulation buffer tsib15170 may receive a packet stream for encapsulation. Packets subjected to overhead reduction may be received when overhead reduction is performed, and an input IP packet may be received without change when overhead reduction is not performed.

An encapsulation controller tsib15180 may determine whether to encapsulate an input packet stream. When encapsulation is performed, the packet stream may be delivered to a segmentation/concatenation block tsib15190. When encapsulation is not performed, the packet stream may be delivered to a transmission buffer tsib15230. Whether to encapsulate packets may be determined based on the signaling information tsib15010 delivered to the link layer. The signaling information may be delivered to the encapsulation controller tsib15180 by the scheduler tsib15020.

In the segmentation/concatenation block tsib15190, the above-described segmentation or concatenation operation may be performed on packets. In other words, when an input IP packet is longer than a link layer packet corresponding to an output of the link layer, one IP packet may be segmented into several segments to configure a plurality of link layer packet payloads. On the other hand, when an input IP packet is shorter than a link layer packet corresponding to an output of the link layer, several IP packets may be concatenated to configure one link layer packet payload.

A packet configuration table tsib15200 may have configuration information of a segmented and/or concatenated link layer packet. A transmitter and a receiver may have the same information in the packet configuration table tsib15200. The transmitter and the receiver may refer to the information of the packet configuration table tsib15200. An index value of the information of the packet configuration table tsib15200 may be included in a header of the link layer packet.

A link layer header information block tsib15210 may collect header information generated in an encapsulation process. In addition, the link layer header information block tsib15210 may collect header information included in the packet configuration table tsib15200. The link layer header information block tsib15210 may configure header information according to a header structure of the link layer packet.

A header attachment block tsib15220 may add a header to a payload of a segmented and/or concatenated link layer packet. The transmission buffer tsib15230 may function as a buffer to deliver the link layer packet to a DP tsib15240 of the physical layer.

The respective blocks, modules, or parts may be configured as one module/protocol or a plurality of modules/protocols in the link layer.

Figure 16:
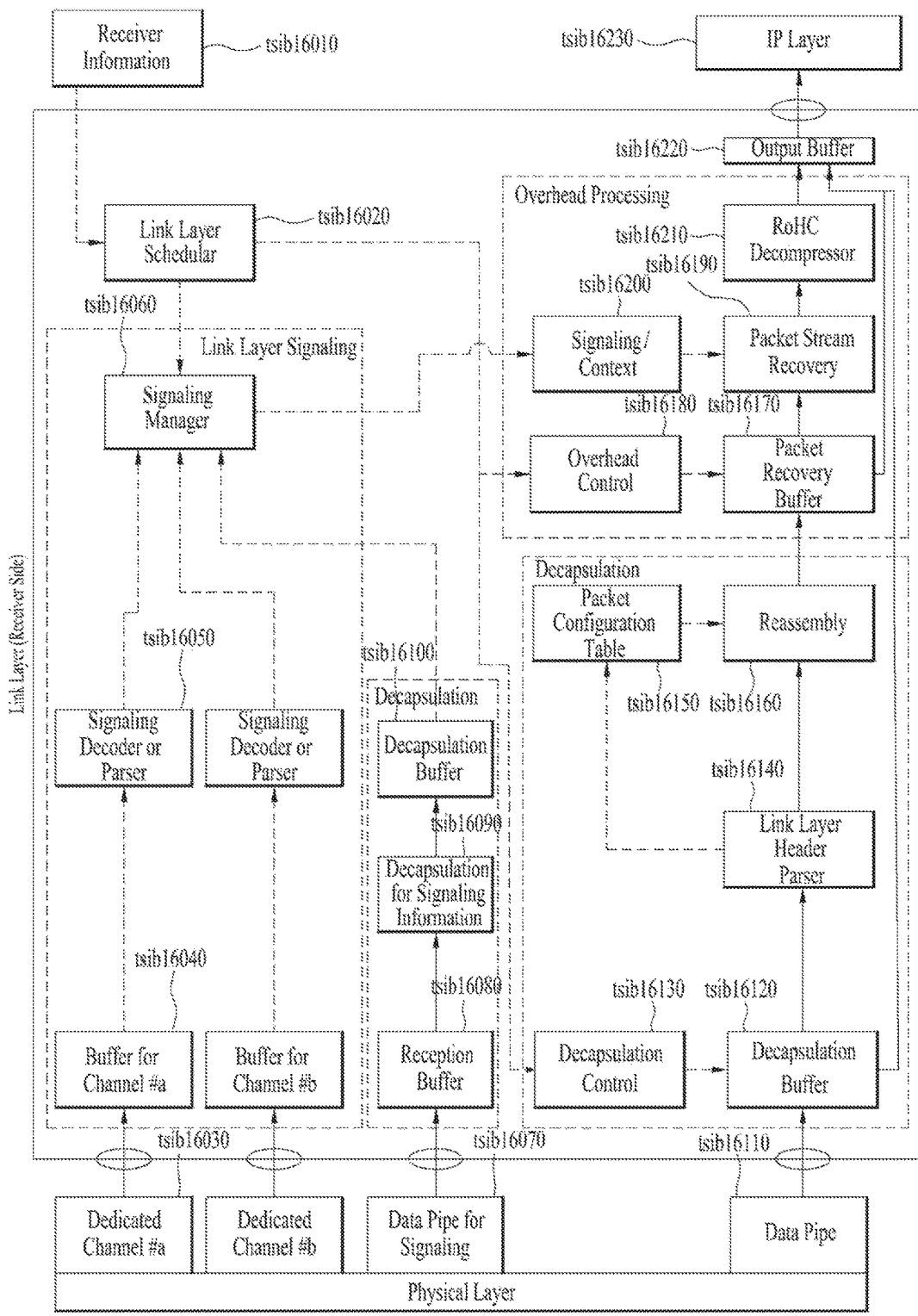
FIG. 16 illustrates a structure of a link layer on a receiver side according to an embodiment of the present invention.

FIG. 16 illustrates a structure of a link layer on a receiver side according to an embodiment of the present invention.

The present embodiment presumes that an IP packet is processed. From a functional point of view, the link layer on the receiver side may broadly include a link layer signaling part in which signaling information is processed, an overhead processing part, and/or a decapsulation part. In addition, the link layer on the receiver side may include a scheduler for controlling and scheduling overall operation of the link layer and/or input and output parts of the link layer.

First, information received through a physical layer may be delivered to the link layer. The link layer may process the information, restore an original state before being processed at a transmitter side, and then deliver the information to an upper layer. In the present embodiment, the upper layer may be an IP layer.

Information, which is separated in the physical layer and delivered through a particular channel tsib16030, may be delivered to a link layer signaling part. The link layer signaling part may determine signaling information received from the physical layer, and deliver the determined signaling information to each part of the link layer.

A buffer for channels tsib16040 may function as a buffer that receives signaling information transmitted through particular channels. As described in the foregoing, when physically/logically divided separate channels are present in the physical layer, it is possible to receive signaling information transmitted through the channels. When the information received from the separate channels is segmented, the segmented information may be stored until complete information is configured.

A signaling decoder/parser tsib16050 may verify a format of the signaling information received through the particular channel, and extract information to be used in the link layer. When the signaling information received through the particular channel is encoded, decoding may be performed. In addition, according to a given embodiment, it is possible to verify integrity, etc. of the signaling information.

A signaling manager tsib16060 may integrate signaling information received through several paths. Signaling information received through a DP for signaling tsib16070 to be described below may be integrated in the signaling manager tsib16060. The signaling manager tsib16060 may deliver signaling information necessary for each part in the link layer. For example, the signaling manager tsib16060 may deliver context information, etc. for recovery of a packet to the overhead processing part. In addition, the signaling manager tsib16060 may deliver signaling information for control to a scheduler tsib16020.

General signaling information, which is not received through a separate particular channel, may be received through the DP for signaling tsib16070. Here, the DP for signaling may refer to PLS, L1, etc. Here, the DP may be referred to as a PLP. A reception buffer tsib16080 may function as a buffer that receives signaling information delivered from the DP for signaling. In a decapsulation block for signaling information tsib16090, the received signaling information may be decapsulated. The decapsulated signaling information may be delivered to the signaling manager tsib16060 through a decapsulation buffer tsib16100. As described in the foregoing, the signaling manager tsib16060 may collate signaling information, and deliver the collated signaling information to a necessary part in the link layer.

The scheduler tsib16020 may determine and control operations of several modules included in the link layer. The scheduler tsib16020 may control each part of the link layer using receiver information tsib16010 and/or information delivered from the signaling manager tsib16060. In addition, the scheduler tsib16020 may determine an operation mode, etc. of each part. Here, the receiver information tsib16010 may refer to information previously stored in the receiver. The scheduler tsib16020 may use information changed by a user such as channel switching, etc. to perform a control operation.

The decapsulation part may filter a packet received from a DP tsib16110 of the physical layer, and separate a packet according to a type of the packet. It is possible to configure decapsulation parts corresponding to the number of DPs that can be simultaneously decoded in the physical layer.

The decapsulation buffer tsib16100 may function as a buffer that receives a packet stream from the physical layer to perform decapsulation. A decapsulation controller tsib16130 may determine whether to decapsulate an input packet stream. When decapsulation is performed, the packet stream may be delivered to a link layer header parser tsib16140. When decapsulation is not performed, the packet stream may be delivered to an output buffer tsib16220. The signaling information received from the scheduler tsib16020 may be used to determine whether to perform decapsulation.

The link layer header parser tsib16140 may identify a header of the delivered link layer packet. It is possible to identify a configuration of an IP packet included in a payload of the link layer packet by identifying the header. For example, the IP packet may be segmented or concatenated.

A packet configuration table tsib16150 may include payload information of segmented and/or concatenated link layer packets. The transmitter and the receiver may have the same information in the packet configuration table tsib16150. The transmitter and the receiver may refer to the information of the packet configuration table tsib16150. It is possible to find a value necessary for reassembly based on index information included in the link layer packet.

A reassembly block tsib16160 may configure payloads of the segmented and/or concatenated link layer packets as packets of an original IP stream. Segments may be collected and reconfigured as one IP packet, or concatenated packets may be separated and reconfigured as a plurality of IP packet streams. Recombined IP packets may be delivered to the overhead processing part.

The overhead processing part may perform an operation of restoring a packet subjected to overhead reduction to an original packet as a reverse operation of overhead reduction performed in the transmitter. This operation may be referred to as overhead processing. It is possible to configure overhead processing parts corresponding to the number of DPs that can be simultaneously decoded in the physical layer.

A packet recovery buffer tsib16170 may function as a buffer that receives a decapsulated RoHC packet or IP packet to perform overhead processing.

An overhead controller tsib16180 may determine whether to recover and/or decompress the decapsulated packet. When recovery and/or decompression are performed, the packet may be delivered to a packet stream recovery block tsib16190. When recovery and/or decompression are not performed, the packet may be delivered to the output buffer tsib16220. Whether to perform recovery and/or decompression may be determined based on the signaling information delivered by the scheduler tsib16020.

The packet stream recovery block tsib16190 may perform an operation of integrating a packet stream separated from the transmitter with context information of the packet stream. This operation may be a process of restoring a packet stream such that an RoHC decompressor tsib16210 can perform processing. In this process, it is possible to receive signaling information and/or context information from a signaling and/or context controller tsib16200. The signaling and/or context controller tsib16200 may determine signaling information delivered from the transmitter, and deliver the signaling information to the packet stream recovery block tsib16190 such that the signaling information may be mapped to a stream corresponding to a context ID.

The RoHC decompressor tsib16210 may restore headers of packets of the packet stream. The packets of the packet stream may be restored to forms of original IP packets through restoration of the headers. In other words, the RoHC decompressor tsib16210 may perform overhead processing.

The output buffer tsib16220 may function as a buffer before an output stream is delivered to an IP layer tsib16230.

The link layers of the transmitter and the receiver proposed in the present invention may include the blocks or modules described above. In this way, the link layer may independently operate irrespective of an upper layer and a lower layer, overhead reduction may be efficiently performed, and a supportable function according to an upper/lower layer may be easily defined/added/deleted.

Figure 17:
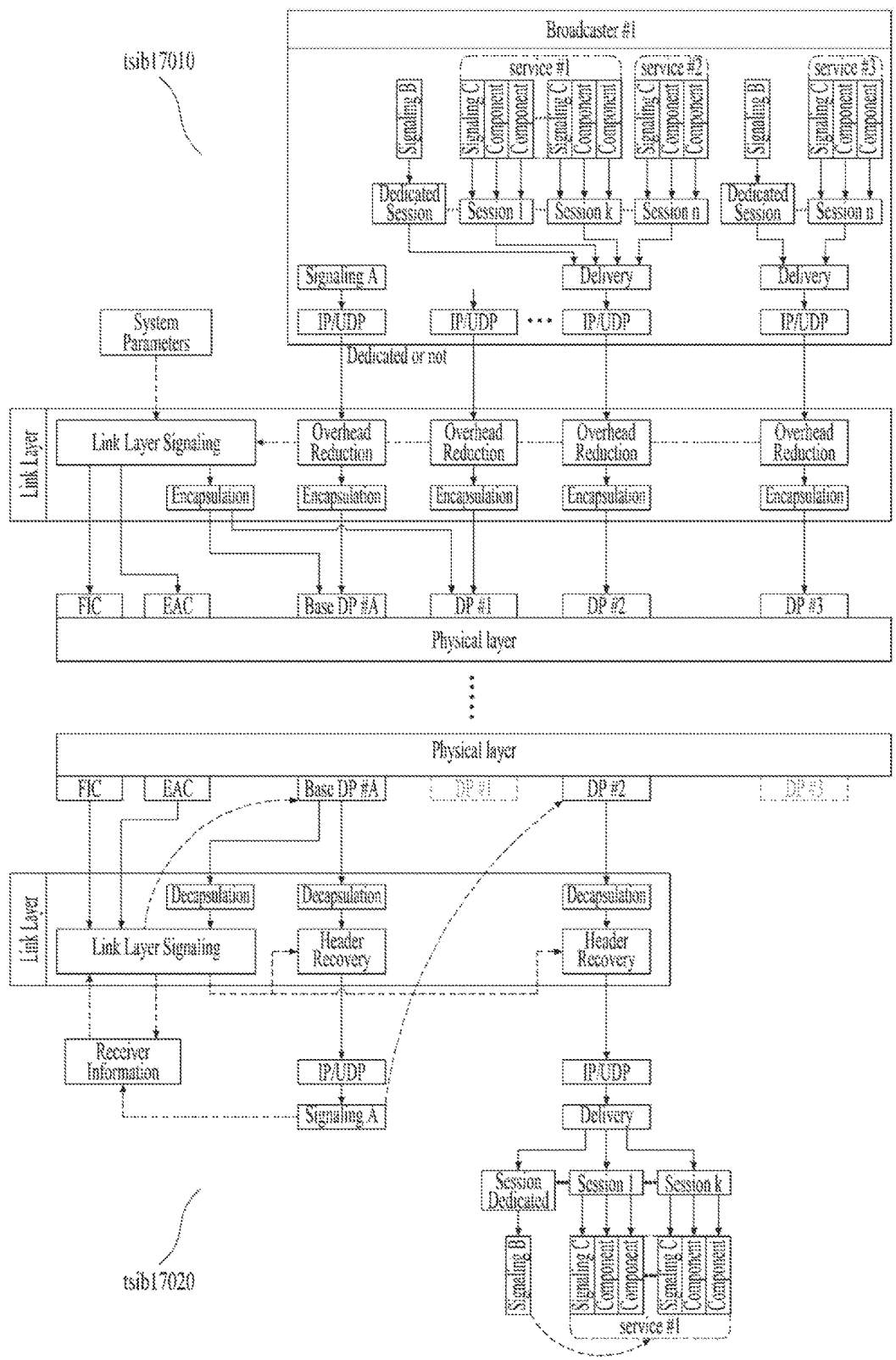
FIG. 17 illustrates a configuration of signaling transmission through a link layer according to an embodiment of the present invention (transmitting/receiving sides).

FIG. 17 illustrates a configuration of signaling transmission through a link layer according to an embodiment of the present invention (transmitting/receiving sides).

In the present invention, a plurality of service providers (broadcasters) may provide services within one frequency band. In addition, a service provider may provide a plurality of services, and one service may include one or more components. It can be considered that the user receives content using a service as a unit.

The present invention presumes that a transmission protocol based on a plurality of sessions is used to support an IP hybrid broadcast. Signaling information delivered through a signaling path may be determined based on a transmission configuration of each protocol. Various names may be applied to respective protocols according to a given embodiment.

In the illustrated data configuration tsib17010 on the transmitting side, service providers (broadcasters) may provide a plurality of services (Service #1, #2, . . . ). In general, a signal for a service may be transmitted through a general transmission session (signaling C). However, the signal may be transmitted through a particular session (dedicated session) according to a given embodiment (signaling B).

Service data and service signaling information may be encapsulated according to a transmission protocol. According to a given embodiment, an IP/UDP layer may be used. According to a given embodiment, a signal in the IP/UDP layer (signaling A) may be additionally provided. This signaling may be omitted.

Data processed using the IP/UDP may be input to the link layer. As described in the foregoing, overhead reduction and/or encapsulation may be performed in the link layer. Here, link layer signaling may be additionally provided. Link layer signaling may include a system parameter, etc. Link layer signaling has been described above.

The service data and the signaling information subjected to the above process may be processed through PLPs in a physical layer. Here, a PLP may be referred to as a DP. The example illustrated in the figure presumes a case in which a base DP/PLP is used. However, depending on embodiments, transmission may be performed using only a general DP/PLP without the base DP/PLP.

In the example illustrated in the figure, a particular channel (dedicated channel) such as an FIC, an EAC, etc. is used. A signal delivered through the FIC may be referred to as a fast information table (FIT), and a signal delivered through the EAC may be referred to as an emergency alert table (EAT). The FIT may be identical to the above-described SLT. The particular channels may not be used depending on embodiments. When the particular channel (dedicated channel) is not configured, the FIT and the EAT may be transmitted using a general link layer signaling transmission scheme, or transmitted using a PLP via the IP/UDP as other service data.

According to a given embodiment, system parameters may include a transmitter-related parameter, a service provider-related parameter, etc. Link layer signaling may include IP header compression-related context information and/or identification information of data to which the context is applied. Signaling of an upper layer may include an IP address, a UDP number, service/component information, emergency alert-related information, an IP/UDP address for service signaling, a session ID, etc. Detailed examples thereof have been described above.

In the illustrated data configuration tsib17020 on the receiving side, the receiver may decode only a PLP for a corresponding service using signaling information without having to decode all PLPs.

First, when the user selects or changes a service desired to be received, the receiver may be tuned to a corresponding frequency and may read receiver information related to a corresponding channel stored in a DB, etc. The information stored in the DB, etc. of the receiver may be configured by reading an SLT at the time of initial channel scan.

After receiving the SLT and the information about the corresponding channel, information previously stored in the DB is updated, and information about a transmission path of the service selected by the user and information about a path, through which component information is acquired or a signal necessary to acquire the information is transmitted, are acquired. When the information is not determined to be changed using version information of the SLT, decoding or parsing may be omitted.

The receiver may verify whether SLT information is included in a PLP by parsing physical signaling of the PLP in a corresponding broadcast stream (not illustrated), which may be indicated through a particular field of physical signaling. It is possible to access a position at which a service layer signal of a particular service is transmitted by accessing the SLT information. The service layer signal may be encapsulated into the IP/UDP and delivered through a transmission session. It is possible to acquire information about a component included in the service using this service layer signaling. A specific SLT-SLS configuration is as described above.

In other words, it is possible to acquire transmission path information, for receiving upper layer signaling information (service signaling information) necessary to receive the service, corresponding to one of several packet streams and PLPs currently transmitted on a channel using the SLT. The transmission path information may include an IP address, a UDP port number, a session ID, a PLP ID, etc. Here, depending on embodiments, a value previously designated by the IANA or a system may be used as an IP/UDP address. The information may be acquired using a scheme of accessing a DB or a shared memory, etc.

When the link layer signal and service data are transmitted through the same PLP, or only one PLP is operated, service data delivered through the PLP may be temporarily stored in a device such as a buffer, etc. while the link layer signal is decoded.

It is possible to acquire information about a path through which the service is actually transmitted using service signaling information of a service to be received. In addition, a received packet stream may be subjected to decapsulation and header recovery using information such as overhead reduction for a PLP to be received, etc.

In the illustrated example (tsib17020), the FIC and the EAC are used, and a concept of the base DP/PLP is presumed. As described in the foregoing, concepts of the FIC, the EAC, and the base DP/PLP may not be used.

While MISO or MIMO uses two antennas in the following for convenience of description, the present invention is applicable to systems using two or more antennas. The present invention proposes a physical profile (or system) optimized to minimize receiver complexity while attaining the performance required for a particular use case. Physical (PHY) profiles (base, handheld and advanced profiles) according to an embodiment of the present invention are subsets of all configurations that a corresponding receiver should implement. The PHY profiles share most of the functional blocks but differ slightly in specific blocks and/or parameters. For the system evolution, future profiles may also be multiplexed with existing profiles in a single radio frequency (RF) channel through a future extension frame (FEF). The base profile and the handheld profile according to the embodiment of the present invention refer to profiles to which MIMO is not applied, and the advanced profile refers to a profile to which MIMO is applied. The base profile may be used as a profile for both the terrestrial broadcast service and the mobile broadcast service. That is, the base profile may be used to define a concept of a profile which includes the mobile profile. In addition, the advanced profile may be divided into an advanced profile for a base profile with MIMO and an advanced profile for a handheld profile with MIMO. Moreover, the profiles may be changed according to intention of the designer.

The following terms and definitions may be applied to the present invention. The following terms and definitions may be changed according to design.

Auxiliary stream: sequence of cells carrying data of as yet undefined modulation and coding, which may be used for future extensions or as required by broadcasters or network operators Base data pipe: data pipe that carries service signaling data Baseband frame (or BBFRAME): set of Kbch bits which form the input to one FEC encoding process (BCH and LDPC encoding)

Cell: modulation value that is carried by one carrier of orthogonal frequency division multiplexing (OFDM) transmission Coded block: LDPC-encoded block of PLS1 data or one of the LDPC-encoded blocks of PLS2 data Data pipe: logical channel in the physical layer that carries service data or related metadata, which may carry one or a plurality of service(s) or service component(s).

Data pipe unit (DPU): a basic unit for allocating data cells to a DP in a frame.

Data symbol: OFDM symbol in a frame which is not a preamble symbol (the data symbol encompasses the frame signaling symbol and frame edge symbol)

DP_ID: this 8-bit field identifies uniquely a DP within the system identified by the SYSTEM_ID Dummy cell: cell carrying a pseudo-random value used to fill the remaining capacity not used for PLS signaling, DPs or auxiliary streams Emergency alert channel (EAC): part of a frame that carries EAS information data Frame: physical layer time slot that starts with a preamble and ends with a frame edge symbol Frame repetition unit: a set of frames belonging to the same or different physical layer profiles including an FEF, which is repeated eight times in a superframe Fast information channel (FIC): a logical channel in a frame that carries mapping information between a service and the corresponding base DP FECBLOCK: set of LDPC-encoded bits of DP data FFT size: nominal FFT size used for a particular mode, equal to the active symbol period Ts expressed in cycles of an elementary period T Frame signaling symbol: OFDM symbol with higher pilot density used at the start of a frame in certain combinations of FFT size, guard interval and scattered pilot pattern, which carries a part of the PLS data Frame edge symbol: OFDM symbol with higher pilot density used at the end of a frame in certain combinations of FFT size, guard interval and scattered pilot pattern Frame group: the set of all frames having the same PHY profile type in a superframe.

Future extension frame: physical layer time slot within the superframe that may be used for future extension, which starts with a preamble Futurecast UTB system: proposed physical layer broadcast system, the input of which is one or more MPEG2-TS, IP or general stream(s) and the output of which is an RF signal Input stream: a stream of data for an ensemble of services delivered to the end users by the system Normal data symbol: data symbol excluding the frame signaling symbol and the frame edge symbol PHY profile: subset of all configurations that a corresponding receiver should implement PLS: physical layer signaling data including PLS1 and PLS2

PLS1: a first set of PLS data carried in a frame signaling symbol (FSS) having a fixed size, coding and modulation, which carries basic information about a system as well as parameters needed to decode PLS2

NOTE: PLS1 data remains constant for the duration of a frame group

PLS2: a second set of PLS data transmitted in the FSS, which carries more detailed PLS data about the system and the DPs PLS2 dynamic data: PLS2 data that dynamically changes frame-by-frame PLS2 static data: PLS2 data that remains static for the duration of a frame group Preamble signaling data: signaling data carried by the preamble symbol and used to identify the basic mode of the system Preamble symbol: fixed-length pilot symbol that carries basic PLS data and is located at the beginning of a frame The preamble symbol is mainly used for fast initial band scan to detect the system signal, timing thereof, frequency offset, and FFT size.

Reserved for future use: not defined by the present document but may be defined in future Superframe: set of eight frame repetition units Time interleaving block (TI block): set of cells within which time interleaving is carried out, corresponding to one use of a time interleaver memory TI group: unit over which dynamic capacity allocation for a particular DP is carried out, made up of an integer, dynamically varying number of XFECBLOCKs NOTE: The TI group may be mapped directly to one frame or may be mapped to a plurality of frames. The TI group may contain one or more TI blocks.

Figure 18:
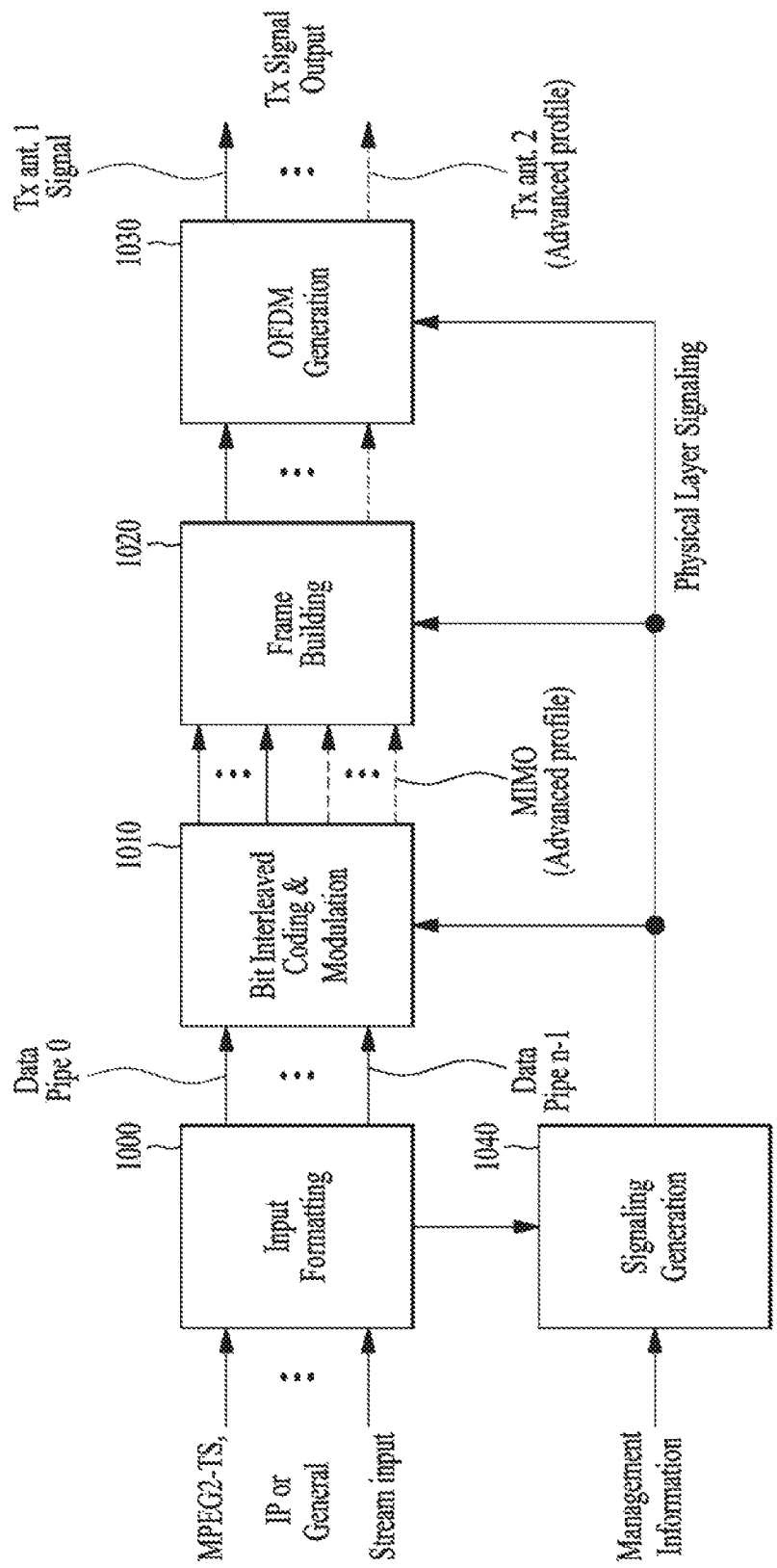
FIG. 18 is a block diagram illustrating a configuration of a broadcast signal transmission apparatus for future broadcast services according to an embodiment of the present invention.

Type 1 DP: DP of a frame where all DPs are mapped to the frame in time division multiplexing (TDM) scheme Type 2 DP: DP of a frame where all DPs are mapped to the frame in frequency division multiplexing (FDM) scheme XFECBLOCK: set of Ncells cells carrying all the bits of one LDPC FECBLOCK FIG. 18 illustrates a configuration of a broadcast signal transmission apparatus for future broadcast services according to an embodiment of the present invention.

The broadcast signal transmission apparatus for future broadcast services according to the present embodiment may include an input formatting block 1000, a bit interleaved coding & modulation (BICM) block 1010, a frame building block 1020, an OFDM generation block 1030 and a signaling generation block 1040. Description will be given of an operation of each block of the broadcast signal transmission apparatus.

In input data according to an embodiment of the present invention, IP stream/packets and MPEG2-TS may be main input formats, and other stream types are handled as general streams. In addition to these data inputs, management information is input to control scheduling and allocation of the corresponding bandwidth for each input stream. In addition, the present invention allows simultaneous input of one or a plurality of TS streams, IP stream(s) and/or a general stream(s).

The input formatting block 1000 may demultiplex each input stream into one or a plurality of data pipes, to each of which independent coding and modulation are applied. A DP is the basic unit for robustness control, which affects QoS. One or a plurality of services or service components may be carried by one DP. The DP is a logical channel in a physical layer for delivering service data or related metadata capable of carrying one or a plurality of services or service components.

In addition, a DPU is a basic unit for allocating data cells to a DP in one frame.

An input to the physical layer may include one or a plurality of data streams. Each of the data streams is delivered by one DP. The input formatting block 1000 may covert a data stream input through one or more physical paths (or DPs) into a baseband frame (BBF). In this case, the input formatting block 1000 may perform null packet deletion or header compression on input data (a TS or IP input stream) in order to enhance transmission efficiency. A receiver may have a priori information for a particular part of a header, and thus this known information may be deleted from a transmitter. A null packet deletion block 3030 may be used only for a TS input stream.

In the BICM block 1010, parity data is added for error correction and encoded bit streams are mapped to complex-value constellation symbols. The symbols are interleaved across a specific interleaving depth that is used for the corresponding DP. For the advanced profile, MIMO encoding is performed in the BICM block 1010 and an additional data path is added at the output for MIMO transmission.

The frame building block 1020 may map the data cells of the input DPs into the OFDM symbols within a frame, and perform frequency interleaving for frequency-domain diversity, especially to combat frequency-selective fading channels. The frame building block 1020 may include a delay compensation block, a cell mapper and a frequency interleaver.

The delay compensation block may adjust timing between DPs and corresponding PLS data to ensure that the DPs and the corresponding PLS data are co-timed at a transmitter side. The PLS data is delayed by the same amount as the data pipes by addressing the delays of data pipes caused by the input formatting block and BICM block. The delay of the BICM block is mainly due to the time interleaver. In-band signaling data carries information of the next TI group so that the information is carried one frame ahead of the DPs to be signaled. The delay compensation block delays in-band signaling data accordingly.

The cell mapper may map PLS, DPs, auxiliary streams, dummy cells, etc. to active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. A basic function of the cell mapper is to map a data cell generated by time interleaving for each DP and PLS cell to an array of active OFDM cells (if present) corresponding to respective OFDM symbols in one frame. Service signaling data (such as program specific information (PSI)/SI) may be separately gathered and sent by a DP. The cell mapper operates according to dynamic information produced by a scheduler and the configuration of a frame structure. The frequency interleaver may randomly interleave data cells received from the cell mapper to provide frequency diversity. In addition, the frequency interleaver may operate on an OFDM symbol pair including two sequential OFDM symbols using a different interleaving-seed order to obtain maximum interleaving gain in a single frame.

The OFDM generation block 1030 modulates OFDM carriers by cells produced by the frame building block, inserts pilots, and produces a time domain signal for transmission. In addition, this block subsequently inserts guard intervals, and applies peak-to-average power ratio (PAPR) reduction processing to produce a final RF signal.

Specifically, after inserting a preamble at the beginning of each frame, the OFDM generation block 1030 may apply conventional OFDM modulation having a cyclic prefix as a guard interval. For antenna space diversity, a distributed MISO scheme is applied across transmitters. In addition, a PAPR scheme is performed in the time domain. For flexible network planning, the present invention provides a set of various FFT sizes, guard interval lengths and corresponding pilot patterns.

In addition, the present invention may multiplex signals of a plurality of broadcast transmission/reception systems in the time domain such that data of two or more different broadcast transmission/reception systems providing broadcast services may be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc.

The signaling generation block 1040 may create physical layer signaling information used for an operation of each functional block. This signaling information is also transmitted so that services of interest are properly recovered at a receiver side. Signaling information according to an embodiment of the present invention may include PLS data. PLS provides the receiver with a means to access physical layer DPs. The PLS data includes PLS1 data and PLS2 data.

The PLS1 data is a first set of PLS data carried in an FSS symbol in a frame having a fixed size, coding and modulation, which carries basic information about the system in addition to the parameters needed to decode the PLS2 data. The PLS1 data provides basic transmission parameters including parameters required to enable reception and decoding of the PLS2 data. In addition, the PLS1 data remains constant for the duration of a frame group.

The PLS2 data is a second set of PLS data transmitted in an FSS symbol, which carries more detailed PLS data about the system and the DPs. The PLS2 contains parameters that provide sufficient information for the receiver to decode a desired DP. The PLS2 signaling further includes two types of parameters, PLS2 static data (PLS2-STAT data) and PLS2 dynamic data (PLS2-DYN data). The PLS2 static data is PLS2 data that remains static for the duration of a frame group and the PLS2 dynamic data is PLS2 data that dynamically changes frame by frame. Details of the PLS data will be described later.

The above-described blocks may be omitted or replaced by blocks having similar or identical functions.

Figure 19:
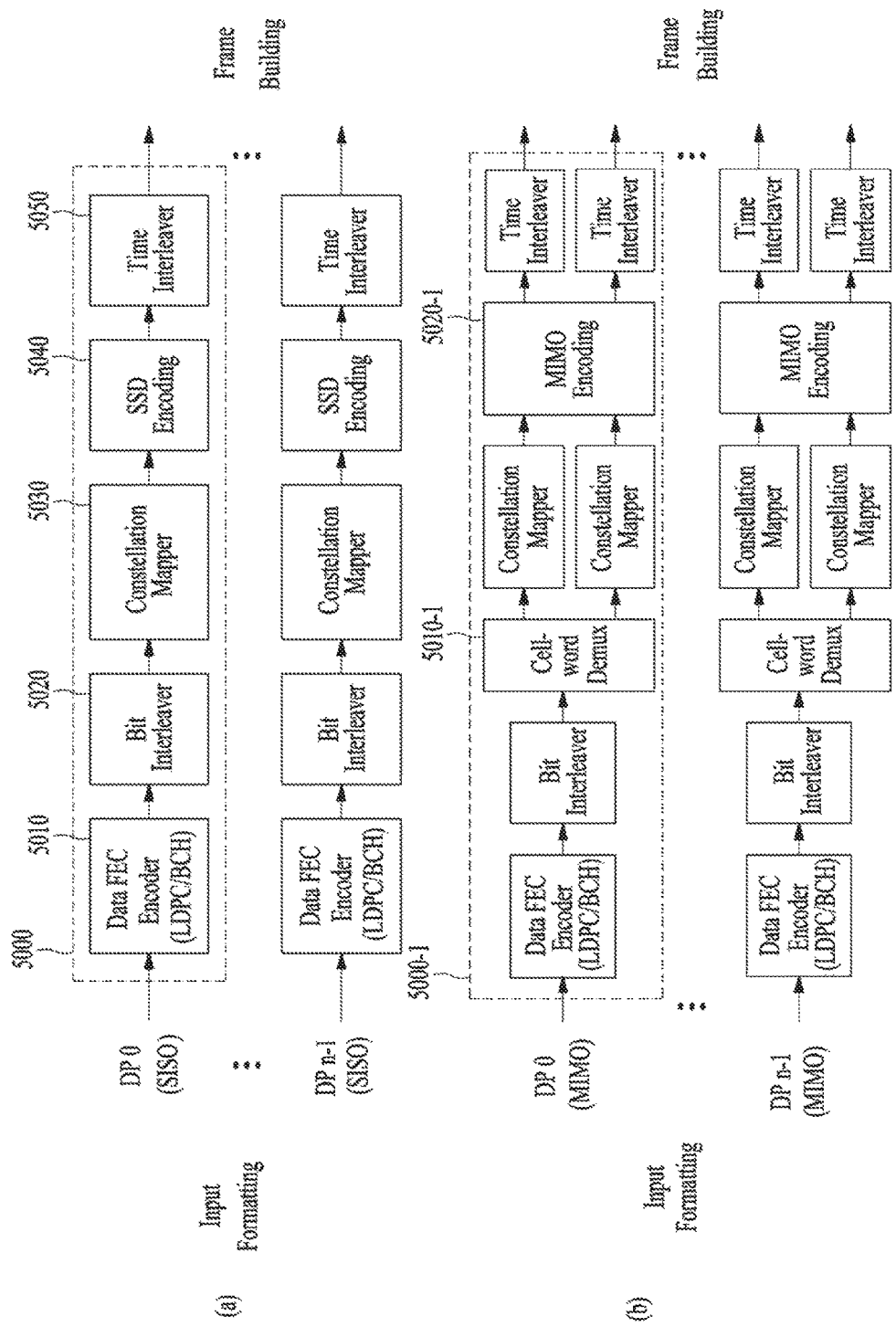
FIG. 19 is a block diagram illustrating a bit interleaved coding & modulation (BICM) block according to an embodiment of the present invention.

FIG. 19 illustrates a BICM block according to an embodiment of the present invention.

The BICM block illustrated in FIG. 22 corresponds to an embodiment of the BICM block 1010 described with reference to FIG. 18.

As described above, the broadcast signal transmission apparatus for future broadcast services according to the embodiment of the present invention may provide a terrestrial broadcast service, mobile broadcast service, UHDTV service, etc.

Since QoS depends on characteristics of a service provided by the broadcast signal transmission apparatus for future broadcast services according to the embodiment of the present invention, data corresponding to respective services needs to be processed using different schemes. Accordingly, the BICM block according to the embodiment of the present invention may independently process respective DPs by independently applying SISO, MISO and MIMO schemes to data pipes respectively corresponding to data paths. Consequently, the broadcast signal transmission apparatus for future broadcast services according to the embodiment of the present invention may control QoS for each service or service component transmitted through each DP.

(a) shows a BICM block applied to a profile (or system) to which MIMO is not applied, and (b) shows a BICM block of a profile (or system) to which MIMO is applied.

The BICM block to which MIMO is not applied and the BICM block to which MIMO is applied may include a plurality of processing blocks for processing each DP.

Description will be given of each processing block of the BICM block to which MIMO is not applied and the BICM block to which MIMO is applied.

A processing block 5000 of the BICM block to which MIMO is not applied may include a data FEC encoder 5010, a bit interleaver 5020, a constellation mapper 5030, a signal space diversity (SSD) encoding block 5040 and a time interleaver 5050.

The data FEC encoder 5010 performs FEC encoding on an input BBF to generate FECBLOCK procedure using outer coding (BCH) and inner coding (LDPC). The outer coding (BCH) is optional coding method. A detailed operation of the data FEC encoder 5010 will be described later.

The bit interleaver 5020 may interleave outputs of the data FEC encoder 5010 to achieve optimized performance with a combination of LDPC codes and a modulation scheme while providing an efficiently implementable structure. A detailed operation of the bit interleaver 5020 will be described later.

The constellation mapper 5030 may modulate each cell word from the bit interleaver 5020 in the base and the handheld profiles, or each cell word from the cell-word demultiplexer 5010-1 in the advanced profile using either QPSK, QAM-16, non-uniform QAM (NUQ-64, NUQ-256, or NUQ-1024) or non-uniform constellation (NUC-16, NUC-64, NUC-256, or NUC-1024) mapping to give a power-normalized constellation point, e1. This constellation mapping is applied only for DPs. It is observed that QAM-16 and NUQs are square shaped, while NUCs have arbitrary shapes. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in the PLS2 data.

The time interleaver 5050 may operates at a DP level. Parameters of time interleaving (TI) may be set differently for each DP. A detailed operation of the time interleaver 5050 will be described later.

A processing block 5000-1 of the BICM block to which MIMO is applied may include the data FEC encoder, the bit interleaver, the constellation mapper, and the time interleaver.

However, the processing block 5000-1 is distinguished from the processing block 5000 of the BICM block to which MIMO is not applied in that the processing block 5000-1 further includes a cell-word demultiplexer 5010-1 and a MIMO encoding block 5020-1.

In addition, operations of the data FEC encoder, the bit interleaver, the constellation mapper, and the time interleaver in the processing block 5000-1 correspond to those of the data FEC encoder 5010, the bit interleaver 5020, the constellation mapper 5030, and the time interleaver 5050 described above, and thus description thereof is omitted.

The cell-word demultiplexer 5010-1 is used for a DP of the advanced profile to divide a single cell-word stream into dual cell-word streams for MIMO processing.

The MIMO encoding block 5020-1 may process an output of the cell-word demultiplexer 5010-1 using a MIMO encoding scheme. The MIMO encoding scheme is optimized for broadcast signal transmission. MIMO technology is a promising way to obtain a capacity increase but depends on channel characteristics. Especially for broadcasting, a strong LOS component of a channel or a difference in received signal power between two antennas caused by different signal propagation characteristics makes it difficult to obtain capacity gain from MIMO. The proposed MIMO encoding scheme overcomes this problem using rotation-based precoding and phase randomization of one of MIMO output signals.

MIMO encoding is intended for a 2×2 MIMO system requiring at least two antennas at both the transmitter and the receiver. A MIMO encoding mode of the present invention may be defined as full-rate spatial multiplexing (FR-SM). FR-SM encoding may provide capacity increase with relatively small complexity increase at the receiver side. In addition, the MIMO encoding scheme of the present invention has no restriction on an antenna polarity configuration.

MIMO processing is applied at the DP level. NUQ (e1,i and e2,i) corresponding to a pair of constellation mapper outputs is fed to an input of a MIMO encoder. Paired MIMO encoder output (g1,i and g2,i) is transmitted by the same carrier k and OFDM symbol 1 of respective TX antennas thereof.

The above-described blocks may be omitted or replaced by blocks having similar or identical functions.

Figure 20:
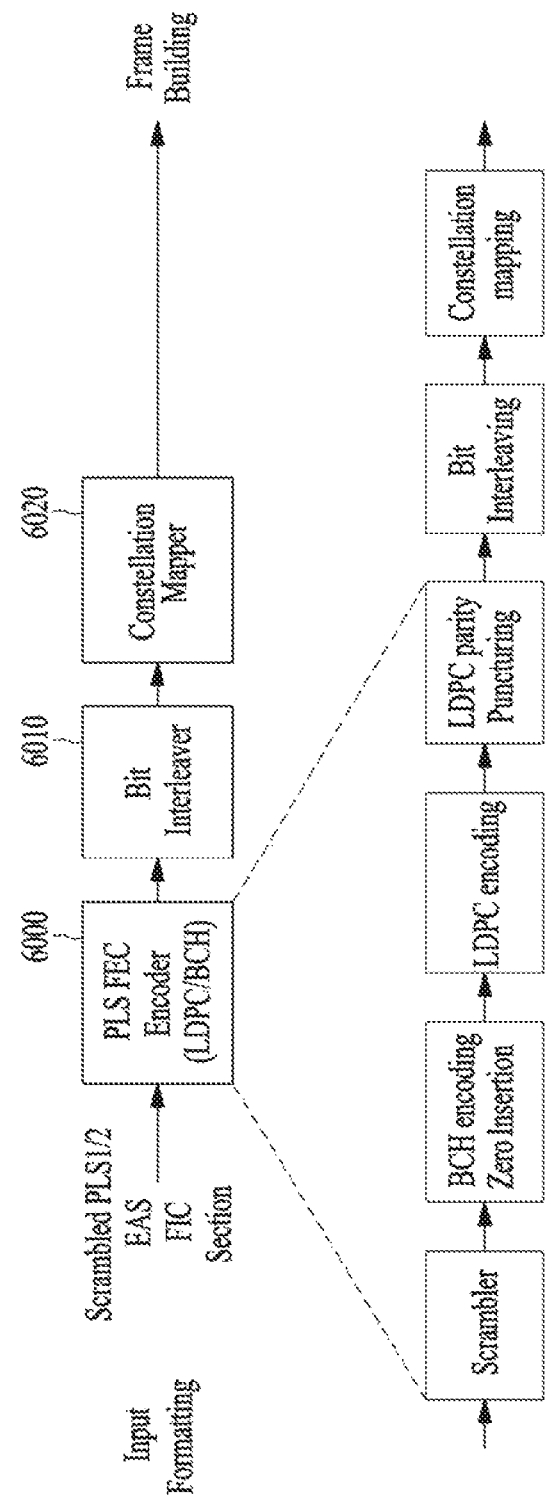
FIG. 20 is a block diagram illustrating a BICM block according to another embodiment of the present invention.

FIG. 20 illustrates a BICM block according to another embodiment of the present invention.

The BICM block illustrated in FIG. 20 corresponds to another embodiment of the BICM block 1010 described with reference to FIG. 18.

FIG. 20 illustrates a BICM block for protection of physical layer signaling (PLS), an emergency alert channel (EAC) and a fast information channel (FIC). The EAC is a part of a frame that carries EAS information data, and the FIC is a logical channel in a frame that carries mapping information between a service and a corresponding base DP. Details of the EAC and FIC will be described later.

Referring to FIG. 20, the BICM block for protection of the PLS, the EAC and the FIC may include a PLS FEC encoder 6000, a bit interleaver 6010 and a constellation mapper 6020.

In addition, the PLS FEC encoder 6000 may include a scrambler, a BCH encoding/zero insertion block, an LDPC encoding block and an LDPC parity puncturing block. Description will be given of each block of the BICM block.

The PLS FEC encoder 6000 may encode scrambled PLS 1/2 data, EAC and FIC sections.

The scrambler may scramble PLS1 data and PLS2 data before BCH encoding and shortened and punctured LDPC encoding.

The BCH encoding/zero insertion block may perform outer encoding on the scrambled PLS 1/2 data using a shortened BCH code for PLS protection, and insert zero bits after BCH encoding. For PLS1 data only, output bits of zero insertion may be permutted before LDPC encoding.

The LDPC encoding block may encode an output of the BCH encoding/zero insertion block using an LDPC code. To generate a complete coded block, Cldpc and parity bits Pldpc are encoded systematically from each zero-inserted PLS information block Ildpc and appended thereto.

$$C_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Equation 1]

The LDPC parity puncturing block may perform puncturing on the PLS1 data and the PLS2 data.

When shortening is applied to PLS1 data protection, some LDPC parity bits are punctured after LDPC encoding. In addition, for PLS2 data protection, LDPC parity bits of PLS2 are punctured after LDPC encoding. These punctured bits are not transmitted.

The bit interleaver 6010 may interleave each of shortened and punctured PLS1 data and PLS2 data.

The constellation mapper 6020 may map the bit-interleaved PLS1 data and PLS2 data to constellations.

The above-described blocks may be omitted or replaced by blocks having similar or identical functions.

Figure 21:
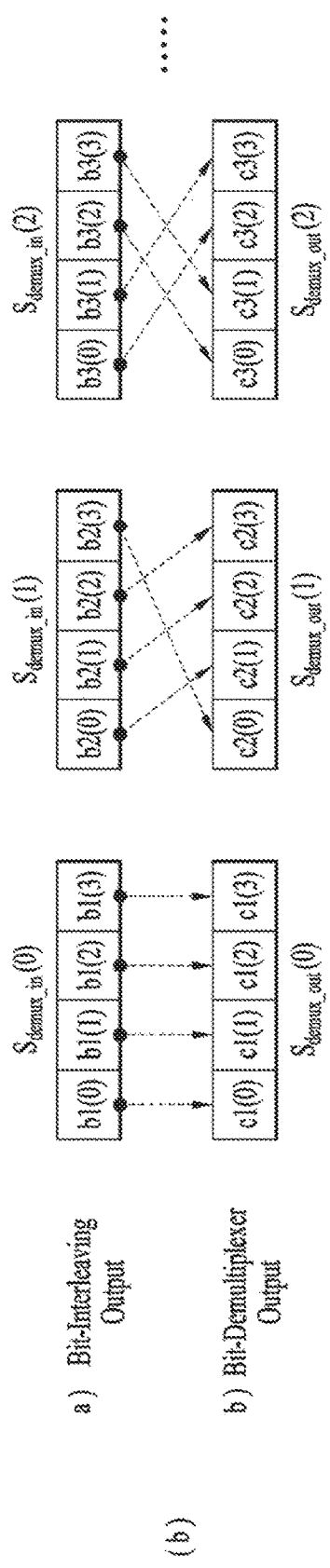
FIG. 21 is a diagram illustrating a bit interleaving process of physical layer signalling (PLS) according to an embodiment of the present invention.

FIG. 21 illustrates a bit interleaving process of PLS according to an embodiment of the present invention.

Figure 22:
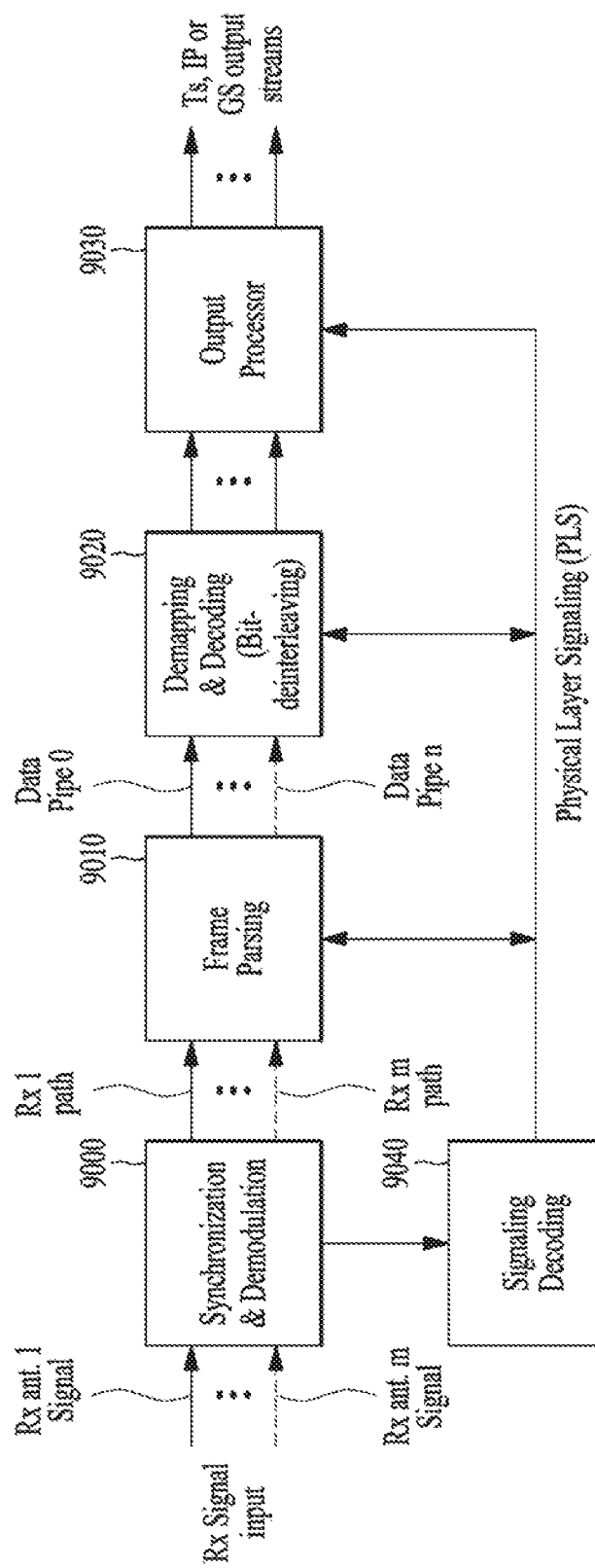
FIG. 22 is a block diagram illustrating a configuration of a broadcast signal reception apparatus for future broadcast services according to an embodiment of the present invention.

Each shortened and punctured PLS1 and PLS2 coded block is interleaved bit-by-bit as described in FIG. 22. Each block of additional parity bits is interleaved with the same block interleaving structure but separately.

In the case of BPSK, there are two branches for bit interleaving to duplicate FEC coded bits in the real and imaginary parts. Each coded block is written to the upper branch first. The bits are mapped to the lower branch by applying modulo NFEC addition with cyclic shifting value floor(NFEC/2), where NFEC is the length of each LDPC coded block after shortening and puncturing.

In other modulation cases, such as QSPK, QAM-16 and NUQ-64, FEC coded bits are written serially into the interleaver column-wise, where the number of columns is the same as the modulation order.

In the read operation, the bits for one constellation symbol are read out sequentially row-wise and fed into the bit demultiplexer block. These operations are continued until the end of the column.

Each bit interleaved group is demultiplexed bit-by-bit in a group before constellation mapping. Depending on modulation order, there are two mapping rules. In the case of BPSK and QPSK, the reliability of bits in a symbol is equal. Therefore, the bit group read out from the bit interleaving block is mapped to a QAM symbol without any operation.

Figure 23:
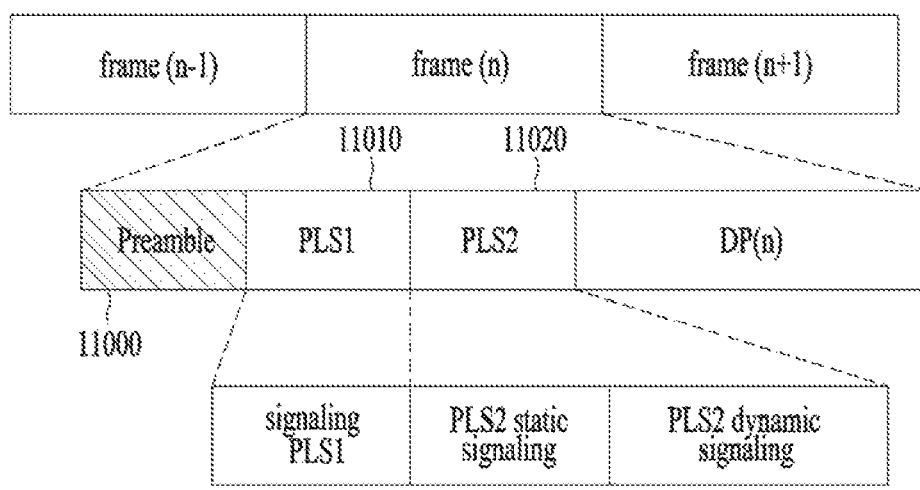
FIG. 23 is a diagram illustrating a signaling hierarchy structure of a frame according to an embodiment of the present invention.

In the cases of QAM-16 and NUQ-64 mapped to a QAM symbol, the rule of operation is described in FIG. 23 (a). As shown in FIG. 23 (a), i is bit group index corresponding to column index in bit interleaving.

FIG. 21 shows the bit demultiplexing rule for QAM-16. This operation continues until all bit groups are read from the bit interleaving block.

FIG. 22 illustrates a configuration of a broadcast signal reception apparatus for future broadcast services according to an embodiment of the present invention.

The broadcast signal reception apparatus for future broadcast services according to the embodiment of the present invention may correspond to the broadcast signal transmission apparatus for future broadcast services described with reference to FIG. 18.

The broadcast signal reception apparatus for future broadcast services according to the embodiment of the present invention may include a synchronization & demodulation module 9000, a frame parsing module 9010, a demapping & decoding module 9020, an output processor 9030 and a signaling decoding module 9040. A description will be given of operation of each module of the broadcast signal reception apparatus.

The synchronization & demodulation module 9000 may receive input signals through m Rx antennas, perform signal detection and synchronization with respect to a system corresponding to the broadcast signal reception apparatus, and carry out demodulation corresponding to a reverse procedure of a procedure performed by the broadcast signal transmission apparatus.

The frame parsing module 9010 may parse input signal frames and extract data through which a service selected by a user is transmitted. If the broadcast signal transmission apparatus performs interleaving, the frame parsing module 9010 may carry out deinterleaving corresponding to a reverse procedure of interleaving. In this case, positions of a signal and data that need to be extracted may be obtained by decoding data output from the signaling decoding module 9040 to restore scheduling information generated by the broadcast signal transmission apparatus.

The demapping & decoding module 9020 may convert input signals into bit domain data and then deinterleave the same as necessary. The demapping & decoding module 9020 may perform demapping of mapping applied for transmission efficiency and correct an error generated on a transmission channel through decoding. In this case, the demapping & decoding module 9020 may obtain transmission parameters necessary for demapping and decoding by decoding data output from the signaling decoding module 9040.

The output processor 9030 may perform reverse procedures of various compression/signal processing procedures which are applied by the broadcast signal transmission apparatus to improve transmission efficiency. In this case, the output processor 9030 may acquire necessary control information from data output from the signaling decoding module 9040. An output of the output processor 9030 corresponds to a signal input to the broadcast signal transmission apparatus and may be MPEG-TSs, IP streams (v4 or v6) and generic streams.

The signaling decoding module 9040 may obtain PLS information from a signal demodulated by the synchronization & demodulation module 9000. As described above, the frame parsing module 9010, the demapping & decoding module 9020 and the output processor 9030 may execute functions thereof using data output from the signaling decoding module 9040.

A frame according to an embodiment of the present invention is further divided into a number of OFDM symbols and a preamble. As shown in (d), the frame includes a preamble, one or more frame signaling symbols (FSSs), normal data symbols and a frame edge symbol (FES).

The preamble is a special symbol that enables fast future-cast UTB system signal detection and provides a set of basic transmission parameters for efficient transmission and reception of a signal. Details of the preamble will be described later.

A main purpose of the FSS is to carry PLS data. For fast synchronization and channel estimation, and hence fast decoding of PLS data, the FSS has a dense pilot pattern than a normal data symbol. The FES has exactly the same pilots as the FSS, which enables frequency-only interpolation within the FES and temporal interpolation, without extrapolation, for symbols immediately preceding the FES.

FIG. 23 illustrates a signaling hierarchy structure of a frame according to an embodiment of the present invention.

FIG. 23 illustrates the signaling hierarchy structure, which is split into three main parts corresponding to preamble signaling data 11000, PLS1 data 11010 and PLS2 data 11020. A purpose of a preamble, which is carried by a preamble symbol in every frame, is to indicate a transmission type and basic transmission parameters of the frame. PLS1 enables the receiver to access and decode the PLS2 data, which contains the parameters to access a DP of interest. PLS2 is carried in every frame and split into two main parts corresponding to PLS2-STAT data and PLS2-DYN data. Static and dynamic portions of PLS2 data are followed by padding, if necessary.

Preamble signaling data according to an embodiment of the present invention carries 21 bits of information that are needed to enable the receiver to access PLS data and trace DPs within the frame structure. Details of the preamble signaling data are as follows.

FFT_SIZE: This 2-bit field indicates an FFT size of a current frame within a frame group as described in the following Table 1.

TABLE 1

| Value | FFT size |
| --- | --- |
| 00 | 8K FFT |
| 01 | 16K FFT |
| 10 | 32K FFT |
| 11 | Reserved |

GI_FRACTION: This 3-bit field indicates a guard interval fraction value in a current superframe as described in the following Table 2.

TABLE 2

| Value | GI_FRACTION |
| --- | --- |
| 000 | 1/5 |
| 001 | 1/10 |
| 010 | 1/20 |
| 011 | 1/40 |
| 100 | 1/80 |
| 101 | 1/160 |
| 110 to 111 | Reserved |

EAC_FLAG: This 1-bit field indicates whether the EAC is provided in a current frame. If this field is set to '1', an emergency alert service (EAS) is provided in the current frame. If this field set to '0', the EAS is not carried in the current frame. This field may be switched dynamically within a superframe.

PILOT_MODE: This 1-bit field indicates whether a pilot mode is a mobile mode or a fixed mode for a current frame in a current frame group. If this field is set to '0', the mobile pilot mode is used. If the field is set to '1', the fixed pilot mode is used.

PAPR_FLAG: This 1-bit field indicates whether PAPR reduction is used for a current frame in a current frame group. If this field is set to a value of '1', tone reservation is used for PAPR reduction. If this field is set to a value of '0', PAPR reduction is not used.

RESERVED: This 7-bit field is reserved for future use.

FIG. 24 illustrates PLS1 data according to an embodiment of the present invention.

PLS1 data provides basic transmission parameters including parameters required to enable reception and decoding of PLS2. As mentioned above, the PLS1 data remain unchanged for the entire duration of one frame group. A detailed definition of the signaling fields of the PLS1 data is as follows.

PREAMBLE_DATA: This 20-bit field is a copy of preamble signaling data excluding EAC_FLAG.

NUM_FRAME_FRU: This 2-bit field indicates the number of the frames per FRU.

PAYLOAD_TYPE: This 3-bit field indicates a format of payload data carried in a frame group. PAYLOAD_TYPE is signaled as shown in Table 3.

TABLE 3

| Value | Payload type |
| --- | --- |
| 1XX | TS is transmitted. |
| X1X | IP stream is transmitted. |
| XX1 | GS is transmitted. |

NUM_FSS: This 2-bit field indicates the number of FSSs in a current frame.

SYSTEM_VERSION: This 8-bit field indicates a version of a transmitted signal format. SYSTEM_VERSION is divided into two 4-bit fields: a major version and a minor version.

Major version: The MSB corresponding to four bits of the SYSTEM_VERSION field indicate major version information. A change in the major version field indicates a non-backward-compatible change. A default value is '0000'. For a version described in this standard, a value is set to '0000'.

Minor version: The LSB corresponding to four bits of SYSTEM_VERSION field indicate minor version information. A change in the minor version field is backwards compatible.

CELL_ID: This is a 16-bit field which uniquely identifies a geographic cell in an ATSC network. An ATSC cell coverage area may include one or more frequencies depending on the number of frequencies used per futurecast UTB system. If a value of CELL_ID is not known or unspecified, this field is set to '0'.

NETWORK_ID: This is a 16-bit field which uniquely identifies a current ATSC network.

SYSTEM_ID: This 16-bit field uniquely identifies the futurecast UTB system within the ATSC network. The futurecast UTB system is a terrestrial broadcast system whose input is one or more input streams (TS, IP, GS) and whose output is an RF signal. The futurecast UTB system carries one or more PHY profiles and FEF, if any. The same futurecast UTB system may carry different input streams and use different RFs in different geographical areas, allowing local service insertion. The frame structure and scheduling are controlled in one place and are identical for all transmissions within the futurecast UTB system. One or more futurecast UTB systems may have the same SYSTEM_ID meaning that they all have the same physical layer structure and configuration.

The following loop includes FRU_PHY_PROFILE, FRU_FRAME_LENGTH, FRU_GI_FRACTION, and RESERVED which are used to indicate an FRU configuration and a length of each frame type. A loop size is fixed so that four PHY profiles (including an FEF) are signaled within the FRU. If NUM_FRAME_FRU is less than 4, unused fields are filled with zeros.

FRU_PHY_PROFILE: This 3-bit field indicates a PHY profile type of an (i+1)th (i is a loop index) frame of an associated FRU. This field uses the same signaling format as shown in Table 8.

FRU_FRAME_LENGTH: This 2-bit field indicates a length of an (i+1)th frame of an associated FRU. Using FRU_FRAME_LENGTH together with FRU_GI_FRACTION, an exact value of a frame duration may be obtained.

FRU_GI_FRACTION: This 3-bit field indicates a guard interval fraction value of an (i+1)th frame of an associated FRU. FRU_GI_FRACTION is signaled according to Table 7.

RESERVED: This 4-bit field is reserved for future use.

The following fields provide parameters for decoding the PLS2 data.

PLS2_FEC_TYPE: This 2-bit field indicates an FEC type used by PLS2 protection. The FEC type is signaled according to Table 4. Details of LDPC codes will be described later.

TABLE 4

| Content | PLS2 FEC type |
|---|---|
| 00 | 4K-1/4 and 7K-3/10 LDPC codes |
| 01 to 11 | Reserved |

PLS2_MOD: This 3-bit field indicates a modulation type used by PLS2. The modulation type is signaled according to Table 5.

TABLE 5

| Value | PLS2_MODE |
|---|---|
| 000 | BPSK |
| 001 | QPSK |
| 010 | QAM-16 |
| 011 | NUQ-64 |
| 100 to 111 | Reserved |

PLS2_SIZE_CELL: This 15-bit field indicates Ctotal_partial_block, a size (specified as the number of QAM cells) of the collection of full coded blocks for PLS2 that is carried in a current frame group. This value is constant during the entire duration of the current frame group.

PLS2_STAT_SIZE_BIT: This 14-bit field indicates a size, in bits, of PLS2-STAT for a current frame group. This value is constant during the entire duration of the current frame group.

PLS2_DYN_SIZE_BIT: This 14-bit field indicates a size, in bits, of PLS2-DYN for a current frame group. This value is constant during the entire duration of the current frame group.

PLS2_REP_FLAG: This 1-bit flag indicates whether a PLS2 repetition mode is used in a current frame group. When this field is set to a value of '1', the PLS2 repetition mode is activated. When this field is set to a value of '0', the PLS2 repetition mode is deactivated.

PLS2_REP_SIZE_CELL: This 15-bit field indicates Ctotal_partial_block, a size (specified as the number of QAM cells) of the collection of partial coded blocks for PLS2 carried in every frame of a current frame group, when PLS2 repetition is used. If repetition is not used, a value of this field is equal to 0. This value is constant during the entire duration of the current frame group.

PLS2_NEXT_FEC_TYPE: This 2-bit field indicates an FEC type used for PLS2 that is carried in every frame of a next frame group. The FEC type is signaled according to Table 10.

PLS2_NEXT_MOD: This 3-bit field indicates a modulation type used for PLS2 that is carried in every frame of a next frame group. The modulation type is signaled according to Table 11.

PLS2_NEXT_REP_FLAG: This 1-bit flag indicates whether the PLS2 repetition mode is used in a next frame group. When this field is set to a value of '1', the PLS2 repetition mode is activated. When this field is set to a value of '0', the PLS2 repetition mode is deactivated.

PLS2_NEXT_REP_SIZE_CELL: This 15-bit field indicates Ctotal_full_block, a size (specified as the number of QAM cells) of the collection of full coded blocks for PLS2 that is carried in every frame of a next frame group, when PLS2 repetition is used. If repetition is not used in the next frame group, a value of this field is equal to 0. This value is constant during the entire duration of a current frame group.

PLS2_NEXT_REP_STAT_SIZE_BIT: This 14-bit field indicates a size, in bits, of PLS2-STAT for a next frame group. This value is constant in a current frame group.

PLS2_NEXT_REP_DYN_SIZE_BIT: This 14-bit field indicates the size, in bits, of the PLS2-DYN for a next frame group. This value is constant in a current frame group.

PLS2_AP_MODE: This 2-bit field indicates whether additional parity is provided for PLS2 in a current frame group. This value is constant during the entire duration of the current frame group. Table 6 below provides values of this field. When this field is set to a value of '00', additional parity is not used for the PLS2 in the current frame group.

TABLE 6

| Value | PLS2-AP mode |
|---|---|
| 00 | AP is not provided |
| 01 | AP1 mode |
| 10 to 11 | Reserved |

PLS2_AP_SIZE_CELL: This 15-bit field indicates a size (specified as the number of QAM cells) of additional parity bits of PLS2. This value is constant during the entire duration of a current frame group.

PLS2_NEXT_AP_MODE: This 2-bit field indicates whether additional parity is provided for PLS2 signaling in every frame of a next frame group. This value is constant during the entire duration of a current frame group. Table 12 defines values of this field PLS2_NEXT_AP_SIZE_CELL: This 15-bit field indicates a size (specified as the number of QAM cells) of additional parity bits of PLS2 in every frame of a next frame group. This value is constant during the entire duration of a current frame group.

RESERVED: This 32-bit field is reserved for future use.

CRC_32: A 32-bit error detection code, which is applied to all PLS1 signaling.

FIG. 25 illustrates PLS2 data according to an embodiment of the present invention.

FIG. 25 illustrates PLS2-STAT data of the PLS2 data. The PLS2-STAT data is the same within a frame group, while PLS2-DYN data provides information that is specific for a current frame.

Details of fields of the PLS2-STAT data are described below.

FIC_FLAG: This 1-bit field indicates whether the FIC is used in a current frame group. If this field is set to '1', the FIC is provided in the current frame. If this field set to '0', the FIC is not carried in the current frame. This value is constant during the entire duration of the current frame group.

AUX_FLAG: This 1-bit field indicates whether an auxiliary stream is used in a current frame group. If this field is set to '1', the auxiliary stream is provided in a current frame. If this field set to '0', the auxiliary stream is not carried in the current frame. This value is constant during the entire duration of current frame group.

NUM_DP: This 6-bit field indicates the number of DPs carried within a current frame. A value of this field ranges from 1 to 64, and the number of DPs is NUM_DP+1.

DP_ID: This 6-bit field identifies uniquely a DP within a PHY profile.

DP_TYPE: This 3-bit field indicates a type of a DP. This is signaled according to the following Table 7.

TABLE 7

| Value | DP Type |
| --- | --- |
| 000 | DP Type 1 |
| 001 | DP Type 2 |
| 010 to 111 | Reserved |

DP_GROUP_ID: This 8-bit field identifies a DP group with which a current DP is associated. This may be used by the receiver to access DPs of service components associated with a particular service having the same DP_GROUP_ID.

BASE_DP_ID: This 6-bit field indicates a DP carrying service signaling data (such as PSI/SI) used in a management layer. The DP indicated by BASE_DP_ID may be either a normal DP carrying the service signaling data along with service data or a dedicated DP carrying only the service signaling data.

DP_FEC_TYPE: This 2-bit field indicates an FEC type used by an associated DP. The FEC type is signaled according to the following Table 8.

TABLE 8

| Value | FEC_TYPE |
| --- | --- |
| 00 | 16K LDPC |
| 01 | 64K LDPC |
| 10 to 11 | Reserved |

DP_COD: This 4-bit field indicates a code rate used by an associated DP. The code rate is signaled according to the following Table 9.

TABLE 9

| Value | Code rate |
| --- | --- |
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001 to 1111 | Reserved |

DP_MOD: This 4-bit field indicates modulation used by an associated DP. The modulation is signaled according to the following Table 10.

TABLE 10

| Value | Modulation |
| --- | --- |
| 0000 | QPSK |
| 0001 | QAM-16 |
| 0010 | NUQ-64 |
| 0011 | NUQ-256 |

TABLE 10-continued

| Value | Modulation |
| --- | --- |
| 0100 | NUQ-1024 |
| 0101 | NUC-16 |
| 0110 | NUC-64 |
| 0111 | NUC-256 |
| 1000 | NUC-1024 |
| 1001 to 1111 | Reserved |

DP_SSD_FLAG: This 1-bit field indicates whether an SSD mode is used in an associated DP. If this field is set to a value of '1', SSD is used. If this field is set to a value of '0', SSD is not used.

The following field appears only if PHY_PROFILE is equal to '010', which indicates the advanced profile:

DP_MIMO: This 3-bit field indicates which type of MIMO encoding process is applied to an associated DP. A type of MIMO encoding process is signaled according to the following Table 11.

TABLE 11

| Value | MIMO encoding |
| --- | --- |
| 000 | FR-SM |
| 001 | FRFD-SM |
| 010 to 111 | Reserved |

DP_TI_TYPE: This 1-bit field indicates a type of time interleaving. A value of '0' indicates that one TI group corresponds to one frame and contains one or more TI blocks. A value of '1' indicates that one TI group is carried in more than one frame and contains only one TI block.

DP_TI_LENGTH: The use of this 2-bit field (allowed values are only 1, 2, 4, and 8) is determined by values set within the DP_TI_TYPE field as follows.

If DP_TI_TYPE is set to a value of '1', this field indicates PI, the number of frames to which each TI group is mapped, and one TI block is present per TI group (NTI=1). Allowed values of PI with the 2-bit field are defined in Table 12 below.

If DP_TI_TYPE is set to a value of '0', this field indicates the number of TI blocks NTI per TI group, and one TI group is present per frame (PI=1). Allowed values of PI with the 2-bit field are defined in the following Table 12.

TABLE 12

| 2-bit field | $P_I$ | $N_{TI}$ |
| --- | --- | --- |
| 00 | 1 | 1 |
| 01 | 2 | 2 |
| 10 | 4 | 3 |
| 11 | 8 | 4 |

DP_FRAME_INTERVAL: This 2-bit field indicates a frame interval (IJUMP) within a frame group for an associated DP and allowed values are 1, 2, 4, and 8 (the corresponding 2-bit field is '00', '01', '10', or '11', respectively). For DPs that do not appear every frame of the frame group, a value of this field is equal to an interval between successive frames. For example, if a DP appears on frames 1, 5, 9, 13, etc., this field is set to a value of '4'. For DPs that appear in every frame, this field is set to a value of '1'.

DP_TI_BYPASS: This 1-bit field determines availability of the time interleaver 5050. If time interleaving is not used for a DP, a value of this field is set to '1'. If time interleaving is used, the value is set to '0'.

DP_FIRST_FRAME_IDX: This 5-bit field indicates an index of a first frame of a superframe in which a current DP occurs. A value of DP_FIRST_FRAME_IDX ranges from 0 to 31

DP_NUM_BLOCK_MAX: This 10-bit field indicates a maximum value of DP_NUM_BLOCKS for this DP. A value of this field has the same range as DP_NUM_BLOCKS.

DP_PAYLOAD_TYPE: This 2-bit field indicates a type of payload data carried by a given DP. DP_PAYLOAD_TYPE is signaled according to the following Table 13.

TABLE 13

| Value | Payload type |
|---|---|
| 00 | TS |
| 01 | IP |
| 10 | GS |
| 11 | Reserved |

DP_INBAND_MODE: This 2-bit field indicates whether a current DP carries in-band signaling information. An in-band signaling_type is signaled according to the following Table 14.

TABLE 14

| Value | In-band mode |
|---|---|
| 00 | In-band signaling is not carried. |
| 01 | INBAND-PLS is carried |
| 10 | INBAND-ISSY is carried |
| 11 | INBAND-PLS and INBAND-ISSY are carried |

DP_PROTOCOL_TYPE: This 2-bit field indicates a protocol type of a payload carried by a given DP. The protocol type is signaled according to Table 15 below when input payload types are selected.

TABLE 15

| Value | If DP_PAYLOAD_TYPE is TS | If DP_PAYLOAD_TYPE is IP | If DP_PAYLOAD_TYPE is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in an input formatting block. A CRC mode is signaled according to the following Table 16.

TABLE 16

| Value | CRC mode |
|---|---|
| 00 | Not used |
| 01 | CRC-8 |
| 10 | CRC-16 |
| 11 | CRC-32 |

DNP_MODE: This 2-bit field indicates a null-packet deletion mode used by an associated DP when DP_PAYLOAD_TYPE is set to TS ('00'). DNP_MODE is signaled according to Table 17 below. If DP_PAYLOAD_TYPE is not ('00'), DNP_MODE is set to a value of '00'.

TABLE 17

| Value | Null-packet deletion mode |
|---|---|
| 00 | Not used |
| 01 | DNP-NORMAL |
| 10 | DNP-OFFSET |
| 11 | Reserved |

ISSY_MODE: This 2-bit field indicates an ISSY mode used by an associated DP when DP_PAYLOAD_TYPE is set to TS ('00'). ISSY_MODE is signaled according to Table 18 below. If DP_PAYLOAD_TYPE is not TS ('00'), ISSY_MODE is set to the value of '00'.

TABLE 18

| Value | ISSY mode |
|---|---|
| 00 | Not used |
| 01 | ISSY-UP |
| 10 | ISSY-BBF |
| 11 | Reserved |

HC_MODE_TS: This 2-bit field indicates a TS header compression mode used by an associated DP when DP_PAYLOAD_TYPE is set to TS ('00'). HC_MODE_TS is signaled according to the following Table 19.

TABLE 19

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates an IP header compression mode when DP_PAYLOAD_TYPE is set to IP ('01'). HC_MODE_IP is signaled according to the following Table 20.

TABLE 20

| Value | Header compression mode |
|---|---|
| 00 | No compression |
| 01 | HC_MODE_IP 1 |
| 10 to 11 | Reserved |

PID: This 13-bit field indicates the PID number for TS header compression when DP_PAYLOAD_TYPE is set to TS (00') and HC_MODE_TS is set to '01' or '10'.

RESERVED: This 8-bit field is reserved for future use.

The following fields appear only if FIC_FLAG is equal to '1'.

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following fields appear only if AUX_FLAG is equal to '1'.

NUM_AUX: This 4-bit field indicates the number of auxiliary streams. Zero means no auxiliary stream is used.

AUX_CONFIG_RFU: This 8-bit field is reserved for future use.

AUX_STREAM_TYPE: This 4-bit is reserved for future use for indicating a type of a current auxiliary stream.

AUX_PRIVATE_CONFIG: This 28-bit field is reserved for future use for signaling auxiliary streams.

Figures 26, 27:
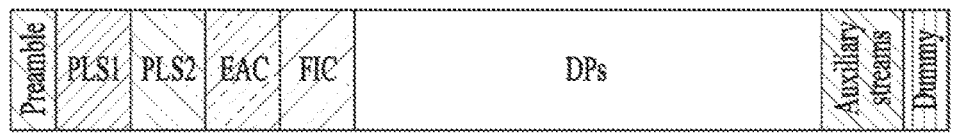
FIG. 26 is a table illustrating PLS2 data according to another embodiment of the present invention.
FIG. 27 is a diagram illustrating a logical structure of a frame according to an embodiment of the present invention.

FIG. 26 illustrates PLS2 data according to another embodiment of the present invention.

FIG. 26 illustrates PLS2-DYN data of the PLS2 data. Values of the PLS2 -DYN data may change during the duration of one frame group while sizes of fields remain constant.

Details of fields of the PLS2-DYN data are as below.

FRAME_INDEX: This 5-bit field indicates a frame index of a current frame within a superframe. An index of a first frame of the superframe is set to '0'.

PLS_CHANGE_COUNTER: This 4-bit field indicates the number of superframes before a configuration changes. A next superframe with changes in the configuration is indicated by a value signaled within this field. If this field is set to a value of '0000', it means that no scheduled change is foreseen. For example, a value of '1' indicates that there is a change in the next superframe.

FIC_CHANGE_COUNTER: This 4-bit field indicates the number of superframes before a configuration (i.e., content of the FIC) changes. A next superframe with changes in the configuration is indicated by a value signaled within this field. If this field is set to a value of '0000', it means that no scheduled change is foreseen. For example, a value of '0001' indicates that there is a change in the next superframe.

RESERVED: This 16-bit field is reserved for future use.

The following fields appear in a loop over NUM_DP, which describe parameters associated with a DP carried in a current frame.

DP_ID: This 6-bit field uniquely indicates a DP within a PHY profile.

DP_START: This 15-bit (or 13-bit) field indicates a start position of the first of the DPs using a DPU addressing scheme. The DP_START field has differing length according to the PHY profile and FFT size as shown in the following Table 21.

TABLE 21

| PHY profile | DP_START field size | |
|---|---|---|
| | 64K | 16K |
| Base | 13 bits | 15 bits |
| Handheld | — | 13 bits |
| Advanced | 13 bits | 15 bits |

DP_NUM_BLOCK: This 10-bit field indicates the number of FEC blocks in a current TI group for a current DP. A value of DP_NUM_BLOCK ranges from 0 to 1023.

RESERVED: This 8-bit field is reserved for future use.

The following fields indicate FIC parameters associated with the EAC.

EAC_FLAG: This 1-bit field indicates the presence of the EAC in a current frame. This bit is the same value as EAC_FLAG in a preamble.

EAS_WAKE_UP_VERSION_NUM: This 8-bit field indicates a version number of a wake-up indication.

If the EAC_FLAG field is equal to '1', the following 12 bits are allocated to EAC_LENGTH_BYTE. If the EAC_FLAG field is equal to '0', the following 12 bits are allocated to EAC_COUNTER.

EAC_LENGTH_BYTE: This 12-bit field indicates a length, in bytes, of the EAC.

EAC_COUNTER: This 12-bit field indicates the number of frames before a frame where the EAC arrives.

The following fields appear only if the AUX_FLAG field is equal to '1'.

AUX_PRIVATE_DYN: This 48-bit field is reserved for future use for signaling auxiliary streams. A meaning of this field depends on a value of AUX_STREAM_TYPE in a configurable PLS2-STAT.

CRC_32: A 32-bit error detection code, which is applied to the entire PLS2.

FIG. 27 illustrates a logical structure of a frame according to an embodiment of the present invention.

As above mentioned, the PLS, EAC, FIC, DPs, auxiliary streams and dummy cells are mapped to the active carriers of OFDM symbols in a frame. PLS1 and PLS2 are first mapped to one or more FSSs. Thereafter, EAC cells, if any, are mapped to an immediately following PLS field, followed next by FIC cells, if any. The DPs are mapped next after the PLS or after the EAC or the FIC, if any. Type 1 DPs are mapped first and Type 2 DPs are mapped next. Details of types of the DPs will be described later. In some cases, DPs may carry some special data for EAS or service signaling data. The auxiliary streams or streams, if any, follow the DPs, which in turn are followed by dummy cells. When the PLS, EAC, FIC, DPs, auxiliary streams and dummy data cells are mapped all together in the above mentioned order, i.e. the PLS, EAC, FIC, DPs, auxiliary streams and dummy data cells, cell capacity in the frame is exactly filled.

Figure 28:
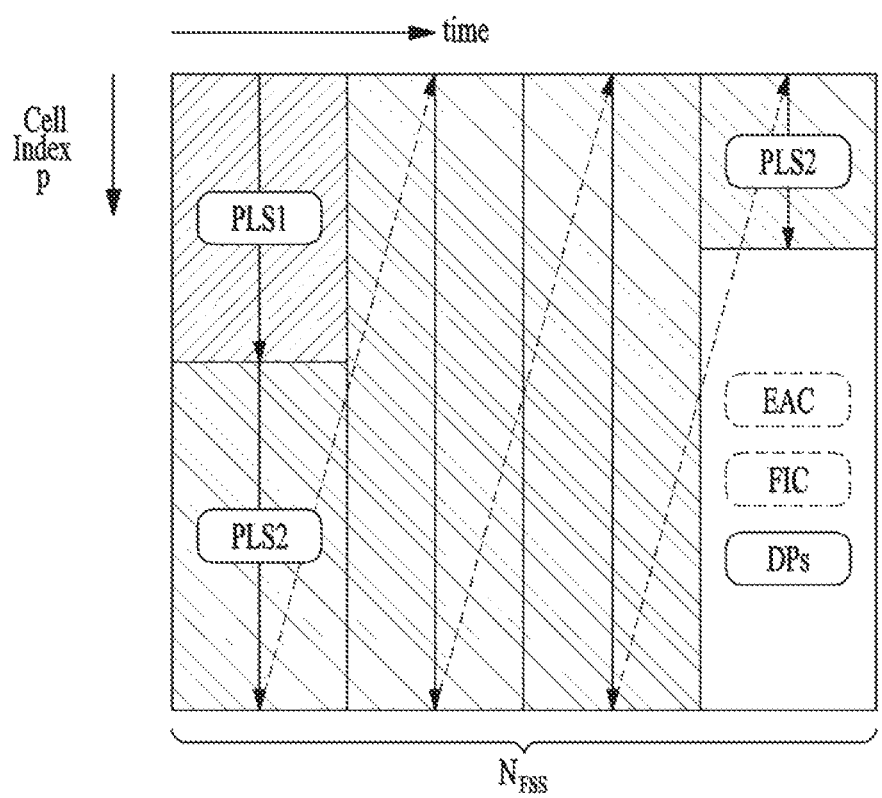
FIG. 28 is a diagram illustrating PLS mapping according to an embodiment of the present invention.

FIG. 28 illustrates PLS mapping according to an embodiment of the present invention.

PLS cells are mapped to active carriers of FSS(s). Depending on the number of cells occupied by PLS, one or more symbols are designated as FSS(s), and the number of FSS(s) NFSS is signaled by NUM_FSS in PLS1. The FSS is a special symbol for carrying PLS cells. Since robustness and latency are critical issues in the PLS, the FSS(s) have higher pilot density, allowing fast synchronization and frequency-only interpolation within the FSS.

PLS cells are mapped to active carriers of the FSS(s) in a top-down manner as shown in the figure. PLS1 cells are mapped first from a first cell of a first FSS in increasing order of cell index. PLS2 cells follow immediately after a last cell of PLS1 and mapping continues downward until a last cell index of the first FSS. If the total number of required PLS cells exceeds the number of active carriers of one FSS, mapping proceeds to a next FSS and continues in exactly the same manner as the first FSS.

After PLS mapping is completed, DPs are carried next. If an EAC, an FIC or both are present in a current frame, the EAC and the FIC are placed between the PLS and "normal" DPs.

Hereinafter, description will be given of encoding an FEC structure according to an embodiment of the present invention. As above mentioned, the data FEC encoder may perform FEC encoding on an input BBF to generate an FECBLOCK procedure using outer coding (BCH), and inner coding (LDPC). The illustrated FEC structure corresponds to the FECBLOCK. In addition, the FECBLOCK and the FEC structure have same value corresponding to a length of an LDPC codeword.

As described above, BCH encoding is applied to each BBF ($K_{bch}$ bits), and then LDPC encoding is applied to BCH-encoded BBF ($K_{ldpc}$ bits=$N_{bch}$ bits).

A value of $N_{ldpc}$ is either 64,800 bits (long FECBLOCK) or 16,200 bits (short FECBLOCK).

Table 22 and Table 23 below show FEC encoding parameters for the long FECBLOCK and the short FECBLOCK, respectively.

TABLE 22

| LDPC rate | $N_{ldpc}$ | $K_{ldpc}$ | $K_{bch}$ | BCH error correction capability | $N_{bch} - K_{bch}$ |
|---|---|---|---|---|---|
| 5/15  | 64800 | 21600 | 21408 | 12 | 192 |
| 6/15  |       | 25920 | 25728 |    |     |
| 7/15  |       | 30240 | 30048 |    |     |
| 8/15  |       | 34560 | 34368 |    |     |
| 9/15  |       | 38880 | 38688 |    |     |
| 10/15 |       | 43200 | 43008 |    |     |
| 11/15 |       | 47520 | 47328 |    |     |
| 12/15 |       | 51840 | 51648 |    |     |
| 13/15 |       | 56160 | 55968 |    |     |

TABLE 23

| LDPC rate | $N_{ldpc}$ | $K_{ldpc}$ | $K_{bch}$ | BCH error correction capability | $N_{bch} - K_{bch}$ |
|---|---|---|---|---|---|
| 5/15  | 16200 | 5400  | 5232  | 12 | 168 |
| 6/15  |       | 6480  | 6312  |    |     |
| 7/15  |       | 7560  | 7392  |    |     |
| 8/15  |       | 8640  | 8472  |    |     |
| 9/15  |       | 9720  | 9552  |    |     |
| 10/15 |       | 10800 | 10632 |    |     |
| 11/15 |       | 11880 | 11712 |    |     |
| 12/15 |       | 12960 | 12792 |    |     |
| 13/15 |       | 14040 | 13872 |    |     |

Detailed operations of BCH encoding and LDPC encoding are as below.

A 12-error correcting BCH code is used for outer encoding of the BBF. A BCH generator polynomial for the short FECBLOCK and the long FECBLOCK are obtained by multiplying all polynomials together.

LDPC code is used to encode an output of outer BCH encoding. To generate a completed $B_{ldpc}$, (FECBLOCK), Pldpc (parity bits) is encoded systematically from each $I_{ldpc}$ (BCH—encoded BBF), and appended to $I_{ldpc}$. The completed $B_{ldpc}$, (FECBLOCK) is expressed by the following Equation.

$$B_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$  [Equation 2]

Parameters for the long FECBLOCK and the short FECBLOCK are given in the above Tables 22 and 23, respectively.

A detailed procedure to calculate $N_{ldpc}-K_{ldpc}$ parity bits for the long FECBLOCK, is as follows.

1) Initialize the parity bits $$p_0 = p_1 = p_2 = \ldots = p_{N_{ldpc}-K_{ldpc}-1} = 0$$  [Equation 3]

2) Accumulate a first information bit—$i_0$, at a parity bit address specified in a first row of addresses of a parity check matrix. Details of the addresses of the parity check matrix will be described later. For example, for the rate of 13/15, $$p_{983} = p_{983} \oplus i_0 \quad p_{2815} = p_{2815} \oplus i_0$$  [Equation 4]
$$p_{4837} = p_{4837} \oplus i_0 \quad p_{4989} = p_{4989} \oplus i_0$$
$$p_{6138} = p_{6138} \oplus i_0 \quad p_{6458} = p_{6458} \oplus i_0$$
$$p_{6921} = p_{6921} \oplus i_0 \quad p_{6974} = p_{6974} \oplus i_0$$
$$p_{7572} = p_{7571} \oplus i_0 \quad p_{8260} = p_{8260} \oplus i_0$$
$$p_{8496} = p_{8496} \oplus i_0$$

3) For the next 359 information bits, $i_s$, s=1, 2, . . . , 359, accumulate is at parity bit addresses using following Equation.

$$\{x+(s \bmod 360) \times Q_{ldpc}\} \bmod(N_{ldpc}-K_{ldpc})$$  [Equation 5]

Here, x denotes an address of a parity bit accumulator corresponding to a first bit $i_0$, and $Q_{ldpc}$ is a code rate dependent constant specified in the addresses of the parity check matrix. Continuing with the example, $Q_{ldpc}=24$ for the rate of 13/15, so for an information bit $i_1$, the following operations are performed.

$$p_{1007} = p_{1007} \oplus i_1 \quad p_{2839} = p_{2839} \oplus i_1$$  [Equation 6]
$$p_{4861} = p_{4861} \oplus i_1 \quad p_{5013} = p_{5013} \oplus i_1$$
$$p_{6162} = p_{6162} \oplus i_1 \quad p_{6482} = p_{6482} \oplus i_1$$
$$p_{6945} = p_{6945} \oplus i_1 \quad p_{6998} = p_{6998} \oplus i_1$$
$$p_{7596} = p_{7596} \oplus i_1 \quad p_{8284} = p_{8284} \oplus i_1$$
$$p_{8520} = p_{8520} \oplus i_1$$

4) For a 361th information bit $i_{360}$, an address of the parity bit accumulator is given in a second row of the addresses of the parity check matrix. In a similar manner, addresses of the parity bit accumulator for the following 359 information bits $i_s$, s=361, 362, . . . , 719 are obtained using Equation 6, where x denotes an address of the parity bit accumulator corresponding to the information bit $i_{360}$, i.e., an entry in the second row of the addresses of the parity check matrix.

5) In a similar manner, for every group of 360 new information bits, a new row from the addresses of the parity check matrix is used to find the address of the parity bit accumulator.

After all of the information bits are exhausted, a final parity bit is obtained as below.

6) Sequentially perform the following operations starting with i=1.

$$p_i = p_i \oplus p_{i-1}, i=1,2, \ldots, N_{ldpc}-K_{ldpc}-1$$  [Equation 7]

Here, final content of $p_i$ (i=0, 1, . . . , $N_{ldpc}-K_{ldpc}-1$) is equal to a parity bit $p_i$.

TABLE 24

| Code rate | $Q_{ldpc}$ |
|---|---|
| 5/15 | 120 |
| 6/15 | 108 |
| 7/15 | 96 |

TABLE 24-continued

| Code rate | $Q_{ldpc}$ |
|---|---|
| 8/15 | 84 |
| 9/15 | 72 |
| 10/15 | 60 |
| 11/15 | 48 |
| 12/15 | 36 |
| 13/15 | 24 |

This LDPC encoding procedure for the short FECBLOCK is in accordance with t LDPC encoding procedure for the long FECBLOCK, except that Table 24 is replaced with Table 25, and the addresses of the parity check matrix for the long FECBLOCK are replaced with the addresses of the parity check matrix for the short FECBLOCK.

TABLE 25

| Code rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

FIG. 29 illustrates time interleaving according to an embodiment of the present invention.

(a) to (c) show examples of a TI mode.

A time interleaver operates at the DP level. Parameters of time interleaving (TI) may be set differently for each DP.

The following parameters, which appear in part of the PLS2-STAT data, configure the TI.

DP_TI_TYPE (allowed values: 0 or 1): This parameter represents the TI mode. The value '0' indicates a mode with multiple TI blocks (more than one TI block) per TI group. In this case, one TI group is directly mapped to one frame (no inter-frame interleaving). The value of '1' indicates a mode with only one TI block per TI group. In this case, the TI block may be spread over more than one frame (inter-frame interleaving).

DP_TI_LENGTH: If DP_TI_TYPE='0', this parameter is the number of TI blocks $N_{TI}$ per TI group. For DP_TI_TYPE='1', this parameter is the number of frames PI spread from one TI group.

DP_NUM_BLOCK_MAX (allowed values: 0 to 1023): This parameter represents the maximum number of XFECBLOCKs per TI group.

DP_FRAME_INTERVAL (allowed values: 1, 2, 4, and 8): This parameter represents the number of the frames $I_{JUMP}$ between two successive frames carrying the same DP of a given PHY profile.

DP_TI_BYPASS (allowed values: 0 or 1): If time interleaving is not used for a DP, this parameter is set to '1'. This parameter is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the delay compensation block for the dynamic configuration information from the scheduler may still be required. In each DP, the XFECBLOCKs received from SSD/MIMO encoding are grouped into TI groups. That is, each TI group is a set of an integer number of XFECBLOCKs and contains a dynamically variable number of XFECBLOCKs. The number of XFECBLOCKs in the TI group of index n is denoted by $N_{xBLOCK\_Group}(n)$ and is signaled as DP_NUM_BLOCK in the PLS2-DYN data. Note that $N_{xBLOCK\_Group}(n)$ may vary from a minimum value of 0 to a maximum value of $N_{xBLOCK\_Group\_MAX}$ (corresponding to DP_NUM_BLOCK_MAX), the largest value of which is 1023.

Each TI group is either mapped directly to one frame or spread over $P_i$ frames. Each TI group is also divided into more than one TI block ($N_{TI}$), where each TI block corresponds to one usage of a time interleaver memory. The TI blocks within the TI group may contain slightly different numbers of XFECBLOCKs. If the TI group is divided into multiple TI blocks, the TI group is directly mapped to only one frame. There are three options for time interleaving (except an extra option of skipping time interleaving) as shown in the following Table 26.

TABLE 26

| Modes | Descriptions |
|---|---|
| Option 1 | Each TI group contains one TI block and is mapped directly to one frame as shown in (a). This option is signaled in PLS2-STAT by DP_TI_TYPE = '0' and DP_TI_LENGTH = '1' ($N_{TI}$ = 1). |
| Option 2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in PLS2-STAT by DP_TI_TYPE = '1'. |
| Option 3 | Each TI group is divided into multiple TI blocks and is mapped directly to one frame as shown in (c). Each TI block may use a full TI memory so as to provide a maximum bit-rate for a DP. This option is signaled in PLS2-STAT by DP_TI_TYPE = '0' and DP_TI_LENGTH = $N_{TI}$, while $P_I$ = 1. |

Typically, the time interleaver may also function as a buffer for DP data prior to a process of frame building. This is achieved by means of two memory banks for each DP. A first TI block is written to a first bank. A second TI block is written to a second bank while the first bank is being read from and so on.

The TI is a twisted row-column block interleaver. For an $s^{th}$ TI block of an $n^{th}$ TI group, the number of rows $N_r$ of a TI memory is equal to the number of cells $N_{cells}$, i.e., $N_r = N_{cells}$ while the number of columns $N_c$ is equal to the number $N_{xBLOCK\_u}(n,s)$.

Figure 30:
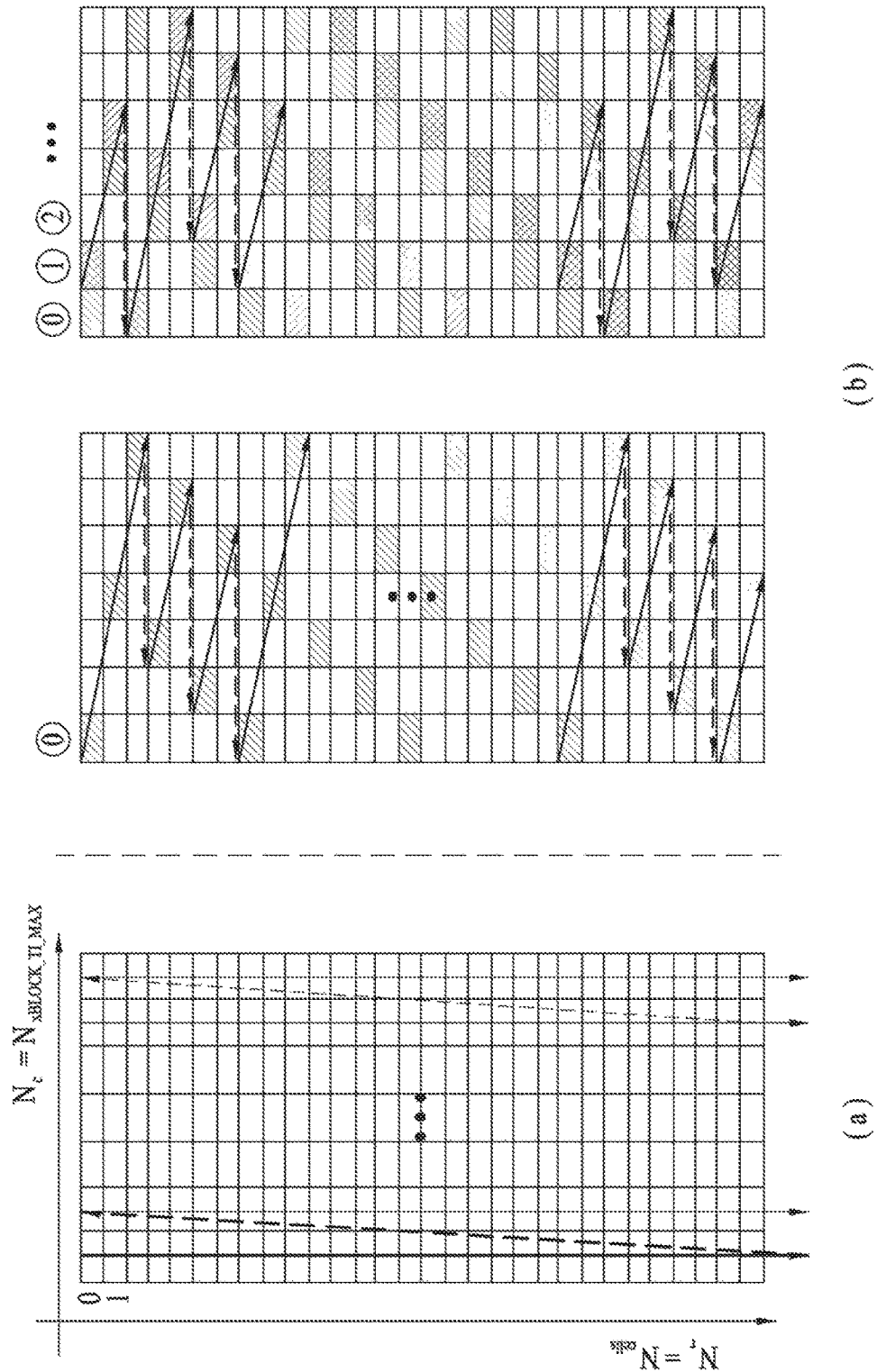
FIG. 30 is a diagram illustrating a basic operation of a twisted row-column block interleaver according to an embodiment of the present invention.

FIG. 30 illustrates a basic operation of a twisted row-column block interleaver according to an embodiment of the present invention.

FIG. 30(a) shows a write operation in the time interleaver and FIG. 30(b) shows a read operation in the time interleaver. A first XFECBLOCK is written column-wise into a first column of a TI memory, and a second XFECBLOCK is written into a next column, and so on as shown in (a). Then, in an interleaving array, cells are read diagonal-wise. During diagonal-wise reading from a first row (rightwards along a row beginning with a left-most column) to a last row, Nr cells are read out as shown in (b). In detail, assuming $z_{n,s,i}(i=0, \ldots, N_r N_c)$ as a TI memory cell position to be read sequentially, a reading process in such an interleaving array is performed by calculating a row index $R_{n,s,i}$, a column index $C_{n,s,i}$, and an associated twisting parameter $T_{n,s,i}$ as in the following Equation.

[Equation 8]

$$\text{GENERATE } (R_{n,s,i}, C_{n,s,i}) = \{$$
$$R_{n,s,i} = \text{mod}(i, N_r),$$
$$T_{n,s,i} = \text{mod}(S_{shift} \times R_{n,s,i}, N_c),$$
$$C_{n,s,i} = \text{mod}\left(T_{n,s,i} + \left\lfloor \frac{i}{N_r} \right\rfloor, N_c\right)$$
$$\}$$

Here, $S_{shift}$ is a common shift value for a diagonal-wise reading process regardless of $N_{xBLOCK\_TI}(n,s)$, and the shift value is determined by $N_{xBLOCK\_TI\_MAX}$ given in PLS2-STAT as in the following Equation.

[Equation 9]

$$\text{for} \begin{cases} N'_{xBLOCK\_TI\_MAX} = N_{xBLOCK\_TI\_MAX} + 1, & \text{if } N_{xBLOCK\_TI\_MAX} \bmod 2 = 0 \\ N'_{xBLOCK\_TI\_MAX} = N_{xBLOCK\_TI\_MAX}, & \text{if } N_{xBLOCK\_TI\_MAX} \bmod 2 = 1 \end{cases},$$

$$S_{shift} = \frac{N'_{xBLOCK\_TI\_MAX} - 1}{2}$$

As a result, cell positions to be read are calculated by coordinates $Z_{n,s,i} = N_r C_{n,s,i} + R_{n,s,i}$.

Figure 31:
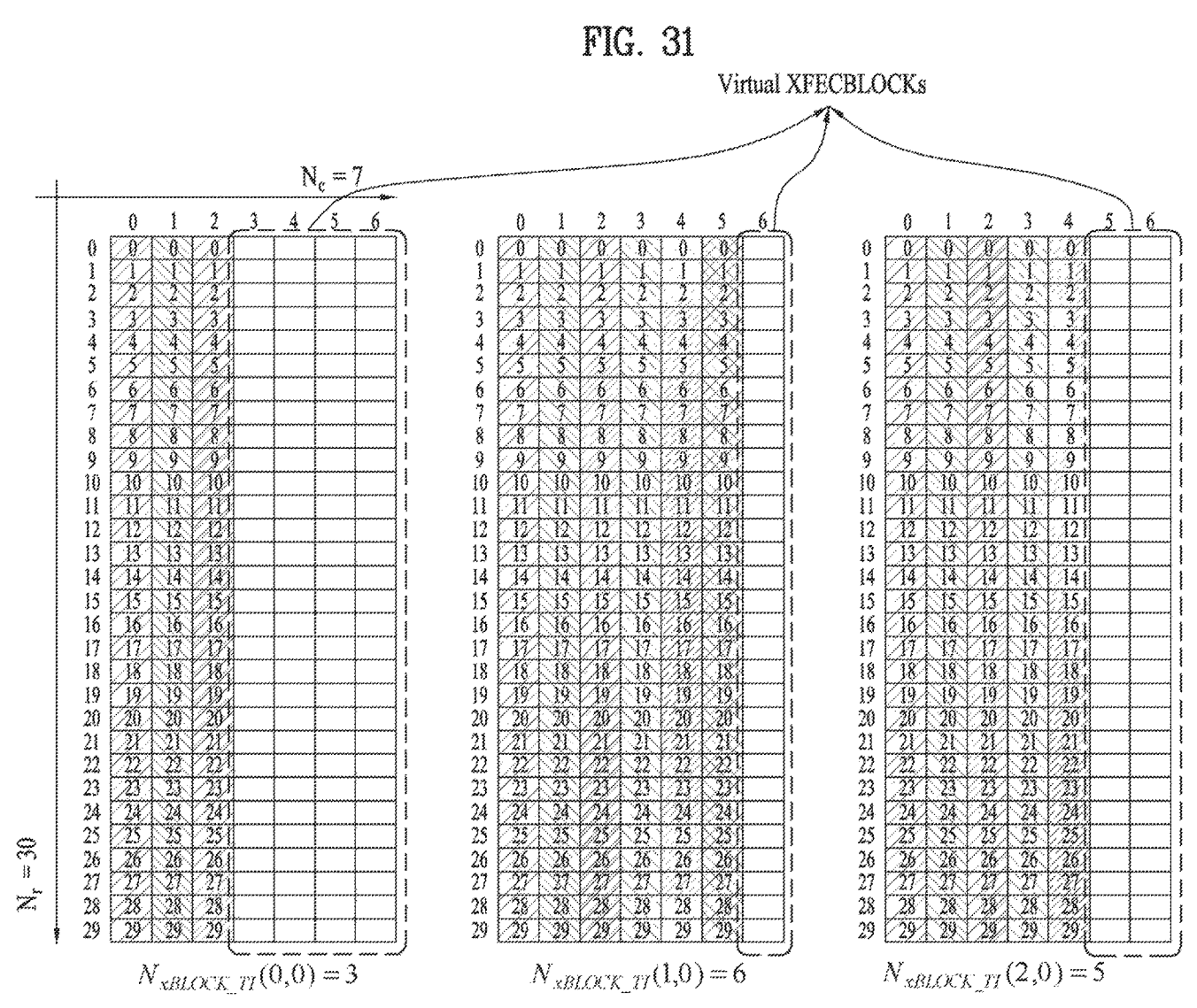

FIG. 31 illustrates an operation of a twisted row-column block interleaver according to another embodiment of the present invention.

More specifically, FIG. 31 illustrates an interleaving array in a TI memory for each TI group, including virtual XFEC-BLOCKs when $N_{xBLOCK\_TI}(0,0)=3$, $N_{xBLOCK\_TI}(1,0)=6$, and $N_{xBLOCK\_TI}(2,0)=5$.

A variable number $N_{xBLOCK\_TI}(n,s)=N_r$ may be less than or equal to $N'_{xBLOCK\_TI\_MAX}$. Thus, in order to achieve single-memory deinterleaving at a receiver side regardless of $N_{xBLOCK\_TI}(n,s)$, the interleaving array for use in the twisted row-column block interleaver is set to a size of $N_r \times N_c = N_{cells} \times N'_{xBLOCK\_TI\_MAX}$ by inserting the virtual XFECBLOCKs into the TI memory and a reading process is accomplished as in the following Equation.

[Equation 10]

```
p = 0;
for i = 0;i < N_cells N_xBLOCK_TI_MAX';i = i + 1
{GENERATE (R_{n,s,i}, C_{n,s,i});
V_i = N_r C_{n,s,j} + R_{n,s,j}
  if V_i < N_cells N_xBLOCK_TI(n,s)
  {
    Z_{n,s,p} = V_i; p = p + 1;
  }
}
```

The number of TI groups is set to 3. An option of the time interleaver is signaled in the PLS2-STAT data by DP_TI_TYPE='0', DP_FRAME_INTERVAL='1', and DP_TI_LENGTH='1', i.e., NTI=1, IJUMP=1, and PI=1. The number of XFECBLOCKs, each of which has Ncells=30 cells, per TI group is signaled in the PLS2-DYN data by NxBLOCK_TI(0,0)=3, NxBLOCK_TI(1,0)=6, and NxBLOCK_TI(2,0)=5, respectively. A maximum number of XFECBLOCKs is signaled in the PLS2-STAT data by NxBLOCK_Group_MAX, which leads to $\lfloor N_{xBLOCK\_Group\_MAX}/N_{TI} \rfloor = N_{xBLOCK\_TI\_MAX} = 6$.

The purpose of the Frequency Interleaver, which operates on data corresponding to a single OFDM symbol, is to provide frequency diversity by randomly interleaving data cells received from the frame builder. In order to get maximum interleaving gain in a single frame, a different interleaving-sequence is used for every OFDM symbol pair comprised of two sequential OFDM symbols.

Therefore, the frequency interleaver according to the present embodiment may include an interleaving address generator for generating an interleaving address for applying corresponding data to a symbol pair.

Figure 32:
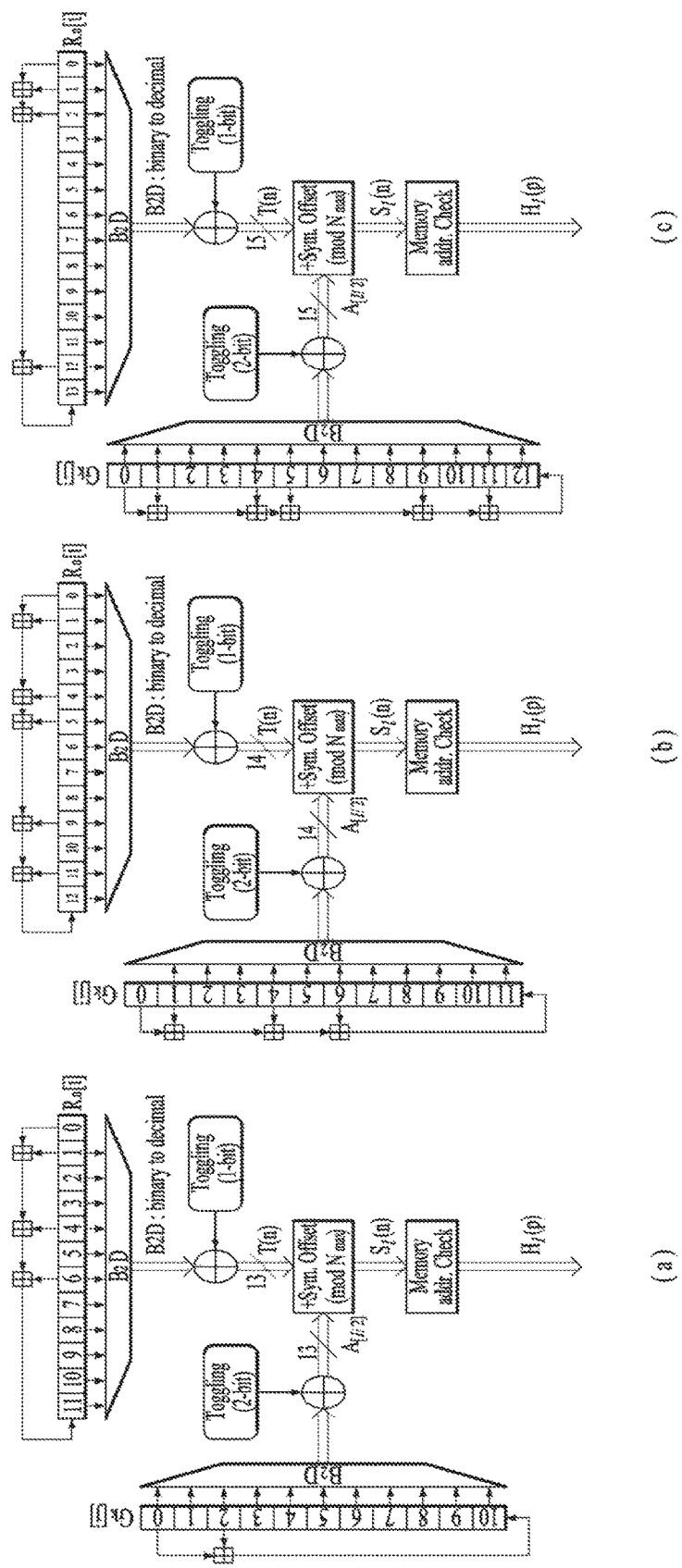

FIG. 32 illustrates an interleaving address generator including a main pseudo-random binary sequence (PRBS) generator and a sub-PRBS generator according to each FFT mode according to an embodiment of the present invention.

(a) shows the block diagrams of the interleaving-address generator for 8K FFT mode, (b) shows the block diagrams of the interleaving-address generator for 16K FFT mode and (c) shows the block diagrams of the interleaving-address generator for 32K FFT mode.

The interleaving process for the OFDM symbol pair is described as follows, exploiting a single interleaving-sequence. First, available data cells (the output cells from the Cell Mapper) to be interleaved in one OFDM symbol $O_{m,l}$ is defined as $O_{m,l} = [x_{m,l,0}, \ldots, x_{m,l,p}, \ldots, x_{m,l,N_{data}-1}]$ for $l=0, \ldots, N_{sym}-1$ where $x_{m,l,p}$ is the $p^{th}$ cell of the $l^{th}$ OFDM symbol in the $m^{th}$ frame and $N_{data}$ is the number of data cells: $N_{data} = C_{FSS}$ for the frame signaling symbol(s), $N_{data} = C_{data}$ for the normal data, and $N_{data} = C_{FES}$ for the frame edge symbol. In addition, the interleaved data cells are defined as $P_{m,l} = [v_{m,l,0}, \ldots, v_{m,l,N_{data}-1}]$ for $l=0, \ldots, N_{sym}-1$.

For the OFDM symbol pair, the interleaved OFDM symbol pair is given by $v_{m,l,H_i(p)} = x_{m,l,p}$, $p=0, \ldots, N_{data}-1$, for the first OFDM symbol of each pair $v_{m,l,p} = x_{m,l,H_i(p)}$, $p=0, \ldots, N_{data}-1$, for the second OFDM symbol of each pair, where $H_l(p)$ is the interleaving address generated by a PRBS generator.

FIG. 33 illustrates a main PRBS used for all FFT modes according to an embodiment of the present invention.

(a) illustrates the main PRBS, and (b) illustrates a parameter Nmax for each FFT mode.

FIG. 34 illustrates a sub-PRBS used for FFT modes and an interleaving address for frequency interleaving according to an embodiment of the present invention.

(a) illustrates a sub-PRBS generator, and (b) illustrates an interleaving address for frequency interleaving. A cyclic shift value according to an embodiment of the present invention may be referred to as a symbol offset.

FIG. 35 illustrates a write operation of a time interleaver according to an embodiment of the present invention.

FIG. 35 illustrates a write operation for two TI groups.

A left block in the figure illustrates a TI memory address array, and right blocks in the figure illustrate a write operation when two virtual FEC blocks and one virtual FEC block are inserted into heads of two contiguous TI groups, respectively.

Hereinafter, description will be given of a configuration of a time interleaver and a time interleaving method using both a convolutional interleaver (CI) and a block interleaver (BI) or selectively using either the CI or the BI according to a physical layer pipe (PLP) mode. A PLP according to an embodiment of the present invention is a physical path corresponding to the same concept as that of the above-described DP, and a name of the PLP may be changed by a designer.

A PLP mode according to an embodiment of the present invention may include a single PLP mode or a multi-PLP mode according to the number of PLPs processed by a broadcast signal transmitter or a broadcast signal transmission apparatus. The single PLP mode corresponds to a case in which one PLP is processed by the broadcast signal transmission apparatus. The single PLP mode may be referred to as a single PLP.

The multi-PLP mode corresponds to a case in which one or more PLPs are processed by the broadcast signal transmission apparatus. The multi-PLP mode may be referred to as multiple PLPs.

In the present invention, time interleaving in which different time interleaving schemes are applied according to PLP modes may be referred to as hybrid time interleaving. Hybrid time interleaving according to an embodiment of the present invention is applied for each PLP (or at each PLP level) in the multi-PLP mode.

FIG. 36 illustrates an interleaving type applied according to the number of PLPs in a table.

In a time interleaving according to an embodiment of the present invention, an interleaving type may be determined based on a value of PLP_NUM. PLP_NUM is a signaling field indicating a PLP mode. When PLP_NUM has a value of 1, the PLP mode corresponds to a single PLP. The single PLP according to the present embodiment may be applied only to a CI.

When PLP_NUM has a value greater than 1, the PLP mode corresponds to multiple PLPs. The multiple PLPs according to the present embodiment may be applied to the CI and a BI. In this case, the CI may perform inter-frame interleaving, and the BI may perform intra-frame interleaving.

FIG. 37 is a block diagram including a first example of a structure of a hybrid time interleaver described above.

The hybrid time interleaver according to the first example may include a BI and a CI. The time interleaver of the present invention may be positioned between a BICM chain block and a frame builder.

The BICM chain block illustrated in FIGS. 37 and 38 may include the blocks in the processing block 5000 of the BICM block illustrated in FIG. 19 except for the time interleaver 5050. The frame builder illustrated in FIGS. 37 and 38 may perform the same function as that of the frame building block 1020 of FIG. 18.

As described in the foregoing, it is possible to determine whether to apply the BI according to the first example of the structure of the hybrid time interleaver depending on values of PLP_NUM. That is, when PLP_NUM=1, the BI is not applied (BI is turned OFF) and only the CI is applied. When PLP_NUM>1, both the BI and the CI may be applied (BI is turned ON). A structure and an operation of the CI applied when PLP_NUM>1 may be the same as or similar to a structure and an operation of the CI applied when PLP_NUM=1.

FIG. 38 is a block diagram including a second example of the structure of the hybrid time interleaver described above.

An operation of each block included in the second example of the structure of the hybrid time interleaver is the same as the above description in FIG. 37. It is possible to determine whether to apply a BI according to the second example of the structure of the hybrid time interleaver depending on values of PLP_NUM. Each block of the hybrid time interleaver according to the second example may perform operations according to embodiments of the present invention. In this instance, an applied structure and operation of a CI may be different between a case of PLP_NUM=1 and a case of PLP_NUM>1.

FIG. 39 is a block diagram including a first example of a structure of a hybrid time deinterleaver.

The hybrid time deinterleaver according to the first example may perform an operation corresponding to a reverse operation of the hybrid time interleaver according to the first example described above. Therefore, the hybrid time deinterleaver according to the first example of FIG. 39 may include a convolutional deinterleaver (CDI) and a block deinterleaver (BDI).

A structure and an operation of the CDI applied when PLP_NUM>1 may be the same as or similar to a structure and an operation of the CDI applied when PLP_NUM=1.

It is possible to determine whether to apply the BDI according to the first example of the structure of the hybrid time deinterleaver depending on values of PLP_NUM. That is, when PLP_NUM=1, the BDI is not applied (BDI is turned OFF) and only the CDI is applied.

The CDI of the hybrid time deinterleaver may perform inter-frame deinterleaving, and the BDEI may perform intra-frame deinterleaving. Details of inter-frame deinterleaving and intra-frame deinterleaving are the same as the above description.

A BICM decoding block illustrated in FIGS. 39 and 40 may perform a reverse operation of the BICM chain block of FIGS. 37 and 38.

FIG. 40 is a block diagram including a second example of the structure of the hybrid time deinterleaver.

The hybrid time deinterleaver according to the second example may perform an operation corresponding to a reverse operation of the hybrid time interleaver according to the second example described above. An operation of each block included in the second example of the structure of the hybrid time deinterleaver may be the same as the above description in FIG. 39.

It is possible to determine whether to apply a BDI according to the second example of the structure of the hybrid time deinterleaver depending on values of PLP_NUM. Each block of the hybrid time deinterleaver according to the second example may perform operations according to embodiments of the present invention. In this instance, an applied structure and operation of a CDI may be different between a case of PLP_NUM=1 and a case of PLP_NUM>1.

FIG. 41 illustrates an application-related broadcast service according to an embodiment of the present invention.

The present invention proposes a signaling scheme and a synchronization scheme in a broadcast service related to an application among the above-described broadcast services. Here, the application-related broadcast service may refer to a broadcast service corresponding to a case in which provision of a basic broadcast service is related to an application. Specifically, examples thereof may include a linear service including application-based enhancements and/or a standalone application-based service. According to a given embodiment, the signaling scheme of the present invention may be applied to another form of service which uses an application.

First, a description will be given of the linear service including application-based enhancements. Here, the linear service may refer to a general broadcast service. An enhancement may refer to an enhancement service or an interactive service which delivers additional information for a general broadcast service. In addition, application-based enhancement may refer to a case in which the above-described additional information is provided and/or controlled based on an application.

For example, a case, in which a player information application provides information about football players (application-based enhancement) when a football game (general broadcast service) is broadcast, may correspond to the linear service including application-based enhancements.

The standalone application-based service will be described. The standalone application-based service may refer to a broadcast service only including an application-based enhancement. In other words, a case in which an application provides a service rather than the application-based enhancement provides additional information to the basic broadcast service may correspond to the standalone application-based service. A broadcast-independent application, etc. may be an example of an application that provides the standalone application-based service.

The application-based enhancement may include several components. The components of the application-based enhancement may include one or more applications, zero or more activation notifications, zero or more additional non-real-time (NRT) content items and/or zero or more on-demand items.

Here, each application may correspond to an NRT content item which can be executed in an application run time environment. Here, actions to be performed by applications may be initiated by notifications delivered through a broadcast network/broadband network, and these notifications may correspond to the above-described activation notifications. These notifications may be referred to as "events". Here, the additional NRT content items and/or the on-demand items may refer to data to be used by an application.

According to a given embodiment, one of applications included in the application-based enhancement may be set as a primary application. When the primary application is present, the primary application may be executed upon selecting a broadcast service including the application-based enhancement. Applications other than the primary application may be executed by signaling through the broadcast network/broadband network. Alternatively, applications other than the primary application may be executed by other applications which have been executed. In this case, the applications other than the primary application may be executed by createApplication( ) of JavaScript.

As described in the foregoing, the present invention proposes a signaling scheme for various types of application-based enhancements. In addition, the present invention proposes a scheme of delivering an activation notification in synchronization with a time base. Actions of an application may be synchronized by the synchronized activation notification.

Here, the application may refer to a set of documents (HTML, CSS, JavaScript, etc.) included in an enhancement/interactive service.

Here, a content item may refer to a set of one or more files intended to be treated as one unit for presentation by a service provider.

Here, an event may refer to a timed notification that indicates an action to be performed in a DASH client or application.

Here, an event stream may refer to a stream of the above-described events.

Here, the NRT content item may refer to a content item delivered ahead of time for another use in a future presentation or application.

Here, an on-demand content item may refer to a content item downloaded and presented at a point in time requested by a user.

FIG. 42 illustrates a part of an ApplicationList element according to an embodiment of the present invention.

FIG. 43 illustrates another part of the ApplicationList element according to an embodiment of the present invention.

Even though the two figures originally corresponded to one figure, the one figure is divided into two figures due to space constraints.

As described in the foregoing, the broadcast service may include zero or more application-based enhancements. For example, the linear service may include an application-based enhancement having one application which is executed in the background to manage insertion of a targeted advertisement. In addition, the linear service may further include an application-based enhancement having a set of applications which provide an interactive viewing experience related to an audio/video program.

Here, each of the application-based enhancements may be separately signaled. Therefore, manufacturers who manufacture various applications may not cooperate with each other in signaling thereof A set of applications included in one application-based enhancement may be signaled by an application signaling table (AST). The AST is one of XML documents, and may include the ApplicationList element as a root element. One AST may include signaling information of applications included in one application-based enhancement. According to a given embodiment, one AST may be extended to signal a plurality of application-based enhancements.

Service signaling information of one service may include an AST for each application-based enhancement included in the service. In other words, when one service includes a plurality of application-based enhancements, service signaling information of the service may include a plurality of ASTs.

An example of the AST illustrated in the figure will be described. According to a given embodiment, each element/attribute of the AST may be added/omitted/changed.

The AST may include the ApplicationList element as a root element. The ApplicationList element may include a list of Application elements. That is, the ApplicationList element may include at least one or more Application elements.

Each of the Application elements may include an appName element, an applicationDescriptor element, an applicationSpecificDescriptor element, an applicationUsageDescriptor element, an applicationBoundary element, an applicationTransport element, an applicationLocation element, an atsc:Capabilities element, an atsc:liveEventSource element, an atsc:ContentItems element, an @applicationIdentifier attribute, an @atsc:serviceId attribute and/or an @atsc:protocolVersion attribute.

The appName element may indicate a name of an application which is indicated by the Application element. This element may be omitted. The application name may be expressed in various languages. The appName element may further include an @lang attribute. The @lang attribute may indicate a language of the application name.

The applicationDescriptor element may include information of the corresponding application. The applicationDescriptor element may include information which can be commonly included in all applications. The applicationDescriptor element may include an icon element, an @type attribute, an @controlCode attribute, an @visibility attribute, an @serviceBound attribute, an @priority attribute, an @version attribute, an @mhpVersion attribute, an @storageCapabilities attribute and/or an @trickModeTolerance attribute.

The icon element may indicate an icon which can be used to represent the corresponding application. This element may be omitted. The icon element may include an @mimeType attribute that indicates a MIME type of an application image (icon) and/or an @width/@height/@depth attribute that indicates a width/height/depth of the application image using pixels. The icon element may further include an @url attribute having HTTP URL information for downloading the application image.

The @type attribute may indicate a type of the corresponding application. For example, this attribute may indicate that the corresponding application is an application according to ATSC or DVB.

The @controlCode attribute may include information for controlling a state of the corresponding application. For example, this attribute may have information about auto-launch, kill, etc. The state of the corresponding application may be controlled using the information.

The @visibility attribute may indicate whether the corresponding application is visible to a user and/or another application. Here, in a broad sense, whether the corresponding application is visible to the user and/or the other application may indicate whether the corresponding application appears in a user interface. This attribute may indicate whether the corresponding application is audible or sensible in addition to whether the corresponding application is visible. According to a given embodiment, whether the corresponding application is audible to the user, etc. through a speaker may be indicated by separately setting an @audibility attribute. This attribute may be omitted.

The @serviceBound attribute may indicate whether the corresponding application is service-bounded. The corresponding application may be service-bounded when this attribute is set to true, and may not be service-bounded when this attribute is set to false. This attribute may have the true value as a default value. This attribute may be omitted. When this attribute is omitted, it may mean that the corresponding application is service-bounded.

The @priority attribute may indicate a relative priority of the corresponding application when compared to other applications. The @version attribute may indicate a version of the corresponding application. The @mhpVersion attribute may indicate a platform or a version necessary for the corresponding application. This attribute may be omitted.

The @storageCapabilities attribute may indicate the amount of storage necessary to cache the corresponding application. This attribute may be omitted. According to a given embodiment, this attribute may be used to indicate whether the corresponding application can be cached.

The @trickModeTolerance attribute may indicate whether the corresponding application is compatible with a certain trick mode. Compatibility may refer to whether the corresponding application can tolerate the certain trick mode when the certain trick mode is executed. Examples of the trick mode may include pause, FF, slow mode, rewind, etc. This attribute may be omitted. In a broadcast service having an application enhancement, when the user performs a trick play for the broadcast service, signaling may be performed such that a basic program subjected to the trick play can be normally enhanced.

The applicationSpecificDescriptor element may have necessary information only for a certain type of application unlike the above-described applicationDescriptor element. That is, information of this element may be subject to an application type. This element may be unnecessary according to application type, and thus this element may be omitted.

The applicationUsageDescriptor element may indicate a function of the corresponding application. For example, this element may indicate that the corresponding application can be used for teletext. This element may be unnecessary according to application type. This element may be omitted.

The applicationBoundary element may indicate URL information that defines extension of an application boundary of the corresponding application. This element may be omitted.

The applicationTransport element may indicate a protocol used to deliver the corresponding application. For example, this element may indicate that the corresponding application is delivered through ROUTE, MMT or HTTP. According to a given embodiment, this element may indicate a protocol used when the AST is delivered. According to the above-described method of delivering service data of the present invention, permissible values of this element may correspond to ROUTE, MMT, HTTP, etc.

The applicationLocation element may indicate a URL that provides a location at which the corresponding application can to be acquired. According to a given embodiment, this element may indicate a URL at which the corresponding application can to be acquired.

The atsc:Capabilities element may indicate capability information for meaningfully processing the corresponding application/application-based enhancement. Here, capability for meaningful processing may refer to capability of a receiving side capable of meaningfully performing rendering/decoding/reproduction, etc. According to a given embodiment, the capability information may be indicated by a preset capability code.

The atsc:liveEventSource element may provide information for receiving the above-described event in a live situation. For example, in a live broadcast program, an event needs to be changed in real time and delivered in order to provide an enhancement according to content of the broadcast program which changes in real time. Unlike pre-produced content, the above-described operation may be needed in the live situation. This element may provide information such as a URL, etc. for receiving the event in real time in this situation. This element may include an @url attribute, an @shortPollingPeriod attribute and/or an @targetDevice attribute.

The @url attribute may indicate a URL for receiving the event in the live situation. The @shortPollingPeriod attribute may indicate a polling period when the event is acquired in short polling of a broadband network. The @targetDevice attribute may indicate a device targeted by the live event. For example, a primary device (PD) or a companion device (CD) may correspond to the target device. The @shortPollingPeriod attribute and/or the @targetDevice attribute may be omitted.

The atsc:ContentItems element may include information about each content item to be used by the corresponding application. The number of ContentItems elements may correspond to the number of respective content items. The atsc:ContentItems element may further include a location element, an @ContentLinkage attribute, an @updatesAvailable attribute, an @TFAvailable attribute, an @contentSecurityCondition attribute, an @availableInBroadcast attribute, an @availableOnInet attribute, an @playbackLengthInSeconds attribute, an @playbackDelay attribute, an @expiration attribute, an @size attribute, an @name attribute and/or a timeSlotInfo element.

The location element may indicate information about a location at which the content item can be acquired. This information may have a form of URL according to a given embodiment. The location element may be omitted, or a plurality of location elements may be present.

The @ContentLinkage attribute may indicate an application in which the content item is to be used. Signaling by a certain application may be performed using a value of this attribute and information about events to be described below (EventStream element, emsg box, etc.). For example, this attribute may provide an application identifier for the certain application or indicate a certain LCT session in which application data thereof is delivered.

The @updatesAvailable attribute may indicate whether the content item can be updated. This attribute may have a value of true or false. The @TFAvailable attribute may indicate whether a text fragment is present on a signaling channel for the content item.

The @contentSecurityCondition attribute may indicate a security state of the content item. The @availableInBroadcast attribute may indicate whether the content item can be acquired through a broadcast network. The @availableOnInet attribute may indicate whether the content item can be acquired through an Internet protocol network.

The @playbackLengthInSeconds attribute may indicate a length in seconds of the content item when the content item is reproduced. This attribute may be omitted. The @playbackDelay attribute may indicate a reproduction delay of the content item. This attribute may be omitted. The @expiration attribute may indicate an expiration period of the content item. This attribute may be omitted. The @size attribute may indicate a size of the content item. This attribute may be omitted. The @name attribute may indicate a name of the content item. This attribute may be omitted.

The timeSlotInfo element may include time slot-related information of the content item. The timeSlotInfo element may further include an @time_slot_start attribute, an @time_slot_length attribute, an @acquisition_time attribute, an @repeat_period attribute and/or an @slot_count attribute.

The @time_slot_start attribute may indicate a start time of a time slot. This time may be expressed in GPS seconds from 00:00:00 UTC of Jan. 6, 1980. When this field has a value of 0, this field may indicate that the time slot starts from an uncertain past.

The @time_slot_length attribute may indicate a length in minutes of the time slot.

The @acquisition_time attribute may indicate a minimum time interval length in which transmission of at least one content item is ensured. This time interval may be expressed in minutes. Here, this time interval is presumed to start from an arbitrary time in the time slot and may include an end of the time slot. When one large content item is repeatedly transmitted during the time slot, this attribute may correspond to a time taken when one instance of the content item is transmitted. When a plurality of small content items is transmitted in a carousel, this attribute may correspond to a cycle time of the carousel.

The @repeat_period attribute may indicate a repetition interval in minutes of the time slot.

The @slot_count attribute may indicate the number of times at which the time slot occurs. The number of times may be indicated from a time slot which starts from a time indicated by the @time_slot_start attribute. When this attribute has a value of 0, repetition may be presumed to indefinitely continue.

The Application element may directly include the @ContentLinkage attribute and/or the timeSlotInfo element. That is, the @ContentLinkage attribute and/or the timeSlotInfo element may be included in both the Application element and the atsc:ContentItems element.

Among the attributes of the Application element, the @applicationIdentifier attribute may indicate an identifier of the application. This value may be a globally unique value.

The @atsc:serviced attribute may indicate a service identifier of a service related to the corresponding application.

The @atsc:protocolVersion attribute may indicate a protocol version of the corresponding application. According to a given embodiment, the corresponding field may be divided into two fields indicating a major protocol version and a minor protocol version. Alternatively, this field may simultaneously provide the major/minor protocol versions.

The ApplicationList element may include an @ASTVersionNumber attribute, an @timeSpanStart attribute and/or an @timeSpanLength attribute in addition to the plurality of Application elements.

The @ASTVersionNumber attribute may indicate a version number of the whole corresponding AST. According to a given embodiment, the corresponding field may be divided into two fields indicating a major protocol version and a minor protocol version. Alternatively, this field may simultaneously provide the major/minor protocol versions.

The @timeSpanStart attribute may indicate a start of a time interval covered by a corresponding AST instance. The AST may be divided into a plurality of instances and transmitted. Each of the AST instances may include signaling information for each time interval.

The @timeSpanLength attribute may indicate a length of a time interval covered by a corresponding AST instance. It is possible to calculate the time interval covered by the corresponding AST instance together with a value of the @timeSpanStart attribute.

The respective fields of the AST according to the above-described embodiments may be omitted or changed. In addition, according to a given embodiment, additional fields may be added to the AST. The respective fields of the AST may be replaced by fields having the same/similar meanings.

The above-described AST may be transmitted through a broadcast network or a broadband network.

When the AST is transmitted through the broadcast network, an AST for an application enhancement may be delivered through a service signaling channel of a broadcast service to which the application enhancement is related. Here, the service signaling channel of the service may refer to a path through which the above-described SLS is delivered. For example, in ROUTE, an LCT transmission session specified by tsi=0 may deliver the AST as a dedicated signaling channel. In MMT, an MMTP packet flow specified by packet_id=00 may deliver the AST as a dedicated signaling channel.

When the AST is delivered through the broadband network, the AST may be acquired through a query. This query may be generated using base URL information in the SLT described above. The base URL may correspond to URL information for acquiring the AST. Here, the SLT may correspond to an SLT including bootstrap information for a broadcast service related to the AST. In a scenario in which a watermark is used, the base URL may be acquired through the watermark or through an auto content recognition (ACR) process using the watermark.

FIG. 44 illustrates an event message table (EMT) according to an embodiment of the present invention.

As described in the foregoing, actions to be performed by applications may be initiated by notifications delivered through the broadcast network/broadband network. These notifications may be referred to as "events". According to context, operations, actions, or operated states of the applications initiated by the notifications may be referred to as "events". In addition, executable actions of the applications may be referred to as "events".

These events may be delivered through the broadcast network or the broadband network. In this case, each event or an action performed by the event may need to be synchronized with a basic broadcast service/broadcast program. The present invention proposes a delivery scheme and a synchronization scheme of the event.

A description will be given of a case in which the event is delivered through the broadcast network.

When the event is delivered through the broadcast network, the event may be delivered as a DASH event. In this instance, the event may be delivered in the form of an EventStream element or an emsg box. A case in which the event is delivered through the EventStream element may correspond to a case in which the event is delivered as a form of an EventStream element which appears in a Period element of an MPD. A case in which the event is delivered in the form of the emsg box may correspond to a case in which the event is delivered through an emsg box which appears in representation segments.

The two event delivery mechanisms may be interchangeable. For example, one event stream may include several events delivered through the EventStream element and/or other events delivered through the emsg box.

The events delivered through the EventStream element may correspond to events to be delivered to the receiving side during a time interval corresponding to a certain period. In other words, the MPD may provide signaling information at time intervals of a service referred to as a period as service signaling information of a certain service. The signaling information for the period is included in an MPD Period element, and this Period element may include the EventStream element. The EventStream element may provide signaling (event) necessary for operations of applications during the period of the service.

The EventStream element may correspond to a list of Event elements. Each EventStream element may have a schemeIdUri attribute and/or a value attribute. These two attributes may indicate types of events in an EventStream. According to a given embodiment, these two attributes may identify events. Here, predefined values may be used as values of the schemeIdUri attribute and/or the value attribute. Alternatively, a service provide may additionally define and use values of the schemeIdUri attribute and/or the value attribute. An "owner" of the schemeIdUri attribute needs to uniquely define the schemeIdUri attribute, and needs to define semantics of the event and the value attribute. Value information may be subject to an application and used to identify a certain event stream in one service.

The EventStream element may further include a timescale attribute. This attribute may indicate a reference time scale in duration and an event presentation time.

Each Event sub-element of the EventStream element may include a presentationTime attribute, a duration attribute, and/or an id attribute. The presentationTime attribute may indicate a start time of each event, the duration attribute may indicate a duration of each event, and the id attribute may indicate an identifier of each event. In this context, the event may refer to an action of an application initiated by a notification or a phenomenon caused by the action (pop-up window, etc.).

The Event sub-element may not have data for the corresponding event. However, according to a given embodiment, an Event element may have an additional data element or attribute. This data element/attribute may provide data necessary to execute an action initiated by the event.

According to a given embodiment, a plurality of EventStream elements having different types may be present in one period.

When the event is delivered in the form of the emsg box, the event may be delivered through the emsg box which appears in the Representation segments as described in the foregoing. In this instance, an InbandEventStream element of the Representation of the MPD may signal whether an event is present in the emsg box in the segments.

An InbandEvent element may include schemeIdUri and/or value. These two fields may indicate a type of an event in the emsg box. According to a given embodiment, these two fields may be used to identify the event.

The InbandEvent element may further include a timescale field. This field may indicate a reference time scale related to an event.

In addition, the InbandEvent element may further include presentation_time_delta information, event_duration information and/or id information. The presentation_time_delta information may indicate a start time of the corresponding event. Here, the start time may be expressed by a relative value with respect to a start time of the Representation. The event_duration information may indicate a duration of the corresponding event. The id information may identify an instance of the corresponding event.

The InbandEvent element may further optionally include message_data information. The message_data information may provide data necessary to execute an action which is initiated by the corresponding event.

A description will be given of a case in which the event is delivered through the broadband network.

Batch delivery using a batch through MPD and incremental delivery using the emsg box have been described with regard to delivery of the event through the broadcast network. Similarly, batch delivery and incremental delivery may be proposed with regard to delivery of the event through the broadband network.

When the event is delivered using batch delivery through the broadband network, events may be delivered through an event stream table (EST). This EST may be referred to as an EMT according to a given embodiment. As an XML document, the EST may include an EventStreamTable element as a root element.

The EventStreamTable element may correspond to a list of EventStream elements. Each of the EventStream elements may be identical to the EventStream element in delivery of the event through the broadcast network described above. The list of EventStream elements may include all event streams for one service.

The illustrated EMT is an EMT (EST) according to another embodiment of the present invention. The EMT may include an @mpdId attribute, an @periodId attribute, and an EventStream element.

The @mpdId attribute may correspond to an identifier of an MPD related to events described by the EMT. The MPD may be used as a time reference of the corresponding events.

The @periodId attribute may correspond to an identifier of a period of the MPD related to the events of the EMT. The period may be used as a time reference of the corresponding events.

Respective fields in the EventStream element are as described above. Here, each Event element may have a value suitable for a type thereof according to a value of @schemeIdURi and/or @value. An @presentationTime attribute indicates a start time of an event as a relative value with respect to a start time of a period, and this period may correspond to a period identified by the @mpdId and @periodId attributes.

The EST may be acquired through a query as described above. The query may be generated by base URL information in the SLT. A description thereof has been given above.

When events are delivered using incremental delivery through the broadband network, the events may be separately delivered through a live event server. Polling may be periodically performed using the live event server. When an event to be transmitted in the corresponding period is present, the event server may deliver the event to a receiver. Information such as a URL, a polling period, etc. of the live event server may have been delivered to the receiver by the above described AST or EST, or another signaling object.

The event delivered in this case may have the same format as a format of the emsg box in the above-described delivery of the event using the emsg box. According to a given embodiment, signaling information corresponding to the above-described InbandEvent element may be delivered together with the live event.

SchemeIdUri information and value information may correspond to targetURI and eventName arguments in an API for addition and deletion of a stream event listener for an event stream. The events according to the respective embodiments described above may further include an optional data attribute. The data attribute may provide data used to execute an action which is initiated by the corresponding event. The data attribute may correspond to a data attribute of a StreamEvent interface returned to a registered listener when the event occurs.

In delivery of an NRT content item, an NRT delivery method of ATSC may be used. However, in this case, an AST is used instead of an NRT-IT, and a content item to be delivered by the AST may be identified. In addition, an application may initiate broadband delivery of the NRT content item even when the NRT content item is not listed in the AST.

An on-demand content item may be delivered through the broadband network. Broadband delivery of the on-demand content item may be initiated by an application.

Synchronization of an application will be described.

The application may need to be synchronized in several aspects. For example, actions of the application may need to be synchronized with a scheduled audio/video service. In addition, the application may need to be initiated and suspended according to the scheduled audio/video service. The application and the actions of the application may need to be synchronized with reproduction of recorded content, NRT content, etc. in addition to a basic broadcast service. In addition, the application may need to be initiated or suspended according to recorded content, NRT content, etc. to effectively enhance user experience.

In addition, an application in a CD may need to be synchronized with audio/video content reproduced in a PD such that an application enhancement provided by the CD can be effectively synchronized and provided.

User experience will be described.

According to a given embodiment, the user may control operations of the application for an efficient application enhancement since the enhancement may hinder viewing when the operations cannot be controlled. As an embodiment, permission of the user may be used. The user may collectively permit all services or some particular services. Alternatively, the user may permit applications of the respective services or the services case by case.

When the user gives permission case by case, an application notification may need to be displayed first before the application is activated. Through this notification, the application may obtain to be activated permission from the user. The application may be in a blocked state until obtaining permission.

A format and a location of the notification for this permission may be determined by a device manufacturer. An actual user interface for permission may be determined by the device manufacturer. Referring to these issues, a certain format, etc. may be proposed by a certain entity from an industrial viewpoint.

A notification for permission may time-out or be dismissed by the user. In this way, even when the user does not immediately determine whether to permit activation of the application, the user may be prevented from being hindered from viewing continuously by this notification. Even when the notification is on a time-out or dismissed and thus is invisible, the user may activate or block the application through setting, etc. The user may terminate the activated application. In this case, even when a signal for activating the application is received, the application may be continuously blocked.

A description will be given of synchronization of an action and an action parameter.

Download of the application, activation of the application, termination of the application, and/or a certain action of the application may need to be synchronized with a basic broadcast program, etc.

With regard to actions of the application, action parameters may be needed to perform the actions. The actions may be performed using information of the parameters. Examples of the action parameters may include an application identifier parameter for identifying an application related to an action, a time parameter that indicates a time at which an action is to be performed, and/or a synchronization level parameter related to a synchronization level of an action. Here, the time parameter may indicate a start time of an action as a relative value with respect to a time base or a media time line. Here, the synchronization level parameter may indicate a synchronization level such as program level sync, sync less than two seconds, lip sync, frame sync, etc.

With regard to an action related to download of the application, this action may include an action parameter related to a target device and/or an action parameter related to a jitter interval. The action parameter related to the target device may include information as to whether the downloaded application is for a PC or a CD. The action parameter related to the jitter interval may include information related to the jitter interval for fetching of the application.

With regard to an action related to start of the application, this action may include an action parameter related to a target device and/or an action parameter related to a jitter interval. The action parameter related to the target device may include information as to whether the started application is for a PC or a CD.

As described in the foregoing, examples of the action parameters may include an action parameter that provides data necessary to execute the application. This action parameter may include data necessary to perform the corresponding action.

FIG. 45 illustrates a method of providing the broadcast service by the transmitting side according to an embodiment of the present invention.

The method of providing the broadcast service by the transmitting side according to the present embodiment may include generating service data and service signaling information, generating a service list table, processing a streaming component, an enhancement component, the service signaling information, and/or the service list table in transmission packets, generating link layer packets, and/or physically processing the link layer packets to generate and transmit a broadcast signal.

First, a first mode of a transmitting side may generate the service data of the broadcast service and the service signaling information for signaling the service data. Here, the service data may include a streaming component having data related to real-time content of the broadcast service and/or an enhancement component having data related to the application-based enhancement of real-time content.

The streaming component may have data necessary to reproduce real-time content. For example, the streaming component may correspond to a video component, an audio component, or a closed captioning component. As described in the foregoing, the application-based enhancement may provide an interactive viewing experience for the broadcast service. As described in the foregoing, the application-based enhancement may provide an interactive service through an application for a broadcast program, etc. The enhancement component may include data for providing the application-based enhancement. The enhancement component may correspond to the application, and may correspond to a data/content item for using the application. Here, the enhancement component may correspond to an NRT component and be delivered through the ROUTE protocol, etc.

In addition, the service may further include a plurality of service components. Here, the service signaling information may refer to the above-described SLS.

A second module of the transmitting side may generate the service list table. The service list table may correspond to the above-described SLT. The SLT may include bootstrap information that indicates a transmission session in which the SLS is delivered. Here, the transmission session may correspond to a ROUTE session or an MMTP session. The bootstrap information may refer to an IP address, a UDP port number, etc. of the ROUTE session or the MMTP session. The first module and the second module may correspond to modules serving as service providers which manage generation of a service.

A third module of the transmitting side may process a streaming component, an enhancement component, the service signaling information, and/or the service list table in transmission packets. This step may correspond to a step for UDP/IP-processing the service component data, the SLS, and the SLT and encapsulating the service component data, the SLS, and the SLT in an IP packet in order to deliver the service data through a broadcast network. Here, a transmission packet may correspond to an IP packet. Here, it is presumed that an FIC is not used and the SLT is encapsulated in the IP packet and delivered through a PLP. The third module may correspond to a hardware module that manages a UDP/IP layer.

A fourth module of the transmitting side may perform link layer processing on transmission packets to output at least one link layer packet. Link layer processing has been described above. Here, the fourth module may correspond to a module that performs an operation corresponding to a link layer. The fourth module may perform header compression/overhead reduction or packet encapsulation.

A fifth module of the transmitting side may physically process the at least one link layer packet. The fifth module may correspond to a module that manages operation of a physical layer. The fifth module may generate BB packets from the link layer packet and perform encoding, bit interleaving, constellation mapping, etc. on the BB packets. Thereafter, it is possible to perform time interleaving, frame building, frequency interleaving, etc., and then a modulation process according to an OFDM scheme. In addition, the fifth module may transmit a broadcast signal including physically processed data. Here, the fourth module may be included in the fifth module. The fourth and fifth modules may be replaced by one integrated module. The fifth module may include a plurality of internal blocks. The fourth module may be included in one of the blocks of the fifth module.

In the method of providing the broadcast service by the transmitting side according to the present embodiment, the service signaling information may include an AST that signals applications which provide the application-based enhancement. The AST has been described above. As described in the foregoing, the AST may be delivered together with the SLS for the broadcast service. In other words, the AST may be delivered through the ROUTE/LCT session in which the SLS is delivered. According to a given embodiment, the AST may be delivered through a broadband network, etc. In this case, the AST may be requested using URL information of the SLT.

In addition, in the present embodiment, the enhancement component may correspond to an NRT component of the broadcast service. As described in the foregoing, the enhancement component may include a related application or content item with respect to an application enhancement for the broadcast service.

In a method of providing the broadcast service by the transmitting side according to another embodiment of the present invention, the service signaling information may include a user service bundle description (USBD), a service-based transport session instance description (S-TSID), and/or a media presentation description (MPD). As described in the foregoing, the USBD may include URI information for referencing the S-TSID and/or URI information for referencing the MPD. The S-TSID may include transmission session description information related to a transmission session in which a streaming component and an enhancement component of the broadcast service are delivered. The S-TSID may provide information about an LCT session in which service components of a certain service are delivered. Examples of this information may include tsi information and/or IP/UDP information of a ROUTE session. The MPD may include reproduction-related information of the streaming component of the broadcast service. The MPD may provide description information for reproducing DASH representation, etc. included in video and audio components. In other words, the MPD may provide segment URL information of service components and context information of media segments.

In a method of providing the broadcast service by the transmitting side according to another embodiment of the present invention, the AST may include application elements including information about applications which provide an application-based enhancement. The AST may include application elements as in the above-described embodiment. These applications may be used to provide the application enhancement. The respective application enhancement may include content item elements including information about content items used by the applications. Content item elements may be present as child elements of the application elements described above. The respective content item elements may describe content items used by the application. At least one content item element may describe a content item included in an enhancement component. The above-described enhancement component may have a certain content item used by a certain application. This content item may be described by the AST. In this way, the application-based enhancement may be provided using the content items acquired through the AST.

In a method of providing the broadcast service by the transmitting side according to another embodiment of the present invention, the S-TSID may include transmission session identifier information that indicates a transmission session in which an enhancement component is delivered. The S-TSID may indicate a transmission session in which an enhancement component corresponding to an NRT component is delivered. Tsi information may be provided to indicate the transmission session. Depending on cases, IP/UDP information for identifying a ROUTE session may be provided. A reception system may acquire enhancement components for providing an application-based enhancement through the S-TSID. At least one content item element of the AST may further include content link information, and the content link information may be used to indicate an application which uses a content item included in the enhancement component. As described in the foregoing, an @ContentLinkage attribute may be included in a lower element of an application element and/or a content item element of the AST. This attribute may be used to indicate an application in which the content item delivered in the enhancement component is used. This attribute may be used to connect the AST to the content item. Alternatively, this attribute may be used to connect the AST to the application. In this way, the content item acquired using the S-TSID may be used to provide the application-based enhancement in connection with the application.

In a method of providing the broadcast service by the transmitting side according to another embodiment of the present invention, the MPD may further include a period element that describes reproduction-related information of a certain interval of real-time content. In a presentation of media content, a period is a concept corresponding to a part obtained by dividing the presentation in terms of time, and the period element may provide media reproduction description information corresponding to the part. As described in the forgoing, the period element may have an event stream element. This event stream element may include a plurality of event elements. These event elements may include information about events that signal actions to be performed by an application. In addition, the respective event elements may include presentation time information and event identifiers of the events. The event identifiers may identify event instances. The presentation time information may indicate start times of the events, and the start times may be indicated based on a time of the period. For example, a start time of the period may be set to an offset, and a start time of an action may be indicated using a difference from the start time of the period. This action may be referred to as an event according to context.

In a method of providing the broadcast service by the transmitting side according to another embodiment of the present invention, the service signaling information may further include an EMT, and the EMT may include event stream elements. Each of the event stream elements may include event elements. These event elements may include information about events that signal actions to be performed by an application. Similarly, each of the event elements may include presentation time information and an event identifier of the event.

In a method of providing the broadcast service by the transmitting side according to another embodiment of the present invention, the EMT may further include a period identifier and an MPD identifier of an MPD. Here, the MPD identifier may identify an MPD related to the EMT. In other words, the MPD identifier may identify an MPD related to the corresponding event. The period identifier may identify a period element that describes reproduction-related information of a certain interval of real-time content. This period element may identify a period related to the corresponding event. Presentation time information may indicate a start time of an action based on an interval in a media presentation described by the period element with respect to the period element identified by the MPD identifier and the period identifier. This action may be referred to as an event according to context.

A description will be given of a method of providing a broadcast service by a receiving side according to an embodiment of the present invention. This method is not illustrated in any figure.

The method of providing the broadcast service by the receiving side according to the present embodiment may include receiving a broadcast signal by a first module of the receiving side, physically processing the broadcast signal to output link layer packets by a second module of the receiving side, link-processing the link layer packets to output transmission packets by a third module of the receiving side, acquiring an SLT and accessing an SLS by a fourth module of the receiving side, and/or acquiring a streaming component and/or an enhancement component delivered through a broadcast network using the SLS by a fifth module of the receiving side. Here, physical processing, link processing, etc. may correspond to reverse operations of those of the transmitting side. Here, service data may include a streaming component which includes data about real-time content of the broadcast service and/or enhancement data which includes data about application-based enhancement of real-time content. Service signaling information may include an AST which signals applications providing the application-based enhancement.

Methods of providing the broadcast service by the receiving side according to embodiments of the present invention may correspond to the methods of providing the broadcast service by the transmitting side according to the embodiments of the present invention described above. The methods of providing the broadcast service by the receiving side may be performed by hardware modules corresponding to the modules used in the methods of providing the broadcast service by the transmitting side (for example, the first, second, third, fourth, and fifth modules of the transmitting side, etc.). The methods of providing the broadcast service by the receiving side may have embodiments corresponding to the embodiments of the methods of providing the broadcast service by the transmitting side described above.

According to a given embodiment, the above-described steps may be omitted or replaced by other steps in which the same/similar operations are performed.

FIG. 46 illustrates an apparatus for providing the broadcast service by the transmitting side according to an embodiment of the present invention.

The apparatus for providing the broadcast service by the transmitting side according to the present embodiment may include the first second, third, fourth, and/or fifth modules of the transmitting side described above. The respective blocks and modules have been described above.

The apparatus for providing the broadcast service by the transmitting side according to the present embodiment and the internal modules/blocks may perform the embodiments of the methods of providing the broadcast service by the transmitting side of the present invention described above.

A description will be given of an apparatus for providing the broadcast service by the receiving side according to an embodiment of the present invention. This apparatus is not illustrated in any figure.

The apparatus for providing the broadcast service by the receiving side according to the present embodiment may include the first second, third, fourth, and/or fifth modules of the receiving side described above. The respective blocks and modules have been described above.

The apparatus for providing the broadcast service by the receiving side according to the present embodiment and the internal modules/blocks may perform the embodiments of the methods of providing the broadcast service by the receiving side of the present invention described above.

The internal modules/blocks of the apparatuses described above may correspond to processors for executing continuous processes stored in a memory, and may correspond to hardware elements located inside/outside the apparatuses according to a given embodiment.

According to a given embodiment, the above-described modules may be omitted or replaced by other modules for performing the same/similar operations.

FIG. 47 illustrates an AST transmitted through a broadcast network according to an embodiment of the present invention.

When the AST is transmitted through the broadcast network, an AST for an application enhancement may be transmitted through a service signaling channel of the broadcast service to which the application enhancement is related. Here, the service signaling channel of the service may refer to a path through which the above-described SLS is delivered.

A broadcast signal (broadcast stream) having a certain frequency may include service data and/or signaling data for the service. For example, the broadcast signal may be identified by the certain frequency.

The broadcast signal may include a first ROUTE session (sIP#A/dIP#A/dPort#A). The service data for the service may be transmitted through the first ROUTE session.

The service data may include a video component and/or an audio component for the service. The video component may include at least one video segment having video data. The audio component may include at least one audio segment having audio data. The video component may be transmitted through a certain transmission session of the first ROUTE session. The audio component may be transmitted through another transmission session of the first ROUTE session.

The signaling data may include low level signaling data and/or service layer signaling data. For example, the low level signaling data may include an FIT and/or an SLT. The low level signaling data may be included in an IP/UDP packet and transmitted. The service layer signaling data may be referred to as an SLS. The service layer signaling data may include a USBD, an MPD, an S-TSID, and/or an AST. The USBD, the MPD, the S-TSID, and/or the AST may be transmitted through a certain transmission session. For example, the SLS may be transmitted through a certain LCT transmission session included in the first ROUTE session (sIP#A/dIP#A/dPort#A). Specifically, the SLS may be transmitted through a first transmission session (tsi-sls) specified by tsi=0.

The first ROUTE session (sIP#A/dIP#A/dPort#A) may be identified by a combination of a source IP Address (sIP#A), a destination IP Address (dIP#A), and a destination port number (dPort#A). In addition, the first ROUTE session may be transmitted through at least one PLP. For example, the first ROUTE session may be transmitted through a first PLP (PLP #A). Further, the first ROUTE session may include the first transmission session (tsi-sls), a second transmission session (tsi-app), and/or a third transmission session (not illustrated).

The first transmission session (tsi-sls) may include at least one service layer signaling information. For example, the service layer signaling information may include at least one of the USBD, the MPD, the S-TSID, and/or the AST described above.

The second transmission session (tsi-app) may include at least one application. For example, the application may refer to a set of documents (HTML, CSS, JavaScript, etc.) included in an enhancement/interactive service.

The third transmission session may include a video component. For example, the video component may include at least one video segment. A transmission object identifier for the video segment may have a certain value.

Hereinafter, the SLT (or FIT) will be described.

The SLT enables the receiver to create a basic service list and bootstrap discovery of an SLS for each service. The SLT may be transmitted through UDP/IP. The SLT may include bootstrapping information for acquiring basic information and service layer signaling information related to the service.

For example, the SLT may include a Broadcast_Stream_id attribute and a first service element (Service #A).

The Broadcast_Stream_id attribute is an identifier of a whole broadcast stream. A value of a Broadcast_Stream_id field may be unique at a regional level.

The first service element (Service #A) may include at least one of a serviceId attribute and/or a signaling_broadcast element.

The serviceId attribute may be an integer for uniquely identifying the corresponding service in a range of a broadcast region.

The signaling_broadcast element may include information for signaling information for the service transmitted through the broadcast network. The signaling_broadcast element enables the receiver to bootstrap discovery of an SLS for each service.

The signaling_broadcast element may include at least one of a source IP Address, a destination IP Address, a destination port number, a PLPID, and a transmission session identifier (TSI) related to an SLS for each service.

For example, the source IP Address, the destination IP Address, and/or the destination port number may indicate the first ROUTE session (sIP#A/dIP#A/dPort#A). In addition, the PLPID may indicate the first PLP (PLP #A). Further, the TSI may indicate the first transmission session (tsi-sls).

Hereinafter, the SLS will be described.

The SLS may be transmitted through the broadcast network. The SLS may be transmitted through a certain LCT transmission session included in the first ROUTE session (sIP#A/dIP#A/dPort#A). Specifically, the SLS may be transmitted through the first transmission session (tsi-sls) specified by tsi=0. The SLS may include at least one of a USBD, an MPD, an S-TSID, and/or an AST.

The USBD may describe service layer attributes. In addition, the USBD may include reference information (or a URI) referencing the MPD and/or the S-TSID. Details of the USBD (C620210) may include whole content about the USBD described above.

The MPD may include resource identifiers for separate media components of a linear/streaming service. For example, the MPD may include a DASH MPD for all components transmitted through a mobile broadcast network, a general broadcast network, and/or an Internet protocol network. The DASH MPD may include a formalized description of DASH Media Presentation. The DASH MPD may include resource identifiers for separate media components of the linear/streaming service. In addition, the DASH MPD may include context of resources identified in the media presentation. For example, the resource identifiers may correspond to information for identifying representation related to a component for the service. For example, the resource identifiers may have a form of a segment URL.

The S-TSID is a type of SLS XML fragment that provides all session description information for at least one transmission session for transmitting at least one content component of the service.

The S-TSID may include a first ROUTE session element (RS) that provides information about a ROUTE session for a service and/or a component included in the service. The first ROUTE session element (RS) may include transmission path information for the first ROUTE session. In addition, the first ROUTE session element (RS) may include information about a transmission session (or a layered coding transport session) included in the ROUTE session. For example, the first ROUTE session element (RS) may include a second transmission session element (LS) including information about the second transmission session. The second transmission session element (LS) may include transmission path information for the second transmission session.

Specifically, the second transmission session element (LS) may include a tsi attribute for identifying a transmission session in which a content component for the service is transmitted and a SrcFlow element that describes a source flow included in the ROUTE session. The SrcFlow element may include an nrt attribute that indicates whether the SrcFlow element transmits NRT service data. Alternatively, the SrcFlow element may include an rt attribute that indicates whether the SrcFlow element transmits streaming media data. In other words, the nrt attribute may perform the same function as that of the rt attribute. Further, the nrt attribute and the rt attribute may be replaced by each other. For example, when the tsi attribute corresponds to "tsi-app", the corresponding transmission session element may include information for the second transmission session. In addition, when the nrt attribute corresponds to "true", the SrcFlow element may transmit NRT service data.

The AST may include signaling information for an application. Details of the AST may include all of the above-described content.

The AST may include a ContentLinkage attribute. The ContentLinkage attribute may indicate an application that uses a corresponding content item. Signaling for a certain application may be performed by a value of this attribute and information about events (EventStream element, emsg box, etc.) to be described below.

For example, the ContentLinkage attribute may provide an application identifier for identifying an application which is transmitted through the second transmission session. Alternatively, the ContentLinkage attribute may provide a transmission session identifier for identifying the second transmission session (or LCT session).

A broadcast receiver may acquire a service based on signaling data. Specifically, the broadcast receiver may acquire low level signaling data, and acquire service layer signaling data based on the low level signaling data.

In addition, the broadcast receiver may acquire an attribute of the service using the service layer signaling data (USBD). Further, the broadcast receiver may refer to and/or acquire an MPD and/or an S-TSID using the USBD.

In addition, the broadcast receiver may acquire information about at least one component (or representation) for the service using the service layer signaling data (USBD and/or MPD). For example, the broadcast receiver may acquire information about a video component.

In addition, the broadcast receiver may acquire transmission path information of at least one component using the service layer signaling data (S-TSID). Further, the broadcast receiver may acquire transmission path information of another component for the at least one component using the service layer signaling data (S-TSID). For example, the other component for the at least one component may include the application.

In addition, the broadcast receiver may acquire service data for the service based on the service layer signaling data (transmission path information). For example, the broadcast receiver may receive the application in non-real time through the second transmission session (tsi-app).

In addition, the broadcast receiver may acquire information for identifying the application based on the service layer signaling data (AST).

The broadcast receiver may operate the application at predetermined timing while reproducing the video component.

FIG. 48 illustrates an AST transmitted through a broadband network according to an embodiment of the present invention.

When the AST is transmitted through the broadband network, the AST may be acquired through a query. This query may be generated using information about a base URL in an SLT. This base URL may correspond to URL information for acquiring the AST. Here, the SLT may correspond to an SLT including bootstrap information for a broadcast service related to the AST.

A broadcast signal (broadcast stream) having a certain frequency may include service data and/or signaling data for the service. The broadcast signal may include a first ROUTE session (sIP#A/dIP#A/dPort#A). The first ROUTE session may be transmitted through a first PLP (PLP #A). In addition, the first ROUTE session may include a first transmission session (not illustrated), a second transmission session (tsi-app), and/or a third transmission session (not illustrated). The first transmission session may include at least one service layer signaling information. The second transmission session (tsi-app) may include at least one application. The third transmission session may include a video component. Content about the first ROUTE session (sIP#A/dIP#A/dPort#A), the first PLP (PLP #A), the first transmission session, the second transmission session (tsi-app), and/or the third transmission session may include all of the above-described content about the first ROUTE session (sIP#A/dIP#A/dPort#A), the first PLP (PLP #A), the first transmission session, the second transmission session (tsi-app), and/or the third transmission session.

Hereinafter, the SLT (or FIT) will be described.

Content about the SLT according to an embodiment of the present invention may include all of the above-described content of the SLT. Hereinafter, a description will be given focusing on differences.

For example, the SLT may include a Broadcast_Stream_id attribute and a first service element (Service #A).

The first service element (Service #A) may include at least one of a serviceId attribute and/or a signaling_broadband element.

The serviceId attribute may correspond to an integer for uniquely identifying the corresponding service in a range of a broadcast region.

The signaling_broadband element may include path information (or URL) for accessing Internet signaling information (for example, SLS) for the service. The signaling_broadband element enables the receiver to bootstrap discovery of an SLS for each service. In this case, the SLS may be transmitted through the broadband network.

The signaling_broadband element may include broadbandServerURL_AST which includes path information (or URL) for accessing the AST for the service. In this case, the AST may be transmitted through the broadband network.

Hereinafter, the SLS will be described.

The SLS may include at least one of a USBD, an MPD, an S-TSID, and/or an AST. Content related to the SLS may include all of the above-described content about the SLS. However, one difference is that the SLS may be transmitted through the broadband network.

The broadcast receiver according to the present embodiment may receive, through a broadcast network, a broadcast signal including at least one of service data and signaling data (for example, low level signaling data or SLT) for the service.

The broadcast receiver according to the present embodiment may acquire the service based on the signaling data. Specifically, the broadcast receiver may acquire the low level signaling data, and acquire service layer signaling data based on the low level signaling data. The service layer signaling data may be transmitted through the broadband network.

In addition, the broadcast receiver may acquire an attribute of the service using the service layer signaling data (USBD). Further, the broadcast receiver may refer to and/or acquire the MPD and/or the S-TSID using the USBD.

In addition, the broadcast receiver may acquire information about at least one component (or representation) for the service using the service layer signaling data (USBD and/or MPD). For example, the broadcast receiver may acquire information about a video component.

In addition, the broadcast receiver may acquire transmission path information of at least one component using the service layer signaling data (S-TSID). Further, the broadcast receiver may acquire transmission path information of another component for the at least one component using the service layer signaling data (S-TSID). For example, the other component for the at least one component may include the application.

In addition, the broadcast receiver may acquire service data for the service based on the service layer signaling data (transmission path information). For example, the broadcast receiver may receive the application in non-real time through the second transmission session (tsi-app).

In addition, the broadcast receiver may acquire information for identifying the application based on the service layer signaling data (AST).

The broadcast receiver may operate the application at predetermined timing while reproducing the video component.

FIG. 49 illustrates an event transmitted in the form of an EventStream element through a broadcast network according to an embodiment of the present invention.

The event may be transmitted in the form of the EventStream element which appears in a Period element of an MPD. Content about the EventStream element which is transmitted through the broadcast network may include all of the above-described content about the EventStream element.

A broadcast signal (broadcast stream) having a certain frequency may include service data and/or signaling data for the service. The broadcast signal may include a first ROUTE session (sIP#A/dIP#A/dPort#A). The first ROUTE session may be transmitted through a first PLP (PLP #A). In addition, the first ROUTE session may include a first transmission session (tsi-sls), a second transmission session (tsi-app), and/or a third transmission session (not illustrated). The first transmission session (tsi-sls) may include at least one service layer signaling information. For example, the service layer signaling information may include at least one of the USBD, the MPD, the S-TSID, and/or the AST described above. The second transmission session (tsi-app) may include at least one application. The third transmission session may include a video component. Content about the first ROUTE session (sIP#A/dIP#A/dPort#A), the first PLP (PLP #A), the first transmission session, the second transmission session (tsi-app), and/or the third transmission session may include all of the above-described content about the first ROUTE session (sIP#A/dIP#A/dPort#A), the first PLP (PLP #A), the first transmission session, the second transmission session (tsi-app), and/or the third transmission session.

Hereinafter, an SLT will be described.

The SLT enables the receiver to create a basic service list and bootstrap discovery of an SLS for each service. For example, the SLT may include path information for the first ROUTE session (sIP#A/dIP#A/dPort#A). In addition, the SLT may include path information for the first transmission session (tsi-sls). Content about the SLT according to the present embodiment may include all of the above-described content about the SLT.

Hereinafter, the SLS will be described.

The SLS may include at least one of a USBD, an MPD, an S-TSID, and/or an AST. Content related to the SLS may include all of the above-described content about the SLS. Hereinafter, the MPD will be described in further detail.

The MPD corresponds to service signaling information for a certain service, and may provide signaling information at a time interval of the service referred to as a period. Signaling information related to the period is included in an MPD Period element, and this Period element may include an EventStream element. The EventStream element may provide signaling (event) necessary for operations of applications during the period of the service.

The EventStream element may include a schemeIdUri attribute, a value attribute, a timescale attribute, and/or at least one Event sub-element. Each Event sub-element may include a presentationTime attribute, a duration attribute and/or an id attribute. Details of the EventStream element may include all of the above-described content about the EventStream element.

For example, the schemeIdUri attribute may have a value of "urn:uuid:XYZY". In addition, the value attribute may have a value of "call". Further, the timescale attribute may have a value of "1000".

In addition, with regard to a first event, the presentationTime attribute may have a value of "0", the duration attribute may have a value of "10000", and/or the id attribute may have a value of "0". Further, a data element/attribute may correspond to "+1 800 10101010". With regard to a second event, the presentationTime attribute may have a value of "20000", the duration attribute may have a value of "10000", and/or the id attribute may have a value of "1". Further, a data element/attribute may correspond to "+1 800 10101011". With regard to a third event, the presentationTime attribute may have a value of "40000", the duration attribute may have a value of "10000", and/or the id attribute may have a value of "2". Further, a data element/attribute may correspond to "+1 800 10101012". With regard to a fourth event, the presentationTime attribute may have a value of "60000", the duration attribute may have a value of "10000", and/or the id attribute may have a value of "3". Further, a data element/attribute may correspond to "+1 800 10101013".

The broadcast receiver according to the present embodiment may receive a broadcast signal including at least one of service data and signaling data (for example, low level signaling data or service layer signaling data) for a service through a broadcast network.

The broadcast receiver according to the present embodiment may acquire the service based on the signaling data. Specifically, the broadcast receiver may acquire the low level signaling data, and acquire the service layer signaling data based on the low level signaling data.

In addition, the broadcast receiver may acquire an attribute of the service using the service layer signaling data (USBD). Further, the broadcast receiver may refer to and/or acquire an MPD and/or an S-TSID using the USBD.

In addition, the broadcast receiver may acquire information about at least one component (or representation) for the service using the service layer signaling data (USBD and/or MPD). For example, the broadcast receiver may acquire information about a video component.

In addition, the broadcast receiver may acquire transmission path information of at least one component using the service layer signaling data (S-TSID). Further, the broadcast receiver may acquire transmission path information of another component for the at least one component using the service layer signaling data (S-TSID). For example, the other component for the at least one component may include the application.

In addition, the broadcast receiver may acquire service data for the service based on the service layer signaling data (transmission path information). For example, the broadcast receiver may receive the application in non-real time through the second transmission session (tsi-app).

In addition, the broadcast receiver may acquire information for identifying the application based on the service layer signaling data (AST).

In addition, the broadcast receiver may operate the application based on the event. For example, the event may be transmitted in the form of the EventStream element which appears in the Period element. The broadcast receiver may operate the application at predetermined timing while reproducing the video component.

FIG. 50 illustrates an event transmitted in the form of an emsg box through a broadcast network according to an embodiment of the present invention.

The event may be transmitted in the form of the emsg box which appears in segments of Representation (or Representation segments). Content about the emsg box transmitted through the broadcast network may include all of the above-described content about the emsg box.

A broadcast signal (broadcast stream) having a certain frequency may include service data and/or signaling data for a service. The broadcast signal may include a first ROUTE session (sIP#A/dIP#A/dPort#A). The first ROUTE session may be transmitted through a first PLP (PLP #A). In addition, the first ROUTE session may include a first transmission session (tsi-sls), a second transmission session (tsi-app), and/or a third transmission session (tsi-v). The first transmission session (tsi-sls) may include at least one service layer signaling information. For example, the service layer signaling information may include at least one of the USBD, the MPD, the S-TSID, and/or the AST described above. The second transmission session (tsi-app) may include at least one application. The third transmission session may include a video component. The video component may include at least one video segment which includes video data. The at least one video segment may include the emsg box.

Content about the first ROUTE session (sIP#A/dIP#A/dPort#A), the first PLP (PLP #A), the first transmission session, the second transmission session (tsi-app), and/or the third transmission session (tsi-v) may include all of the above-described content about the first ROUTE session (sIP#A/dIP#A/dPort#A), the first PLP (PLP #A), the first transmission session, the second transmission session (tsi-app), and/or the third transmission session (tsi-v).

Hereinafter, the emsg box included in the segments will be described.

The emsg box may provide signaling information for generic events related to a media presentation time. The emsg box may include at least one of a schemeIdUri field, a value field, a timescale field, a presentationTimeDelta field, an eventDuration field, an id field, and/or a messageData field. Content about the emsg box may include all of the above-described content of the emsg box.

Hereinafter, an SLT will be described.

The SLT enables the receiver to create a basic service list and bootstrap discovery of an SLS for each service. For example, the SLT may include path information for the first ROUTE session (sIP#A/dIP#A/dPort#A). In addition, the SLT may include path information for the first transmission session (tsi-sls). Content about the SLT according to the present embodiment may include all of the above-described content about the SLT.

Hereinafter, the SLS will be described.

The SLS may include at least one of a USBD, an MPD, an S-TSID, and/or an AST. Content related to the SLS may include all of the above-described content about the SLS. Hereinafter, the S-TSID and/or the MPD will be described in further detail.

The S-TSID may include a first ROUTE session element (RS) that provides information about a ROUTE session for a service and/or a component included in the service. The first ROUTE session element (RS) may include transmission path information for the first ROUTE session. In addition, the first ROUTE session element (RS) may include information about a transmission session (or a layered coding transport session) included in the ROUTE session. For example, the first ROUTE session element (RS) may include a second transmission session element (LS) including information about the second transmission session. The second transmission session element (LS) may include transmission path information for the second transmission session. In addition, the first ROUTE session element (RS) may include a third transmission session element (LS) including information about the third transmission session. The third transmission session element (LS) may include transmission path information for the third transmission session.

Specifically, each of the second transmission session element (LS) and/or the third transmission session element (LS) may include a tsi attribute for identifying a transmission session in which a content component for the service is transmitted and a SrcFlow element that describes a source flow included in the ROUTE session.

The SrcFlow element may include an nrt attribute that indicates whether the SrcFlow element transmits NRT service data. Alternatively, the SrcFlow element may include an rt attribute that indicates whether the SrcFlow element transmits streaming media data. In other words, the nrt attribute may perform the same function as that of the rt attribute. Further, the nrt attribute and the rt attribute may be replaced by each other.

The SrcFlow element may further include an appID attribute which includes additional information mapped to a service (or an application service) transmitted through a transmission session. The appID attribute may be referred to as a ContentInfo element. The ContentInfo element may include additional information mapped to the service (or the application service) transmitted through the transmission session. For example, the ContentInfo element may include a representation identifier (ID) of DASH content and/or adaptation set parameters of DASH media representation in order to select an LCT transmission session for rendering. The representation ID is an ID related to a component for the service, and may be referred to as an id attribute. Therefore, the appID attribute in the SrcFlow element may be matched with an id attribute in a Representation element of the MPD.

With regard to the second transmission session element (LS), when the tsi attribute corresponds to "tsi-app", the transmission session element may include information for the second transmission session. In addition, when the nrt attribute corresponds to "true", the SrcFlow element may transmit NRT service data. In other words, the application may be transmitted in non-real time through the second transmission session (tsi-app).

With regard to the third transmission session element (LS), when the tsi attribute corresponds to "tsi-app", the transmission session element may include information for the third transmission session. In addition, when the nrt attribute corresponds to "false", the SrcFlow element may transmit real-time service data. Further, when the appID attribute corresponds to "rep_v1", a representation ID of the video component may correspond to "rep_v1". In other words, at least one video segment of the video component identified by "rep_v1" may be transmitted in real time through the third transmission session (tsi-v).

The MPD may include resource identifiers for separate media components of a linear/streaming service. The MPD may include the Period element. The Period element may include an AdaptationSet element which includes information about the video component. The AdaptationSet element may include at least one Representation element. The Representation element may include information about a representation related to the component.

The Representation element may include an id attribute for identifying the representation. For example, the id attribute may have a value of "rep_v1". In other words, the id attribute may indicate the video component transmitted through the third transmission session (tsi-v).

In addition, the Representation element may further include an InbandEventStream element that specifies the presence of an in-band event stream in the related representation. The InbandEventStream element of the Representation element of the MPD may signal whether an event is present the emsg box in the segments.

The InbandEventStream element may include a schemeIdURI attribute and/or a value attribute. These two attributes may indicate a type of the event in the emsg box. According to a given embodiment, these two attributes may be used to identify the event. The schemeIdURI attribute and/or the value attribute included in the InbandEventStream element may be matched with a schemeIdURI attribute and/or a value attribute in the emsg box. For example, the schemeIdURI attribute may have a value of "event URI #1", and the value attribute may have a value of "abc".

The broadcast receiver according to the present embodiment may receive a broadcast signal including at least one of service data and signaling data (for example, low level signaling data or service layer signaling data) for a service through a broadcast network.

The broadcast receiver according to the present embodiment may acquire the service based on the signaling data. Specifically, the broadcast receiver may acquire the low level signaling data, and acquire the service layer signaling data based on the low level signaling data.

In addition, the broadcast receiver may acquire an attribute of the service using the service layer signaling data (USBD). Further, the broadcast receiver may refer to and/or acquire an MPD and/or an S-TSID using the USBD.

In addition, the broadcast receiver may acquire information about at least one component (or representation) for the service using the service layer signaling data (USBD and/or MPD). For example, the broadcast receiver may acquire information about a video component. In this instance, the Representation element of the MPD may include an InbandEventStream element that specifies the presence of the emsg box (or in-band event stream) in the video component.

In addition, the broadcast receiver may acquire transmission path information of at least one component using the service layer signaling data (S-TSID). Further, the broadcast receiver may acquire transmission path information of another component for the at least one component using the service layer signaling data (S-TSID). For example, the other component for the at least one component may include the application.

In addition, the broadcast receiver may acquire service data for the service based on the service layer signaling data (transmission path information). For example, the broadcast receiver may receive the application in non-real time through the second transmission session (tsi-app). Further, the broadcast receiver may receive at least one video segment of the video component identified by "rep_v1" through the third transmission session (tsi-v) in real time. The at least one video segment may include the emsg box.

In addition, the broadcast receiver may acquire information for identifying the application based on the service layer signaling data (AST).

In addition, the broadcast receiver may operate the application based on the event. For example, the event may be included in the segments in the form of the emsg box. The broadcast receiver may operate the application at predetermined timing while reproducing the video component.

FIG. 51 illustrates an event transmitted in the form of an EventStream element through a broadband network according to an embodiment of the present invention.

The event may be transmitted in the form of the EventStream element which is included in an EST transmitted through the broadband network. When the EST is transmitted through the broadband network, the EST may be acquired through a query. This query may be generated using URL information in an ALT. This URL information may be URL information for acquiring the EST. Content about the EventStream element transmitted through the broadband network may include all of the above-described content about the EventStream element.

A broadcast signal (broadcast stream) having a certain frequency may include service data and/or signaling data for a service. The broadcast signal may include a first ROUTE session (sIP#A/dIP#A/dPort#A). The first ROUTE session may be transmitted through a first PLP (PLP #A). In addition, the first ROUTE session may include a first transmission session (tsi-sls), a second transmission session (tsi-app), and/or a third transmission session (not illustrated). The first transmission session (tsi-sls) may include at least one service layer signaling information. For example, the service layer signaling information may include at least one of the USBD, the MPD (not illustrated), the S-TSID, and/or the AST described above. The second transmission session (tsi-app) may include at least one application. The third transmission session may include a video component. According to a given embodiment, the MPD may be omitted. Content about the first ROUTE session (sIP#A/dIP#A/dPort#A), the first PLP (PLP #A), the first transmission session, the second transmission session (tsi-app), and/or the third transmission session according to the present embodiment may include all of the above-described content about the first ROUTE session (sIP#A/dIP#A/dPort#A), the first PLP (PLP #A), the first transmission session, the second transmission session (tsi-app), and/or the third transmission session.

Hereinafter, an SLT will be described.

The SLT may include path information for the first ROUTE session (sIP#A/dIP#A/dPort#A). In addition, the SLT may include path information for the first transmission session (tsi-sls). Content about the SLT according to the present embodiment may include all of the above-described content of the SLT.

Hereinafter, an SLS will be described.

The SLS may include at least one of a USBD, an MPD, an S-TSID, and/or an AST. Content about the SLS may include all of the above-described content about the SLS. Hereinafter, the AST will be described in further detail.

The AST may include a ContentLinkage attribute. The ContentLinkage attribute may indicate an application that uses a corresponding content item. Signaling for a certain application may be performed by a value of this attribute and information about events (EventStream element, emsg box, etc.) to be described below.

For example, the ContentLinkage attribute may provide an application identifier for identifying an application which is transmitted through the second transmission session. Alternatively, the ContentLinkage attribute may provide a transmission session identifier for identifying the second transmission session (or LCT session).

The AST may further include a BroadbandStaticEventURL attribute. The BroadbandStaticEventURL attribute may include path information (or a URL) for accessing the EST for the service. In this case, the EST may be transmitted through the broadband network. The EST may include an EventStream element. The EventStream element may provide signaling (event) necessary for operations of applications.

The EventStream element may include a schemeIdUri attribute, a value attribute, a timescale attribute, and/or at least one Event sub-element. Each Event sub-element may include a presentationTime attribute, a duration attribute and/or an id attribute. Details of the EventStream element may include all of the above-described content about the EventStream element.

For example, the schemeIdUri attribute may have a value of "urn:uuid:XYZY". In addition, the value attribute may have a value of "call". Further, the timescale attribute may have a value of "1000".

In addition, with regard to a first event, the presentationTime attribute may have a value of "0", the duration attribute may have a value of "10000", and/or the id attribute may have a value of "0". Further, a data element/attribute may correspond to "+1 800 10101010". With regard to a second event, the presentationTime attribute may have a value of "20000", the duration attribute may have a value of "10000", and/or the id attribute may have a value of "1". Further, a data element/attribute may correspond to "+1 800 10101011". With regard to a third event, the presentationTime attribute may have a value of "40000", the duration attribute may have a value of "10000", and/or the id attribute may have a value of "2". Further, a data element/attribute may correspond to "+1 800 10101012". With regard to a fourth event, the presentationTime attribute may have a value of "60000", the duration attribute may have a value of "10000", and/or the id attribute may have a value of "3". Further, a data element/attribute may correspond to "+1 800 10101013".

The broadcast receiver according to the present embodiment may receive a broadcast signal including at least one of service data and signaling data (for example, low level signaling data or service layer signaling data) for a service through a broadcast network.

The broadcast receiver according to the present embodiment may acquire the service based on the signaling data. Specifically, the broadcast receiver may acquire the low level signaling data, and acquire the service layer signaling data based on the low level signaling data.

In addition, the broadcast receiver may acquire an attribute of the service using the service layer signaling data (USBD). Further, the broadcast receiver may refer to and/or acquire an MPD and/or an S-TSID using the USBD.

In addition, the broadcast receiver may acquire information about at least one component (or representation) for the service using the service layer signaling data (USBD and/or MPD). For example, the broadcast receiver may acquire information about a video component.

In addition, the broadcast receiver may acquire transmission path information of at least one component using the service layer signaling data (S-TSID). Further, the broadcast receiver may acquire transmission path information of another component for the at least one component using the service layer signaling data (S-TSID). For example, the other component for the at least one component may include the application.

In addition, the broadcast receiver may acquire service data for the service based on the service layer signaling data (transmission path information). For example, the broadcast receiver may receive the application in non-real time through the second transmission session (tsi-app).

In addition, the broadcast receiver may acquire information for identifying the application based on the service layer signaling data (AST). Further, the broadcast receiver may acquire the EST through the broadband network based on the service layer signaling data (AST).

In addition, the broadcast receiver may operate the application based on the event. For example, the event may be transmitted in the form of the EventStream element which is included in the EST transmitted through the broadband network.

The broadcast receiver may operate the application at predetermined timing while reproducing the video component.

FIG. 52 illustrates an event transmitted in the form of an emsg box through a broadband network according to an embodiment of the present invention.

The event may be transmitted in the form of the emsg box transmitted through the broadband network. In this case, the event may be delivered through a live event server. Polling may be periodically performed using the live event server. When an event to be transmitted in the corresponding period is present, the event server may deliver the event to a receiver. Content about the emsg box transmitted through the broadband network may include all of the above-described content about the emsg box.

A broadcast signal (broadcast stream) having a certain frequency may include service data and/or signaling data for a service. The broadcast signal may include a first ROUTE session (sIP#A/dIP#A/dPort#A). The first ROUTE session may be transmitted through a first PLP (PLP #A). In addition, the first ROUTE session may include a first transmission session (tsi-sls), a second transmission session (tsi-app), and/or a third transmission session (not illustrated). The first transmission session (tsi-sls) may include at least one service layer signaling information. For example, the service layer signaling information may include at least one of the USBD, the MPD (not illustrated), the S-TSID, and/or the AST described above. The second transmission session (tsi-app) may include at least one application. The third transmission session may include a video component. According to a given embodiment, the MPD may be omitted. Content about the first ROUTE session (sIP#A/dIP#A/dPort#A), the first PLP (PLP #A), the first transmission session, the second transmission session (tsi-app), and/or the third transmission session according to the present embodiment may include all of the above-described content about the first ROUTE session (sIP#A/dIP#A/dPort#A), the first PLP (PLP #A), the first transmission session, the second transmission session (tsi-app), and/or the third transmission session.

Hereinafter, an SLT will be described.

The SLT may include path information for the first ROUTE session (sIP#A/dIP#A/dPort#A). In addition, the SLT may include path information for the first transmission session (tsi-sls). Content about the SLT according to the present embodiment may include all of the above-described content of the SLT.

Hereinafter, an SLS will be described.

The SLS may include at least one of a USBD, an MPD, an S-TSID, and/or an AST. Content about the SLS may include all of the above-described content about the SLS. Hereinafter, the AST will be described in further detail.

The AST may include a ContentLinkage attribute. The ContentLinkage attribute may indicate an application that uses a corresponding content item. Signaling for a certain application may be performed using a value of this attribute and information about events (EventStream element, emsg box, etc.) to be described below.

For example, the ContentLinkage attribute may provide an application identifier for identifying an application which is transmitted through the second transmission session. Alternatively, the ContentLinkage attribute may provide a transmission session identifier for identifying the second transmission session (or LCT session).

The AST may further include a BroadbandStaticEventURL attribute. The BroadbandStaticEventURL attribute may include path information (or a URL) for accessing the emsg box for the service. In this case, the emsg box may be transmitted through the broadband network. The emsg box may provide signaling (event) necessary for operations of applications.

The emsg box may provide signaling information for generic events related to a media presentation time. The emsg box may include at least one of a schemeIdUri field, a value field, a timescale field, a presentationTimeDelta field, an eventDuration field, an id field, and/or a messageData field. Content about the emsg box may include all of the above-described content of the emsg box.

For example, the schemeIdUri field may have a value of "urn:uuid:XYZY".

The broadcast receiver according to the present embodiment may receive a broadcast signal including at least one of service data and signaling data (for example, low level signaling data or service layer signaling data) for a service through a broadcast network.

The broadcast receiver according to the present embodiment may acquire the service based on the signaling data. Specifically, the broadcast receiver may acquire the low level signaling data, and acquire the service layer signaling data based on the low level signaling data.

In addition, the broadcast receiver may acquire an attribute of the service using the service layer signaling data (USBD). Further, the broadcast receiver may refer to and/or acquire an MPD and/or an S-TSID using the USBD.

In addition, the broadcast receiver may acquire information about at least one component (or representation) for the service using the service layer signaling data (USBD and/or MPD). For example, the broadcast receiver may acquire information about a video component.

In addition, the broadcast receiver may acquire transmission path information of at least one component using the service layer signaling data (S-TSID). Further, the broadcast receiver may acquire transmission path information of another component for the at least one component using the service layer signaling data (S-TSID). For example, the other component for the at least one component may include the application.

In addition, the broadcast receiver may acquire service data for the service based on the service layer signaling data (transmission path information). For example, the broadcast receiver may receive the application in non-real time through the second transmission session (tsi-app).

In addition, the broadcast receiver may acquire information for identifying the application based on the service layer signaling data (AST). Further, the broadcast receiver may acquire the emsg box through the broadband network based on the service layer signaling data (AST).

In addition, the broadcast receiver may operate the application based on the event. For example, the event may be transmitted in the form of the emsg box transmitted through the broadband network.

The broadcast receiver may operate the application at predetermined timing while reproducing the video component.

FIG. 53 illustrates an API and an event listener according to an embodiment of the present invention.

FIG. 53(a) illustrates the listener.

An event processor may correspond to code executed in response to occurrence of an event. For example, the event processor may correspond to JavaScript code for execution when the event occurs. The event processor may include the event listener (or listener). Unlike an event handler which can process only one event for one element, the event listener may process at least one event for one element.

The listener may include a general signature of a document object model (DOM) event listener. Here, a DOM refers to a model (system) that supports the event handler such that the event handler is connectable to all element nodes.

The listener according to the present embodiment may include an object of a StreamEvent type as a parameter. For example, the listener may have a form such as listener (StreamEvent event).

The object of the StreamEvent type delivered to the listener has an extended form of an object of a general DOM event type.

The object of the StreamEvent type may include a name attribute, a data attribute, a text attribute, a status attribute, and/or a time attribute.

The name attribute may indicate a name of an event. The name attribute is a read-only attribute, and may correspond to a string type.

The data attribute may indicate data of an event encoded as a hexadecimal number. For example, the data attribute may have a value of "0A10B81033". The data attribute is a read-only attribute, and may correspond to a string type.

The text attribute may indicate text data of an event. For example, when the data attribute includes text, the text attribute may have values in ASCII code. In addition, the text attribute may correspond to a child element of an Event element for activation of the event, and include data identified by a data identifier (dataID) which is specified in a trigger or specified in an Event element of an EMT. The text attribute is a read-only attribute, and may correspond to a string type.

The status attribute may indicate a state of an event. When the event is activated in response to a trigger, the status attribute may indicate "trigger". When several types of errors occur, the status attribute may indicate "error". The status attribute is a read-only attribute, and may correspond to a DOMString type.

The time attribute may indicate a time at which an event occurs. The time attribute is a read-only attribute, and may have an integer type.

FIG. 53(b) illustrates the API for addition and/or deletion of the event listener (or listener).

A method of processing an event according to an embodiment of the present invention may include a scheme of connecting the event listener to a method of an object. This method is a method of connecting the event listener to the method of the object, and executing the method of the object when the event occurs thereafter.

AddStreamEventListener API and/or removeStreamEventListener API according to an embodiment of the present invention may be used to support this method of processing the event.

AddStreamEventListener API may add the listener for the event (for example, the event listener or a stream event listener). AddStreamEventListener API may add a listener for an event designated by an event identifier (for example, eventID) within a range of a currently executed html application to an AST. When the event is activated by a trigger, the listener is called. In addition, an object of a TriggerEvent type (or a StreamEvent type) may be delivered. Listeners may be added only when a video/broadcast object is in a presenting and/or stopped state.

AddStreamEventListener API may include at least one of a targetURL parameter, an eventName parameter, and/or a Listener parameter. For example, addStreamEventListener API may have a form such as addStreamEventListener (targetURL, eventName, listener).

The targetURL parameter may indicate a URL of a StreamEvent object that describes an event. Alternatively, the targetURL parameter may be mapped to a schemeIdURI attribute of a DASH EventStream element.

The eventName parameter may indicate a name of an event to be subscribed. Alternatively, the eventName parameter may be mapped to a value attribute of the DASH EventStream element.

The Listener parameter may indicate a listener for an event. The Listener parameter may correspond to a callback function. When the event occurs, the Listener parameter may be called as a parameter together with a delivered StreamEvent object.

The targetURL parameter and the eventName parameter may correspond to event identifiers for identifying an event. For example, addStreamEventListener API may include an event identifier (eventId) parameter and a listener parameter. For example, addStreamEventListener API may have a form of addTriggerEventListener(String eventId, EventListener listener). The event identifier may correspond to an identifier (for example, an EventID attribute or an id attribute) of an event present in an event element in the EMT. In addition, the event identifier may correspond to an identifier (for example, an id field of an emsg box) of an event dynamically updated by a trigger.

RemoveStreamEventListener API may delete a listener for an event. RemoveStreamEventListener API may delete a listener for an event designated by an event identifier (for example, eventID).

RemoveStreamEventListener API may include at least one of a targetURL parameter, an eventName parameter, and/or a Listener parameter. For example, removeStreamEventListener API may have a form such as remove StreamEventListener(targetURL, eventName, listener).

The targetURL parameter may indicate a URL of a StreamEvent object. Alternatively, the targetURL parameter may be mapped to a schemeIdURI attribute of a DASH EventStream element.

The eventName parameter may indicate a name of an event, subscription of which needs to be deleted. Alternatively, the eventName parameter may be mapped to a value attribute of the DASH EventStream element.

The Listener parameter may indicate a listener for an event. The Listener parameter may correspond to a callback function. When the event occurs, the Listener parameter may be called out as a parameter together with a delivered StreamEvent object.

The targetURL parameter and the eventName parameter may correspond to event identifiers for identifying an event. For example, removeStreamEventListener API may include an event identifier (eventId) parameter and a listener parameter. For example, removeStreamEventListener API may have a form of removeTriggerEventListener(String eventId, EventListener listener). The event identifier may correspond to an identifier (for example, an EventID attribute or an id attribute) of an event present in an event element in the EMT. In addition, the event identifier may correspond to an identifier (for example, an id field of an emsg box) of an event dynamically updated by a trigger.

The broadcast receiver according to the present embodiment may add a listener for an event based on addStreamEventListener API. In addition, the broadcast receiver may add a listener for an event based on removeStreamEventListener API. AddStreamEventListener API and/or removeStreamEventListener API may support synchronization of html application actions for broadcast programming.

FIG. 54 is a block diagram of an electronic device according to an embodiment of the present invention.

Referring to FIG. 54, the electronic device 100 includes a controller 110 and a communication unit 120. The controller 110 may establish a communication linkage with a companion device. In addition, when the communication linkage with the companion device is established, the communication unit 120 may exchange data with the companion device.

In addition, the controller 110 may include a network processor 111 and an application processor 112. The application processor 112 may request connection with the companion device from the network processor 111.

The network processor 111 may place the connection request received from the application processor 112 in a standby state since the network processor 111 has not been connected with the companion device. Thereafter, the network processor 111 may receive a connection request from the companion device. The network processor 111 may search for a matching connection request from the application processor 112 based on information received from the companion device. Upon finding the matching connection request, the network processor 111 may connect the companion device to the application processor 112.

As an example, the application processor 112 may correspond to an application module or an application browser. Alternatively, the application processor 112 may correspond to an HbbTV application. As an example, the network processor 111 may be implemented as a network module. Alternatively, the network processor 111 may correspond to a WebSocket server. The network processor 111 may interconnect the application processor 112 and the companion device. As an example, when the network processor 111 is implemented as the WebSocket server, each of the application processor 112 and the companion device may be regarded as one client. In other words, the WebSocket server may connect a first client and a second client. Alternatively, each of the first client and the second client may be referred to as a peer. Depending on cases, the WebSocket server may be implemented as a separate device outside the electronic device.

Meanwhile, the application processor 112 may operate one application. In addition, the companion device may operate one application. The application processor 112 may be connected to the companion device through the network processor 111. The companion device may receive data from the application processor 112 and receive and drive an application which is being driven by the application processor 112. Alternatively, each of the application processor 112 and the companion device may drive an application. The application processor 112 may be connected to the companion device to exchange data with the companion device. In this case, the electronic device 100 and the companion device may be considered to perform inter-application communication.

The WebSocket server may be used as a repeater and may generate a communication channel between applications. The generated communication channel may enable the electronic device 100 and the companion device to communicate with each other. The WebSocket server may connect a channel between applications requesting the same information using a name ID and an origin ID of an application desiring to perform communication to generate a communication channel. For example, the above-described method may connect an application (client) and an application (client) without correcting a WebSocket API in HbbTV 2.0.

In this specification, respective terms are interchangeable.

FIG. 55 is a diagram for description of connection of a first client according to an embodiment of the present invention.

FIG. 55 illustrates an electronic device 100a and a companion device 200a. The electronic device 100a may include an application processor and a network processor. As an example, the application processor may correspond to an HbbTV application or a first application, and the network processor may correspond to an HbbTV WebSocket server. The companion device 200a may include a companion device processor. As an example, the companion device processor may correspond to a companion application or a second client. The WebSocket server may need to be changed to connect the clients. Hereinafter, an operation related to change of the WebSocket server will be described. The changed WebSocket server may be driven in HbbTV 2.0 TV.

Usually, a WebSocket client specifies the remote host to which it wishes to establish a connection, and the relative URI for the desired service on that host in the initial GET request along with the WebSocket connection upgrade header. In HbbTV, however, it cannot be assumed that, the peer with which communications are to be established, has contacted the WebSocket server yet. A connection request from a client in the special client-to-client mode, hence needs to be kept active until another, suitable peer arrives.

To achieve this, we define special uses for two fields of the WebSocket protocol upgrade GET request. The Request-URI—which is part of the Request-Line —takes a predefined format with a common prefix string. This field is used to match corresponding communication peers. The Host request-header field may either refer to the TV set running the WebSocket server (in which case communications with any peer with a matching Request-URI will be established), or to a specific companion device (in which case communications only with the designated device, and with a matching Request-URI will be established).

The format for the Request-URI field may be according to the following ABNF grammar:

HbbTV-Request-URI="/hbbtv/" org-id "." app-id
org-id=8HEX
app-id=4HEX

In response to such a request, an HbbTV WebSocket server may create a stream head, that is a half open connection, which is associated with the Request-URI supplied in the upgrade GET request by the client. The server may not respond immediately with a WebSocket Protocol Handshake response, but instead wait for other peers to appear, and thereby keep the first client waiting. If the server wishes to implement a time-out, it may respond with a 504 Gateway Timeout response.

Clients may not use the Sec-WebSocket-Protocol header when requesting client-to-client connections. Servers may ignore the Sec-WebSocket-Protocol header in requests for client-to-client connections. Servers may respond with a 403 Forbidden response if the Host header field in a client-to-client connection request does not specify a device on any of the local sub-networks that the server is attached to. All HbbTV 2.0 WebSocket clients may use the method described in this section to request client-to-client connections from HbbTV 2.0 WebSocket servers.

FIG. 56 is a diagram for description of connection of a second client according to an embodiment of the present invention.

FIG. 56 illustrates an electronic device 100a and a companion device 200a. The electronic device 100a may include an application processor and a network processor. The network processor (for example, a WebSocket server) may receive a connection request from an HbbTV application and a companion application.

When another client requests a client-to-client connection using the method as above, the server may also create a stream head for that new request as shown in FIG. 3. After a new stream head is created, the server may search the collection of stream heads currently waiting to be connected, for Request-URI and Host header field values matching those of the newly created stream head. If no match is found, the server may add the newly created stream head to the collection of stream heads currently waiting to be connected, and may keep waiting for further client-to-client connection requests.

FIG. 57 is a diagram for description of connection between the first and second clients according to an embodiment of the present invention.

FIG. 57 illustrates an electronic device 100*a* and a companion device 200*a*. The electronic device 100*a* may include an application processor and a network processor. The network processor (for example, a WebSocket server) may connect an HbbTV application and a companion application.

If a newly created stream head is associated with the same Request-URI and Host header field values as a stream head in the collection of stream heads currently waiting to be connected, the server may remove the matching stream head from the collection, and may establish a full-duplex communications channel between the two stream heads.

Once the two stream heads are connected, the server outputs all data received from one stream head immediately and without alteration to the respective other stream head. Thereby, a transparent communications channel is established between the two clients.

If one of the two clients sends a Close frame, the server may send a corresponding Close frame to the other client. If one of the two clients disconnects without sending a Close frame, the server may generate a Close frame, and may send the same to the other client.

In other words, the network processor may generate a stream head of the application processor and include the stream head in a stream head group in response to a connection request from the application processor. In addition, in response to a connection request from the companion device, the network processor may generate a stream head of the companion device and verify whether a matching stream head is present. When the matching stream head is present, the network processor may connect a stream head of the application processor and a stream head of the companion device matching from the stream head group. In this instance, the network processor may remove the matching stream head of the application processor or the matching stream head of the companion device from the stream head group.

FIG. 58 is a diagram for description of an additional connection request according to an embodiment of the present invention.

Referring to FIG. 58, an HbbTV application (client) is connected to a companion application (client) of a companion device 200*a*. In addition, the HbbTV application may generate another stream head for another client. The HbbTV application may be additionally connected to another application. Any stream head be removed from the collection of stream heads available for connecting, prior to establishing a client-to-client connection, such client-to-client connections are one-to-one only. If a client wishes to communicate with more than one other client, it may issue further connection requests to the server until the maximum number of client-to-client connections it is able to process, has been reached.

WebSocket servers may not allow more than one stream head for the same client with the same Request-URI and Host to be on the collection of stream heads currently waiting to be connected. If a client issues another client-to-client connection request with the same Request-URI and Host, before the previous one has been successfully connected or has timed-out, the server may respond with a 403 Forbidden response.

Clients may have several client-to-client connection requests with different Request-URI/Host combinations in the waiting to be connected state. Clients may not attempt to request another client-to-client connection with the same Request-URI/Host combination, before the previous one was either successfully connected or has timed-out.

An "/hbbtv/orgid.appid scheme" for the Request-URI may be used as an escape into the special server client-to-client behavior in order to allow it to be implemented along with other, standard WebSocket server functionalities, and without interfering with the same. The choice of matching the Request-URI and Host header field allows for two approaches: if a specific device is targeted by the Host header, the client only wishes to talk to that specific other client. It may have learnt about its existence through other means (e.g. SSDP as part of UPnP). Secondly, if the Host header field targets the server, it will be the same for all clients targeting the same server. This will result in only the Request-URI being the discriminating factor for choosing suitable communication peers. Hence, targeting the server in the Host header field effectively provides a wildcard match with any other client using the same Request-URI and also targeting the server. As such, both dedicated and opportunistic connection establishment strategies are possible.

Since the HbbTV 2.0 WebSocket server does not perform any authentication, authorization, or other verification, no trust can be associated with client-to-client connections, or between clients and WebSocket servers. Clients that wish to exchange private, or otherwise sensitive information through a WebSocket server should therefore employ end-to-end encryption to ensure the privacy of the communication. Likewise, such clients should employ cryptographic methods to establish the identity and authenticity of any communication peers with which they wish to communicate through a WebSocket server. Since an HbbTV 2.0 WebSocket server will establish connections only to clients who have indicated the intent of being connected, it is very unlikely that a successful denial-of-service attack could be staged against another client through an HbbTV WebSocket server. The client under attack can simply stop asking the server to be connected to other clients.

Since it is defined that a server may reject simultaneous connection attempts to a not yet connected Request-URI/Host combination, a denial-of-service attack might be attempted against the server itself. This could be done by repeatedly sending the same connection request to provoke error responses, or by sending random connection requests in an attempt to exhaust the server's resources by creating many open stream heads. Both techniques are general strategies for attacking HTTP servers, and are not specific to WebSocket or HbbTV. It is hence expected that any WebSocket server implementation (be it of the HbbTV flavor or not) will have suitable mitigation mechanisms (e.g. by stopping sending responses or creating stream heads).

FIG. 59 is a diagram for description of connection between clients when an IP address is not present according to an embodiment of the present invention.

FIG. 59 illustrates a method of establishing a communication linkage between clients. The above-described inter-application communication method based on WebSocket may enable a WebSocket server to connect applications, URI paths (paths excluding a host name) of which are the same, to perform inter-application communication. Inter-client communication may divide an application driven in an electronic device (for example, a TV application) and an application driven in a companion device (for example, a CS application), thereby selectively performing inter-application communication.

As an example, in HbbTV, a Request-URI may be configured without including an IP address. A URI path may start with a reserved word ("hbbtv") indicating HbbTV after a root ("/"), and may include an organization or company ID (org-id) and an application ID (app-id) thereafter. The Web-Socket server (network processor) may connect applications, WebSocket API call URI paths of which are the same.

Syntax) GET "/hbbtv/"org-id"."app-id
Example) GET/hbbtv/org.mychannel.myapp

Meanwhile, respective clients requesting connection may use the same port or different ports. When the clients use the same port, the WebSocket server may recognize that a called application is an HbbTV application if IPs of applications calling a WebSocket API are the same, and may recognize that a called application is a companion device application if the IPs are different from each other. When the same port is used, the WebSocket server may simplify server implementation and test, and discovery is unnecessary.

Next, a description will be given of a case in which the clients use different ports. This case refers to a case in which an application driven by a TV and an application driven by a companion device use the same URI path and use different ports. As an embodiment, an HbbTV application driven by the TV may use port 8900, and an application driven by the companion device may use port 8901. When the WebSocket server knows ports used by a TV application and a companion application, it is possible to distinguish between communication between the TV application and the companion application and inter-companion application communication. When different ports are used, if several companion devices are connected to a TV using the same host request-header, clients may be easily connected by distinguishing the companion devices and the TV. Since the TV and the companion devices communicate with each other by being connected to the WebSocket server through different ports while host request-headers are the same, it is possible to distinguish between the companion device and the TV. Therefore, it is possible to take complementary measures in terms of security.

FIG. 60 is a diagram for description of standby connection for connection between applications according to an embodiment of the present invention.

FIG. 60 illustrates an electronic device 100a and a companion device 200a. A TV application of the electronic device 100a may transmit a connection request to a WebSocket server. The TV application is included in the electronic device, and thus the WebSocket server may recognize the TV application as a local application. In addition, a companion application is present outside the electronic device, and thus the WebSocket server may recognize the companion application as a remote application. As an embodiment, an application may use methods below when requesting connection.

TABLE 27

| | String getApp2AppLocalBaseURL( ) |
|---|---|
| Description | Returns the base URL of the application to application communication service local end-point. |
| Arguments | No arguments |

TABLE 28

| | String getApp2AppRemoteBaseURL( ) |
|---|---|
| Description | Returns the base URL of the application to application communication service remote end-point. |
| Arguments | No arguments |

As an embodiment, a network processor may execute W3C WebSocket API, and may support a minimum of 200 simultaneous WebSocket connections.

The network processor may provide two service end points executed by a server side of a WebSocket protocol specification. A local end point is used for connection to the network processor by an HbbTV application. A remote end point may be connected to a home network by an application of another device, and is used to include a remote companion application or an HbbTV application driven by another HbbTV device. The HbbTV application may be connected to a local service end point of a network processor in which the application operates or a remote service end point of another hybrid terminal in the same home network. It is preferable that the network processor not be connected to a local service end point of another device in the home network. For example, this can be achieved by placing a local service end point of a local loopback interface of the network processor. When another service end point executes the service side of the WebSocket protocol specification, and the HbbTV application or the companion application uses the service end point, the hybrid terminal should not place the service end point on the same host and port combination as another service end point.

A basic URL for a service end point between applications may be a WebSocket URL. The WebSocket URL may define a host, a port, security, and a resource name of a service end point. A client needs to be connected to a host and a port specified by the WebSocket URL of the service end point. A resource name used in an initial protocol request by the client conforms to ABNF grammar.

resource-name=base-url-resource-name app-endpoint

Base-url-resource-name is a resource name derived from a WebSocket URL of a service end point. App-endpoint is an application specification and may be used for a client connection matching process corresponding to the client. A message of the corresponding client may be delivered through a WebSocket protocol. App-endpoint may be selected by an application developer to avoid collision. Therefore, app-endpoint may start with an ID formatted in reverse DNS notation uniquely related to the HbbTV application, the companion application, or a developer thereof. The hybrid terminal may support app-endpoint including a certain character permitted in a resource name by a minimum length of 1000 characters and the WebSocket protocol specification.

A service end point may support a minimum of ten simultaneous TCP socket connections from a client. When the client attempts to open connection between a server and a TCP socket, the server may reject a request if the server cannot manage simultaneous connection. Otherwise, the server may approve TCP socket connection, and start WebSocket protocol handshake. When the server receives a request handshake from the client, the server may not immediately respond with a handshake response. Instead, the server may wait until connection is paired or connection of the client is canceled. In this state, standby connection may be configured as connection. When the server attempts to execute time-out, the server may respond with a 504 gateway time-out response.

The server may ignore a certain origin header of a request handshake transmitted by the client. The client may not use a Sec-WebSocket-protocol header when requesting connection between clients. The server may ignore the Sec-WebSocket-protocol header in a request for connection between clients. The server may not approve a request from the client for protocol extension using the Sec-WebSocket-protocol header. When the client uses a Sec-WebSocket extension header, the server may not establish a connection using a scheme defined in the WebSocket protocol specification.

As illustrated in FIG. 60, an HbbTV application operating as a client may attempt connection with a local service end point which has app-endpoint of "org.mychannel.myapp" and base-url-resource-name of/hbbtv/. Connection with the companion device may be maintained in a standby state since the companion application has not been linked to communication between applications using the same app-endpoint.

FIG. 61 is a diagram for description of a new connection request for connection with a second client according to an embodiment of the present invention.

Referring to FIG. 61, an HbbTV application (client) is connected to a companion application (client) of a companion device 200a. In addition, the HbbTV application may generate another stream head for another client.

A server cannot permit one or more simultaneous standby connections from the same original IP address having the same app-endpoint. When successfully connected or when a client of an IP address prior to termination issues another connection request using the same app-endpoint, the server may respond with a 403 Forbidden response.

A client may desire establishment of connection between multiple simultaneous clients through the same service end points using different resource-name combinations. The client cannot attempt to request another connection from an existing service end point before standby to connect the service end point is successful or time-out or connection is canceled. This operation of the client may be defined by a WebSocket protocol specification.

According to FIG. 8, when a client desires to communicate with one or more clients, the client may wait until existing standby connection is paired. In this instance, an additional connection request may be issued to the server until a maximum number of processable inter-client connections is reached. In other words, the HbbTV application may generate a new standby connection request to permit establishment of inter-application communication.

Meanwhile, the client may include an IP address in a URI path.

FIG. 62 is a diagram for description of setting of a first client when an IP address is included according to an embodiment of the present invention.

As an embodiment, the above-described URI path starts with a reserved word ("hbbtb") indicating HbbTV after a root ("/"), and may include an organization/company ID (org-id) and an application ID (app-id) thereafter. An application desiring to perform inter-application communication may add an IP address of a driven device to a URI path to designate a target application. A WebSocket server may connect applications, WebSocket API call URI paths of which are the same, according to IP to be used for communication.

Syntax) GET "/hbbtv/" target IP "I" org-id "." app-id
Example) GET /hbbtv/1.1.1.1/org.mychannel.myapp As an embodiment, a TV application A may be driven in IP 1.1.1.1, a companion application B may be driven in IP 1.1.1.2 (a first user terminal), and a companion application C may be driven in IP 1.1.1.3 (a second user terminal). In this instance, the TV application A may attempt to communicate with the companion application C. The TV application A may include IP (1.1.1.3) in which the companion application C is driven in a URI path which is included in a WebSocket request. In addition, the companion application C may include IP (1.1.1.1) of the TV application A in a URI path which is included in a WebSocket request.

According to FIG. 62, a URI path may correspond to hbbtv/192.0.2.7/org.mychannel.myapp HTTP/1/1. Here, 192.0.2.7 may correspond to an IP address of a target application. 192.0.2.110 may correspond to an IP address thereof. In addition, org.mychannel.myapp may correspond to an application ID.

FIG. 63 is a diagram for description of setting of a first client and a second client when IP addresses are included according to an embodiment of the present invention.

A WebSocket server may receive the URI request described with reference to FIG. 62 from each of the clients. Referring to FIG. 63, the first client has an IP address of 192.0.2.110, and the second client has an IP address of 192.0.2.7. When the first client requests connection from the second client, a start point (From Host) is 192.0.2.110, and a destination (To Host) is 192.0.2.7. In addition, an application ID may be org.mychannel.myapp. When the second client requests connection from the first client, a start point (From Host) is 192.0.2.7, and a destination (To Host) is 192.0.2.110. In addition, an application ID may be org.mychannel.myapp. That is, start points and destinations of the first client and the second client may be opposite to each other. However, application IDs may be the same. The WebSocket server may connect matching clients to each other.

In addition, a URI path including a host IP address may be used.

For example, the URI path may be used as below.
Syntax) GET "/"hbbtv"/" host_address"/"org-id "." app-id,
Example) GET /hbbtv/192.0.2.7/org.mychannel.myapp.

FIG. 64 is a diagram for description of an embodiment of connection to a plurality of second clients when IP addresses are included.

Referring to FIG. 64, an HbbTV has a certain IP address and includes an application ID of org.mychannel.myapp. A first companion application IP address is 192.0.2.7, and a second companion application IP address is 192.0.2.1. Application IDs of first and second companion applications correspond to org.mychannel.myapp. As described above with reference to FIG. 63, the WebSocket server may connect matching clients to each other. Therefore, the WebSocket server may connect matching clients to each other in response to requests from respective clients.

In this way, when an IP address is used in a URI path, both clients designate an object to be connected. Thus, security is improved, clients may be connected to each other, and all information may be matched without extra effort. Meanwhile, even when an IP address is used in a URI path, respective clients may use the same port or may use different ports.

FIG. 65 is a flowchart of a method of controlling an electronic device according to an embodiment of the present invention.

Referring to FIG. 65, in S1210, the electronic device is connected to a companion device. The electronic device may include a network processor and an application processor. In the electronic device, the application processor may request connection to a companion device from the network processor. Upon receiving a connection request from the companion device, the network processor may connect the application processor requesting connection to the companion device.

As described in the foregoing, the application processor may correspond to an application module or an application browser. Alternatively, the application processor may correspond to an HbbTV application. The network processor may be implemented as a network module. Alternatively, the network processor may correspond to a WebSocket server. When the network processor is implemented as the WebSocket server, each of the application processor and the companion device may be regarded as one client. Alternatively, each of a first client and a second client may be referred to as a peer.

The application processor may transmit information about an electronic device operating in the network processor or host request header information indicating companion device information to the network processor. In addition, in response to a connection request from the application processor, the network processor may generate a stream head of the application processor and include the stream head in a stream head group. Upon receiving a connection request from the companion device, the network processor may generate a stream head of the companion device and connect the generated stream head to a stream head of an application processor matched from a stream head group. In this instance, the network processor may remove the stream head of the matched application processor or the stream head of the companion device from the stream head group. Meanwhile, the application processor may transmit an IP address of a companion device to be connected, and respective applications may use the same port.

In S1220, the electronic device may exchange data with the companion device. Through this process, the electronic device may be connected to the companion device to perform communication.

The electronic device and the control method according to the specification are not restricted to configurations and methods of the above-described embodiments, and all or some of the respective embodiments may be selectively combined and variously changed.

FIG. 66 is a diagram illustrating configurations of a main physical device and a companion physical device according to an embodiment of the present invention.

The embodiment of the present invention may provide a service guide in a terrestrial broadcast or mobile broadcast environment. In addition, the embodiment of the present invention may provide a service guide for a service available in a next-generation hybrid broadcast environment based on a linkage between a terrestrial broadcast network and an IP network.

The embodiment of the present invention may inform a user of various services providable in the next-generation hybrid broadcast environment and content and/or component elements included in the services. In this way, the user may conveniently check, select, and enjoy the services.

The embodiment of the present invention may structuralize one service and various content and/or component elements included in the service and form a reference configuration between the service and the content and/or component elements. In this way, a broadcast receiver may easily configure and provide the service and enable the user to easily understand the service.

The embodiment of the present invention may extend the reference configuration in which one service and various content and/or component elements included in the service are linked to each other, thereby allowing the broadcast receiver and the user to save resources and/or time consumed to search for the content and/or component elements included in the service.

This figure illustrates an overall configuration of the main physical device and the companion physical device according to the present embodiment.

The main physical device L25010 according to the present embodiment is a device for an interactive service, and may generally correspond to a device controlled by the companion physical device L25020. The main physical device may be referred to as a main device, a main receiving device, a main receiver, a main display, a main screen, etc.

The main physical device L25010 according to the present embodiment may include a broadcast interface L25030, a network interface L25040, a memory unit L25050, a control unit L25060, a display unit L25070, a multimedia module L25080, a storage L25090, a power supply L25100 and/or a user input interface L25110.

The broadcast interface L25030 may correspond to a physical device that enables a message and/or data such as an AV stream, a service guide, a notification, etc. to be transmitted between a broadcaster and a device. The broadcast interface may receive a broadcast signal, signaling information, data, etc. from the broadcaster.

The network interface L25040 may correspond to a physical device that enables a message, a advertisement and/or data such as a command, a request, an action, a response, etc. to be transmitted between devices (for example, the main physical device and the companion physical device). The network interface may receive a broadcast service, broadcast content, signaling information, an application, data, etc. from an Internet service provider.

The memory unit L25050 may correspond to a selective device implemented in various types of devices, and may correspond to a volatile physical device capable of temporarily storing various types of data.

The control unit L25060 is a device that controls overall operation of a source device and/or a sink device, and may correspond to software or hardware. Here, the source device may correspond to a device that transmits a message and/or data, and the sink device may correspond to a device that receives the message and/or data. Therefore, the main physical device and the companion physical device according to the present embodiment may correspond to the source device or the sink device.

The display unit L25070 may display data received through the network interface or data stored in the storage on a screen. In this instance, the display unit may operate under control of the control unit.

The multimedia module L25080 may reproduce various types of multimedia. The multimedia module may be included in the control unit or may be separated from the control unit.

The storage L25090 may correspond to a volatile physical device capable of storing various types of data. For example, an SD card may correspond to the storage.

The power supply L25100 may correspond to a device that receives external power and/or internal power to supply power necessary for operations of other components under control of the control unit.

The user input interface L25110 may correspond to a device capable of receiving an input such as a command from the user.

The companion physical device L25020 according to the present embodiment is a device for an interactive service, and may correspond to a device that controls the main device. In general, the companion physical device may directly receive an input from the user. The companion physical device may be referred to as a companion device, a second device, an additional device, an auxiliary device, a companion receiving device, a companion receiver, a companion display, a second screen, etc.

The companion physical device L25020 according to the present embodiment may include a network interface, a memory unit, a control unit, a display unit, a multimedia module, a storage, a power supply and/or a user input interface.

Among components included in the companion physical device according to the present embodiment, a component having the same name as that of a component included in the main device may perform the same function as that of the component included in the main device.

FIG. 67 is a diagram illustrating a protocol stack for supporting a hybrid broadcast service according to an embodiment of the present invention.

A physical layer may receive a terrestrial broadcast signal and convent this signal into an appropriate form.

IP encapsulation may acquire an IP datagram using information which is acquired from the physical layer. In addition, the IP encapsulation may convert the acquired IP datagram into a certain frame (for example, an RS frame, a GSE, etc.).

MPEG-2 TS Encapsulation may acquire an MPEG-2 TS using the information which is acquired from the physical layer. In addition, the MPEG-2 TS Encapsulation may convert the acquired MPEG-2 TS into a certain frame (for example, an RS frame, a GSE, etc.).

A fast information channel (FIC) may deliver information for accessing a service and/or content (for example, information about mapping between a service ID and a frame, etc.).

Signaling may include signaling information for supporting effective acquisition of a service and/or content. The signaling information may be expressed in binary and/or XML format, and may be transmitted through a terrestrial broadcast network and/or a broadband network.

Real-time broadcast audio/video (A/V) content and data may be expressed in ISO Base Media File Format (ISOB-MFF), etc. and may be transmitted through the terrestrial broadcast network and/or the broadband network in real time. NRT content may be transmitted based on IP/UDP/FLUTE. In addition, the real-time broadcast A/V content, data, and/or signaling information may be transmitted in real time through the IP network using DASH, etc. In this instance, the real-time broadcast A/V content, data, and/or signaling information may be transmitted in response to a request or may be transmitted by real-time streaming.

The present embodiment may provide a viewer with various enhanced services such as an interactive service, a second screen service, etc. by combining data delivered through the above-described protocol stack.

FIG. 68 is a diagram illustrating an action mechanism of a UPnP scheme according to an embodiment of the present invention.

First, a description will be given of inter-device communication in the present invention.

Inter-device communication may refer to exchange of a message/command/call/action/request/response between devices.

Various protocols such as Internet Control Message Protocol (ICMP), Internet Group Management Protocol (IGMP), etc. may be applied in addition to IP in order to stably deliver a message to a desired target device. In this instance, the present invention is not restricted to a certain protocol.

Various protocols such as Hypertext Transfer Protocol (HTTP), Real-time Transport Protocol (RTP), Extensible Messaging and Presence Protocol (XMPP), File Transfer Protocol (FTP), etc. may be applied in order to contain various types of information in a message used for inter-device communication. In this instance, the present invention is not restricted to a certain protocol.

When a message used for inter-device communication is delivered, various components such as a message header/message body, etc. defined by each protocol may be used. That is, data may be stored in each message component and delivered, and the present invention is not restricted to a certain message component. In addition, the data delivered by the message may be delivered in various types (string, integer, floating point, Boolean, character, array, list, etc.) defined by each protocol. A markup scheme such as Extensible Markup Language (XML), Hypertext Markup Language (HTML), Extensible Hypertext Markup Language (XHTML), JavaScript Object Notation (JSON), etc., text, an image format, etc. may be applied in order to structurally express/deliver/store data of complex content. In this instance, the present invention is not restricted to a certain scheme.

In addition, a message used for inter-device communication may be compressed and delivered, and the present invention is not restricted to application of a compression technology of a certain scheme.

A description will be given of the UPnP scheme in the above description of inter-device communication in the present invention. The UPnP scheme may correspond to a case in which protocols of IP-TCP/UDP-HTTP are combined in the above description of inter-device communication.

The action mechanism of the UPnP scheme according to the present embodiment may refer to a communication mechanism between a UPnP control point t87010 and a UPnP device t87020. Here, the UPnP control point t87010 may correspond to an HTTP client, and the UPnP device t87020 may correspond to an HTTP server. The UPnP control point t87010 may deliver a type of message referred to as an action to the UPnP device t87020 such that the UPnP device t87020 may perform a certain operation.

Here, the UPnP control point t87010 may be paired with the UPnP device t87020. Pairing may be performed through a process of delivering discovery and description between respective devices. The UPnP control point t87010 may acquire a control URL through a pairing process.

The UPnP control point t87010 may express each action in XML, format. The UPnP control point t87010 may deliver the action to an acquired control URL using a POST method t87030 defined in HTTP. Each action may correspond to data actually to be delivered as a type of message, and may be delivered in XML format in an HTTP POST message body. Here, each action may include a name, an argument, and related data. The HTTP POST message body may deliver the name and/or the argument of each action.

In this instance, each action may be delivered to the same control URL. The UPnP device t87020 may parse the delivered action using an XML parser. The UPnP device t87020 may perform a corresponding operation according to the parsed action.

In a UPnP protocol, each action may be defined by a name and used. In addition, the action name is delivered in the HTTP POST message body. Thus, even when only one URL is present for a target device, and only one HTTP POST method is used, infinite types of actions may be exchanged.

FIG. 69 is a diagram illustrating a REST mechanism according to an embodiment of the present invention.

A description will be given of a REST scheme in the above description of inter-device communication in the present invention.

The illustrated REST mechanism according to the present invention may refer to a communication mechanism between a REST client t88010 and a REST server t88020. Here, the REST client t88010 may correspond to an HTTP client, and the REST server t88020 may correspond to an HTTP server. Similarly to the above description, the REST client t88010 delivers a type of message referred to as an action to the REST server t88020 such that the REST server t88020 may perform a certain operation.

In the present embodiment, the REST client t88010 may deliver each action to the REST server t88020 through a URI. An action name may be unnecessary in each action. Each action may only include arguments and data.

Here, several methods such as GET, HEAD, PUT, DELETE, TRACE, OPTIONS, CONNECT, PATCH, etc. may be used in addition to POST among HTTP methods. In addition, a plurality of URIs accessing a target device which performs communication may be defined. Due to these characteristics, an action may be delivered without defining an action name. A plurality of URI values necessary for this REST scheme may be acquired in a process of delivering discovery or description.

Data or arguments that need to be delivered may be delivered by being appended to a URI, or may be delivered by being included in an HTTP body in various forms (XML, JSON, HTML, TEXT, IMAGE, etc.).

The REST server t88020 may perform a certain operation according to the delivered action.

The above-described inter-device communication is merely an example, and all contents proposed in the present invention are not restricted to the UPnP scheme, etc.

FIG. 70 is a diagram illustrating a service that enables a broadcast receiver and companion devices to exchange an electronic service guide (ESG).

The ESG is a type of a channel or information which can be delivered through service guide delivery descriptors, etc. in a certain session, and may provide a service guide for an application of broadcasting, a radio, or other media. The ESG may provide information related to a schedule or a program of a service in a form of a menu, etc. to the user. The ESG may be provided through a broadcast channel or an Internet channel (broadband).

The user may perform, through the ESG, operations such as service provision scheduling, discovery of an entry point of a currently available service, service filtering according to preference, etc. A content provider may express, through the ESG, information about a service and/or content in an available state, information related to purchase/subscription, service access information, etc. The ESG may be referred to as a service guide or an electronic program guide (EPG).

In a conventional scheme, when the user executes a service guide such as an ESG while viewing a broadcast program in the broadcast receiver, the ESG covers the viewed broadcast, causing inconvenience.

The present invention proposes a scheme of accessing ESG information without hindering the user from viewing the broadcast program by executing the service guide such as the ESG, etc. in a companion device. In this case, the user may access the ESG without experiencing inconvenience when viewing the broadcast program. In addition, privacy of the user may be protected if the user uses a personal companion device to explore the ESG. Further, convenience may be enhanced by exploring the ESG through a UI of the companion device instead of a UI of the inconvenient broadcast receiver.

The present invention may solve the above-mentioned problem by defining a protocol for delivering ESG information from the broadcast receiver to the companion device in the next-generation hybrid broadcast environment based on the linkage between the terrestrial broadcast network and the IP network. In addition, the present invention proposes a protocol allowing a service of the broadcast receiver to be changed through channel information delivery in the companion device when the user selects a new service through the ESG provided in the companion device.

Embodiments of the present invention are described based on UPnP for convenience of description. However, a protocol for communication between the broadcast receiver and the companion device is not restricted thereto. In addition, the embodiments of the present invention are described using an XML-based ESG as an example for convenience of description. However, a format of the ESG is not restricted thereto.

An example of the illustrated service for exchanging the ESG may be referred to as an ESG service.

The ESG service may be a service for exchanging the ESG between the broadcast receiver and the companion device. According to a given embodiment, a service type of the ESG service may be defined as atsc3.0ESG-1, and a service ID of the ESG service may be defined as urn:atsc.org:serviceId:atsc3.0ESG.

Compatibility between respective devices may be needed for the ESG service. According to a given embodiment, a UPnP device type may be defined. The broadcast receiver has a device type of urn:atsc.org:device:atsc3.0rcvr, and may operate as a UPnP-controlled device. The companion device may operate as a UPnP control point.

A state variable, an action, etc. for the ESG service will be described below.

FIG. 71 is a diagram illustrating an ESGData state variable according to an embodiment of the present invention.

A state variable referred to as ESGData may be defined for the above-described ESG service. The ESGData state variable may be a state variable indicating the ESG. An ESGData state variable may store ESG data of the ESG received through the broadcast/IP network. The illustrated ESGData is created in XML format.

The ESGData state variable may store ESG data that expresses the ESG, that is, elements, attributes, and sub-elements in the ESG.

A service element t54010 in the ESGData state variable may be an element having information related to a service which is indicated by the ESG in content included in the ESG. Examples of lower information of this element may include Service@id that indicates a service ID, Service version that indicates a version of the service, Service.Name that indicates a service name, Service.Description corresponding to description of the service, and/or Service.ServiceType that indicates a service type. Here, A.B may refer to a B element corresponding to a lower element of an A element, and A@a may refer to @a corresponding to a lower attribute of the A element.

Here, Service.ServiceType corresponding to a lower element of the service, that is, a ServiceType element may indicate a service type which is indicated by the service. According to a given embodiment, 0 may be unspecified, 1 may refer to Basic TV, 2 may refer to Basic Radio, . . . , 14 may refer to a linear service, 15 may refer to an application-based service, and 16 may refer to a companion screen service. A value indicated by this element may vary according to embodiment.

A schedule element t54020 in the ESGData state variable may be an element having schedule information of a service/program indicated by the ESG in content included in the ESG. Examples of lower information of this element may include information such as Schedule@id that indicates a schedule ID, Schedule@version that indicates a schedule version, etc. In addition, examples of lower information of this element may include information such as Schedule.ServiceReference that indicates a service related to a schedule, Schedule.InteractivityDataReference that indicates interactivity data related to the schedule, Scheudule.ContentReference that indicates content related to the schedule, etc.

A content element t54030 in the ESGData state variable may be an element having content information indicated by the ESG in content included in the ESG. Examples of lower information of this element may include information such as Content@id that indicates a content ID, Content version that indicates a content version, Content.Name that indicates a content name, Content.Description corresponding to description of the content, Content. StartTime that indicates a reproduction start time of the content, Content.EndTime that indicates a reproduction end time of the content, etc. In addition, ComponentReference corresponding to a lower element of the content element may include information that references a component of the content related to the content. In this way, a related component may be verified, and information related to the component in the ESG may be referred to.

A component element t54040 in the ESGData state variable may be an element having component information of content indicated by the ESG in content included in the ESG. Examples of lower information of this element may include information such as Component@id that indicates a component ID, Component@version that indicates a component version, etc. In addition, examples of lower information of this element may include information such as Language that indicates a language of a component, Length that indicates a length of the component, ParentalRating that indicates rating of the component, ComponentType that indicates a type of the component, ComponentRole that indicates a role of the component, a TargetDevice element that indicates a device targeted by the component, etc. In addition, information such as PresentableVideoComponent, PresentableAudioComponent, PresentableCCComponent, PresentableAppComponent, etc. may be included in this element depending on whether the component corresponds to a reproducible video, audio, closed captioning, or application.

According to a given embodiment, the ESGData state variable may be delivered to the companion device using an event scheme or an action scheme.

The above-described elements, attributes, etc. are merely examples of ESGData, and elements/attributes, etc. in ESGData may be added, changed, or deleted according to configuration, format, etc. of the ESG.

FIG. 72 is a diagram illustrating an ESGData state variable according to another embodiment of the present invention.

The illustrated ESGData state variable is similar to the above-described ESGData state variable. However, the illustrated ESGData state variable is different from the above-described ESGData state variable in that a component element is included as a lower element of a content element.

A plurality of components is combined to configure one piece of content, and thus the component element may be included as a lower element of the content element. In addition, capability of a device in which each component is supported may be defined as a lower element DeviceCapability and included as a lower element of the component element.

FIG. 73 is a diagram illustrating a process of delivering an ESGData state variable to a companion device using the event scheme according to an embodiment of the present invention.

First, an illustrated CD may refer to a companion device, and an illustrated primary device (PD) may refer to a receiver or a broadcast receiver. The present embodiment presumes that the two devices are paired. In addition, it is presumed that the companion device subscribes to the above-described ESG service. In this initial state t56010, the ESGData state variable may have no value.

In t56020, a service/content provider may transit an ESG through a broadcast network or a broadband channel. The ESG may be received through a receiving unit or a network interface of the receiver. Here, the receiving unit may correspond to the above-described broadcast interface or tuner.

In t56030, the receiver may signal the received ESG. In t56040, ESG data may be stored in the ESGData state variable.

In t56050, ESGData may be delivered to the companion device through eventing. The companion device receiving the ESGData state variable may parse the ESGData state variable in t56060, and then the ESG may be exposed to the companion device through a UI according to a parsed value in t56070. In this instance, to show the ESG to the user, the UI may be expressed at a negative level of the companion device or may be expressed in an application of the companion device.

A scheme in which the ESG is expressed in the companion device may include various embodiments. According to a given embodiment, the companion device may directly expose the ESG to the user in any form in response to the received ESG. According to another embodiment, in response to the received ESG, the companion device may transmit a notification message to the user, and may expose the ESG in response to execution by the user. According to another embodiment, in response to the received ESG, the companion device may keep ESG information in the background, and expose the ESG to the user when the user directly executes an application in which the ESG can be viewed at a desired time.

FIG. 74 is a diagram illustrating a LastChangedESGData state variable according to an embodiment of the present invention.

A state variable referred to as LastChangedESGData may be defined for the above-described ESG service. As described in the foregoing, if the whole ESG is delivered to the companion device, all ESG data may be delivered even when only a part of the ESG data is changed. Thus, it may be inefficient. In this regard, the LastChangedESGData state variable that stores only the changed ESG data may be defined. The LastChangedESGData state variable may store only added/changed/deleted ESG data in a newly received ESG when compared to the previous ESG.

In t57010, the LastChangedESGData state variable may include an addition element. This element may store added ESG data in the newly received ESG when compared to the previous ESG data. The newly added ESG data, that is, elements/attributes may be stored as a sub-element of this element. For example, when ESG data related to a new service having a new service ID is added to the newly received ESG, elements/attributes related to the new service may be included in a lower tree of the addition element. In the illustrated embodiment, a service having an ID of "atsc.org/esg/service/3" is newly added. Thus, it can be understood that a service element of the service is included in the addition element. In addition, a service having a name of ABC is newly added with an ID of "atsc.org/esg/service/4". Thus, it can be understood that a service element of the service is included in the addition element. In addition, information such as Service, Content, Schedule, etc. may be included in this element.

In t57020, the LastChangedESGData state variable may include a modification element. This element may store changed ESG data in the newly received ESG when compared to the previous ESG data. The changed ESG data, that is, elements/attributes may be stored as a sub-element of this element. For example, when lower information of a schedule having an ID of "atsc.org/esg/schedule/3" is changed, a schedule element of the schedule may be stored in the modification element. In addition, information such as Service, Content, Schedule, etc. may be included in this element.

In t57030, the LastChangedESGData state variable may include a deletion element. This element may store deleted ESG data in the newly received ESG when compared to the previous ESG data. The deleted ESG data, that is, elements/attributes may be stored as a sub-element of this element. For example, when content elements having IDs of "atsc.org/esg/content/1" and "atsc.org/esg/content/2" are deleted from the newly received ESG, the content elements of the corresponding content may be stored in the deletion element. In addition, information such as Service, Content, Schedule, etc. may be included in this element.

According to a given embodiment, the LastChangedESGData state variable may be delivered to the companion device using the event scheme or the action scheme. If the LastChangedESGData state variable is delivered using the event scheme, this state variable may be delivered to the companion device when a value of the state variable is changed. If the LastChangedESGData state variable is delivered using the action scheme, the LastChangedESGData state variable may be configured for changes of latest ESG data at a point in time when a request for a value of this state variable is received and may be delivered to the companion device.

The companion device may update only changed ESG data when compared to a previously stored ESG with reference to the received LastChangedESGData state variable. In this way, efficient delivery may be performed when compared to a case in which the whole ESG is delivered.

The above-described elements, attributes, etc. are merely examples of LastChangedESGData, and elements/attributes, etc. in LastChangedESGData may be further added, changed, or deleted according to configuration, format, etc. of the ESG.

FIG. 75 is a diagram illustrating a process in which ESG data is delivered to a companion device according to a GetESGData action according to an embodiment of the present invention.

As described in the foregoing, the ESGData state variable may be delivered to the companion device using the event scheme. However, when eventing to the companion device is performed each time the ESG is changed on a receiver side, a network may be overloaded or a companion device side may be burdened. Therefore, a GetESGData( ) action may be defined such that the ESG data can be delivered only when the companion device wants.

The GetESGData( ) action may be an action for delivering the ESGData state variable to the companion device in the action scheme. In other words, when the companion device requests that a receiver transmit the ESG data through this action, the receiver may deliver the ESGData state variable to the companion device. An input argument of this action may not be present, and an output argument of this action may be the ESGData state variable.

The GetESGData( ) action may be performed when the user desires to view an ESG in the companion device and executes an ESG application, etc. In this case, the ESG data is received as a result of the action, and the received ESG data may be exposed through the ESG application. In addition, according to a given embodiment, the GetESGData( ) action may be performed using a periodic polling scheme to store the ESG data in the companion device, and then the stored ESG data may be exposed to the user in response to execution of the ESG application.

The GetESGData( ) action may be simultaneously supported even when the ESGData state variable supports the event scheme. However, in this case, when ESG data is received using the event scheme each time the ESG data is changed, and ESG data is received again through the action, there may be an overlap between the ESG data. Therefore, when the action and the event scheme are simultaneously supported, it is possible to employ a policy in which ESG data is received using the event scheme only when subscribing to an initial ESG service, and then ESG data is received using the GetESGData( ) action periodically or when the ESG application is executed.

First, in the present embodiment, it is presumed that the two devices are previously paired. In addition, it is presumed that the companion device subscribes to the above-described ESG service.

In t58010, the receiver may have ESG data. The ESG data may be stored in the ESGData state variable. In t58020, the user may take a particular action of executing the ESG application, etc. The particular action may be a certain action using the ESG data.

In t58030, the companion device may request the ESGData state variable from the receiver by performing the GetESGData( ) action. In t58040, the receiver may output the ESGData state variable, which is an output variable of the GetESGData( ) action, to the companion device simultaneously with sending a callback of 200 OK in response to the request.

In t58050, the companion device may parse the received ESG data, and perform an exposure operation through the ESG application using the ESG data. When the ESG data is exposed, the companion device may immediately expose the ESG data as in the above-described embodiments, or may store the ESG data before exposing the ESG data.

The illustrated embodiment is an embodiment in which the GetESGData( ) action is performed when the user performs a particular action. However, according to a given embodiment, as described above, the GetESGData( ) action may be periodically performed (irrespective of a particular action), and then the received and stored ESG data may be exposed through the action when the user executes the ESG application, etc. at a certain point in time.

FIG. 76 is a diagram illustrating a process of delivering ESG data to a companion device according to GetServiceIds and GetESGbyServiceIds actions according to an embodiment of the present invention.

Only ESG data related to a certain service may be delivered to the companion device in order to minimize a network burden between a broadcast receiver and the companion device and/or a burden to process whole ESG data in the companion device. To this end, a ServiceIdsList state variable and an A_ARG_TYPE_ESGData_by_ServiceIds state variable may be defined.

The ServiceIdsList state variable may be a state variable for delivering IDs of services described by an ESG to the companion device. In other words, this state variable may include service ID information in ESG data which is parsed and stored in the receiver. This state variable may have a type of a list of strings or a list of URIs. Here, a type of a URI may be ignored. According to a given embodiment, this state variable may be expressed in CSV form. For example, this state variable may be expressed in atsc.org/esg/service/1, atsc.org/esg/service/2, etc.

The A_ARG_TYPE_ESGData_by_ServiceIds state variable may be a state variable for storing partial ESG data of the ESG. This state variable may be defined to deliver only the partial ESG data to the companion device. This state variable may have a fragment type of Markup Language of a certain form for expressing an ESGData state variable. For example, when the ESGData state variable is an XML document, this state variable may have an XML fragment type.

The service IDs of the ESG included in the receiver may be first delivered to the companion device using the above-described state variables, and only necessary ESG data requested in response to the delivery may be delivered to the companion device. To this end, a GetServiceIds action and a GetESGbyServiceIds action may be defined.

The GetServiceIds action may be an action for enabling the companion device to receive service IDs from the receiver. The receiver may deliver the service IDs in a list form in information related to a service which is described by an ESG included in the receiver. An input variable of this action may not be present, and an output variable of this action may be the ServiceIdsList state variable.

The GetServiceIds action may be performed when the user desires to view an ESG in the companion device and executes an ESG application, etc. In this case, the ESG data is received as a result of the action, and the received ESG data may be exposed through the ESG application. In addition, according to a given embodiment, the GetServiceIds action may be performed using a periodic polling scheme to store the ESG data in the companion device, and then the stored ESG data may be exposed to the user in response to execution of the ESG application.

The GetESGbyServiceIds action may be defined to enable the companion device to receive only ESG data corresponding to a certain service from the receiver. The companion device may sort a service ID of a desired service by utilizing the list of the service IDs received by the GetServiceIds action. Thereafter, this action may be performed using the list of the service IDs as an input variable in order to receive the ESG data of the desired service. As a result, the companion device may receive the ESG data related to the desired service. An input variable of this action may be the ServiceIdsList state variable, and an output variable of this action may be the A_ARG_TYPE_ESGData_by_ServiceIds state variable.

The GetESGbyServiceIds action may be performed when the user desires to view an ESG in the companion device and executes an ESG application, etc. In this case, the ESG data is received as a result of the action, and the received ESG data may be exposed through the ESG application. In addition, according to a given embodiment, the GetServiceIds action may be performed using a periodic polling scheme to store the ESG data in the companion device, and then the stored ESG data may be exposed to the user in response to execution of the ESG application.

According to a given embodiment, when an input variable is set to "*" in the GetESGbyServiceIds action, all ESG data may be set to be requested irrespective of a service ID. In addition, according to a given embodiment, when an input variable is set to "empty" in the GetESGbyServiceIds action, ESG data for a currently viewed service may be set to be requested.

First, in the present embodiment, it is presumed that the two devices are previously paired. In addition, it is presumed that the companion device subscribes to the above-described ESG service.

In t59010, the receiver may have ESG data. The ESG data may be stored in the ESGData state variable. In t59080, the ESG data stored in the ESGData state variable may be ESG data related to two services identified by "atsc.org/esg/service/1" and "atsc.org/esg/service/2". In t59020, the user may take a certain action of executing the ESG application, etc. The certain action may be a certain action using the ESG data.

In t59030, the companion device may request a list of service IDs through the GetServiceIds action. In t59040, the receiver may output ServiceIdsList together with 200 OK to the companion device. In the present embodiment, a value of ServiceIdsList may be equal to (atsc.org/esg/service/1, atsc.org/esg/service/2).

In t59050, when a certain service desired by the user or the companion device is a service identified by "atsc.org/esg/service/1", the GetESGbyServiceIds may be performed using "atsc.org/esg/service/1" as an input variable. In t59060, the receiver may output A_ART_TYPE_ESGData_by_ServiceIds together with 200 OK to the companion device. In the present embodiment, a value of A_ART_TYPE_ESGData_by_ServiceIds may be ESG data related to a service which is identified by "atsc.org/esg/service/1" in t59090. As illustrated in the figure, not only a service element having atsc.org/esg/service/1 as a service ID value, but also a schedule element having atsc.org/esg/service/1 as a reference value and a content element may be included in output variables. Here, the schedule element and the content element may be schedule and content information related to a service identified by atsc.org/esg/service/1.

In t59070, the companion device may parse the received ESG data, and perform an exposure operation through the ESG application using the ESG data. When the ESG data is exposed, the companion device may immediately expose the ESG data as in the above-described embodiments, or may store the ESG data before exposing the ESG data.

The illustrated embodiment corresponds to a case in which the user performs a particular action. However, as described above, an action may be first performed (irrespective of the particular action), and then the previously received and stored ESG data may be exposed through the action when the user executes the ESG application, etc. at a certain point in time.

FIG. 77 is a diagram illustrating a process of delivering ESG data to a companion device according to a GetCurrentServiceId action according to an embodiment of the present invention.

ESG data of a service currently viewed by a receiver may need to be delivered to the companion device. To this end, a service ID of the currently viewed service may be delivered to the companion device. To this end, a CurrentServiceId state variable and the GetCurrentServiceId action may be defined.

The CurrentServiceId state variable may store a service ID of a service currently viewed in the receiver in ESG data of the receiver. This state variable may correspond to a string or particular URI type.

The GetCurrentServiceId action may be action for enabling the companion device to receive the service ID of the service currently viewed in the receiver. An input variable of this action may not be present, and an output variable of this action may be the CurrentServiceId state variable.

The GetCurrentServiceId action may be performed when the user desires to view an ESG in the companion device and executes an ESG application, etc. In this case, the ESG data is received as a result of the action, and the received ESG data may be exposed through the ESG application. In addition, according to a given embodiment, the GetCurrentServiceId action may be performed using a periodic polling scheme to store the ESG data in the companion device, and then the stored ESG data may be exposed to the user in response to execution of the ESG application.

First, in the present embodiment, it is presumed that the two devices are previously paired. In addition, it is presumed that the companion device subscribes to the above-described ESG service.

In t60010, the receiver may have ESG data. The ESG data may be stored in the ESGData state variable. In t60090, the ESG data stored in the ESGData state variable may be ESG data related to two services identified by "atsc.org/esg/service/1" and "atsc.org/esg/service/2". The receiver may update the CurrentServiceId state variable with the service ID of the currently viewed service by periodically signaling a currently viewed broadcast. In t60030, the user may take a certain action of executing the ESG application, etc. The certain action may be a certain action using the ESG data.

In t60040, the companion device may request a list of service IDs through the GetCurrentServiceId action. In t60050, the receiver may output the CurrentServiceId state variable together with 200 OK to the companion device. In the present embodiment, a value of the CurrentServiceId state variable may be equal to "atsc.org/esg/service/1".

In t60060, the companion device may request ESG data related to the currently viewed service by performing a GetESGbyServiceIds action. In the present embodiment, an input variable of the GetESGbyServiceIds action may be atsc.org/esg/service/1. In t60070, the receiver may output the A_ART_TYPE_ESGData_by_ServiceIds state variable together with 200 OK to the companion device. In the present embodiment, a value of A_ART_TYPE_ESGData_by_ServiceIds may be ESG data related to a service which is identified by "atsc.org/esg/service/1" in t60100. As illustrated in the figure, not only a service element having atsc.org/esg/service/1 as a service ID value, but also a schedule element having atsc.org/esg/service/1 as a reference value and a content element may be included in output variables. Here, the schedule element and the content element may be schedule and content information related to a service identified by atsc.org/esg/service/1.

In t60080, the companion device may parse the received ESG data, and perform an exposure operation through the ESG application using the ESG data. When the ESG data is exposed, the companion device may immediately expose the ESG data as in the above-described embodiments, or may store the ESG data before exposing the ESG data.

The illustrated embodiment corresponds to a case in which the user performs a particular action. However, as described above, an action may be first performed (irrespective of the particular action), and then the previously received and stored ESG data may be exposed through the action when the user executes the ESG application, etc. at a certain point in time.

FIG. 78 is a diagram illustrating a process in which ESG data is delivered to a companion device according to a SearchESG action according to an embodiment of the present invention.

In a case in which the companion device requests that a receiver deliver the ESG data, the companion device may request that the receiver deliver the ESG data only when a certain field of the ESG data has a particular value (target value). To this end, an A_ART_TYPE_SearchField state variable, an A_ART_TYPE_TargetValue state variable, and a SearchESG action may be defined.

The A_ART_TYPE_SearchField state variable may indicate a particular field to be designated by the companion device. In other words, this state variable may be a list of names of elements/attributes of an ESGData state variable. For example, values such as Service@id, Service.Genre, etc. may be stored in this state variable. This state variable may have a list type of strings. This state variable may be referred to as SearchField.

The A_ART_TYPE_TargetValue state variable may store a certain value of the certain field designated by the companion device, that is, a target value. This target value may be used when the indicated certain field has the target value. The ESG data of the receiver may be retrieved using this target value. This state variable may have a list type of strings. This state variable may be referred to as TargetValue.

The SearchESG action may be an action for enabling the companion device to explore and request ESG data in the receiver. A certain field (SearchField) and/or a target value (TargetValue) may be defined as an input variable of this action. The receiver may explore ESG data based on whether the certain field has the target value. When the receiver explores ESG data that satisfies all conditions, the receiver may output all related ESG data to the companion device. When no data is matched, nothing will be output. According to a given embodiment, ESG information may be delivered only when a part of the ESG data is matched.

An A_ART_TYPE_ESGData state variable may be defined as the output value. This state variable may be a state variable that stores partial ESG data of an ESG similarly to the above-described A_ART_TYPE_ESGData_by_ServiceIds state variable. The A_ART_TYPE_ESGData state variable may be referred to as SearchedESGData.

The SearchESG action may be performed when the user desires to view an ESG in the companion device and executes an ESG application, etc. In this case, the ESG data is received as a result of the action, and the received ESG data may be exposed through the ESG application. In addition, according to a given embodiment, the SearchESG action may be performed using a periodic polling scheme to store the ESG data in the companion device, and then the stored ESG data may be exposed to the user in response to execution of the ESG application.

First, in the present embodiment, it is presumed that the two devices are previously paired. In addition, it is presumed that the companion device subscribes to the above-described ESG service.

In t61010, the receiver may have ESG data. The ESG data may be stored in the ESGData state variable. In t61050, the ESG data stored in the ESGData state variable may be ESG data related to a service which is identified by "atsc.org/esg/service/1" and has a Service.Genre value of Drama and a service which is identified by "atsc.org/esg/service/2" and has a Service.Genre value of Sports.

In t61020, the companion device may request ESG data using the SearchESG action. Here, an input variable of the action may be equal to ("Service@id, Service.Genre", "atsc.org/esg/service/1, Drama") so as to explore ESG data in which a service ID is atsc.org/esg/service/1, and a value of a sub-element genre of the service element is Drama.

In t61030, the receiver may explore ESG data matching the corresponding condition, and output the ESG data together with 200 OK to the companion device. In the present embodiment, ESG data related to a service which is identified by "atsc.org/esg/service/1" matching the corresponding condition may be output.

In t61040, the companion device may parse the received ESG data, and perform an exposure operation through the ESG application using the ESG data. When the ESG data is exposed, the companion device may immediately expose the ESG data as in the above-described embodiments, or may store the ESG data before exposing the ESG data.

FIG. 79 is a diagram illustrating an authentication process for delivering ESG data according to a DoAuthenticationForESG action according to an embodiment of the present invention.

When ESG data is exchanged between a receiver and a companion device, an unintended application, for example, an application for hacking may request ESG data. To prevent this case, an authentication procedure for security may be needed. To this end, a CompanionDeviceId state variable, a CompanionDeviceAppId state variable, a CompanionDeviceAppVersion state variable, a PrimaryDeviceId state variable, and a DoAuthenticationForESG action may be defined.

The CompanionDeviceId state variable may be a state variable for storing ID information of the companion device. A unique value for distinguishing the companion device may be stored in this state variable. A MAC address, etc. may be used as a device ID, and this MAC address may be encrypted for security (e.g. hashed MAC address). This state variable may correspond to a string or particular URI type.

The CompanionDeviceAppId state variable may be a state variable for storing ID information of an application that can be executed to use an ESG in the companion device. Here, the application may correspond to a concept including a native application or a browser-based application of the companion device. This variable may correspond to a string or particular URI type.

The CompanionDeviceAppVersion state variable may be a state variable for storing version information of an application that can be executed to use an ESG in the companion device. The receiver may determine whether to provide ESG information using this version information. This state variable may correspond to a hexBinary or integer type.

The PrimaryDeviceId state variable may correspond to a state variable for storing device ID information of the receiver, that is, a primary device. The companion device may distinguish the receiver using this state variable. The companion device may use this state variable to determine whether information is received from an unintended receiver or determine a particular receiver requesting the ESG when a plurality of receivers is found in a home network. This variable may correspond to a string or particular URI type.

The DoAuthenticationForESG action may be an action for performing the authentication procedure for security before the companion device requests ESG data from the receiver. Whether the ESG data can be exchanged may be determined through this authentication procedure. An ID of the companion device, an application ID of the companion device, and/or application version information of the companion device may be input as input variables and sent to the receiver. This information may be referred to as authentication information. Upon receiving the authentication information, the receiver may determine a companion device requesting the ESG data, and determine whether an application for the ESG requests the ESG data. When the ESG data is requested from an application of a normal companion device, the receiver may output a device ID of the receiver to the companion device. The companion device may verify whether a receiver is an object from which the companion device intends to request an ESG with reference to a received ID of the receiver. After this authentication procedure ends, actual ESG data may be received using a mechanism such as an action/eventing, etc. proposed in the present invention. An input variable of this action may correspond to CompanionDeviceId, CompanionDeviceAppId, and CompanionDeviceAppVersion state variables, and an output variable of this action may correspond to a PrimaryDeviceId state variable.

The DoAuthenticationForESG action may be performed when the user desires to view an ESG in the companion device and executes an ESG application, etc. In addition, according to a given embodiment, the DoAuthenticationForESG action may be performed in a periodic polling scheme to perform the authentication procedure.

First, in the present embodiment, it is presumed that the two devices are previously paired. In addition, it is presumed that the companion device subscribes to the above-described ESG service.

In t62010, the receiver may have ESG data. The ESG data may be stored in the ESGData state variable. In t62020, the user may take a particular action of executing the ESG application, etc. The particular action may be a certain action using the ESG data.

In t62030, the companion device may perform the DoAuthenticationForESG action. In this way, the authentication information may be delivered to the receiver. In t62040, the receiver may determine whether the companion device is authenticated using the received authentication information. When the companion device is authenticated, the receiver may output a device ID of the receiver together with 200 OK to the companion device in t62050. In t62060, the companion device may whether the receiver is a receiver from which the companion device can request the ESG data using the received ID of the receiver.

Thereafter, in t62070 and t62080, the ESG data may be requested and received according to embodiments of the present invention. The companion device may parse the received ESG data, and perform an exposure operation through the ESG application using the ESG data in t62070. When the ESG data is exposed, the companion device may immediately expose the ESG data as in the above-described embodiments, or may store the ESG data before exposing the ESG data.

The illustrated embodiment corresponds to a case in which the user performs a particular action. However, as described above, an action may be first performed (irrespective of the particular action). Thereafter, when the user executes the ESG application, etc. at a certain point in time, the authentication procedure previously ends, and thus operations for delivering the ESG data may be immediately performed.

FIG. 80 is a diagram illustrating a process of delivering ESG data to a companion device simultaneously with device authentication according to GetServiceIds and GetESGbyServiceIds actions according to another embodiment of the present invention.

As described in the foregoing, a separate action may be defined for authentication. The present embodiment may allow an original object of existing actions to be achieved simultaneously with authentication by extending the existing actions without defining the separate action. Here, the actions to be extended may be all actions introduced in the present invention. In the actions to be extended, in addition to the previously defined input/output variables, CompanionDeviceId, CompanionDeviceAppId, CompanionDeviceAppVersion state variables may be added as input variables, and a PrimaryDeviceId state variable may be added as an output variable.

The present embodiment extends the GetServiceIds action and the GetESGbyServiceIds action. The present invention is not limited to extension of the actions.

The GetServiceIds action may be extended to have the CompanionDeviceId, CompanionDeviceAppId, CompanionDeviceAppVersion state variables as the input variables and have the PrimaryDeviceId state variable as the output variable in addition to the existing ServiceIdsList state variable. A receiver may receive authentication information according to this action, and deliver IDs of services together with a device ID of the receiver to the companion device when the receiver determines that the IDs can be delivered. The companion device may determine whether the received service IDs can be used with reference to the received device ID of the receiver.

The GetESGbyServiceIds action may be extended to have the CompanionDeviceAppId and CompanionDeviceAppVersion state variables in addition to the existing ServiceIdsList state variable as input variables and have the PrimaryDeviceId state variable in addition to the existing A_ART_TYPE_ESGData_by_ServiceIds state variable as output variables. The receiver may receive authentication information and service IDs according to this action, and deliver ESG data of a related service together with a device ID of the receiver to the companion device when the receiver determines that the ESG data and the device ID can be delivered. The companion device may determine whether the received ESG data can be used with reference to the received device ID of the receiver.

The extended actions may be performed when the user desires to view an ESG in the companion device and executes an ESG application, etc. In this case, the ESG data is received as a result of the action, and the received ESG data may be exposed through the ESG application. In addition, according to a given embodiment, the extended actions may be performed using a periodic polling scheme to store the ESG data in the companion device, and then the stored ESG data may be exposed to the user in response to execution of the ESG application.

First, in the present embodiment, it is presumed that the two devices are previously paired. In addition, it is presumed that the companion device subscribes to the above-described ESG service.

In t63010, the receiver may have the ESG data. The ESG data may be stored in the ESGData state variable. In t63100, the ESG data stored in the ESGData state variable may be ESG data related to two services identified by "atsc.org/esg/service/1" and "atsc.org/esg/service/2". In t63020, the user may take a particular action of executing the ESG application, etc. The particular action may be a certain action using the ESG data.

In t63030, the companion device may request a list of service IDs through the GetServiceIds action. In this instance, the authentication information may be delivered to the receiver. In t63040, the receiver may determine whether the companion device is authenticated using the authentication information. When the companion device is authenticated, the receiver may output ServiceIdsList together with 200 OK to the companion device in t63050. In the present embodiment, a value of ServiceIdsList may be equal to (atsc.org/esg/service/1, atsc.org/esg/service/2). In this instance, the device ID of the receiver may be delivered. In t63060, the companion device may whether the receiver is a receiver from which the companion device can request the ESG data using the received ID of the receiver.

In t63070, when a certain service desired by the user or the companion device is a service identified by "atsc.org/esg/service/1", the GetESGbyServiceIds may be performed using "atsc.org/esg/service/1" as an input variable. In this instance, the authentication information may be delivered to the receiver. According to a given embodiment, this authentication process may be regarded as an overlapping process and be omitted. When the authentication process is omitted, the existing general GetESGbyServiceIds action may be performed. When the companion device is authenticated, the receiver may output A_ART_TYPE_ESGData_by_ServiceIds together with 200 OK to the companion device in t63080. In the present embodiment, a value of A_ART_TYPE_ESGData_by_ServiceIds may be ESG data related to a service which is identified by "atsc.org/esg/service/1" in t63110. As illustrated in the figure, not only a service element having atsc.org/esg/service/1 as a service ID value, but also a schedule element having atsc.org/esg/service/1 as a reference value and a content element may be included in output variables. Here, the schedule element and the content element may be schedule and content information related to a service identified by atsc.org/esg/service/1.

In t63090, the companion device may parse the received ESG data, and perform an exposure operation through the ESG application using the ESG data. When the ESG data is exposed, the companion device may immediately expose the ESG data as in the above-described embodiments, or may store the ESG data before exposing the ESG data.

The illustrated embodiment corresponds to a case in which the user performs a particular action. However, as described above, an action may be first performed (irrespective of the particular action), and then the previously received and stored ESG data may be exposed through the action when the user executes the ESG application, etc. at a certain point in time.

FIG. 81 is a diagram illustrating a process of delivering ESG data to a companion device according to a GetService action according to an embodiment of the present invention.

In a service in the ESG data, a new service may be less frequently updated (added/deleted, etc.). Therefore, a continuous request for and/or delivery of ESG data related to a service may cause unnecessary network overload. To solve this problem, a NumOfServices state variable, an A_ARG_TYPE_ESGData_Service state variable, and a GetService action may be defined. In addition, another example of the above-described GetESGbyServiceIds action may be defined.

The NumOfServices state variable may be a state variable for storing the total number of services described by an ESG of a receiver. A value of this state variable may be referred to when a service list is configured. For example, a value of this state variable may be used to verify validation when the service list is configured. This state variable may have an integer type.

The A_ARG_TYPE_ESGData_Service state variable may be a state variable for storing only ESG data corresponding to a service element in the ESG of the receiver. This state variable may have a fragment type of Markup Language in a particular form for expressing an ESGData state variable. For example, when the ESGData state variable is an XML document, this state variable may have an XML fragment type.

The GetService action may be an action for allowing a companion device to receive ESG data related to the service in ESG information from the receiver. The companion device may receive ESG data related to a particular service (ESG data other than service elements) using the ESG data (service elements) received through this action. The companion device may compare the total number of services indicated by the NumOfServices state variable with the number of received service elements, and use a result of comparison when configuring a service list. In this process, the above-described authentication procedure may be used. That is, the GetService action may have an extended form including an additional input/output variable for authentication. According to a given embodiment, a GetService action excluding an additional variable for authentication may be used.

Examples of an input variable of this action may include the state variables corresponding to the authentication information described above. Examples of an output variable thereof may include a PrimaryDeviceId state variable, a NumOfServices state variable, and an A_ARG_TYPE_ESGData_Service state variable.

In addition, another example of the above-described GetESGbyServiceIds action may be defined. The GetESGbyServiceIds action according to the other example may be an action for allowing the companion device to receive other ESG data related to a particular service using service IDs of the particular service as an input. Here, the other ESG data may be ESG data excluding the corresponding service element, that is, ESG data corresponding to content and schedule elements related to the service. Similarly, this action may be defined in an extended form including the above-described additional variables for authentication.

The GetService and GetESGbyServiceIds actions may be performed when the user desires to view an ESG in the companion device and executes an ESG application, etc. In this case, the ESG data is received as a result of the action, and the received ESG data may be exposed through the ESG application. In addition, according to a given embodiment, the GetService and GetESGbyServiceIds actions may be performed using a periodic polling scheme to store the ESG data in the companion device, and then the stored ESG data may be exposed to the user in response to execution of the ESG application.

First, in the present embodiment, it is presumed that the two devices are previously paired. In addition, it is presumed that the companion device subscribes to the above-described ESG service.

In t64010, the receiver may have ESG data. In t64100, the ESG data may be stored in the ESGData state variable. In t59080, the ESG data stored in the ESGData state variable may be ESG data related to two services identified by "atsc.org/esg/service/1" and "atsc.org/esg/service/2". In t64020, the user may take a certain action of executing the ESG application, etc. The certain action may be a certain action using the ESG data.

In t64030, the companion device performs the GetService action to request ESG data related to a service. When the receiver determines that the companion device is an authenticated companion device and/or application in t64040, the receiver may output the A_ARG_TYPE_ESGData_Service state variable together with 200 OK to the companion device in t64050. Here, in t64110, the A_ARG_TYPE_ESGData_Service state variable may include only ESG data related to a service element in the ESG data of the receiver. In t64060, the companion device may determine whether the information is reliable by performing authentication using a received device ID of the receiver.

In t64070, the companion device may perform the GetESGbyServiceIds action to request remaining ESG data related to the particular service. In the present embodiment, a ServiceIdsList input variable value of the GetESGbyServiceIds action may be atsc.org/esg/service/1. When the receiver determines that the companion device is an authenticated companion device and/or application, the receiver may output an A_ARG_TYPE_ESGData_by_ServiceIds state variable together with 200 OK in t64080. In the present embodiment, the output A_ARG_TYPE_ESGData_by_ServiceIds state variable may be ESG data related to the service which is identified by atsc.org/esg/service/1 in t64120. As illustrated in the figure, a content element and a schedule element having atsc.org/esg/service/1 as a reference value may be included in output variables. The service element which is identified by atsc.org/esg/service/1 may not be included in the output variables.

In t64090, the companion device may parse the received ESG data, and perform an exposure operation through the ESG application using the ESG data. When the ESG data is exposed, the companion device may immediately expose the ESG data as in the above-described embodiments, or may store the ESG data before exposing the ESG data.

The illustrated embodiment corresponds to a case in which the user performs a particular action. However, as described above, an action may be first performed (irrespective of the particular action), and then the previously received and stored ESG data may be exposed through the action when the user executes the ESG application, etc. at a certain point in time.

FIG. 82 is a diagram illustrating a process of changing a service of a broadcast receiver by a companion device according to a SetChangeChannel action according to an embodiment of the present invention.

ESG information delivered to the companion device may be exposed to the user through a UI. A service appearing in an ESG may be recognized and selected by the user. In this instance, the receiver is a device that actually provides the service, and thus information for changing the service needs to be delivered to the receiver to change the service. To this end, an A_ARG_TYPE_SelectedServiceId state variable and a SetChangeChannel action may be defined.

The A_ARG_TYPE_SelectedServiceId state variable may be a state variable for storing a service ID of a service selected by the user through the ESG in the companion device. This state variable may correspond to a string or particular URI type.

The SetChangeChannel action may be action for enabling the companion device to change the service provided by the receiver. An input variable may be the A_ARG_TYPE_SelectedServiceId state variable. The user may view the ESG through the companion device and select a certain service. In this instance, an ID of the service may be stored as an input variable. When the action is performed, the receiver may change a channel to a service having the service ID according to a value of the input variable. There may be no output variable.

First, in the present embodiment, it is presumed that the two devices are previously paired. In addition, it is presumed that the companion device subscribes to the above-described ESG service.

In t65010, the receiver may have ESG data. The ESG data may be stored in the ESGData state variable. In t65030, the user may take a certain action of executing the ESG application, etc. The certain action may be a certain action using the ESG data.

In t65040, the companion device may request the ESG data through the above-described GetESGData action, and receive the ESG data. The illustrated embodiment corresponds to a case in which the user performs a particular action. However, as described above, an action may be first performed (irrespective of the particular action), and then the previously received and stored ESG data may be exposed through the action when the user executes the ESG application, etc. at a certain point in time.

In t65050, the companion device may parse the received ESG data, and perform an exposure operation through the ESG application using the ESG data. When the ESG data is exposed, the companion device may immediately expose the ESG data as in the above-described embodiments, or may store the ESG data before exposing the ESG data.

In t65060, the user may select a service through the UI of the companion device while viewing an ESG. For example, the user may have attempted a change to an NBCU channel. In t65070, the companion device may perform the SetChangeChannel. Through this action, a service ID corresponding to the NBCU channel may be delivered to the receiver.

In t65080, the receiver may change a channel to the service using the received service ID. In t65090, the service may be changed to NBCU and provided to the user.

FIG. 83 is a diagram illustrating a method of providing a broadcast service according to an embodiment of the present invention.

A method of providing a broadcast service by a broadcast receiver according to an embodiment of the present invention may include paring the broadcast receiver with a companion device and/or receiving an ESG.

In t66010, a network interface unit of the broadcast receiver may be paired with the companion device. Here, the network interface unit may correspond to the above-described network interface of the broadcast receiver. A technology such as UPnP, etc. may be used for pairing. However, a technology for pairing is not limited thereto.

A receiving unit of the broadcast receiver may receive the ESG or a particular service guide. Here, the receiving unit may correspond to the above-described broadcast interface or network interface of the broadcast receiver. The receiving unit may correspond to the broadcast interface when the ESG is received through a broadcast network, and the receiving unit may correspond to the network interface when the ESG is received through an IP network. In other words, according to a given embodiment, the network interface unit and the receiving unit may correspond to the same block/module.

In the present embodiment, the ESG may include ESG data related to at least one broadcast service. Here, the ESG data may refer to data included in the ESG or an element/attribute in the ESG. The broadcast service may correspond to the above-described service or channel.

In a method of providing the broadcast service according to another embodiment of the present invention, the ESG data may correspond to service type information, schedule information, related content information, or related component information of the above-described at least one broadcast service. The ESG data may correspond to a type attribute of the service element described above, the schedule element, the content element, or the component element. Here, a related content and a related component may refer to a content related to a service described by the ESG and a component related thereto.

A method of providing the broadcast service according to another embodiment of the present invention may further include delivering information about changes of the received ESG to the companion device. This operation may be performed by the above-described network interface unit. Here, the information about changes may include added, modified, or deleted ESG data of the received ESG when compared to the previously stored ESG data. Here, the information about changes may correspond to the above-described LastChangedESGData state variable. The added, modified, and deleted ESG data may correspond to the addition, modification, and deletion elements, respectively.

A method of providing the broadcast service according to another embodiment of the present invention may further include delivering an ID list of broadcast services included in the received ESG to the companion device, receiving a request for ESG data related to a particular broadcast service identified by at least one ID in the ID list from the companion device, and delivering the requested ESG data related to the particular broadcast service to the companion device. The service ID list may be delivered through the above-described GetServiceIds action. The ESG data may be requested and delivered using the ID through the above-described GetESGbyServiceIds action.

A method of providing the broadcast service according to another embodiment of the present invention may further include receiving a request for an ID of a currently viewed broadcast service to deliver the ID of the currently viewed broadcast service to the companion device, receiving a request for ESG data related to the currently viewed broadcast service, and delivering the requested ESG data related to the currently viewed broadcast service to the companion device. The ID of the currently viewed broadcast service may be delivered through the above-described GetCurrentServiceId action. The ESG data may be requested and delivered using the ID through the above-described GetESGbyServiceIds action.

A method of providing the broadcast service according to another embodiment of the present invention may further include receiving a search field that indicates a particular field of ESG data and a target value for the particular field from the companion device, sorting the ESG data in which the particular field indicated by the search field has the target value by a control unit, and delivering the sorted ESG data to the companion device. The search field and the target value for the particular field may correspond to the above-described A_ART_TYPE_SearchField state variable and A_ART_TYPE_TargetValue state variable, respectively. The ESG data may be sorted and delivered through the above-described SearchESG action. Here, the control unit may correspond to the above-described control unit of the main physical device of the broadcast servicer.

A method of providing the broadcast service according to another embodiment of the present invention may further include receiving authentication information of the companion device including device ID information of the companion device from the companion device, verifying whether the companion device is authenticated using the authentication information by an authentication module, and delivering device ID information of the broadcast receiver to the companion device when authentication of the companion device is confirmed. Here, the authentication information may correspond to the above-described CompanionDeviceId, CompanionDeviceAppId and/or CompanionDeviceAppVersion state variables. A device ID of the broadcast receiver may correspond to the above-described PrimaryDeviceId state variable. Operations of delivering the authentication information, verifying authentication, delivering the device ID, etc. may be performed through the above-described DoAuthenticationForESG action. Here, the authentication module may be a block/module positioned inside/outside the broadcast receiver to perform an operation related to authentication described above. According to a given embodiment, the authentication module may be merged with the above-described control unit or network interface.

A method of providing the broadcast service according to another embodiment of the present invention may further include delivering an ID list to the companion device, receiving a request for an ID list including authentication information of the companion device from the companion device, verifying whether the companion device is authenticated using the authentication information by an authentication module, and delivering the ID list and device ID information of the broadcast receiver to the companion device when authentication of the companion device is confirmed. This embodiment may correspond to a case in which the GetServiceIds action is extended such that authentication can be performed in the above-described embodiment of delivering the ESG through the service ID list.

A method of providing the broadcast service according to another embodiment of the present invention may further include receiving, from the companion device, a request for change of the currently viewed broadcast service based on the delivered ESG data, and changing the viewed broadcast service in the broadcast receiver by the control unit in response to the request for change of the broadcast service. The request for change may be received and the service may be changed based on the request through the above-described SetChangeChannel action.

The above-described method of providing the broadcast service may be described from the point of view of the companion device. The present invention includes a case in which the above-described embodiments are performed from the point of view of the companion device. For example, the companion device may receive information about changes of the ESG, request an ID list of services, and receive related ESG data using an ID of the ID list. In addition, the companion device may request an ID of a currently viewed service, and receive related ESG data using the ID. The companion device may deliver a search field that indicates a particular field and a particular value to the receiver to receive matching ESG data, and transmit authentication information to the receiver to perform authentication. In addition, the companion device may request a change of the currently viewed service. Communication with the receiver may be performed by the above-described network interface inside/outside the companion device. Overall operation such as an operation related to the search field, an operation related to the request for the change of the service, a processing operation related to the ESG data, etc. may be performed by the above-described control unit inside/outside the companion device. Further, the companion device may include an authentication module for performing an authentication-related operation.

The above-described respective steps may be omitted or replaced by other steps for performing the same or similar operations.

FIG. 84 is a diagram illustrating a broadcast receiver according to an embodiment of the present invention.

The broadcast receiver according to the present embodiment may include a network interface unit and/or a receiving unit. A broadcast receiver according to another embodiment of the present invention may further include a control unit and/or an authentication module. The respective blocks, modules, and units have been described above.

The broadcast receiver and the modules/blocks/units inside the broadcast receiver according to the present embodiment may perform the above-described embodiments of the method of providing the broadcast service by the broadcast receiver.

A companion device according to an embodiment of the present invention may include a network interface unit and/or a receiving unit. A companion device according to another embodiment of the present invention may further include a control unit and/or an authentication module. The respective blocks, modules, and units have been described above.

The companion device and the modules/blocks/units inside the companion device according to the present embodiment may perform the above-described embodiments of the method of providing the broadcast service by the companion device.

The above-described modules/blocks/units, etc. inside the broadcast receiver and the companion device may correspond to processors for executing continuous processes stored in a memory, and may correspond to hardware elements positioned inside/outside the device according to a given embodiment.

The above-described respective modules/blocks/units may be omitted or replaced by other modules/blocks/units for performing the same or similar operations.

FIG. 85 is a diagram illustrating a UPnP-based PD-CD architecture according to an embodiment of the present invention.

The main physical device may correspond to a TV receiver (a broadcast receiver, PD). The companion physical device may correspond to the aforementioned companion device (CD). These two devices are physical devices and may refer to PD and CD in a physical sense.

In this embodiment, the main physical device may include a main device. Herein, the main device may correspond to a controlled device defined in UPnP. For simplicity, the main device will be referred to as a controlled device in the following description.

In this embodiment, the companion physical device may include a main control point. Herein, the main control point may correspond to a control point defined in UPnP. The main control point may refer to a control point communicating with the main controlled device.

The controlled device may usually be positioned at the TV receiver in the UPnP architecture to perform various operations. If the TV receiver joins a whole network, the controlled device may multicast an Advertisement message or deliver description of a UPnP service provided from the PD to the control point. In addition, the controlled device may deliver the value of a state variable to the control point according to the Event scheme, or may deliver information to the control point when the control point requests a specific operation according to an Action scheme. PDs such as the TV receiver may be referred to as controlled devices.

The controlled device may provide an application management service and/or a connection establishment service, which may be one of UPnP services provided by the controlled device. The application management service may refer to services related to management of applications which are running on the controlled device and the control point. These services may include app-to-app communication and delivery of specific information to an application. In the illustrated embodiment, the PD apps (App#1 and App#2) and the CD apps (App#1 and App#3) may perform operations such as communication with each other through these services.

The connection establishment service may be a service related to establishment and management of connection between the controlled device and the control point. The discovery procedure between the controlled device and the control point may conform to the discovery procedure defined in UPnP.

Once the PD joins a home network, the PD may multicast a discovery message for advertising the PD. If the CD joins the network later, the CD may multicast, to any PDs, a search message (unicast message). A PD that receives this search message, can unicast to the CD a response message. These advertising messages and the search messages can be sent back and forth no matter which devices(PD, CD) join the home network first, and when the devices join it. Also these messages can be sent periodically.

Upon receiving the discovery message or the search message from the PD, the CD may send a HTTP get request message to request information about, for example, a UPnP service provided by the PD. The PD may deliver description information about the services to the CD in response to the HTTP get message. Then, the CD may subscribe to a service of the PD. The CD may obtain desired information using an Action, send information, or will receive information using the Event scheme.

According to an embodiment, the main device and the main control point may be referred to as a screen device and a screen control point, respectively.

FIG. 86 is a diagram illustrating a UPnP-based PD-CD architecture according to an embodiment of the present invention.

In this embodiment, the main physical device (PD) may include a main controlled device and/or a companion control point. In addition, the companion physical device (CD) may include a main control point and/or a companion controlled device.

In general, for the UPnP architecture, the operation or function of the controlled device is asymmetrical to that of the control point. That is, an operation which the controlled device is capable of performing may not be possible with the control point.

To address this issue, the companion physical device (CD) may have a companion controlled device, which is similar to the case of the physical device (PD) having a main controlled device. The main physical device may have a companion control point corresponding to the controlled device thereof, and the companion physical device may have a main control point corresponding to the controlled device thereof. The main controlled device may communicate with the main control point, and the companion controlled device may communicate with the companion control point.

The companion controlled device and the companion control point may also exchange a discovery message and perform an operation such as an event/action. Thereby, the CD may also actively perform communication. However, the companion controlled device and the companion control point may differ from the main controlled device/control point in terms of operation, function and authority. Details of the operation and the scope of authority may depend on the designer.

According to an embodiment, the companion controlled device and the companion control point may be respectively referred to as a screen (controlled) device and a screen control point.

FIG. 87 is a diagram illustrating a UPnP-based PD-CD architecture according to another embodiment of the present invention.

In this embodiment, the main physical device (PD) may include a main controlled device and/or a main control point. In addition, the companion physical device (CD) may include a main control point and/or a main controlled device.

As described above, the PD and the CD may perform asymmetric functions regarding operations thereof. To address this issue, the architecture may be configured such that the PD has a main control point in addition to the main controlled device, and the CD has a main controlled device in addition to the main control point. In this case, in contrast with the previous embodiment in which the companion controlled device/control point performs a function different from that of the main controlled device/control point, both the PD and the CD may have an equivalent main controlled device/control point. Thereby, the architecture may be configured such that the TV receiver and the companion physical device are given equal status in communicating with each other.

FIG. 88 illustrates interaction diagrams of a UPnP-based PD-CD architecture according to an embodiment of the present invention.

The illustrated diagrams show examples of the aforementioned UPnP-based PD-CD architecture. In the first example t408010, the aforementioned PD has a controlled device, and the CD has a control point. In the second example t408020, the PD has a main controlled device and a companion control point, and the CD has a main control point and a companion controlled device. In the third example t408030, the PD has a main controlled device and a main control point, and the CD has a main control point and a main controlled device.

In the first example t408010, the controlled device may deliver information such as state variables to the control point through UPnP eventing. At the same time, the control point may make a request to the controlled device for information or a specific operation through a UPnP action. This example may corresponds to the most basic architecture.

In the second example t408020, the main controlled device may communicate with the main control point, and the companion controlled device may communicate with the companion control point. The main controlled device may deliver information such as state variables to the main control point through UPnP eventing. At the same time, the main control point may make a request for information or a specific operation to the main controlled device through a UPnP action. In addition, the companion controlled device may deliver information such as state variables to the companion control point through UPnP eventing. At the same time, the companion control point may make a request for information or a specific operation to the companion controlled device through a UPnP action. As described above, the companion controlled device and the companion control point may differ from the main controlled device/control point in terms of operation, function and authority.

In the third example t408030, the main controlled devices of the PD and the CD may respectively communicate with the corresponding main control points. The main controlled device may deliver information such as state variables to the main control point through UPnP eventing. At the same time, the main control point may make a request for information or a specific operation to the main controlled device through a UPnP action. Thereby, app-to-app communication may be performed.

FIG. 89 is a diagram illustrating a WebSocket-based PD-CD architecture according to an embodiment of the present invention.

In the WebSocket-based architecture, communication may be performed between apps which are being executed in the PD and the CD. The WebSocket-based architecture, the PD may include a WebSocket server, and the CD may include respective apps. Herein, the CD apps may be referred to as WebSocket clients.

The WebSocket server in the PD may have endpoints for respective operation/functions provided by the PD. The endpoints may be connected to CD apps to deliver ESG, deliver a media timeline, and enable communication between the apps of the PD and the CD.

First, a discovery procedure may be performed between the apps which are being executed in the PD and the CD. The discovery procedure will be described later. In this procedure, information about the endpoints of the WebSocket server may be delivered to a CD app.

For each and point, a CD app and the WebSocket server of the PD may perform a handshake procedure. If the CD app requests initiation of the handshake, the WebSocket server may send a response to the request. Thereby, the WebSocket server and CD app may be connected through an endpoint.

In the WebSocket architecture, once the WebSocket server and the CD app are connected through an endpoint, information may be exchanged through the endpoint. Messages may be relayed between the apps of the PD and the CD without restriction in a 2-way manner.

Thereafter, when disconnection is needed, the CD app may request disconnection of the endpoint (Disconnect Request). The WebSocket server may respond to the request (Disconnect Response), and connection to the endpoint may be terminated. Termination of the connection may be performed by the PD, or may be automatically performed in various situations.

The aforementioned procedure may be a procedure of interaction with the WebSocket endpoint. When a plurality of endpoints is present, the aforementioned procedure may be independently performed for each of the endpoints to activate necessary endpoints. This procedure may be performed simultaneously or sequentially for the endpoints.

In this embodiment, the WebSocket server may have an endpoint for each provided function. That is, one endpoint may be provided for one function.

The endpoints may include a Service/Content Identification Endpoint, an ESG Information Endpoint, a Service/Show/Segment Data Endpoint, a Media Timeline Endpoint, a Media Playback State Endpoint, an EAS Endpoint and/or an ApptoApp Endpoint.

The Service/Content Identification Endpoint may be an endpoint functioning to deliver information for identifying a service/content which is currently being reproduced or is to be reproduced in the PD. The CD app may receive the information through this endpoint.

The ESG Information Endpoint may be an endpoint used for the CD to receive the ESG. The CD app may receive information through this endpoint. The Service/Show/Segment Data Endpoint may be an endpoint for receiving various kinds of delivered data for services.

The Media Timeline Endpoint may be an endpoint for delivering a current time and media information about a service/content which is currently being reproduced. The aforementioned service type information may be delivered through this endpoint. The Media Playback State Endpoint may be an endpoint for delivering reproduction-related information about a service/content which is currently being reproduced. The reproduction-related information may indicate whether the service/content is being reproduced at a normal speed, fast-forwarded at a speed three times higher than the normal speed, or rewound. The aforementioned playback state information may be delivered to the CD app through this endpoint.

The EAS Endpoint may be an endpoint for delivering EAS information to the CD. If the TV receiver receives the EAS information, the receiver may relay this information to the CD to more efficiently announce a dangerous situation. The ApptoApp Endpoint may be an endpoint for authentication between apps which are being executed in the PD and the CD. Using this endpoint, a PD app and a CD app may exchange information by exchanging messages in a 2-way manner.

Since each function is provided with an endpoint, the CD app may access each endpoint and perform a connection procedure to obtain desired information or communicate with a PD app through the endpoint.

Hereinafter, the aforementioned architecture will be referred to as a WebSocket-based architecture example #1 for simplicity. This example may be combined with various examples of other WebSocket-based architectures, the UPnP-based architecture and the HTTP-based architecture.

FIG. 90 is a diagram illustrating a WebSocket-based PD-CD architecture according to an embodiment of the present invention.

In the illustrated embodiment, an endpoint may not be provided for each function in contrast with the previous embodiment. In this embodiment, the WebSocket server of the PD may provide one endpoint, and this endpoint may perform all of the aforementioned functions. This endpoint may be referred to as a companion endpoint. Other details of configuration of the WebSocket architecture may be the same as those in the previous embodiment.

This endpoint may perform all the functions illustrated as being performed by multiple endpoints in the previous embodiment. That is, this endpoint may perform all the functions of the endpoints including the aforementioned Service/Content Identification Endpoint, ESG Information Endpoint, and Service/Show/Segment Data Endpoint. Accordingly, the CD app may be allowed to receive the ESG or media Timeline information or perform all operations including communication with a PD app only if the app is connected to this endpoint. In this case, however, the function for which a message exchanged between this CD app and the WebSocket server is intended needs to be identified, and accordingly the message may include more detailed information or be further extended.

Since this companion endpoint performs all the functions, the functions may be performed upon establishment of connection to this endpoint. The procedure of connection to this endpoint may be the same as the procedure of connection to a normal endpoint as described above. In this case, since one endpoint is provided, connection to the endpoint cannot be partially terminated even if access to any one of the functions is unnecessary. In addition, if any one of the functions is necessary, connection to this companion endpoint may need to be established.

Hereinafter, the aforementioned architecture will be referred to as WebSocket-based architecture example #2 for simplicity of description. This example may be combined with various examples of other WebSocket-based architectures, the UPnP-based architecture and the HTTP-based architecture.

FIG. 91 is a diagram illustrating a WebSocket-based PD-CD architecture according to an embodiment of the present invention.

In the illustrated embodiment, n endpoints are provided, and may perform m functions in total. Herein, n may be less than or equal to m, and both n and m may be integers. That is, in this case, a plurality (n) of endpoints each of which may perform one or more functions may be provided.

In this embodiment, an endpoint performing the functions of service/content identification and ESG delivery may be provided as a companion endpoint, and an endpoint performing the App to App function may be provided as a separate "ApptoApp endpoint".

The architecture of this embodiment may be a combination of WebSocket-based architectures #1 and #2. Various architectures may be configured according to the values of n and m. The number of provided endpoints may vary and each endpoint may provide a different number of functions.

The procedure of connection to and disconnection from the aforementioned endpoints may need to be performed for each of the endpoints. That is, when n endpoints are provided, this procedure may need to be performed n times.

Hereinafter, this architecture will be referred to as WebSocket-based architecture example #3 for simplicity of description. This example may be combined with various examples of other WebSocket-based architectures, the UPnP-based architecture and the HTTP-based architecture.

FIG. 92 is a diagram illustrating app-to-app communication in a WebSocket-based PD-CD architecture according to an embodiment of the present invention.

App-to-app communication may be performed between an app which is being executed in the PD and an app which is being executed in the CD. In the WebSocket-based architecture, the apps may communicate with each other via the WebSocket server. In this case, the aforementioned ApptoApp Endpoint may be used. Alternatively, according to an embodiment, a companion endpoint for performing app-to-app communication and other functions in parallel may be used.

The CD app may be connected to the App-to-App communication endpoint of the WebSocket server through the aforementioned procedure. Apps which are being executed in the PD correspond to WebSocket clients and may be connected to the App-to-App communication endpoint of the WebSocket server. When the WebSocket server receives matching connection requests from both sides, the WebSocket server may connect the CD and the PD such that the CD and the PD can exchange a message.

Once the apps of the CD and the PD are connected to each other, they may exchange a message via the WebSocket server. This message may be delivered in a 2-way manner. The WebSocket server may relay the message from one side to an app on the other side.

FIG. 93 is a diagram illustrating an HTTP-based PD-CD architecture according to an embodiment of the present invention.

In the HTTP-based architecture, communication may be performed between apps which are being executed in the PD and the CD. In the HTTP-based architecture, the PD may include an HTTP server, and the CD may include apps. Herein, the apps in the CD may be referred to as HTTP clients.

The HTTP server in the PD may perform various operations/functions. To access the functions of the server, service URLs for corresponding services may be needed. A CD app may receive desired information by sending a request to a corresponding service URL.

First, a discovery procedure may be performed between the apps which are being executed in the PD and the CD. In this procedure, information about URLs of the HTTP server may be delivered to the CD app. The HTTP clients of the CD may receive information needed to access a corresponding URL using the received URL information.

In this embodiment, the HTTP server may have different URLs for respective functions. That is, each function may be provided with one URL.

The services provided through these service URLs may be similar to the functions provided by the aforementioned WebSocket server. For example, if a CD app accesses a service/content identification service URL, the CD app may receive information for identifying a service/content which is currently being reproduced or is to be reproduced in the PD. That is, the CD app may send a request for service/content identification information to the service/content identification service URL, and the HTTP server of the PD may relay the requested information to the CD app. An ESG information service, a media timeline service and the like identical to the functions provided by the aforementioned ESG Information Endpoint, Media Timeline Endpoint and the like may be defined. The CD app may receive desired information by sending a request to respective service URLs.

Since service URLs are provided for respective services, the CD app may recognize respective URL information and may obtain desired information or communicate with a PD app only when the CD app accesses a corresponding URL.

Hereinafter, the aforementioned architecture will be referred to as HTTP-based architecture example #1 for simplicity of description. This example may be combined with various examples of other HTTP-based architectures, the UPnP-based architecture and the WebSocket-based architecture.

FIG. 94 is a diagram illustrating an HTTP-based PD-CD architecture according to another embodiment of present invention.

In the illustrated embodiment, each service may not be provided with a service URL in contrast with the previous embodiment. In this embodiment, the HTTP server of the PD may provide one service URL, and the provided service URL may perform all of the aforementioned functions. The service URL may be referred to as a companion service URL. Other details of configuration of the HTTP architecture may be the same as those of the previous embodiment.

This service URL may perform all the functions illustrated as being performed by multiple service URLs in the previous embodiment. That is, the service URL may perform all the functions performed by the aforementioned service URLs including the service-backspace/content identification service URL, the ESG information service URL and the service/show/segment data service URL. Accordingly, the CD app may receive the ESG or media time information simply by sending a request to the service URL.

In this case, when the request is sent to the HTTP server, the request message may be extended in such a manner that a new variable is added to the query term. This is because it is necessary to identify information for which the request is sent to the companion service URL. The HTTP server may analyze the request and deliver desired information to the CD app.

Hereinafter, the aforementioned architecture will be referred to as HTTP-based architecture example #2 for simplicity of description. This example may be combined with various examples of other HTTP-based architectures, the UPnP-based architecture and the WebSocket-based architecture.

FIG. 95 is a diagram illustrating a WebSocket & HTTP-based PD-CD architecture according to an embodiment of the present invention.

The UPnP-based architecture, the WebSocket-based architecture and the HTTP-based architecture described above may be combined with each other. For example, the PD may have an HTTP server and a WebSocket server together. According to an embodiment, while the PD has the HTTP server and the WebSocket server, the PD may also perform the function of a controlled device on the UPnP architecture.

In addition, the combined UPnP architecture may be one of the first, second and third examples of the aforementioned UPnP architecture. The combined WebSocket architecture may be one of WebSocket-based architectures #1, #2 and #3, and the HTTP architecture may be one of HTTP-based architectures #1 and #2.

In this embodiment, the PD may have an HTTP server and a WebSocket server together, HTTP-based architecture #2 may be used as the HTTP architecture, and WebSocket-based architecture #3 may be used as the WebSocket architecture. That is, in the HTTP server, one service URL address may perform a plurality of functions. The WebSocket server may provide n endpoints, and the n endpoints may perform a plurality of functions. Specifically, in this embodiment, two endpoints may be provided: one of the endpoints may serve as an endpoint for app-to-app communication, and the other endpoint may serve as an endpoint performing all the other functions.

While only the aforementioned embodiments are provided in this specification, all the combinations thereof are also within the scope of the present invention. Various architectures may be designed according to these combinations, and may be selected and used by the designer.

In the architecture of this embodiment, the respective functions may be distributed to the HTTP server and the WebSocket server. That is, the HTTP server may be used to perform specific functions, and thus a single service URL of the HTTP may be used to receive a request for implementation of these functions. In addition, the WebSocket server may provide endpoints for performing the other functions.

Distribution of the functions may be performed according to characteristics of the functions. HTTP may be used for asynchronous communication, while WebSocket may be used for synchronous communication.

According to an embodiment, the functions of ESG information delivery and service/show/segment delivery may be performed by HTTP. That is, by sending a request to a service URL of the HTTP server, information such as the ESG or service data may be acquired.

In addition, the functions of service/content identification, media playback state and app-to-app communication may be performed by the WebSocket. The WebSocket server may provide a companion endpoint capable of performing the functions of service/content identification and media playback state and an ApptoApp endpoint capable of performing the function of app-to-app communication.

According to an embodiment, the media timeline function may be performed by HTTP and/or WebSocket. The function may be provided by one of HTTP and WebSocket or both. The function of EAS information delivery may be performed through the WebSocket or by a multicast sender in the PD. When the multicast sender is used, the multicast sender in the PD may multicast the EAS information to the devices in the multicast group.

FIG. 96 is a diagram illustrating formats of messages used for discovery of a Primary Device (PD).

The PD may have an ST (Search Target) value to identify a technical standard to which the PD conforms. For example, the PD may use a value of urn:atsc:device:atsc-companion:3 or urn:atsc:service:atsccompanion:3 as the device type or service type thereof. These values may be used through ST matching in the discovery procedure.

The PD may advertise itself to CDs on behalf of the discovery procedure. Alternatively, the CD may discover the PD through the search operation.

When the PD advertises itself to the CDs, the PD may multicast a discovery message. The discovery message may be transmitted using a NOTIFY method. The discovery message for advertising the PD may be configured as in the illustrated example t413020.

If the CD discovers a PD through the search operation, the CD or an app which is being executed in the CD may multicast a discovery message. The discovery message may be transmitted using an M-SEARCH method. The discovery message for the search operation of the CD may be configured as in the illustrated example t413020.

Using the aforementioned ST value, a CD app may discover PDs conforming to a specific technical standard. A PD may receive a search message described above. If the ST value of the PD matches the ST value in the message, the PD may send a response to the CD app that has sent the search message (200 OK). This response message may be configured as in the illustrated example t413030.

The illustrated message formats are simply an embodiment of the present invention, and variables contained in the message may have different values according to embodiments.

The illustrated discovery procedure is applicable not only to the WebSocket architecture but also to the HTTP architecture.

FIG. 97 is a diagram illustrating the discovery procedure of a WebSocket endpoint or an HTTP service URL using a Device Description Document (DDD).

As described above, the PD may multicast a discovery message for advertising itself or transmit a response message for the received M-SEARCH message to the CD. The CD app may obtain a URL from the LOCATION header of the multicast discovery message or a response message for the M-SEARCH message. This URL is capable of acquiring a Device Description Document (DDD). A CD app may acquire the DDD using the URL, thereby obtaining device description information and the like.

As described above, the PD may multicast a discovery message for advertising itself using the NOTIFY method. In this operation, URL information for acquiring the DDD may be delivered to an app which is being executed in the CD. Alternatively, if the CD app multicasts a discovery message for the search operation using the M-SEARCH method, the PD may send a response message to the CD in response. In this operation, the URL information for acquiring the DDD may be delivered to the CD app (t417010).

Thereafter, the CD app may send a request for the DDD to the acquired URL using HTTP GET. The PD may deliver the DDD to the CD app through an HTTP response message (t417020). The DDD may be included in the body of this response message.

The addresses of WebSocket endpoints may be provided to the CD app through the DDD. According to an embodiment, the addresses of service URLs of the HTTP architecture may be provided to the CD app through the DDD. When an architecture in the form of a combination of two or more protocols is used, the addresses of WebSocket endpoints and/or the addresses of service URLs of HTTP may be provided to the CD app through the DDD.

FIG. 98 illustrates a DDD request message and a DDD format in the discovery procedure of a WebSocket endpoint or an HTTP service URL using the DDD according to an embodiment of the present invention.

As described above, a CD app may request a DDD using HTTP GET. In this case, the GET message may be configured as in the illustrated example t418010. The DDD request message using GET may be transmitted to the URL of the DDD acquired from the PD. In addition, host information of the IP address/port of the description may be used. In addition, a language preferred by a control point may be used.

As described above, a resource message for the DDD request message may be returned. The DDD may be included in the body of the response message. The typical format of the DDD may be configured as in the illustrated example t418020.

The DDD may include specification version information, base URL information, device-related information and the like. The specification version information (specVersion) may represent the version of the corresponding DDD specification in the form of a major/minor version. The base URL information may include base URL information which is usable for all related URLs delivered by the DDD.

The device-related information may include time information about the device described by the DDD, short device name information (friendlyName) which is readable by the user, manufacturer information (manufacturer) about the device, and service list information.

The service list information may include service time information indicating the type of a service provided by the device, service ID information indicating the ID of the service, service description URL information indicating a new URL related to a service description, control URL information used to control the service and/or URL information which is usable for eventing of the service.

The illustrated formats are simply an embodiment of the present invention, and the structure thereof, elements included therein and the values of the elements may vary according to embodiments.

FIG. 99 illustrates the format of a DDD in the discovery procedure for a WebSocket endpoint or an HTTP service URL using the DDD according to an embodiment of the present invention.

As described above, the addresses of WebSocket endpoints or addresses of HTTP service URLs may be delivered to a CD app through the DDD. The CD app may connect to a WebSocket endpoint using these addresses or send a request to a service URL.

In the aforementioned WebSocket-based architecture example #1, a DDD format according to the illustrated example t419010 or a DDD format according to the example t419020 may be used.

In the illustrated example t419010, the device information of the DDD may include address information about various WebSocket endpoints in addition to the device type information. As shown in the figure, address information about endpoints such as the Service/Content Identification Endpoint and the ESG Information Endpoint is included in the device information of the DDD. Since the DDD format is used for WebSocket-based architecture example #1, addresses of the respective endpoints may be listed. The DDD format according to the illustrated example t419020 may also include address information about various WebSocket endpoints. In this case, the address information about the endpoints may be included in the service information of the DDD.

While the address information is illustrated as being included in the device information or service information, the address information may be included in other positions in the DDD. In the illustrated example of the DDD, other elements of the aforementioned DDD are omitted. Configuration of other elements may vary according to embodiments.

The DDD formats according to the illustrated examples t419010 and t419020 may also be used for the aforementioned HTTP-based architecture example #1. In this case, the address information about the WebSocket endpoints may be replaced by URL address information about corresponding service URLs. Thereby, element names may be changed. Similarly, as the DDD format is used for the HTTP-based architecture example #1, addresses of respective service URLs may be listed.

The address of a WebSocket endpoint may be configured in the form of, for example, ws://localhost:8030/ESGInformation, ws://localhost:8030/Data, and ws://localhost:8030/MediaTimeline. The address of an HTTP service URL may be configured in the form of, for example, http://192.168.1.4:8080/serviceidentification and http://localhost:8030/ESGInformation.

FIG. 100 illustrates the format of a DDD in the discovery procedure of a WebSocket endpoint or an HTTP service URL using the DDD according to another embodiment of the present invention.

In the aforementioned WebSocket-based architecture example #2, a DDD format according to the illustrated example t420010 or a DDD format according to example t420020 may be used.

In the illustrated example t420010, the device information about the DDD may include the address of a WebSocket endpoint in addition to the device type information. Since the DDD format of this example is used for WebSocket-based architecture example #2 address information about only one companion endpoint may be included. The DDD format according to the illustrated example t420020 may also include address information about one companion endpoint. In this case, the address information about the endpoint may be included in the service information of the DDD.

The DDD formats according to the illustrated examples t420010 and t420020 may also be used for the aforementioned HTTP-based architecture example #2. In this case, the address information about the WebSocket companion endpoint may be replaced by address information about a companion service URL. Thereby, element names may be changed. Similarly, as the DDD format is used for the HTTP-based architecture example #2, address information about one service URL may be included.

In the aforementioned WebSocket-based architecture example #3, a DDD format according to the illustrated example t420030 or a DDD format according to the example t420040 may be used.

In the illustrated example t420030, the device information of the DDD may include address information about n provided WebSocket endpoints in addition to the device type information. For example, address information about an endpoint performing functions such as Service/Content identification and the ESG information delivery and address information about an ApptoApp communication endpoint may be included in the device information. The DDD format according to the illustrated example t420040 may also include address information about n WebSocket endpoints. In this case, the address information about the endpoints may be included in the service information of the DDD.

While the address information is illustrated as being included in the device information or service information in this embodiment, the address information may be included in other positions in the DDD. In the illustrated example of the DDD, other elements of the aforementioned DDD are omitted. Configuration of other elements may vary according to embodiments.

FIG. 101 illustrates a discovery procedure for a WebSocket endpoint or an HTTP service URL using a response header for a DDD request according to an embodiment of the present invention.

As described above, the PD may multicast a discovery message for advertising itself, or transmit, to the CD, a response message in response to the received M-SEARCH message. A CD app may obtain a URL from the LOCATION header of the multicast discovery message or the response message for the M-SEARCH message. This procedure t421010 may be the same as that of the previous embodiment.

This URL is capable of acquiring a DDD. The CD app may send a message for requesting a DDD to the URL using HTTP GET. The DDD may be delivered through the body of a response message corresponding to the request message, and thus the CD app may obtain device description information (t421020).

In the previous embodiment, the address of a WebSocket endpoint or the address information about an HTTP service URL is delivered through the DDD of this response message. In this embodiment, corresponding address information may be delivered through the header of the response message. In this case, the body of the response message may remain empty and thus carry no information, or may include the DDD.

FIG. 102 illustrates the format of a response header in a discovery procedure of a WebSocket endpoint or an HTTP service URL using a response header for a DDD request according to another embodiment of the present invention.

As described above, a CD app may request a DDD using HTTP GET. In this case, the GET message may be configured as in the illustrated example t422010. The DDD request message using GET may be transmitted to the URL of the DDD acquired from the PD. In addition, host information about the IP address/port of the description may be used. In addition, a language preferred by a control point may be used. This GET message may be the same as the message according to the previous embodiment.

As described above, a response message for the DDD request message may be returned. Address information may be delivered through the header of the response message.

In the aforementioned WebSocket-based architecture example #1, a response header format according to the illustrated example t422020 may be used. The response header of this example may include address information about various WebSocket endpoints in addition to the information of the basic 200 OK message. As shown in the figure, address information about endpoints such as the Service/Content Identification Endpoint and the ESG Information Endpoint may be included in the response header. As the response header format is used for WebSocket-based architecture example #1, addresses of the respective endpoints may be listed. Herein, the structure and form of the response header including the address information may vary according to embodiments.

The response header format according to the illustrated example t422020 may also be used for HTTP-based architecture example #1 described above. In this case, the address information about the respective WebSocket endpoints may be replaced by URL address information about corresponding service URLs. Thereby, element names may be changed. Similarly, as the response header format is used for the HTTP-based architecture example #1, addresses of respective service URLs may be listed.

In the aforementioned WebSocket-based architecture example #2, a response header format according to the illustrated example t422030 may be used. The response header of this example may include address information about a WebSocket endpoint in addition to the information of the basic 200 OK message. Since the response header format is used for WebSocket-based architecture example #2, address information about only one companion endpoint may be included. Herein, the structure and form of the response header including the address information may vary according to embodiments.

The response header format according to the illustrated example t422030 may also be used for HTTP-based architecture example #2 described above. In this case, the address information about the WebSocket companion endpoint may be replaced by address information about a companion service URL. Thereby, element names may be changed. Similarly, as the response header format is used for the HTTP-based architecture example #2, only address information about the companion service URL may be included.

In the aforementioned WebSocket-based architecture example #3, a response header format according to the illustrated example t422040 may be used. The response header of this example may include address information about n WebSocket endpoints in addition to the information of the basic 200 OK message. For example, address information about a companion endpoint performing functions such as Service/Content identification and ESG information delivery and address information about an ApptoApp communication endpoint may be included in the response header. Herein, the structure and form of the response header including the address information may vary according to embodiments.

FIG. 103 illustrates a discovery procedure of a WebSocket endpoint or an HTTP service URL using a URL of a response header for a DDD request according to an embodiment of the present invention.

As described above, the PD may multicast a discovery message for advertising itself, or transmit a response message corresponding to the received M-SEARCH message to the CD. The CD app may obtain a URL from the LOCATION header of the multicast discovery message or the response message for the M-SEARCH message. This URL is intended to acquire a DDD. The CD app may send an HTTP GET request to the URL. These procedures t423010 and t423020 may be the same as those of the previous embodiment.

Here, a response message may be received in response to the HTTP GET request. In the previous embodiment, the address information is delivered through the DDD in the body of the response message or the response message header. In this embodiment, a URL for acquiring the address information may be delivered through the response message header. In this case, the body of the response message may remain empty and thus carry no information, or may include the DDD.

The CD app may send the HTTP GET request to a URL for the received address information to request the address information. The PD may send a response message to the CD app. The address information may be delivered to the CD through the response message (t423030). The address information may be delivered through the body of the response message. According to an embodiment, the address information may be delivered through the header of the response message.

FIG. 104 is a diagram illustrating formats of a GET request and a response message according to the request in a discovery procedure for a WebSocket endpoint or an HTTP service URL using a URL of a response header for a DDD request according to an embodiment of the present invention.

As described above, a CD app may request a DDD using HTTP GET. In this case, the GET message may be configured as in the illustrated example t424010. The DDD request message using GET may be transmitted to the URL of the DDD acquired from the PD. The GET message may be the same as a message according to the previous embodiment.

The response message may be received according to the HTTP GET message. The response message may have a format as shown in the illustrated example t424020. The response message may include URL information capable of acquiring address information in addition to the information of the basic 200 OK message. This URL information may be intended to acquire the address of a WebSocket endpoint or information for acquiring the address of an HTTP service URL. Alternatively, the URL may be intended to acquire both addresses. In the illustrated format, URL information for acquiring the address of a WebSocket endpoint is included.

The CD app may send a request for address information to a URL intended for address information using HTTP GET. The GET message used at this time may be configured as in the illustrated example t424030. In this case, a request message using GET may be transmitted to the URI of the address information acquired from the PD. In addition, the host information about the IP address/port of the description may be used. In addition, a language preferred by the control point may be used.

For example, when the URL for acquiring address information is configured as http://192.168.1.10:8080/WSEndpoints (assuming WebSocket), a GET message using the URL may be configured as in the example t424040.

Thereafter, a response message according to the request message for the address information may be returned as described above. The response message may include address information. The address information may indicate the address of a WebSocket endpoint or an HTTP service URL.

FIG. 105 is a diagram illustrating the format of a response message for delivering address information in a discovery procedure for a WebSocket endpoint or an HTTP service URL using a URL of a response header for a DDD request according to another embodiment of the present invention.

In WebSocket-based architecture example #1 described above, a response message format according to the illustrated example t425010 may be used.

As shown in the figure, address information about endpoints such as the Service/Content Identification Endpoint and the ESG Information Endpoint may be included in the message. As the message format is used for WebSocket-based architecture example #1, addresses of the respective endpoints may be listed.

The message format according to the illustrated example t425010 may also be used for HTTP-based architecture example #1 described above. In this case, the address information about the respective WebSocket endpoints may be replaced by URL address information about corresponding service URLs. Thereby, element names may be changed. Similarly, as the message format is used for HTTP-based architecture example #1, addresses of respective service URLs may be listed.

In WebSocket-based architecture example #2 described above, a message format according to the illustrated example t425020 may be used.

The message format according to the illustrated example t425020 may also be used for HTTP-based architecture example #2 described above. In this case, the address information about the WebSocket companion endpoint may be replaced by address information about a companion service URL. Thereby, element names may be changed. Similarly, as the message format is used for HTTP-based architecture example #2, only address information about the companion service URL may be included.

In the aforementioned WebSocket-based architecture example #3, a message format according to the illustrated example t425030 may be used.

The message format according to the illustrated embodiment t425030 may include address information about n WebSocket endpoints. For example, address information about a companion endpoint performing functions such as Service/Content identification and ESG information delivery and address information about an ApptoApp communication endpoint may be included in the message format.

While the formats are illustrated as including address information in the additionalData element, the message may also include other information according to embodiments. Herein, the structure and form of the message including the address information may vary according to embodiments.

FIG. 106 is a diagram illustrating a WebSocket-based handshake & connection procedure according to an embodiment of the present invention (after discovery).

As described above, the PD may serve as a WebSocket server, and the CD may correspond to a WebSocket client. The PD may include a WebSocket server and/or a companion service module. The companion service module may provide information which is necessary for a companion device in the TV receiver or the like, or perform overall management related to companion services. The companion service module may be a hardware module.

The WebSocket server of the PD may provide WebSocket endpoints. An app which is usable by a web browser of the CD may be in execution. The web browser may also provide a WebSocket client.

First, the companion service module of the PD may request the WebSocket server to generate a WebSocket endpoint t426010. For example, a request in the Java format such as @ServerEndpoint ("/WS_AA") may be delivered. Herein, "/WS_AA" may refer to a relevant URL. A WebSocket endpoint may be generated in the WebSocket server in this procedure.

The CD app may call an API for creation of a WebSocket object (t426020). The API, which is called newWebSocket, may have the address of a WebSocket endpoint as a variable. For example, ex_websocket may be defined in the form of ex_websocket=newWebSocket(ws://192.168.1.11:8080/WS_AA). A WebSocket object may be created in the CD through this procedure. Herein, handshake may be performed between the endpoint of the WebSocket server of the PD and the WebSocket object of the CD (t426030).

The CD app may call API for adding OpenEventHandler (t426040). This API may be WebSocketObject.onopen( ). For example, a handler may be added in the form of ex_websocket.onopen( . . . ). In this procedure, the WebSocket server may be connected to a client (t426050). The WebSocket client may inform the CD app of establishment of connection (t426060).

FIG. 107 is a diagram illustrating a handshake & connection procedure for WebSocket-based app-to-app communication according to an embodiment of the present invention (after discovery).

In the WebSocket-based architecture, app-to-app communication may be performed between an app which is being executed in the PD and an app which is being executed in the CD. As described above, once the PD app is connected to the WebSocket server, and the CD app is also connected to the WebSocket server, the WebSocket server may relay messages and data between the apps.

First, the PD app may call an API for creation of a new WebSocket object from a WebSocket client in the PD. The aforementioned newWebSocket API may be used. For example, the API may be used in the form of local_websocket=new WebSocket(ws://localhost:8080/ApptoApp). In this procedure, a WebSocket object for the PD app may be created.

The companion service module in the PD may call an API from the WebSocket server in order to create a WebSocket endpoint (t427020, t427030). This procedure may be performed as described above. In this case, an endpoint for app-to-app communication needs to be created, and accordingly a URL (e.g., /ApptoApp) related to app-to-app communication may be used. Thereafter, a local WebSocket client of the PD and the WebSocket server may perform the handshake procedure (t427040).

The CD app may also create a WebSocket object (t427050). This procedure may be performed as described above. In this case, since the WebSocket object is intended for app-to-app communication, the WebSocket object may be defined in the form of, for example, remote_websocket=newWebSocket(ws://192.168.1.11:8080/ApptoApp). Thereafter, the WebSocket server of the PD and the WebSocket object of the CD may perform the handshake procedure (t427060).

The WebSocket cliente of the PD and the WebSocket client of the CD may call an API to add OpenEventHandler (t427091, t427090). These procedure may be performed as described above. Thereby, each WebSocket client may be connected to the WebSocket server (t427070, t427100). Once connection is established, each WebSocket client may announce establishment of connection to the respective apps through an event (t427080, t427110).

Once the aforementioned procedures are completed, the CD app and the PD app may communicate with each other (t427120). A message may be delivered from one app to the other app via the WebSocket server. That is, the WebSocket server may relay a message from one client to the other client. This 2-way communication procedure will be described in detail later.

FIG. 108 is a diagram illustrating a WebSocket-based 2-way communication procedure according to an embodiment of the present invention (after connection).

It is assumed that a CD app and the WebSocket server in the PD are connected through the aforementioned procedures (t428010). As described above, the WebSocket client may inform the CD app of establishment of the connection (t428020).

The companion service module may call an API in order to receive a message (t428030). For example, an API such as @OnMessage in the Java format may be used. Thereby, the WebSocket server may be ready to receive a message (Ready to receive).

The CD app may call an API for adding MessageEventHandler (t428040). For example, an API such as WebSocketObject.onmessage( ) may be called. For an object such as ex_websocket of the previous example, the API may be called in the form of ex_websocket.onmessage( . . . ). Through this procedure, the WebSocket client of the CD may be ready to transmit/receive a message.

The CD app may call an API for sending a message (t428050). For example, an API such as WebSocketObject.send(message1) may be called. For an object such as ex_websocket of the previous example, the API may be called in the form of ex_websocket.send(message1). Thereby, a message (message 1) may be delivered to the WebSocket server (t428060).

The WebSocket server may relay the received message (message 1) to the companion service module (t428070). The companion service module may deliver a message (message 2) in response (t428080, t428090, t428100). The companion service module may call an API for sending a message (t428080). To transmit text or an object in JSON format, a Java API such as session.getBasicRemote( ).sendText(message2) or session.getBasicRemote( ).sendObject(message2) may be called.

FIG. 109 is a diagram illustrating a WebSocket-based app to app 2-way communication procedure according to an embodiment of the present invention (after connection/CD to PD).

It is assumed that a CD app, the WebSocket server of the PD and an app which is being executed in the PD are connected. The respective apps may have been informed of establishment of connection by the WebSocket client through an event.

As described above, the companion service module may call an API for receiving a message. Thereby, the WebSocket server may be ready to receive a message (t429030). The PD app may call an API in order to add MessageEventHandler, and the WebSocket client of the PD may also be ready to receive a message (t429040). The CD app may also call an API in order to make the WebSocket client ready to receive the message (t429020). Details of the procedure have been described above.

The CD app may call an API in order to send a message (t429050). This API is the aforementioned API and may be used in the form of, for example, remote_websocket.send (message1). Thereby, the message may be delivered to the WebSocket server (t429060). The WebSocket server may relay the message (message 1) to the companion service module (t429070).

To deliver the message to the local WebSocket client of the PD, the companion service module may search for a local WebSocket session. When the companion service module discovers the local WebSocket session, the module may call an API in order to deliver the message (message 1) (t429080). In this case, a Java API such as session.getBasicRemote( ).sendText(message1) or session.getBasicRemote( ).sendObject(message 1) may be called in order to transmit text or an object in JSON format.

The WebSocket server may relay the message (message 1) to the WebSocket client (t429090), and the WebSocket client may in turn relay the message to the PD app (t429100).

FIG. 110 is a diagram illustrating a WebSocket-based app to app 2-way communication procedure according to an embodiment of the present invention (after connection/PD to CD).

It is assumed that a CD app, the WebSocket server of the PD and an app which is being executed in the PD are connected. The respective apps may have been informed of establishment of connection by the WebSocket client through an event.

The WebSocket server and the respective WebSocket clients may be ready to transmit/receive a message in the same procedure as described above.

The PD app may call an API in order to send a message (t430010). This API may be the aforementioned API and may be used in the form of, for example, local_websocket.send(message2). Thereby, the message may be delivered to the WebSocket server (t430020). The WebSocket server may relay the message (message 2) to the companion service module (t430030).

The companion service module may search for a remote WebSocket session to deliver the message to a remote WebSocket client of the CD. When the companion service module discovers the remote WebSocket session, the model may call an API in order to deliver the message (message 2) (t430040). In this case, a Java API such as session.getBasicRemote( ).sendText(message2 ) or session.getBasicRemote( ).sendObject(message2) may be called in order to transmit text or an object in JSON format.

The WebSocket server may relay the message (message 2) to the WebSocket client (t430050), and the WebSocket client may in turn relay the message to the CD app (t430060).

FIG. 111 is a diagram illustrating an HTTP-based Request-Response procedure according to an embodiment of the present invention (after discovery).

It is assumed that all the HTTP service URLs have been discovered through the aforementioned discovery procedure of the HTTP-based architecture (t431010).

The CD app may call an API from the HTTP client in order to send a message request (t431020). The HTTP client may send the message request to a proper URL according to the request among HTTP service URLs which are recognized in the discovery procedure (t431030). Alternatively, the message request may be sent to one companion service URL according to the previous embodiment. In this case, the content of the request may be identified by, for example, a query term of the request.

The HTTP server may relay a request message to the companion service model in the PD (t431040). The companion service module may call an API in order to relay the request message (message 1) to the CD (t431050).

Thereby, the HTTP server may relay the message (message 1) to the HTTP client (t431060), and the HTTP client may relay the message to the CD app (t431070).

FIG. 112 illustrates conversion of an ESGData state variable in XML format into an ESGData state variable in JSON format according to another embodiment of the present invention.

A broadcast reception apparatus according to an embodiment of the present invention may employ various protocols including HTTP (Hypertext Transfer Protocol), RTP (Real-time Transport Protocol), XMPP (Extensible Messaging and Presence Protocol), FTP (File Transfer Protocol) and WebSocket to deliver various kinds of information through a message used in device-to-device communication to serve various purposes.

In delivering a message used in device-to-device communication through the aforementioned various protocols, a broadcast reception apparatus according to an embodiment of the present invention may deliver data of various types (string, integer, floating point, Boolean, character, array, list, etc.) defined in the respective protocols. The broadcast reception apparatus may employ a Markup scheme such as XML (Extensible Markup Language), HTML (Hypertext Markup Language), XHTML (Extensible Hypertext Markup Language) and JSON (JavaScript Object Notation), text, or an image format to more structurally express, deliver and store data containing complex content, and is not limited to specific schemes.

Hereinafter, a description will be given of a method for the broadcast reception apparatus to deliver a message (e.g., a state variable) containing the ESG data to a companion device using a WebSocket protocol. In this case, the broadcast reception apparatus may convert an ESGData state variable containing the ESG data into an ESGData state variable in JSON format and deliver the ESGData state variable in JSON format to a companion screen device using the WebSocket protocol.

FIG. 112(a) illustrates an embodiment of setting the aforementioned ESG data in the ESGData state variable in XML format (or XML data structure). Details of the ESGData state variable are the same as described above.

Referring to FIG. 112(b), the ESGData state variable in XML format of FIG. 112(a) may be converted into an ESGData state variable in JSON format (or JSON format). Details of the ESGData state variable in JSON format are the same as those of the ESGData state variable in XML format.

As such, all data in XML format (XML data structure) may be converted into data in JSON format. The data in JSON format may be referred to as a JSON object. The JSON object may be delivered to a companion device in the broadcast reception apparatus (e.g., the primary device) through the WebSocket protocol.

FIG. 113 is a diagram illustrating a procedure of delivering an ESGData state variable in JSON format to a companion device using the WebSocket protocol according to another embodiment of the present invention.

The illustrated CD (Companion Device) may refer to a companion device, and the PD (Primary Device) may refer to a receiver or a broadcast reception apparatus.

The companion device may create a WebSocket Object by calling a WebSocket API using the following syntax (C58003).

[Construct WebSocket Object]
WebSocketobjectname=new WebSocket(WebSocket address)
Ex) WS_ESG=new WebSocket("ws://Tvhost:8080/ESGServer")

Herein, the name of the created WebSocket object may be "WS_ESG", the called WebSocket API may be "new WebSocket" for creation of a new WebSocket, and the address of the WebSocket server may be "ws://Tvhost:8080/ESGServer".

Then, the companion device may open WebSocket connection by calling a WebSocket API using the following syntax (C58005).

[Open a WebSocket connection]
Ex) WS_ESG.onopen=function {~~~}

Herein, "WS_ESG.onopen" may be an opening event handler for opening a WebSocket. The term "function {~~~}" may be a WebSocket API for opening WebSocket connection.

In this state (C58010), the ESGData state variable of the broadcast reception apparatus may have no value.

The service/content provider may transmit ESG data over a broadcast network or a broadband channel (C58020). The ESG data may be received through a reception unit or a network interface. Herein, the reception unit may be the aforementioned broadcast interface or tuner.

The broadcast reception apparatus may signal the received ESG data (C58030).

Then, the broadcast reception apparatus and the companion device may open WebSocket connection to each other (C58035).

WebSocket connection may be opened in the same manner as described above. For example, an application processor (not shown) included in the broadcast reception apparatus may send a request for connection to the companion device to a network processor (not shown). Thereafter, the network processor may receive the connection request from the companion device. The network processor may search for a connection request of a matching application processor based on the information received from the companion device. Once the network processor retrieves a matching connection request, the network processor may connect the companion device with the application processor of the broadcast reception apparatus. Herein, the application processor may be an application module or an application browser. The network processor may be the WebSocket server.

Once WebSocket connection between the broadcast reception apparatus and the companion device opens, the broadcast reception apparatus is allowed to transmit and/or receive a message to and/or from the companion device.

Then, the companion device may transmit and/or receive various messages to and/or from the broadcast reception apparatus using the following event handler (C58037).

For example, the event handler may include a Message Event Handler, an Error Event Handler, and/or a Close Event Handler.

Herein, the Message Event Handler is an event handler for transmitting and/or receiving messages between the broadcast reception apparatus and the companion screen, and has the following syntax.

[Message Event Handler]
EX) WS_ESG.onmessage=function {~~~}

The Error Event Handler may be an event handler for transmitting and/or receiving messages related to errors in the WebSocket connection, broadcast reception apparatus and/or companion device and, has the following syntax.

[Error Event Handler]
EX) WS_ESG.onerror=function {~~~}

The Close Event Handler is an event handler for closing WebSocket connection and has the following syntax.

[Close Event Handler]
EX) WS_ESG.onclose=function {~~~}

Then, the broadcast reception apparatus may store (or set) the ESG data in the ESGData state variable (C58040).

For example, the ESGData state variable may be in either XML format or JSON format. If the broadcast reception apparatus sets the ESG data in the ESGData state variable in XML format, the broadcast reception apparatus may convert the state variable in XML format into a state variable in JSON format.

Then, the broadcast reception apparatus may deliver a JSON object of the ESGData state variable to the companion device through the WebSocket protocol (C58050).

Upon receiving the ESGData state variable, the companion device may parse the state variable (C58060), and then expose the ESG data through the UI according to the parsed value (C56070).

At this time, to show the ESG data to the user, the companion device may express the UI at the native level or in an application.

There may be various embodiments of expressing the ESG data in the companion device. According to an embodiment, upon receiving the ESG data, the companion device may immediately exposes the ESG data to the user in any form. According to an embodiment, upon receiving the ESG data, the companion device may send a notification message to the user, and may expose the ESG data when the user executes the ESG data. According to an embodiment, upon receiving the ESG data, the companion device may hold the ESG information in the background, and may expose the ESG data to the user only when the user executes an application for displaying the ESG data.

FIG. 114 is a diagram illustrating a service/content identification message format according to an embodiment of the present invention.

The present invention proposes a scheme in which a broadcast receiver (TV receiver or PD) provides various data to a CD in a next-generation hybrid broadcast environment based on a linkage between a terrestrial broadcast network and IP network. Here, the CD or a CD-side application executed on a CD side may communicate with a PD side.

In this data provision architecture, the PD and the CD may exchange various types of data. In such data provision, it is possible to utilize a service of the above-described WebSocket end points, a service provided by an HTTP service URL, etc. The service mentioned herein refers to a companion service between the PD and the CD, and corresponds to a different concept from that of a broadcast service.

For example, the PD may deliver, to the CD, information about a broadcast service (channel) or content (a program of a channel) which is currently provided or can be provided in the future in the PD. In addition, the PD may deliver an ESG or an emergency alert message (EAM) to the CD. According to a given embodiment, the PD may deliver, to the CD, playback state information of a service during playback or timeline information of the PD.

Here, the EAM is an alert message for reporting an emergency situation or a disastrous emergency situation. The EAM may be received by the PD and delivered to the CD side. Here, the playback state information may refer to information about a playback speed, fast forward, rewind, etc. for a service such as a broadcast service, etc. provided by the PD. The timeline information may include media time information and/or a UTC absolute time pair for the service such as the broadcast service, etc. provided by the PD.

As described in the foregoing, the present invention proposes architecture for supporting communication between the PD and the CD based on an HTTP request/response simultaneously with supporting communication between the PD and the CD based on WebSocket. Here, a communication scheme according to WebSocket or HTTP may be selected depending on attributes of respective companion services. In this regard, the present invention may allow a flexible architecture configuration and ensure efficiency in communication between the PD and the CD.

In an embodiment of the present invention, WebSocket-based communication may be in charge of communication associated with service/content identification and communication associated with delivery of a playback state. At the same time, communication by a web server based on HTTP may be in charge of communication associated with delivery of an ESG and communication associated with delivery of service/show/segment-related data. Communication associated with delivery of media timeline information may be performed by both WebSocket and HTTP. In addition, in communication associated with service/content identification, a service/content for a currently broadcast service may be identified by HTTP-based communication.

A description will be given of communication associated with service/content identification. The broadcast receiver has directly provided an additional service for the broadcast service, etc. In this case, when a user attempts to execute enhancement services related to broadcast services, which includes identifying content or checking additional information while viewing a program, there may be a problem in which related information covers the broadcast program. The present invention may provide the additional information without hindering viewing, and by using CD's more convenient UI by allowing the additional service to be displayed on the CD of the user.

Further, the present invention proposes a protocol and PD-CD architecture for solving the above-mentioned problem, a service/content identification message format delivered to the CD, etc. In addition, the present invention proposes a scheme in which a CD or a CD-side application accesses a service/content which is being provided or can be provided in the PD using the service/content identification message. In this way, the CD may acquire information about the broadcast service/content in advance, and thus the additional service may be efficiently provided. In addition, the present invention proposes a scheme of enabling the CD side to efficiently acquire information about a service/content by configuring a hierarchical location URL structure in the service/content identification message. Further, the present invention proposes a scheme of enabling the above-described process to be efficiently performed using both WebSocket and HTTP. In this way, the additional service may be provided without hindering viewing of the service/content of the PD, and in more convenient way. In addition, in this way, it is possible to perform preprocessing such that the CD side may acquire and reproduce the service/content, acquire and provide additional information/services related to the service/content, or efficiently perform an additional service related to the service/content.

In an embodiment of the present invention, the PD may deliver the service/content identification message to the CD or the CD-side application. First, WebSocket connection may be established in a discovery process. This process has been described above. A WebSocket server of the PD may receive a subscription message of a companion service for receiving the service/content identification message from the CD-side application. The CD-side application may have subscribed to the companion service. This companion service may be renewed or subscription of the companion service may be canceled. This companion service may be referred to as an ESG service.

When the information related to the service/content is changed, the WebSocket server may deliver the service/content identification message to the CD-side application. This service/content identification message may correspond to a type of notification message. This notification message may have a message body together with information that indicates a companion service associated with the notification message. In this case, the message body may include information corresponding to the service/content identification message. The CD-side application may acquire this information to perform a necessary additional operation.

The CD-side application may receive the service/content identification message through WebSocket connection, and receive the information about the service/content currently provided in the PD using HTTP. This process may be performed by an HTTP GET message and an HTTP response according to the message. The CD-side application may transmit the HTTP GET message for an HTTP service URL for service/content identification of a web server of the PD or the web server. The web server of the PD may transmit a response message to the CD-side application. Here, the response message may include information related to the service/content.

Delivery of the information related to the service/content by WebSocket described above refers to delivery of information related to the whole service/content which is being provided or can be provided in the PD, and may correspond to delivery of comprehensive information in the form of a notification. On the other hand, delivery of the information related to the service/content by HTTP described above refers to delivery of information related to the service/content which is being provided in the PD, and may be performed in response to a request from the CD-side application.

Delivery by WebSocket is delivery of comprehensive and overall information. When there is a great change, for example, when the ESG is updated, information about this change may be provided to the CD side through this delivery, without CD's requests, such that the service/content can be efficiently checked. In this case, a scheme such as WebSocket may be more appropriate, and thus the PD of the present invention which supports both WebSocket and HTTP may utilize this information delivery using WebSocket. In addition, when the CD side needs to acquire information about a service/content currently reproduced on the PD side, delivery by HTTP allows the information to be easily acquired by a request/response. In this case, a request/response scheme by HTTP GET, etc. is more appropriate, and thus the PD of the present invention may use HTTP. The CD side may receive the service/content identification message by WebSocket, and then additionally receive an HTTP response message for a current service/content as necessary.

A description will be given of the service/content identification message in delivery by WebSocket. The service/content identification message may include ESG information or include information which is acquired from the ESG and processed. In addition, according to a given embodiment, the service/content identification message may use an information structure of the ESG.

An embodiment of the illustrated service/content identification message may include a Service element and/or a Content element. At least one (one to N) Service element may be included, and at least zero (zero to N) Content elements may be included.

The Service element may describe information about the broadcast service of the PD. Here, the information about the service may be brought from an ESG data model. The Service element may include an id element, a SerivceType element, a Name element, a Description element and/or a TargetUserProfile element.

The id element may indicate an ID of the service. The SerivceType element may indicate a service type of the service. The Name element may indicate a name of the service. The Description element may include description of the service. The TargetUserProfile element may indicate a user profile targeted by the service.

The Content element may describe information about content of the PD. Here, when the broadcast service corresponds to a channel, the content may refer to a program. The Content element may include a Programid element, a Name element, a Description element, a TargetUserProfile element, a CARatings element, a Capabilities element, a Component element, a FileContentItem element, a TimelineInfo element and/or a Location element.

The Programid element, the Name element, the Description element, the TargetUserProfile element may include an ID, a name, a description, and target user profile information of the content, respectively. The CARatings element may include content advisory information of the content. The Capabilities element may indicate capability information related to the content. Here, the capability information may be necessary to meaningfully reproduce the content.

The Component element may include information related to a component which is included in the content. Here, the Component element may include information related to a continuous component of the content. Here, the continuous component may refer to a presentable component. According to a given embodiment, an audio/video/captioning component, etc. may correspond to the continuous component. According to a given embodiment, an application-based enhancement component, an application component, etc. correspond to the continuous component. A plurality of Component elements may be present, and each of the Component elements may further include @componentType, @componentRole, @componentName and/or @componentLocation attributes.

The @componentType attribute may indicate a type of the component. For example, when the attribute has values of 0, 1, 2, and 3, the component may have audio component, video component, closed captioning component, and application component types, respectively. Remaining values may be reserved for future use.

The @componentRole attribute may indicate a role or a type of the component. The @componentName attribute may indicate a name of the component. Here, the name may be a human-readable name. The @componentLocation attribute may include URL information for accessing the component. The CD-side application may acquire the component through this URL.

The FileContentItem element may include information related to a file content item included in the content. Here, FileContentItem element may include additional information (Adjuct Data) of the content. Here, the additional information may include various types of information. According to a given embodiment, the application-based enhancement component, the application component, etc. may correspond to the various types of information. A plurality of FileContentItem elements may be present, and the FileContentItem element may be omitted. The FileContentItem element may include @FileContentItemLocation, @FileContentItemName, @FileContentItemID, @FileContentItemType and/or @FileContentItemEncoding attributes.

The @FileContentItemLocation attribute may include URL information for accessing a corresponding file component item. The CD-side application may acquire the file component item through this URL.

The @FileContentItemName attribute may indicate a human-readable name of the file component item. The @FileContentItemID attribute may indicate an ID of the file component item. The @FileContentItemType attribute may indicate a type of the file component item. The @FileContentItemEncoding attribute may indicate an encoding scheme of the file component item.

The TimelineInfo element may include timeline-related information of the content. The timeline information may be delivered by HTTP GET or delivered by a separate WebSocket service. Alternatively, the timeline information may be included in the service/content identification message and delivered. The TimelineInfo element may further include a currentTime element. The currentTime element may indicate current time information of the content.

The Location element may include URL information for accessing the corresponding content. The CD-side application may acquire the content through this URL. This element may correspond to URL information for accessing the whole content unlike the above-described URL information. According to a given embodiment, when a request for acquisition is transmitted using the URL information of this element, only a necessary component or file content item may be acquired by adding a query term.

The service/content identification message may further include a Show element and a Segment element. For each of the Show element and the Segment element, the above-described elements/attributes included in the Service element and the Content element may be defined. In addition, the service/content identification message may further include information for reporting information about a portion of a Service, a Show, a Segment, or Content currently reproduced by the PD based on the Service, the Show, the Segment, or the Content.

According to a given embodiment, the service/content identification message may further include a logo, other ESG information, and characteristics (a size, a codec, a bit rate, an aspect ratio, and required/desired capability) of each of the service, the content, etc. In addition, the service/content identification message may further include filtering criteria information for determining whether each of the service, the content, etc. meets a particular individualization criterion.

According to a given embodiment, a URL of the above-described location information may be a URL of the PD (or a server of the PD) for acquiring corresponding information from the PD, a URL of the Internet for direct acquisition from the Internet, or a URL of an arbitrary remote server. According to a given embodiment, the service/content identification message may further include information that indicates whether it is possible to subscribe to each of a service, content, etc. to receive each of the service, the content, etc., or whether each of the service, the content, etc. corresponds to a one-off A description will be given of an HTTP response message for delivering information related to a current service/content in delivery by HTTP.

As described in the foregoing, the CD-side application may transmit an HTTP GET message to an HTTP-based web server of the PD. The HTTP GET message may be requested by service URL information of the companion service. The HTTP GET message may include service URL information and information for identifying the companion service (companion service for acquiring information related to the current service/content). The HTTP GET message may further include a query term, and requested information may be identified through this query term.

The CD-side application may request information about a service/content currently provided by the PD through the HTTP response message. Examples of the requested information about the service/content may include ESG information of a current show, currently available component information, a currently available file or NRT data, and/or current timeline location information, etc.

The PD or the web server of the PD may deliver the requested information to the CD-side application through the HTTP response message. The HTTP response message may include the requested information, or may not include the requested information when there is no requested information. In addition, the HTTP response message may further include information that indicates whether the requested information is included. Here, the requested and delivered information may correspond to the above-described information of the service/content identification message. For example, the ESG information may correspond to the id, Name, Description, and CAratings elements among the Service element, the sub-elements of the Service element, the Content element, and the sub-elements of the Content element described above. In addition, the component information may correspond to the Component element and the sub-elements of the Component element described above. Information about the file or the NRT data may correspond to the FileContentItem element and the sub-elements of the FileContentItem element described above. Further, the timeline location information may correspond to the TimelineInfo element and the sub-elements of the FileContentItem element described above.

FIG. 115 is a diagram illustrating a service/content identification message in an XML format according to an embodiment of the present invention.

Two illustrated figures (t115010, t115020) are divided from one original figure due to space constraints. The above-described service/content identification message may be embodied in various formats. An illustrated service/content identification message has an XML format. This identification message may have a structure modified from the above-described service/content identification message.

This service/content identification message may have an Identification element. This element may have a service ID, a program ID, a show ID, and a segment ID. This information may identify a service, a program show, and a segment. Information to be described below with regard to each service and content may be included in the identification message.

The service/content identification message may include a TemporalLocation element. This element may indicate a location of a service which is currently being broadcast in terms of time, or indicate a location of a service which is currently being broadcast in a byte base.

A Title element may indicate a title of a service, content, etc., and a Description element may provide an additional textual description for the service/content, etc. An Icon element is icon information of the service, etc., and this element may include information about a MIME type, a width, a height, a depth, and a URL of an icon.

An ESGURL element may include URL information for acquiring ESG information of the service and content. A rating element may indicate rating information of the service, and an AccessURL element has a concept corresponding to the above-described location URL information and may provide URL information for acquiring the service. A DeviceCapabilities element may indicate capability information required or preferably desired to meaningfully render the service, etc.

A Component element and a Data element may correspond to the Component element and the FileContentItem element described above. These elements have been described above. A plurality of Component elements and Data elements may be present, and each of the elements may describe information about a corresponding component and file content item.

FIG. 116 is a diagram illustrating a service/content identification message in JSON format according to an embodiment of the present invention.

Two illustrated figures (t116010, t116020) are divided from one original figure due to space constraints. The above-described service/content identification message is reconfigured in JSON format. As described above, the service/content identification message may be embodied in various formats, and formats other than XML and JSON may be used. A component element and a Data element in JSON format may be the same as the above-described elements in the XML format. The respective elements have been described above.

FIG. 117 is a diagram illustrating a method of providing a broadcast service in a PD according to an embodiment of the present invention.

The method of providing the broadcast service in the PD according to the embodiment of the present invention may include performing a discovery process with a CD application executed in a CD, establishing a WebSocket, receiving a subscription message, and/or delivering a service identification message.

First, a companion module of a broadcast receiver operating as a PD may perform a discovery process with a CD application executed in a CD. In this process, a first URL used as an HTTP server end point of the PD and a second URL used as a WebSocket server end point of the PD may be delivered to the CD application.

This discovery process has been described above. Here, it is presumed that the CD application is not executed (launched) by the PD. The CD may multicast an M-SEARCH message. The PD receiving this message may respond with a 200 OK message. A header of this 200 OK message may include LOCATION URL information of the PD.

A CD-side application may request a device description through this Location URL. This request may be performed using an HTTP GET method. The PD or the companion module of the PD receiving this request may transmit a first response message to the CD-side application. Here, the first response message may include the first URL in a header thereof. This first URL may be used as an end point of a web server provided by the PD. Here, the end point of the web server may refer to a service URL provided by the above-described web server. The first URL may correspond to a companion service URL used in the above-described HTTP-based architecture. According to a given embodiment, each service URL may be present according to each function. In this case, the first URL may be one of several HTTP service URLs.

The companion module of the PD may receive a request for application information from the CD application. The CD-side application may request application information through the first URL. The companion module may transmit a second response message in response to the request. The second response message may include information about a second URL in a response message body. The second URL may be used as an end point of a WebSocket server provided by the PD. Here, the second URL corresponding to address information of the WebSocket end point may be a companion WebSocket end point or an app-to-app WebSocket end point.

The present embodiment may correspond to embodiments in which both an HTTP-based web server and a WebSocket-based WebSocket server are provided in the PD among the above-described embodiments. Among the embodiments, the present embodiment may correspond to an embodiment in which only one companion service URL is provided as an HTTP service URL, and one companion end point and one app-to-app end point are provided as a WebSocket server end point. Here, the WebSocket companion end point may be an end point that provides a function other than app-to-app communication. Roles in communication between the PD and the CD may be divided and performed by the HTTP server or the WebSocket server. For example, delivery of an ESG may be performed by the web server, and identification of a service & content and delivery of an emergency alert (EA) message and media playback information may be performed by the WebSocket server. Media timeline information may be delivered through the web server and/or the WebSocket server.

Thereafter, the companion module of the PD may establish WebSocket connection between the WebSocket server and the CD application. In this process, the second URL information may be used. A method of establishing WebSocket connection (session) has been described above in detail. Here, the WebSocket connection may be WebSocket connection for connecting a PD-side application and the CD-side application for app-to-app communication, or may be WebSocket connection for transmitting and receiving information from the PD to the CD-side application.

A receiving module of the PD may receive ESG information through a broadcast network or via broadband. The receiving module may be one of a tuner that receives data through the broadcast network and a network interface that receives data via broadband, or may correspond to a concept including both the tuner and the network interface. The PD may further include an internal control module, and the internal control module may process an ESG when the ESG is received, and generate a service/content identification message.

The WebSocket server of the PD may receive a subscription message from the CD application. This subscription message may correspond to a WebSocket server end point (companion end point) identified by the above-described second URL. This subscription message may allow a subscription to a companion service for receiving a service identification message including information derived from the ESG. This companion service may be referred to as a service/content identification message or an ESG service. Here, the WebSocket server may refer to a hardware module or a processor that performs an operation corresponding to the above-described WebSocket server. Here, the service identification message may correspond to the above-described service/content identification message.

The WebSocket server of the PD may deliver the service identification message to the CD application through WebSocket connection. This delivery may be performed in the form of a notification message of the above-described companion service of WebSocket. This notification may be performed when the ESG is changed, for example, when information corresponding to the service/content identification message is changed, or may be periodically performed. Here, the service identification message may include broadcast service-related information or content-related information provided in the PD.

In a method of providing the broadcast service in the PD according to another embodiment of the invention, the service identification message may include at least one service element or content element, the service element may include information about the broadcast service provided in the PD and an ID of the broadcast service, and the content element may include information about content provided in the PD and an ID of existing content, which may correspond to the above-described Service element, Content element, each id element, and programid element.

The content element may include continuous component elements that describe continuous components included in content, and content item elements that describe file content items included in content. These components may correspond to the Component element and the FileContentItem element described above. A continuous component may be audio, video, or a caption component of content, and a file content item may be additional data of content.

The method of providing the broadcast service in the PD according to the other embodiment of the present invention may further include receiving an HTTP GET message for requesting information about a current broadcast service which is currently provided in the PD at a first URL of an HTTP server, and transmitting a response message in response to the HTTP GET message to the CD application, which may correspond to the above-described information delivery process related to a current service/content using HTTP. This process has been described above. The first URL may correspond to a companion service URL of the HTTP server (web server). The response message may include an ESG of a current broadcast service, a continuous component of the current broadcast service, a file content item of the current broadcast service, or timeline information of the current broadcast service, which may correspond to information of an HTTP response message in delivery of information about a current service/content described above. The information may correspond to ESG information, component information, file or NRT data information, timeline location information, etc.

In a method of providing the broadcast service in the PD according to another embodiment of the present invention, the content element may include first location information, and the first location information may include a URL that allows the CD application to access the whole content. In addition, the continuous component element may include second location information, and the second location information may include a URL that allows the CD application to access the continuous component of the content. Further, the content item element may include third location information, and the third location information may include a URL that allows the CD application to access the file content item of the content. The respective location information may correspond to a Location element, an @componentLocation attribute, and an @FileContentItemLocation attribute in order.

In a method of providing the broadcast service in the PD according to another embodiment of the present invention, the third location information may be used when the CD application acquires an app-based enhancement component for the broadcast service. According to a given embodiment, a URL of the second location information may be used to acquire the app-based enhancement component. Here, app-based enhancement has been described above. The app-based enhancement component may refer to an app component, and may refer to a component having data necessary to provide app-based enhancement.

In a method of providing the broadcast service in the PD according to another embodiment of the present invention, the app-based enhancement component may be used to provide app-based enhancement for the broadcast service. In addition, the URL of the third location information may be used to acquire an AST or an EMT that signals app-based enhancement. The AST and the EMT have been described above.

In a method of providing the broadcast service in the PD according to another embodiment of the present invention, the AST may describe information about at least one application included in app-based enhancement, and the EMT may describe information about events that signal an action performed by an application. The AST, the EMT, and the event have been described above. App-based enhancement may be provided in the CD using the AST and the EMT.

A description will be given of a method of providing a broadcast service in the CD according to an embodiment of the present invention. This method is not illustrated in the figure.

The method of providing the broadcast service in the CD according to the embodiment of the present invention may include executing an application of the CD by a launcher of the CD, performing a discovery process with the PD using a network interface of the CD by an application of the CD, establishing WebSocket connection with a WebSocket server of the PD by the application of the CD using a WebSocket client of the CD, transmitting, by the CD application, a subscription message for receiving a service/content identification message using the WebSocket client of the CD and subscribing to the service, and/or receiving a service identification message using the WebSocket client of the CD. The discover process between the CD application and the PD may be performed by a companion module of the CD. The CD application may request a device description using the companion module, request application information at the above-described first URL, and acquire a response to the request.

Methods of providing the broadcast service in the CD according to embodiments of the present invention may correspond to the above-described methods of providing the broadcast service in the PD according to the embodiments of the present invention. The methods of providing the broadcast service in the CD may be performed by hardware modules corresponding to the modules (for example, the companion module, the receiving module, the internal control module, the web server, the WebSocket server, etc.) used in the methods of providing the broadcast service in the PD. The method of providing the broadcast service in the CD may have embodiments corresponding to the embodiments of the method of providing the broadcast service in the PD described above.

The above-described steps may be omitted or replaced by other steps for performing the same/similar operations according to embodiment.

FIG. 118 is a diagram illustrating a broadcast receiver which operates as a PD according to an embodiment of the present invention.

The broadcast receiver which operates as the PD according to the embodiment of the present invention may include the companion module, the receiving module, the internal control module, the web server, and/or the WebSocket server described above. The respective blocks/modules have been described above.

The broadcast receiver which operates as the PD according to the embodiment of the present invention and the internal blocks/modules thereof may perform the above-described embodiments of the method of providing the broadcast service in the PD of the present invention.

A description will be given of an apparatus which operates as the CD according to an embodiment of the present invention. This apparatus is not illustrated in the figure.

The apparatus which operates as the CD according to the embodiment of the present invention may include the launcher, the companion module, and/or the network interface described above.

The apparatus which operates as the CD according to the embodiment of the present invention and the internal blocks/modules thereof may perform the above-described embodiments of the method of providing the broadcast service in the CD of the present invention.

The above-described blocks/modules, etc. inside the apparatus may correspond to processors that execute continuous processes stored in a memory or hardware elements positioned inside/outside the apparatus according to embodiment.

The above-described modules may be omitted or replaced by other modules for performing the same/similar operations according to embodiment.

Modules or units may correspond to processors that execute continuous processes stored in a memory (or a storage unit). The respective steps described in the above-described embodiments may be performed by hardware/processors. The respective modules/blocks/units described in the above embodiments may operate as hardware/processors. In addition, the methods proposed in the present invention may be executed as codes. These codes may be written in a processor-readable storage medium, and thus may be read by a processor provided by an apparatus.

Even though the respective drawings have been separately described for convenience of description, embodiments described in the respective drawings may be merged into a new embodiment. In addition, designing of a computer-readable recording medium in which a program for executing the above-described embodiments according to necessity of a person skilled in the art is within the scope of the present invention.

Referring to the apparatuses and methods according to the present invention, configurations and methods of the embodiments are not restrictively applicable, and all or some of the above-described embodiments may be selectively combined and configured such that the embodiments can be variously changed Meanwhile, the methods proposed in the present invention may be implemented as processor-readable code stored in a processor-readable recording medium included in a network device. The processor-readable recording medium includes all types of recording devices in which processor-readable data is stored. Examples of the processor-readable recording medium include a ROM, a RAM, a CD-ROM, a magnetic tape, a floppy disk, an optical data storage device, etc. In addition, the examples include a carrier-wave type implementation such as a transmission over the Internet. Furthermore, as the processor-readable recording medium is distributed to a computer system connected via a network, processor-readable code can be saved and executed in a distributed manner.

Further, even though preferred embodiments of the present invention have been illustrated and described, the present invention is not restricted to a certain embodiment described above, and various modifications and variations can be made by those skilled in the art without departing from the subject matter of the present invention as defined by the claims. Furthermore, these modified embodiments should not be understood separately from the spirit or scope of the present invention.

Both apparatus and method inventions are mentioned in this specification and descriptions of both the apparatus and method inventions may be complementarily applicable to each other.

It should be understood by those skilled in the art that various changes and modifications can be made in the present invention within the spirit or scope of the present invention. Therefore, the present invention is intended to include changes and modifications of the present invention within the scope of accompanying claims and equivalents thereof.

Both apparatus and method inventions are mentioned in this specification and descriptions of both the apparatus and method inventions may be complementarily applicable to each other.

Various embodiments have been described in best modes.

INDUSTRIAL APPLICABILITY

The present invention is used in a series of broadcast signal provision fields.

It is clear to those skilled in the art that various changes and modifications can be made in the present invention within the spirit or scope of the present invention. Therefore, the present invention is intended to include changes and modifications of the present invention within the scope of accompanying claims and equivalents thereof.

The invention claimed is:

1. A method of providing a broadcast service in a Primary Device (PD), the method comprising:
conducting a discovery process with a Companion Device (CD) application in a CD, wherein the PD provides the CD application with a Web Server endpoint or a WebSocket Server endpoint of the PD by using a response message; and
delivering a service and content identification message to the CD application based on the WebSocket Server endpoint,
wherein the service and content identification message includes service information and content information, and the content information includes component information for a component included in a content and file information for a file included in the content, and
wherein the content information includes first Uniform Resource Locator (URL) information for accessing the content, the component information includes second URL information for accessing the component, and the file information includes third URL information for accessing the file.

2. The method of claim 1,
wherein the service information includes information related to a broadcast service provided in the PD and an identifier of the broadcast service.

3. The method of claim 2, the method further comprising:
receiving a HyperText Transfer Protocol (HTTP) GET message, through the Web Server endpoint, requesting information about a current broadcast service in the PD; and
delivering a response message for the HTTP GET message to the CD application,
wherein the response message for the HTTP GET message includes an Electronic Service Guide (ESG) of the current broadcast service, components of the current broadcast service, files of the current broadcast service or timeline information of the current broadcast service.

4. The method of claim 2,
wherein the second URL information is used for the CD application to obtain app-based enhancement components of the broadcast service.

5. The method of claim 4,
wherein the app-based enhancement components are used for providing an app-based enhancement for the broadcast service, and
the third URL information is used for obtaining an Application Signaling Table (AST) or an Event Message Table (EMT) that signals the app-based enhancement.

6. The method of claim 5,
wherein the AST describes information about at least one of applications included in the app-based enhancement, and
the EMT describes information about events signaling actions conducted by the applications.

7. An apparatus for receiving a broadcast service operating as a Primary Device (PD), the apparatus comprising:
a processor that conducts a discovery process with a Companion Device (CD) application in a CD, the PD providing the CD application with a Web Server endpoint or a WebSocket Server endpoint of the PD by using a response message,
wherein a WebSocket Server delivers a service and content identification message to the CD application based on the WebSocket Server endpoint,
wherein the service and content identification message includes service information and content information, and the content information includes component information for a component included in a content and file information for a file included in the content,
wherein the content information includes first Uniform Resource Locator (URL) information for accessing the content, the component information includes second URL information for accessing the component, and the file information includes third URL information for accessing the file.

8. The apparatus of claim 7,
wherein the service information includes information related to a broadcast service provided in the PD and an identifier of the broadcast service.

9. The apparatus of claim 8,
wherein the apparatus further comprises a HyperText Transfer Protocol (HTTP) server,
the HTTP server receiving a HTTP GET message, through the Web Server endpoint, requesting information about a current broadcast service currently being provided in the PD, and the HTTP server delivering a response message for the HTTP GET message to the CD application, wherein the response message for the HTTP GET message includes an Electronic Service Guide (ESG) of the current broadcast service, components of the current broadcast service, files of the current broadcast service or timeline information of the current broadcast service.

10. The apparatus of claim 8, wherein the second URL information is used for the CD application to obtain app-based enhancement components of the broadcast service.

11. The apparatus of claim 10, wherein the app-based enhancement components are used for providing an app-based enhancement for the broadcast service, and the third URL information is used for obtaining an Application Signaling Table (AST) or an Event Message Table (EMT) that signals the app-based enhancement.

12. The apparatus of claim 11, wherein the AST describes information about at least one of applications included in the app-based enhancement, and the EMT describes information about events signaling actions conducted by the applications.

* * * * *